(12) United States Patent
Li et al.

(10) Patent No.: US 11,856,286 B2
(45) Date of Patent: Dec. 26, 2023

(54) VIDEO SHOOTING METHOD AND ELECTRONIC DEVICE

(71) Applicant: Huawei Technologies Co., Ltd., Shenzhen (CN)

(72) Inventors: Yuanyou Li, Oerlikon (CH); Wei Luo, Shanghai (CN); Bin Chen, Shenzhen (CN); Congchao Zhu, Shenzhen (CN); Bin Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/780,872

(22) PCT Filed: Nov. 28, 2020

(86) PCT No.: PCT/CN2020/132547
§ 371 (c)(1),
(2) Date: May 27, 2022

(87) PCT Pub. No.: WO2021/104508
PCT Pub. Date: Jun. 3, 2021

(65) Prior Publication Data
US 2023/0007186 A1    Jan. 5, 2023

(30) Foreign Application Priority Data

Nov. 29, 2019  (CN) .......................... 201911207579.8
Feb. 3, 2020   (CN) .......................... 202010079012.3
Sep. 30, 2020  (CN) .......................... 202011066518.7

(51) Int. Cl.
*H04N 5/265*    (2006.01)
*H04N 23/63*    (2023.01)
(Continued)

(52) U.S. Cl.
CPC ........... *H04N 23/632* (2023.01); *H04N 5/265* (2013.01); *H04N 5/77* (2013.01); *H04N 23/62* (2023.01);
(Continued)

(58) Field of Classification Search
None
See application file for complete search history.

(56) References Cited

U.S. PATENT DOCUMENTS

2010/0123929 A1    5/2010  Yoshimoto
2010/0281375 A1*  11/2010  Pendergast ............ G11B 27/34
                                                        715/723
(Continued)

FOREIGN PATENT DOCUMENTS

CN    101742038 A    6/2010
CN    105049712 A    11/2015
(Continued)

*Primary Examiner* — Eileen M Adams
(74) *Attorney, Agent, or Firm* — Conley Rose, P.C.

(57) ABSTRACT

A video shooting method includes: enabling a camera function; determining a first video recording template in response to a first operation of a user, where the first video recording template includes a first example sample, a second example sample, and preset audio; maintaining a position of an electronic device and starting video recording in response to a second operation of the user; and automatically generating a synthetic video, where the synthetic video includes a first video clip, a second video clip, and the preset audio, the first video clip is a video clip generated in the first camera movement mode, and the second video clip is a video clip generated in the second camera movement mode. In this manner, a plurality of video clips obtained in various camera movement modes may be synthesized into a video configured with audio.

19 Claims, 79 Drawing Sheets

(51) Int. Cl.
*H04N 23/667* (2023.01)
*H04N 23/698* (2023.01)
*H04N 23/62* (2023.01)
*H04N 5/77* (2006.01)

(52) U.S. Cl.
CPC ......... *H04N 23/633* (2023.01); *H04N 23/667* (2023.01); *H04N 23/698* (2023.01)

(56) References Cited

U.S. PATENT DOCUMENTS

| | | |
|---|---|---|
| 2011/0116759 A1 | 5/2011 | Oikawa |
| 2013/0050477 A1 | 2/2013 | Lima |
| 2016/0112632 A1* | 4/2016 | Du .................. H04N 23/64 348/36 |
| 2016/0336041 A1 | 11/2016 | Mukai et al. |
| 2017/0131878 A1 | 5/2017 | Tan et al. |
| 2017/0201714 A1* | 7/2017 | Kim .................. H04N 7/185 |
| 2018/0091728 A1* | 3/2018 | Brown .................. G11B 27/34 |
| 2020/0099854 A1* | 3/2020 | Kajiwara .............. H04N 23/50 |
| 2020/0321029 A1 | 10/2020 | Cui et al. |
| 2020/0412976 A1 | 12/2020 | Hao |
| 2023/0007186 A1 | 1/2023 | Li et al. |

FOREIGN PATENT DOCUMENTS

| | | |
|---|---|---|
| CN | 105657260 A | 6/2016 |
| CN | 107155068 A | 9/2017 |
| CN | 108900771 B | 2/2020 |
| JP | 2011103642 A | 5/2011 |
| JP | 2017046355 A | 3/2017 |
| JP | 2019140567 A | 8/2019 |
| WO | 2019205882 A1 | 10/2019 |
| WO | 2021104508 A1 | 6/2021 |

* cited by examiner

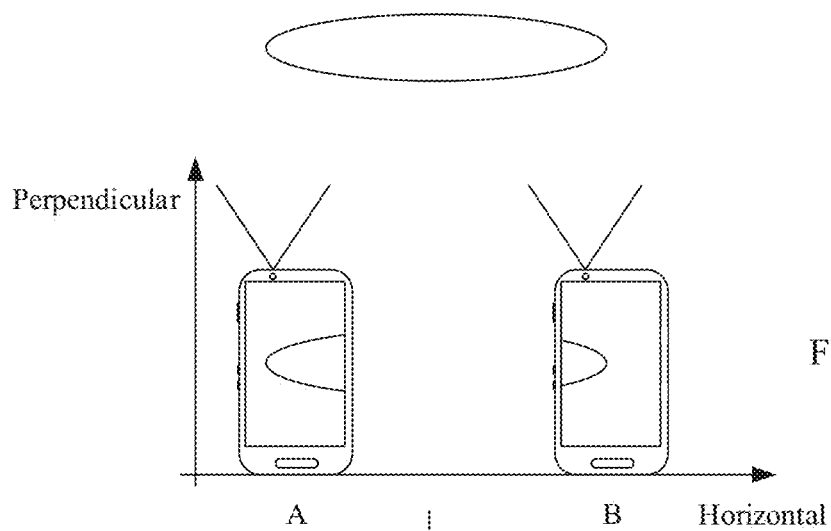
FIG. 1(a) Move
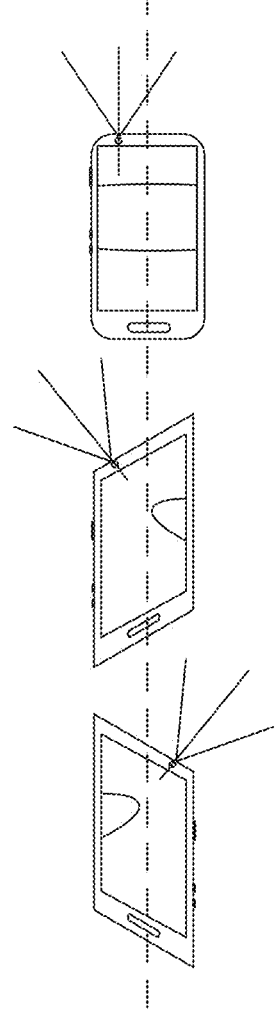
FIG. 1(b) Shake leftward
FIG. 1(c) Shake rightward

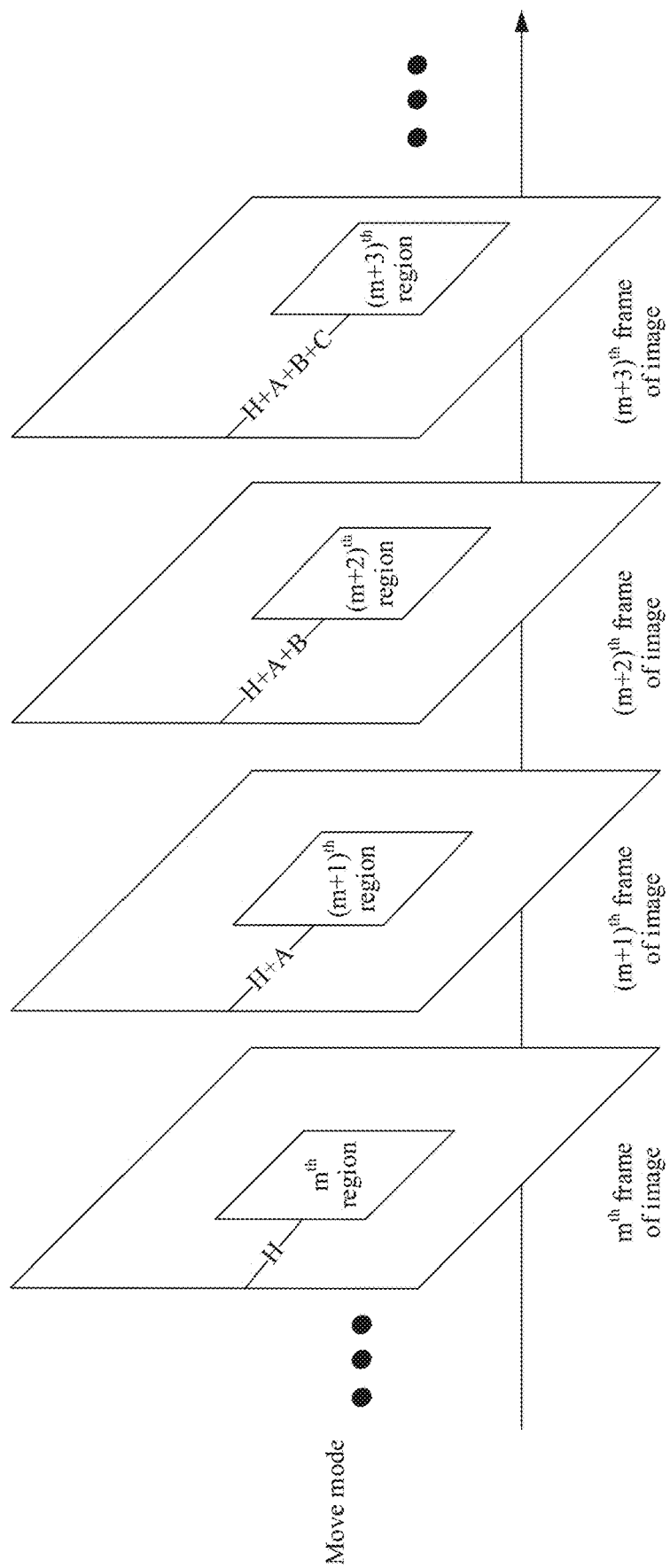
FIG. 3A-(a)

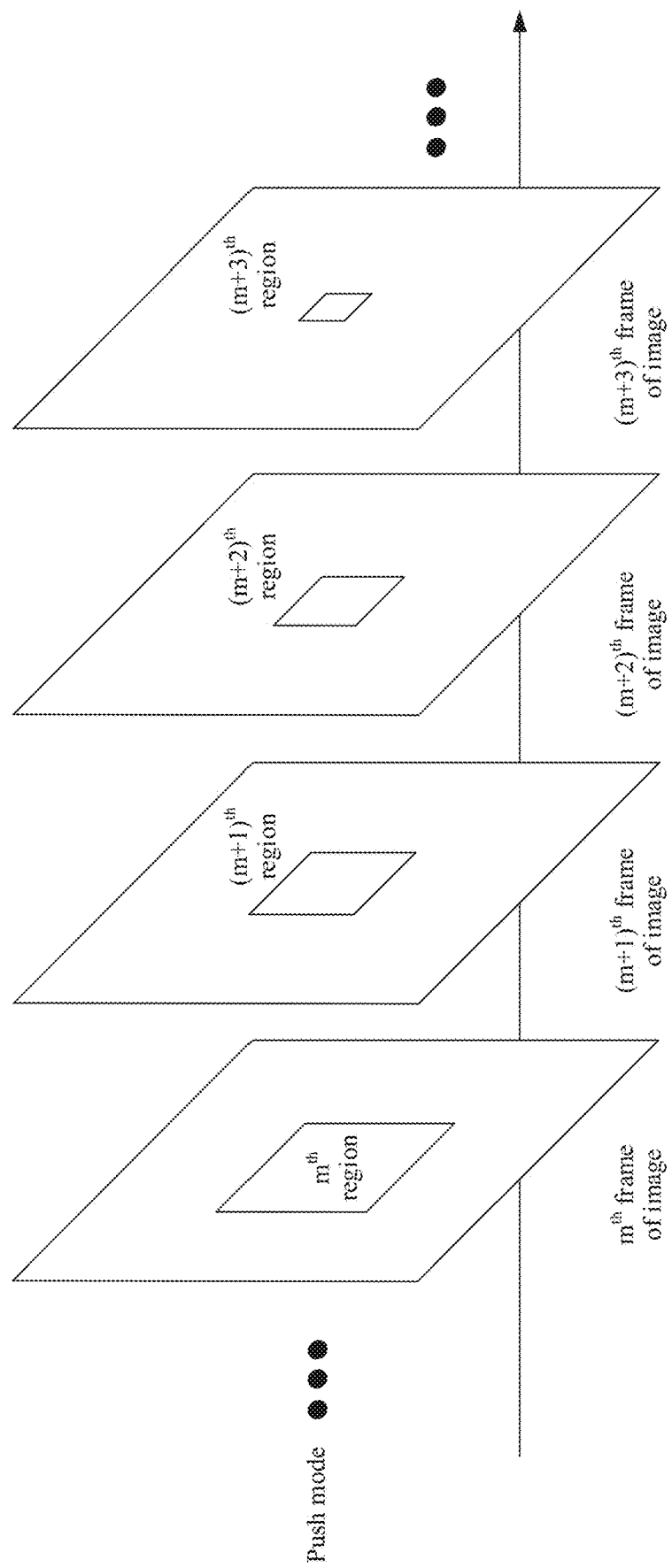
FIG. 3A-(b)

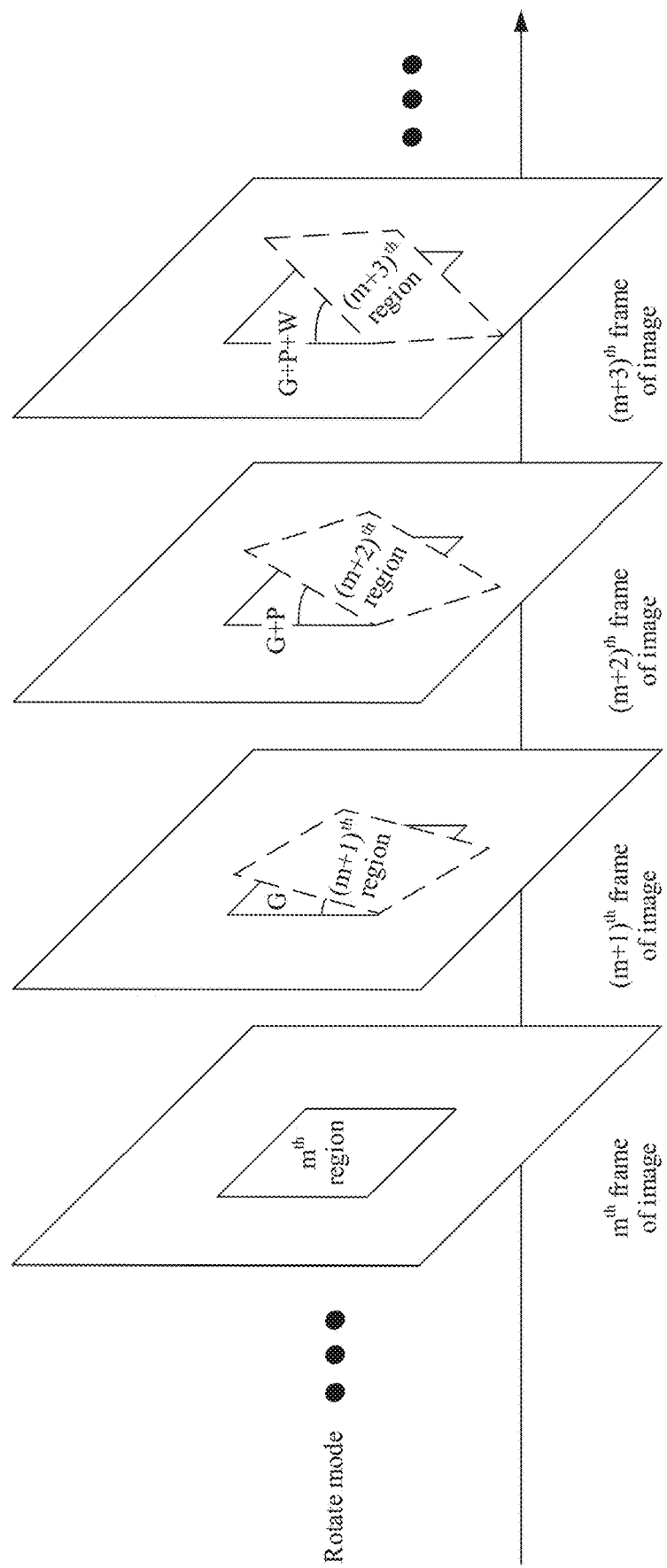
FIG. 3A-(c)

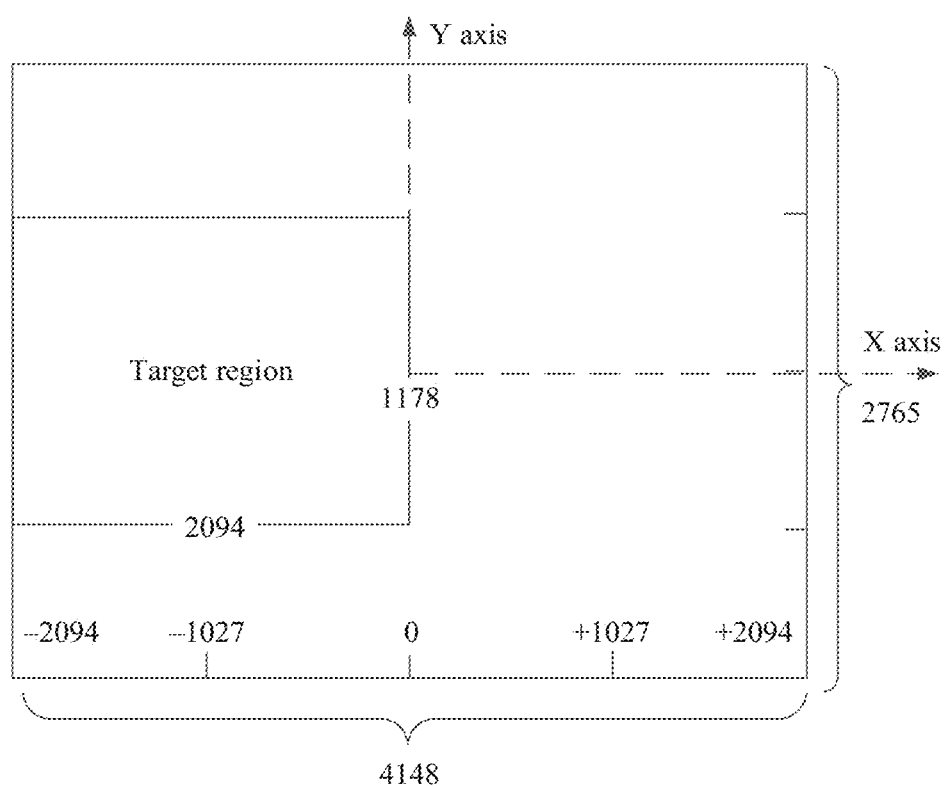
FIG. 3B-(a)

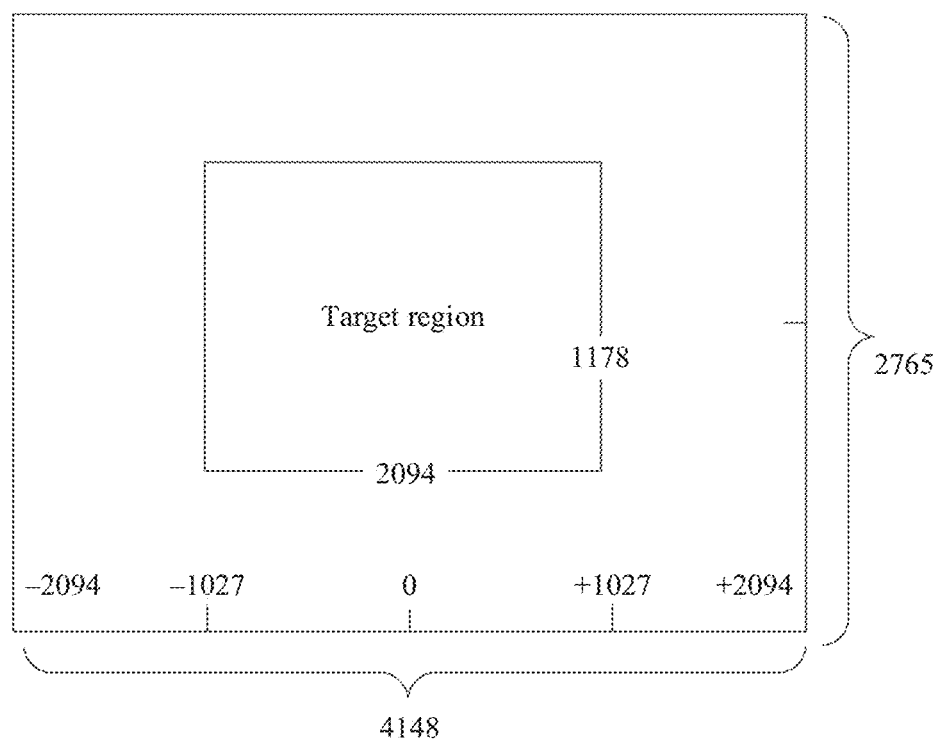
FIG. 3B-(b)

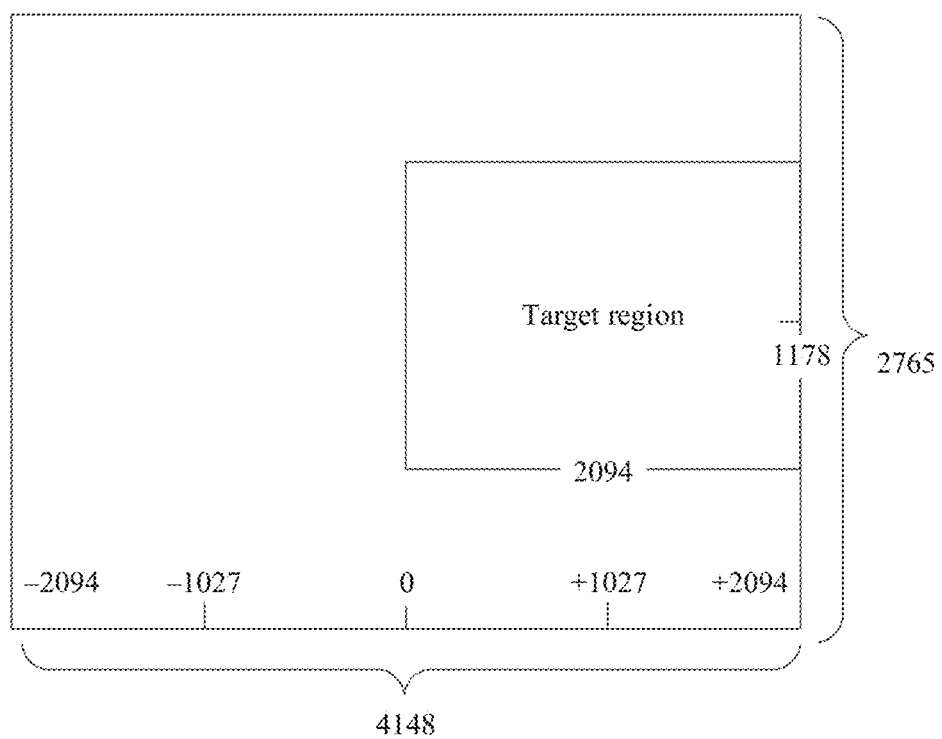
FIG. 3B-(c)

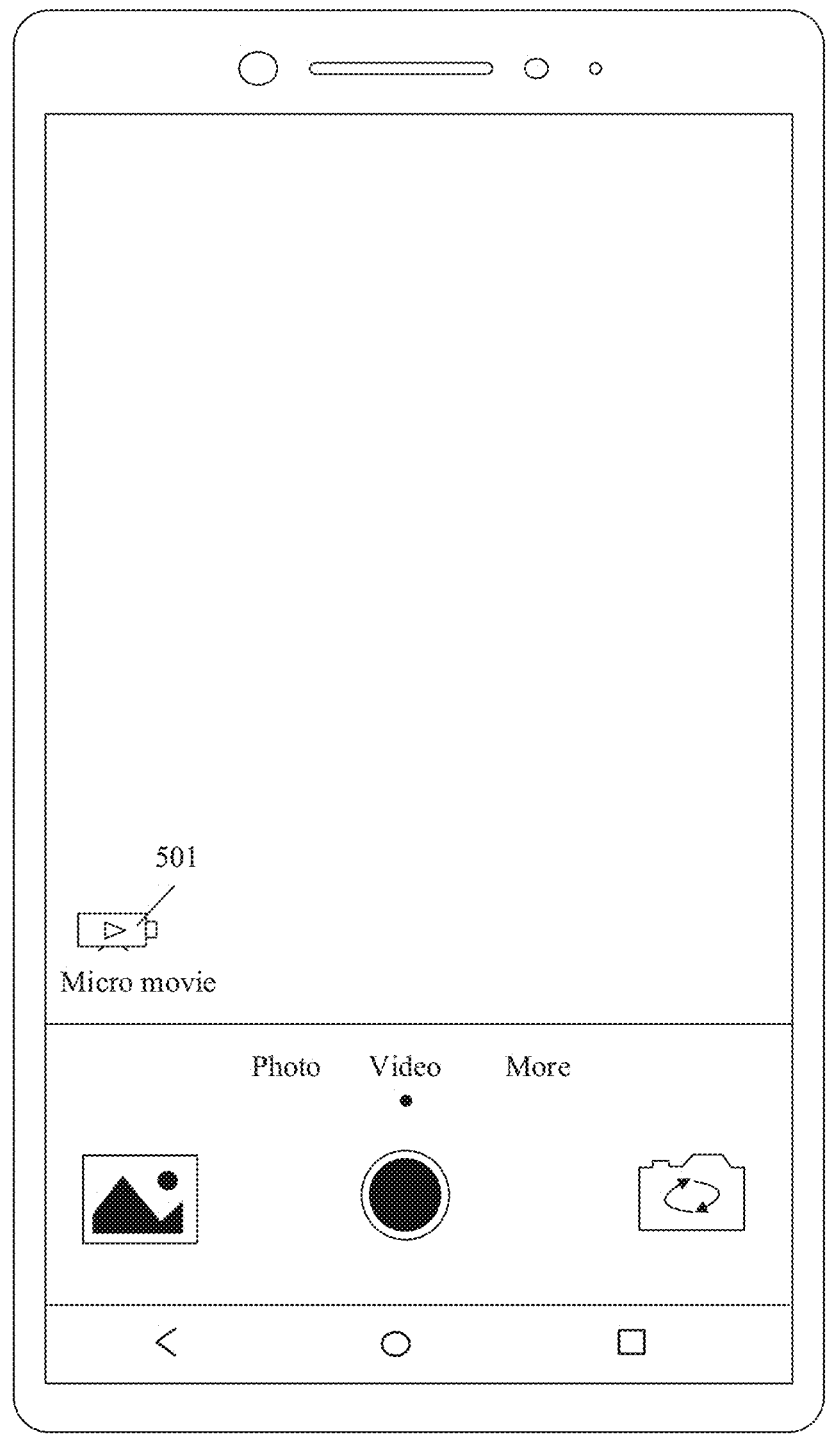
FIG. 5A-(a)

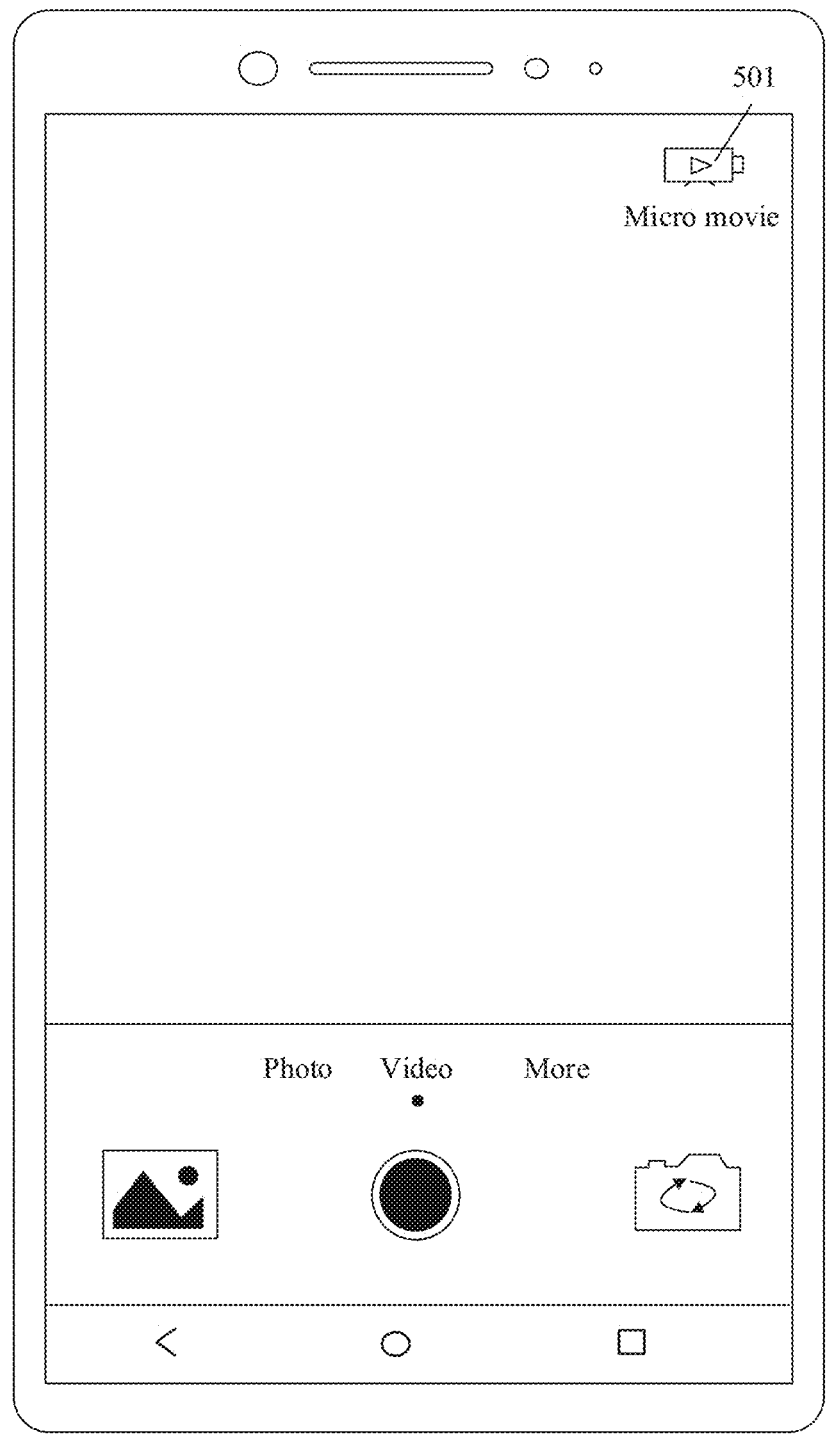
FIG. 5A-(b)

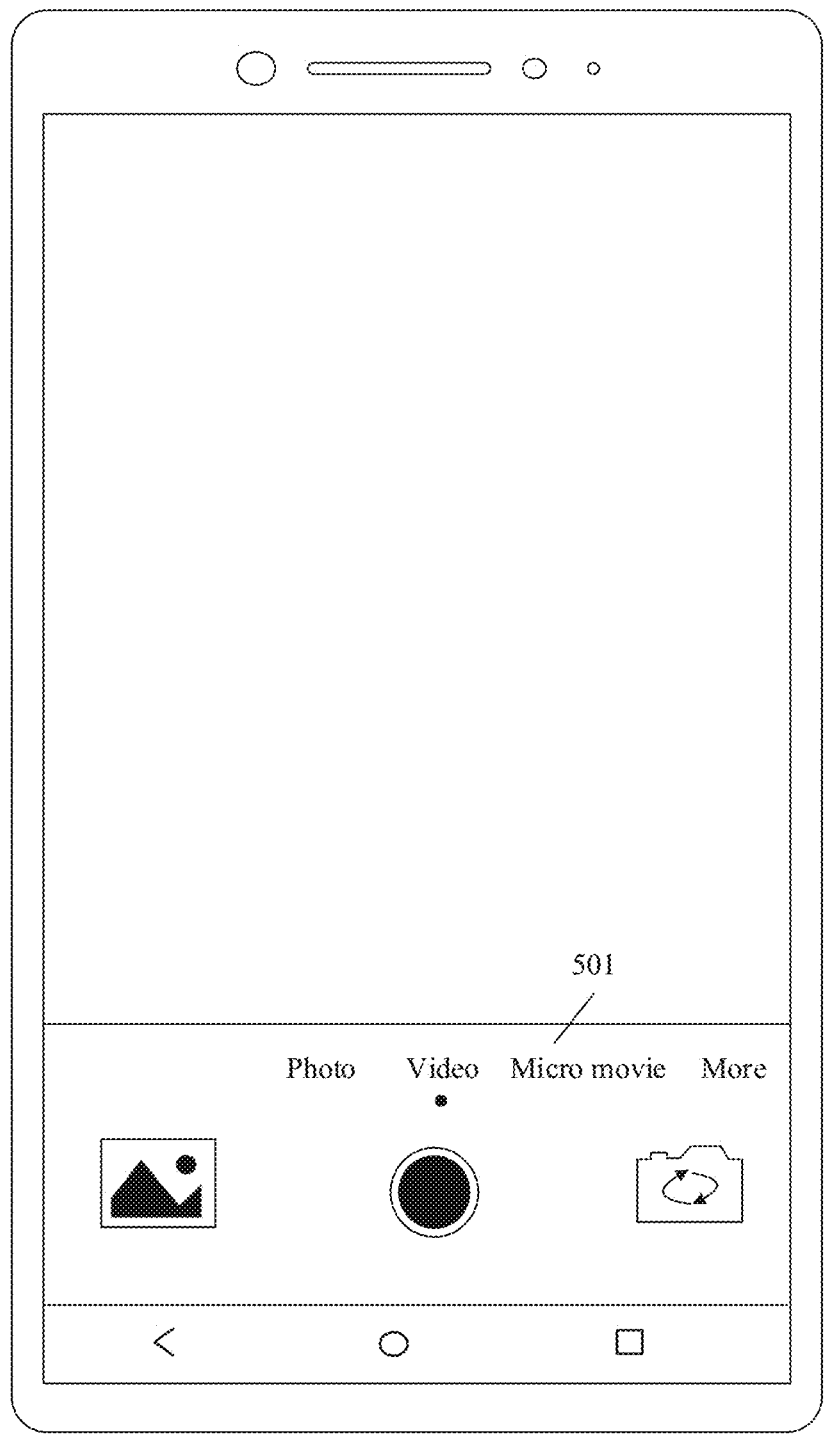
FIG. 5A-(c)

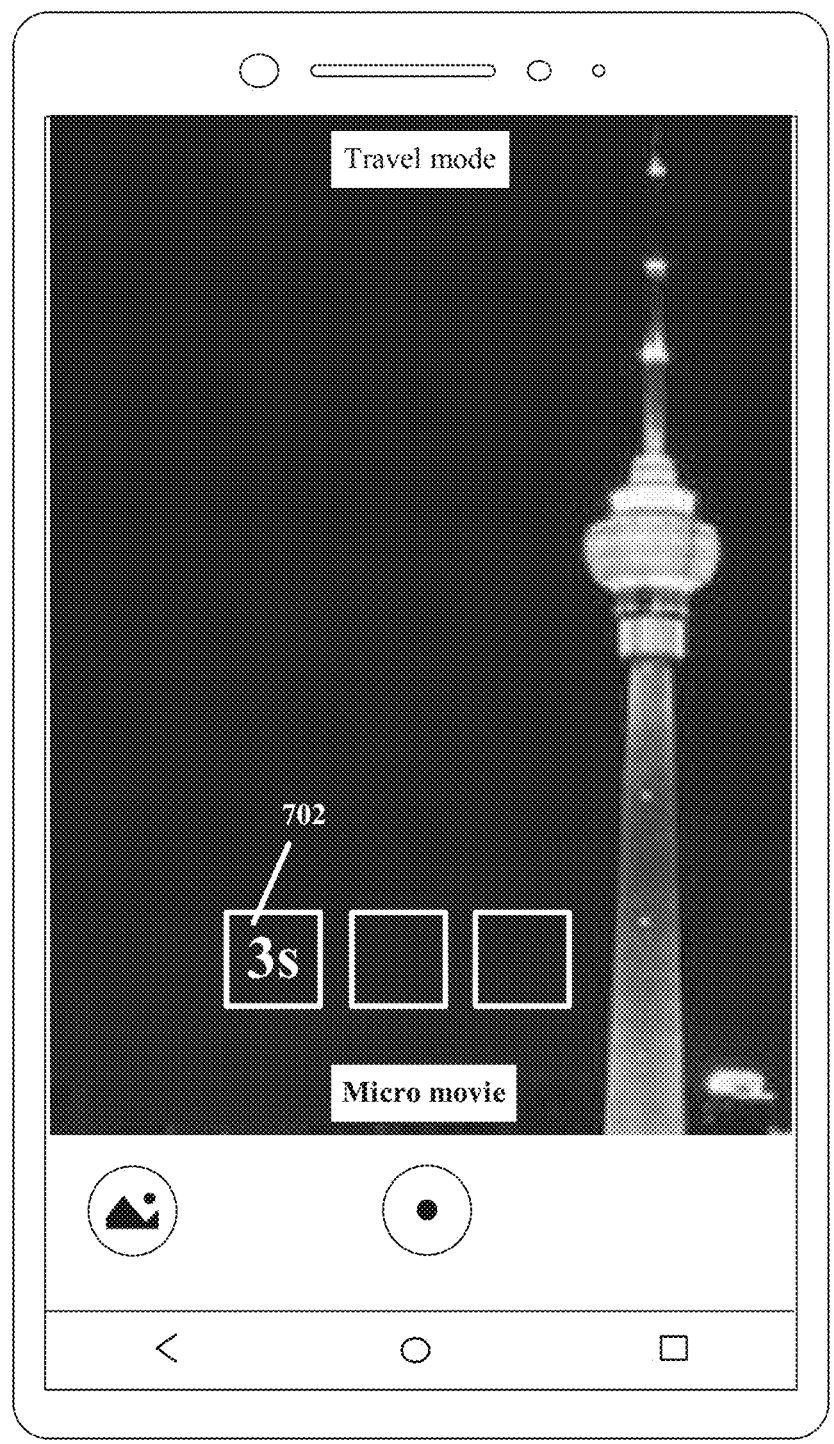
FIG. 7B-(a)

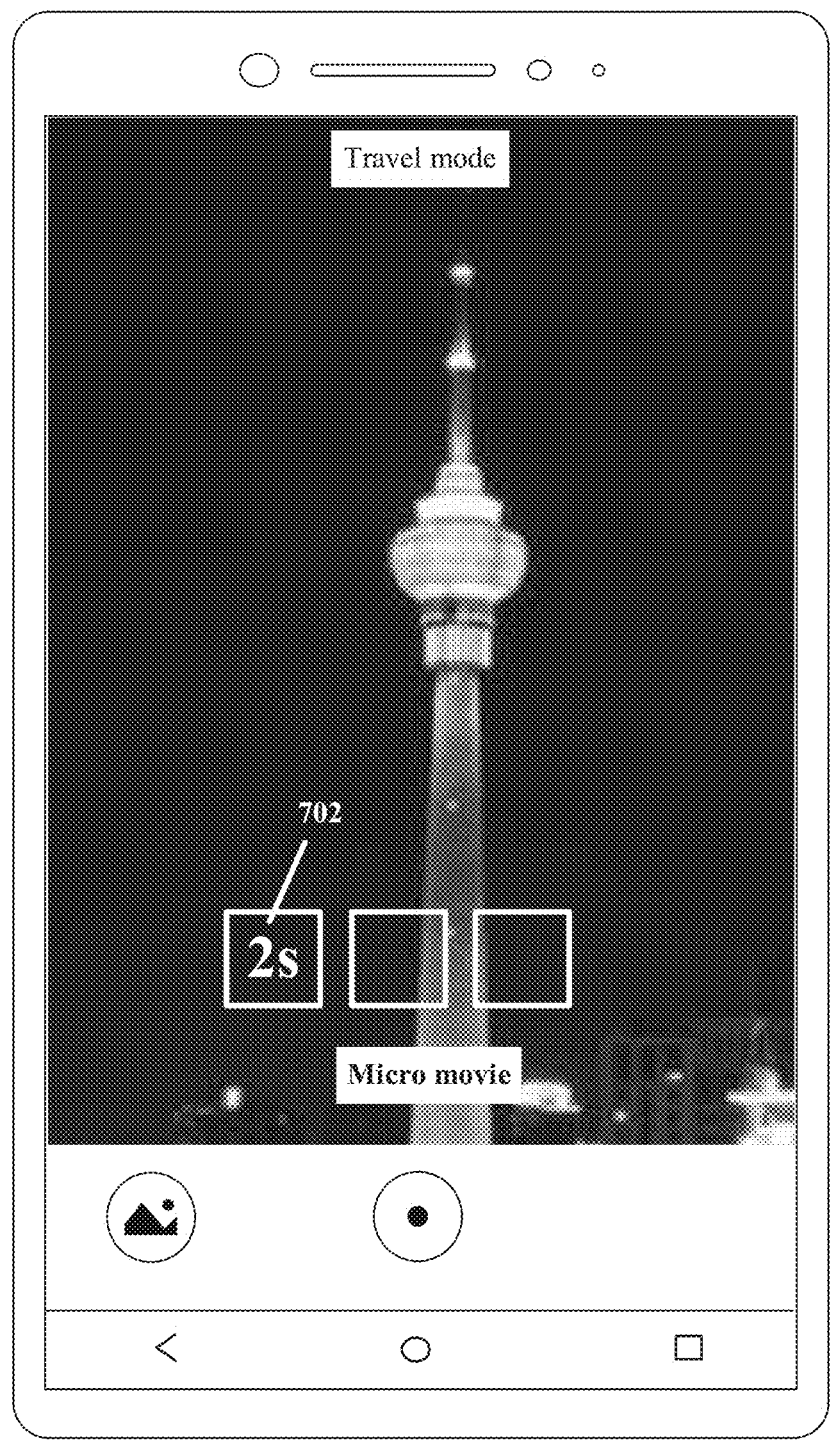
FIG. 7B-(b)

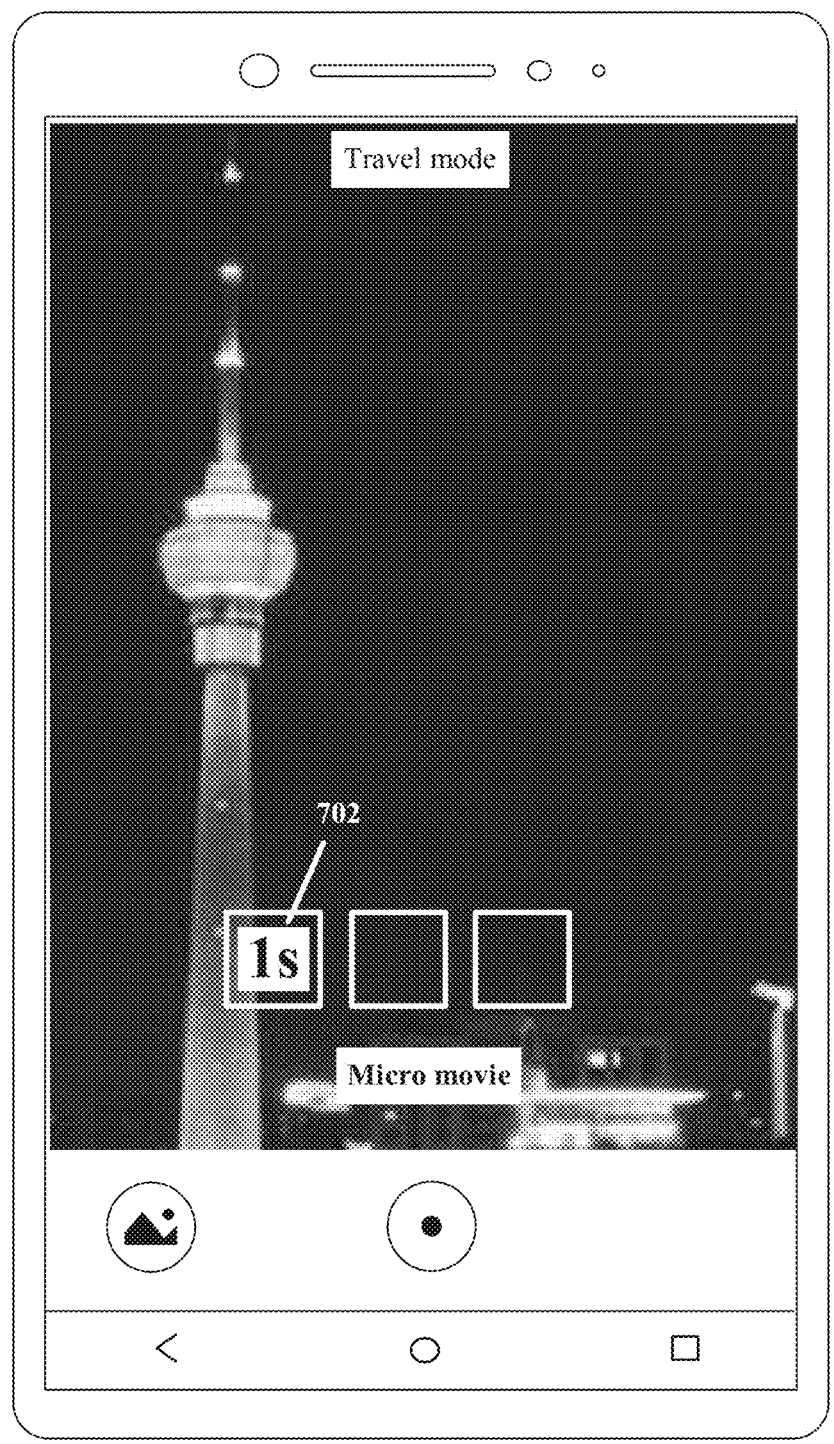
FIG. 7B-(c)

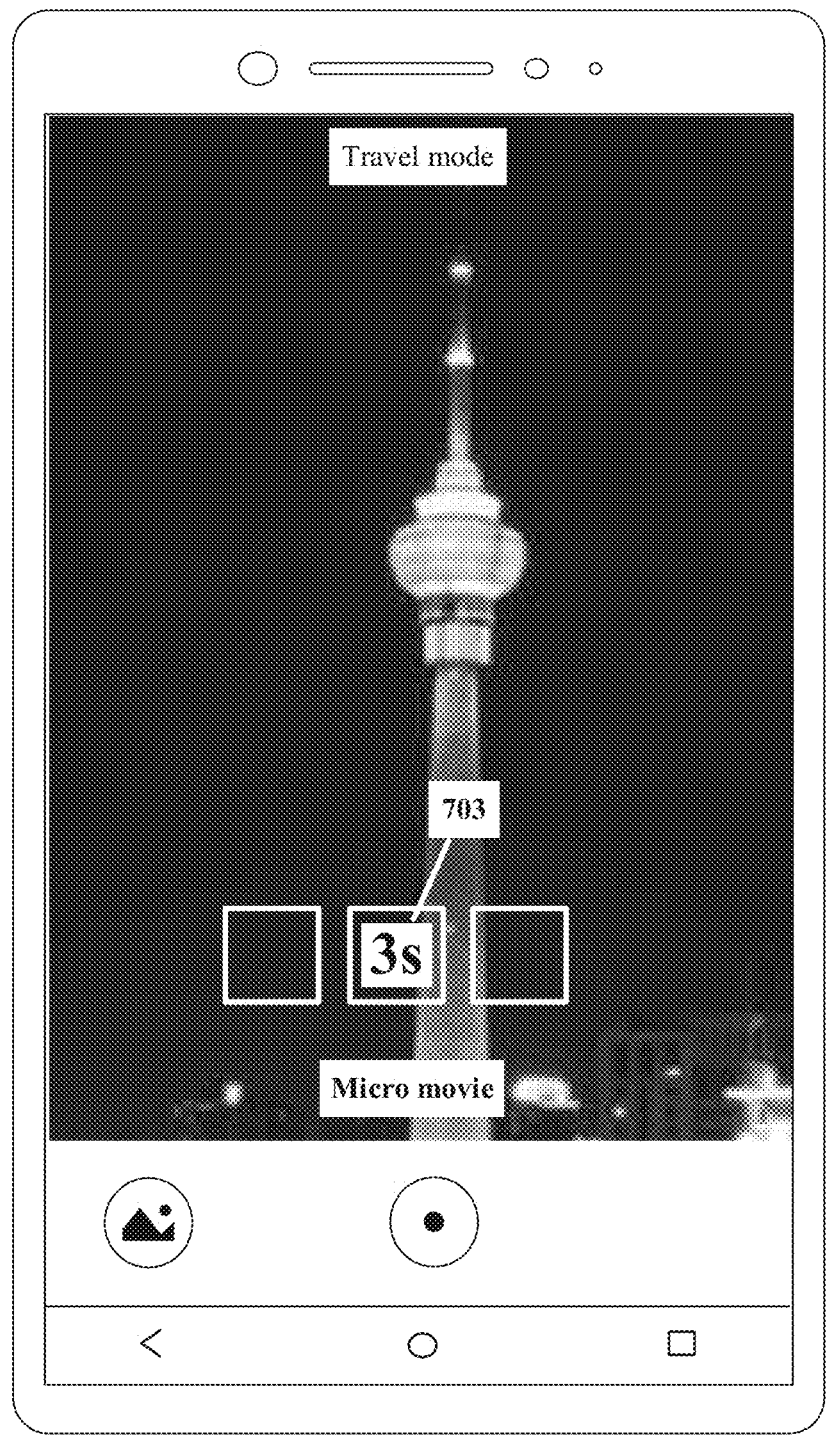
FIG. 7C-(a)

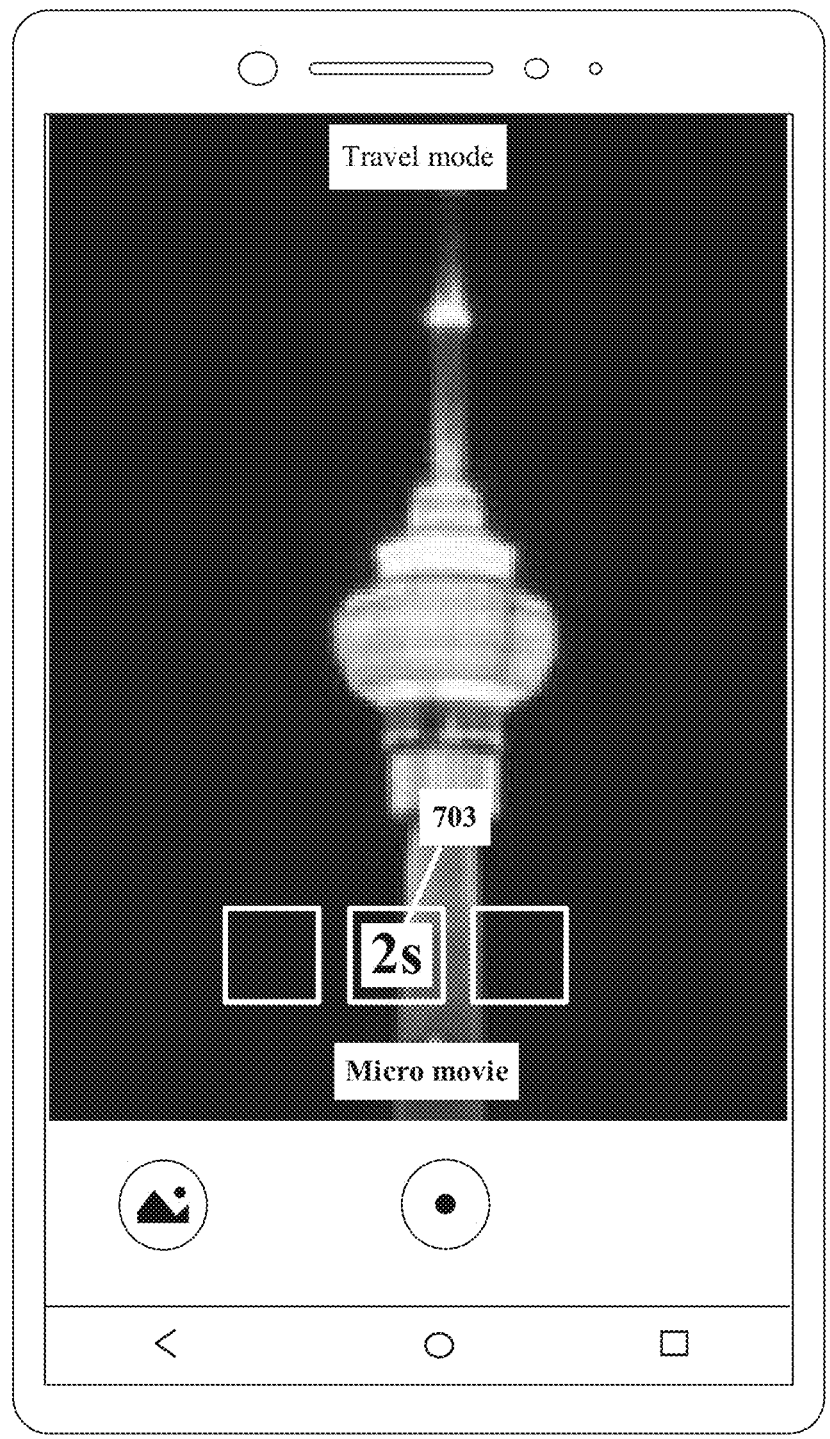
FIG. 7C-(b)

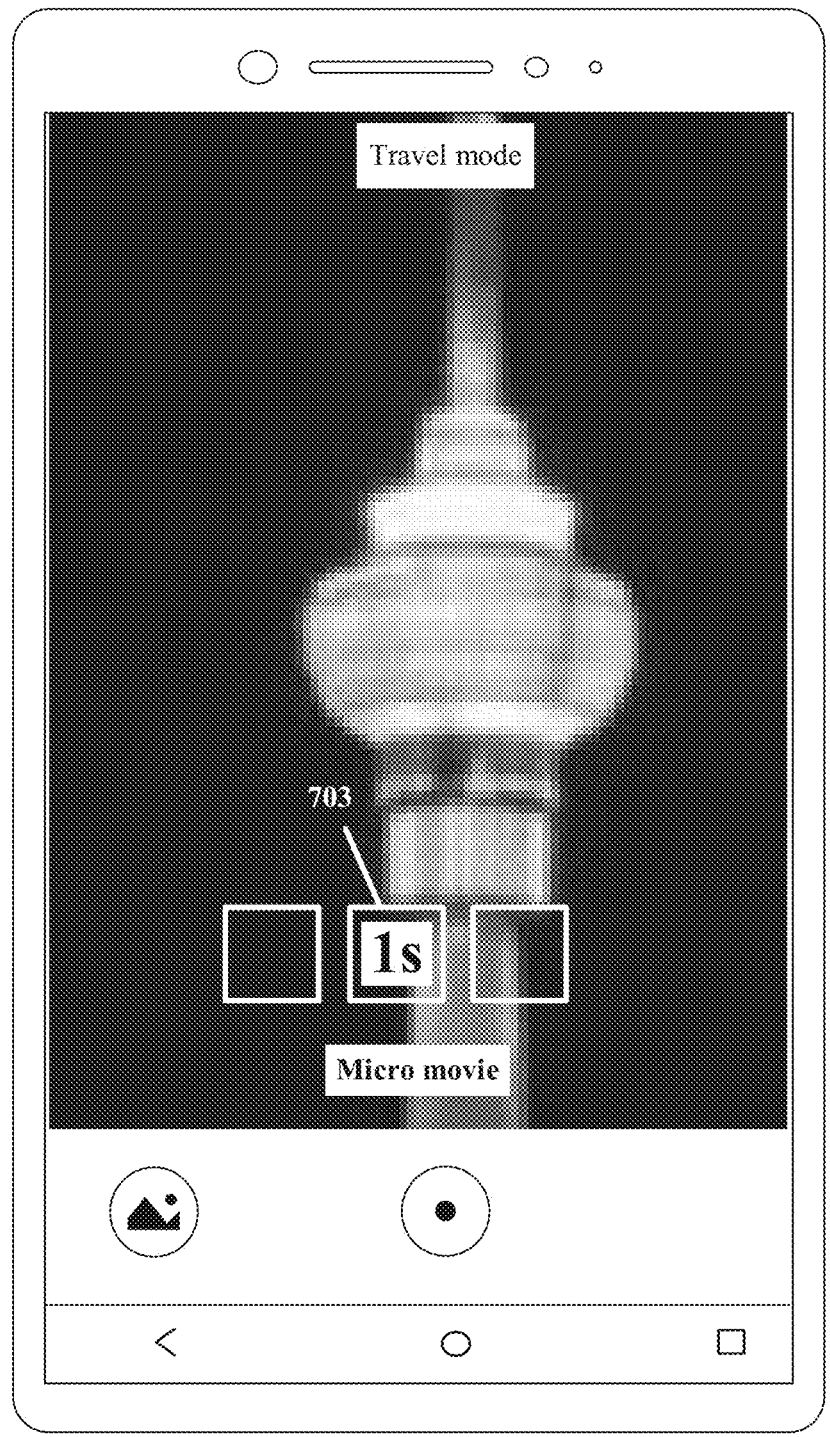
FIG. 7C-(c)

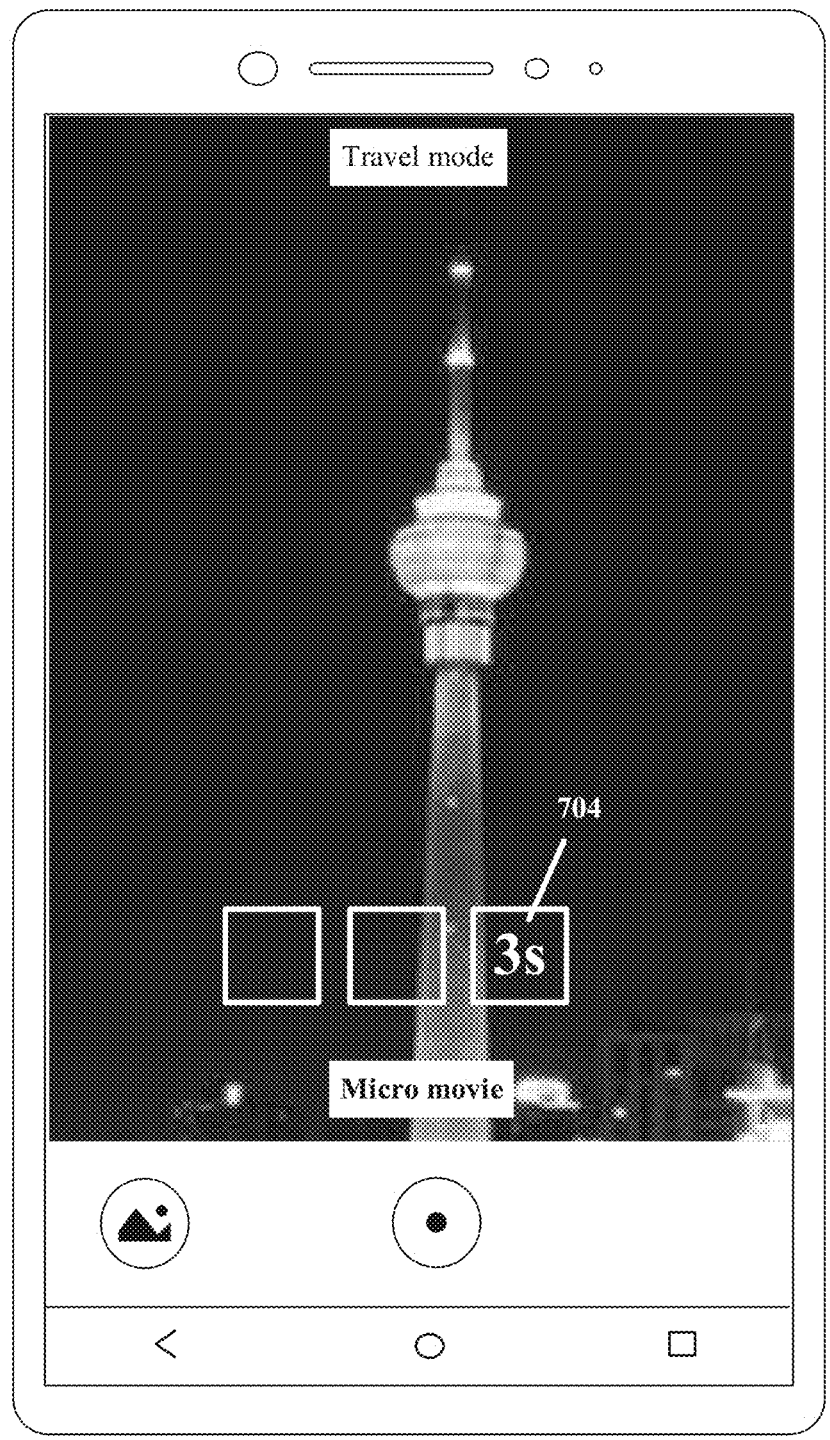
FIG. 7D-(a)

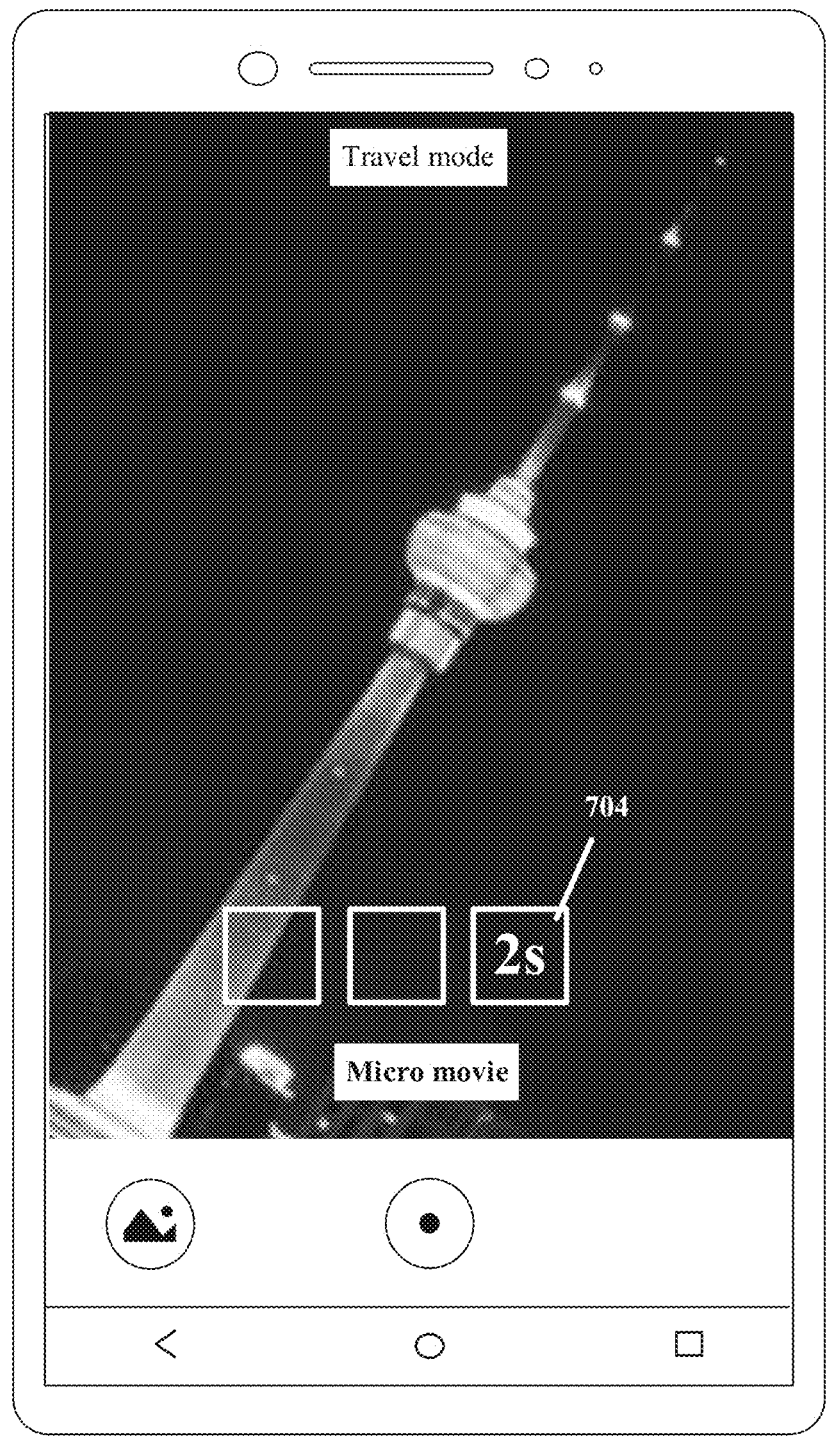
FIG. 7D-(b)

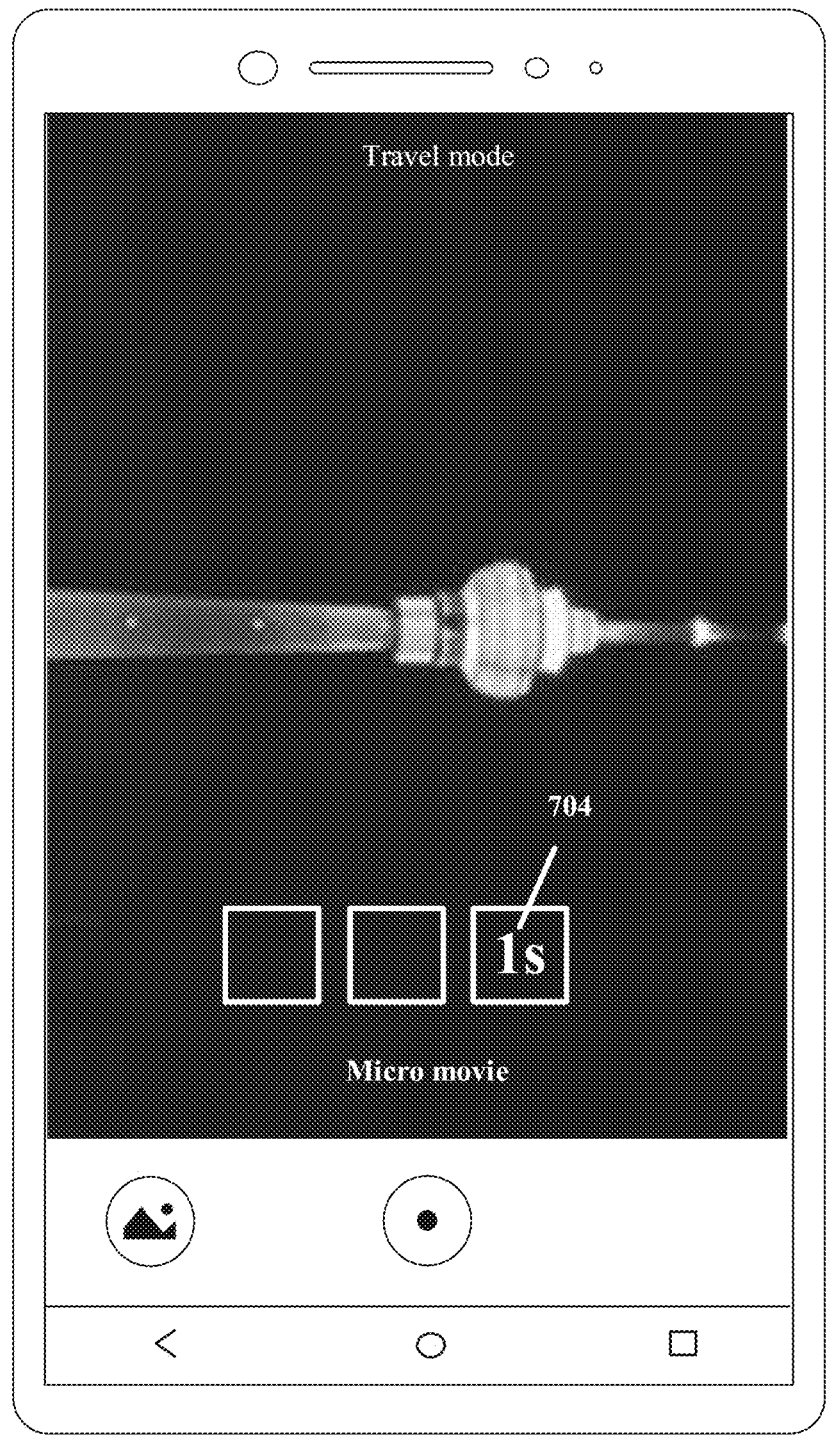
FIG. 7D-(c)

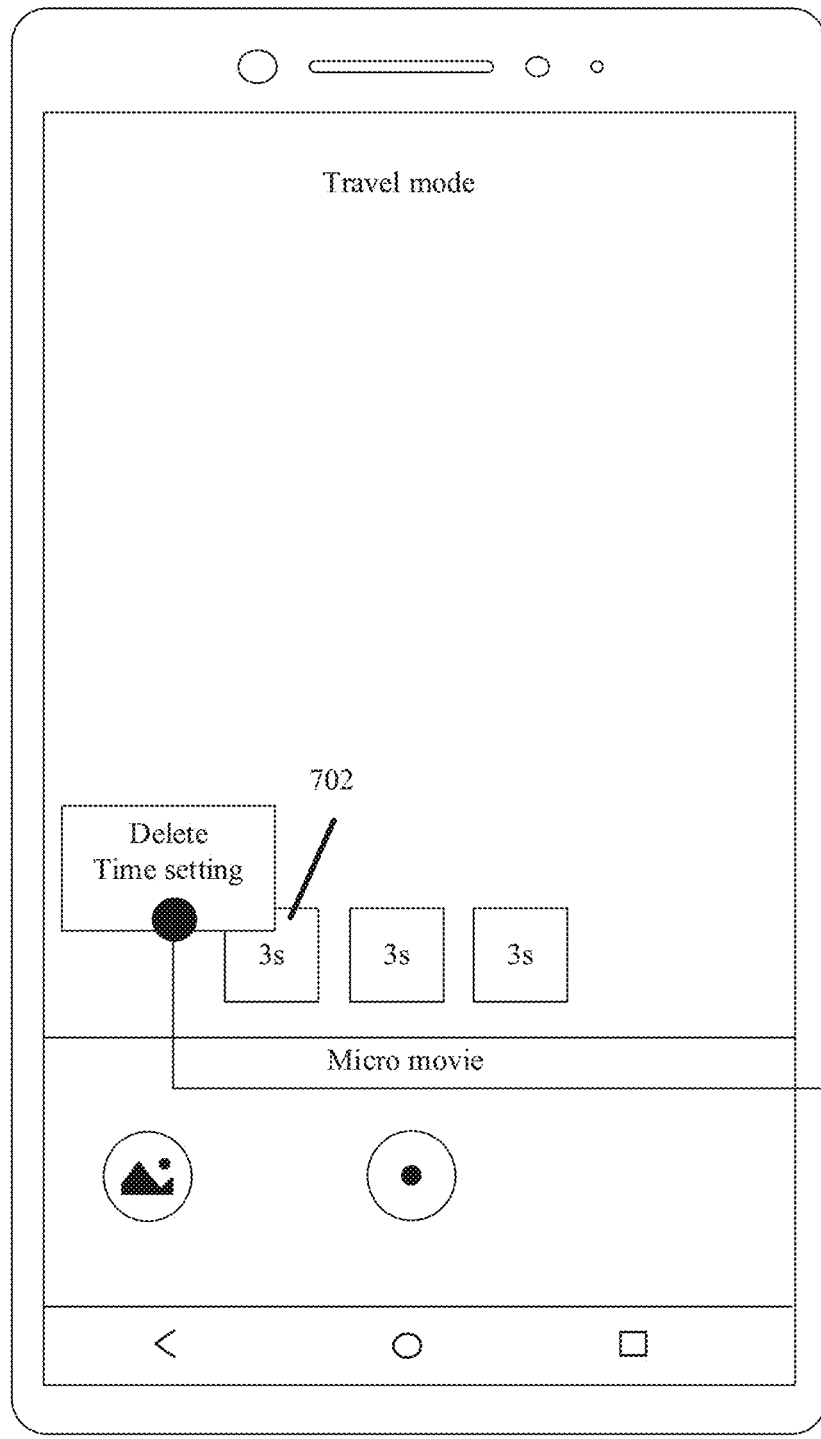
FIG. 8A-(a)

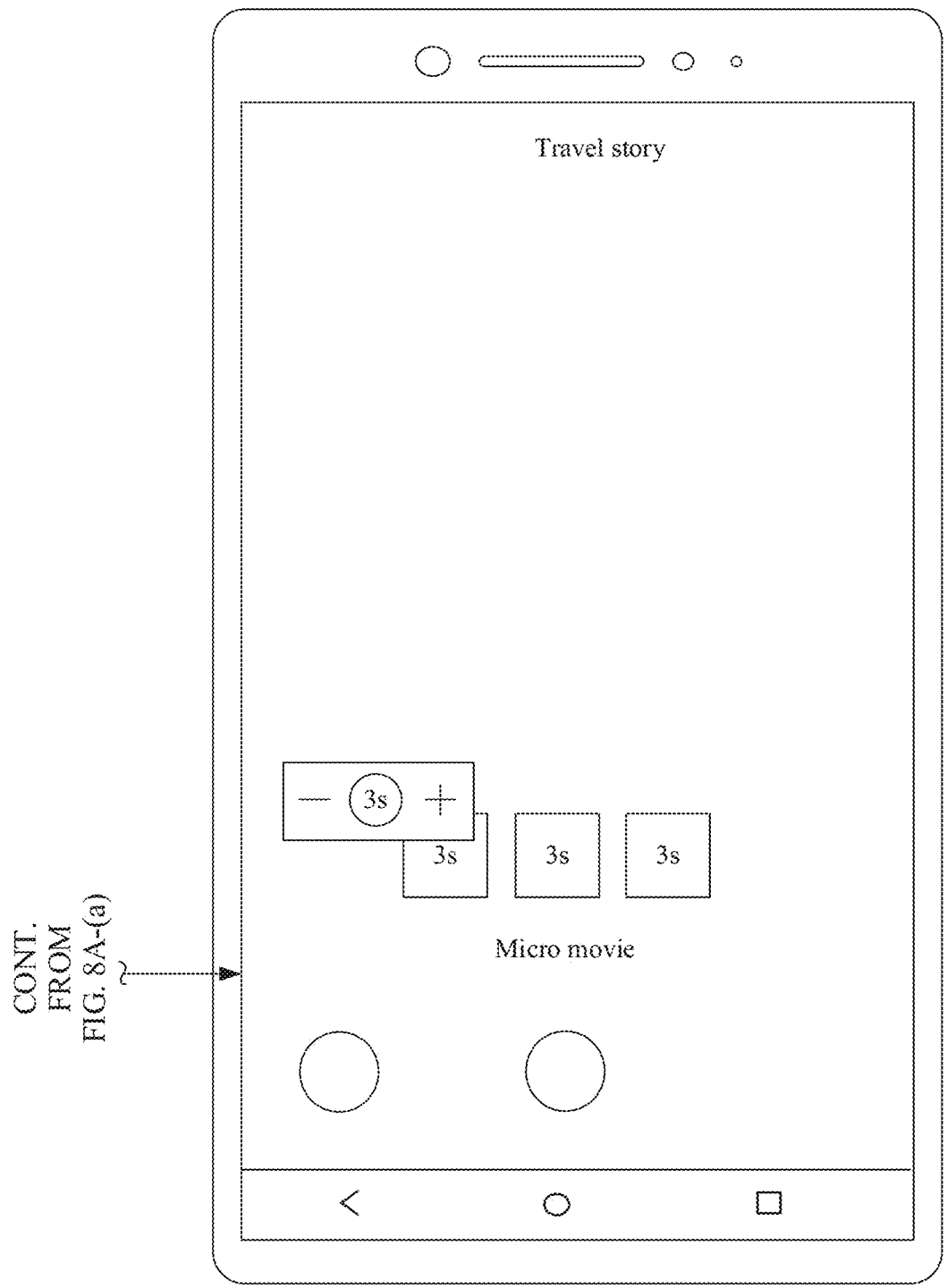
FIG. 8A-(b)

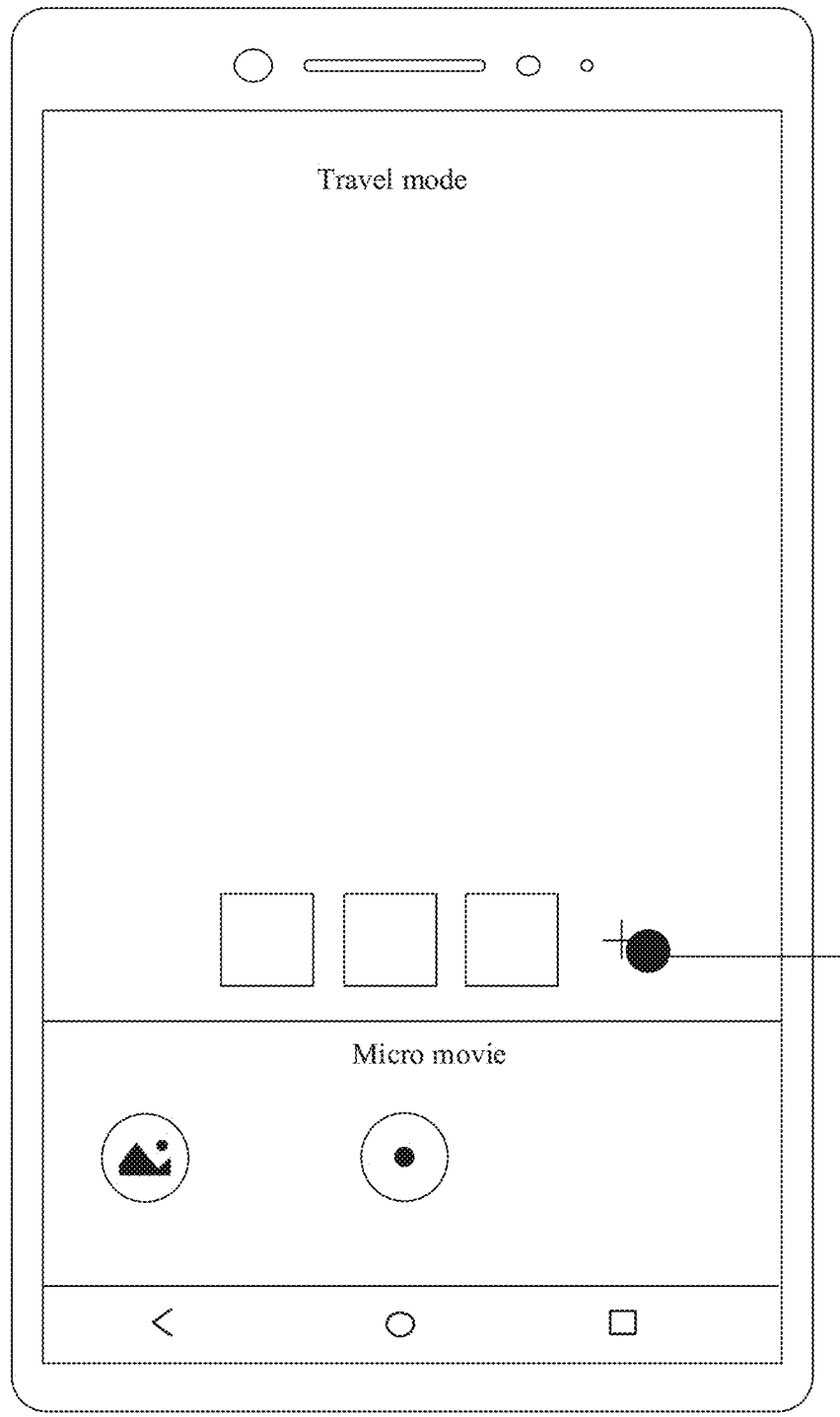
FIG. 8B-(a)

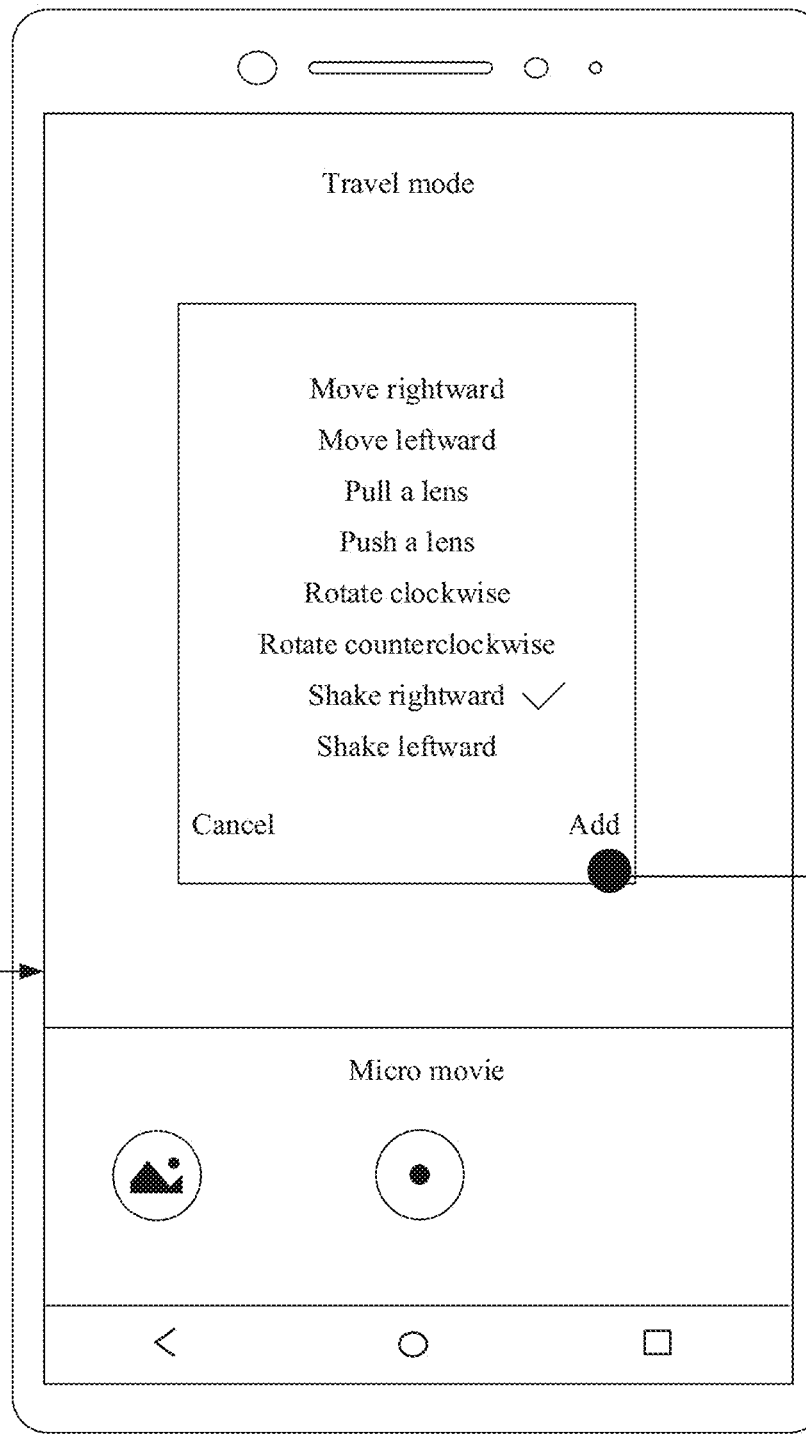
FIG. 8B-(b)

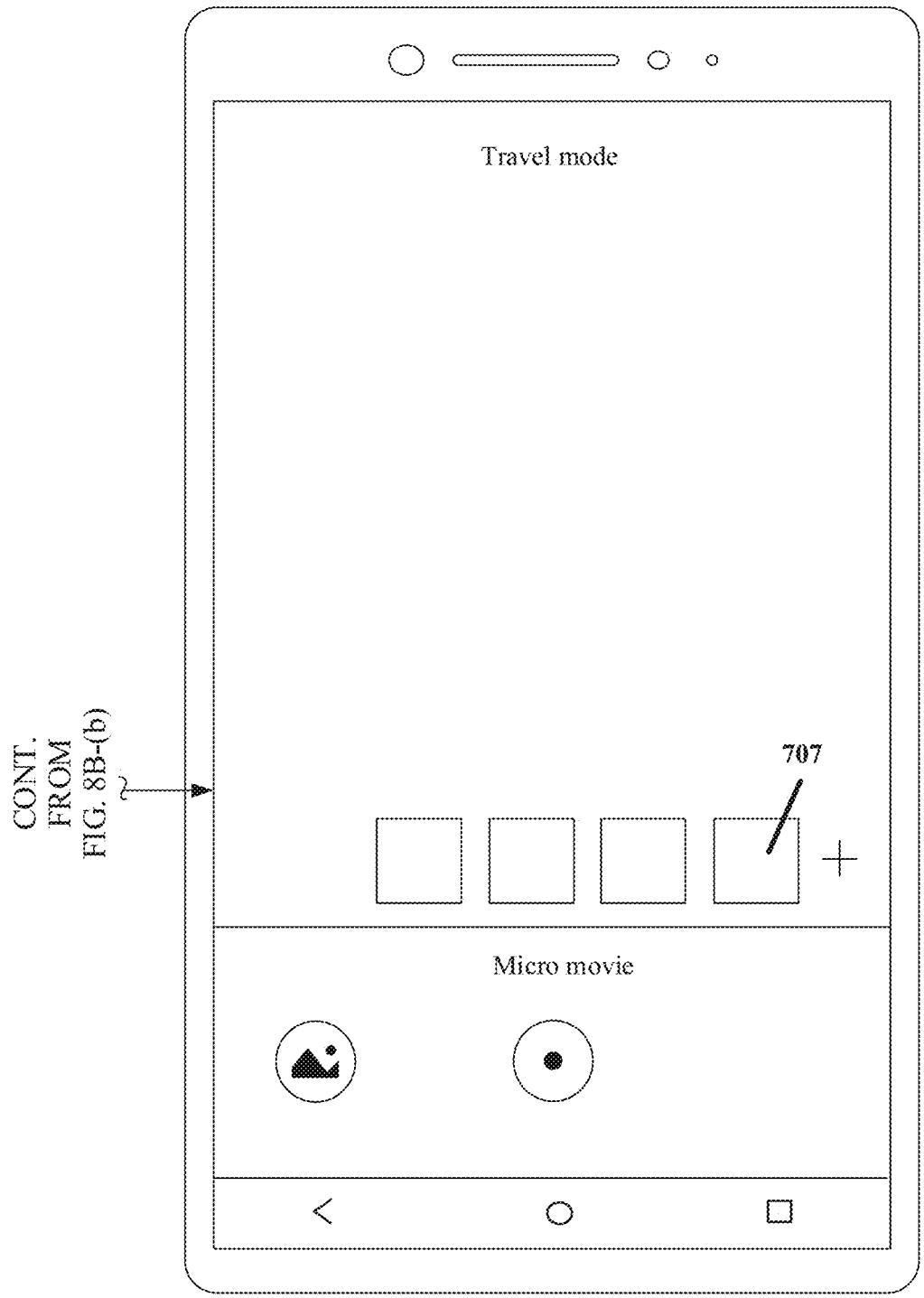
FIG. 8B-(c)

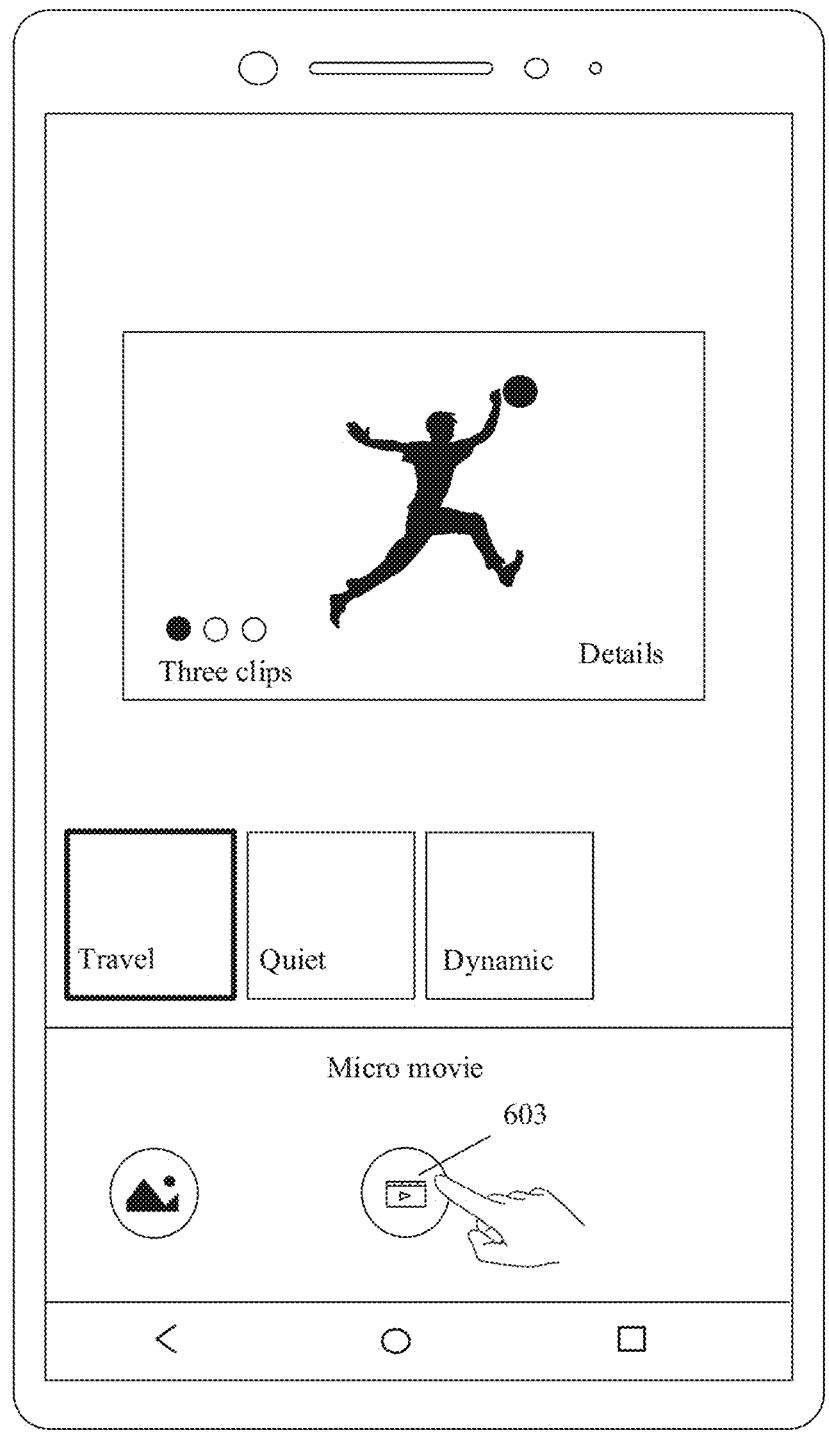
FIG. 8D-(a)

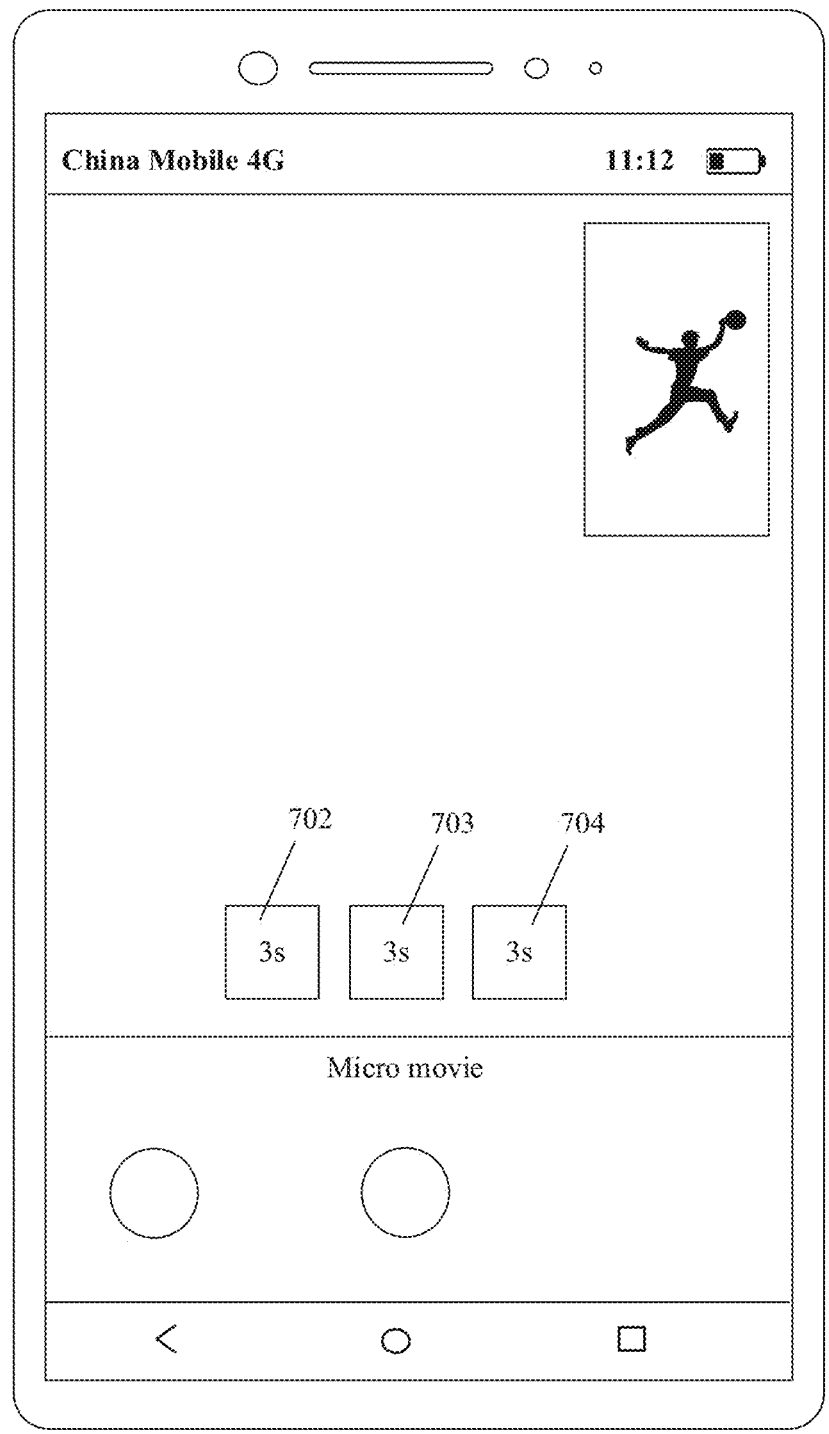
FIG. 8D-(b)

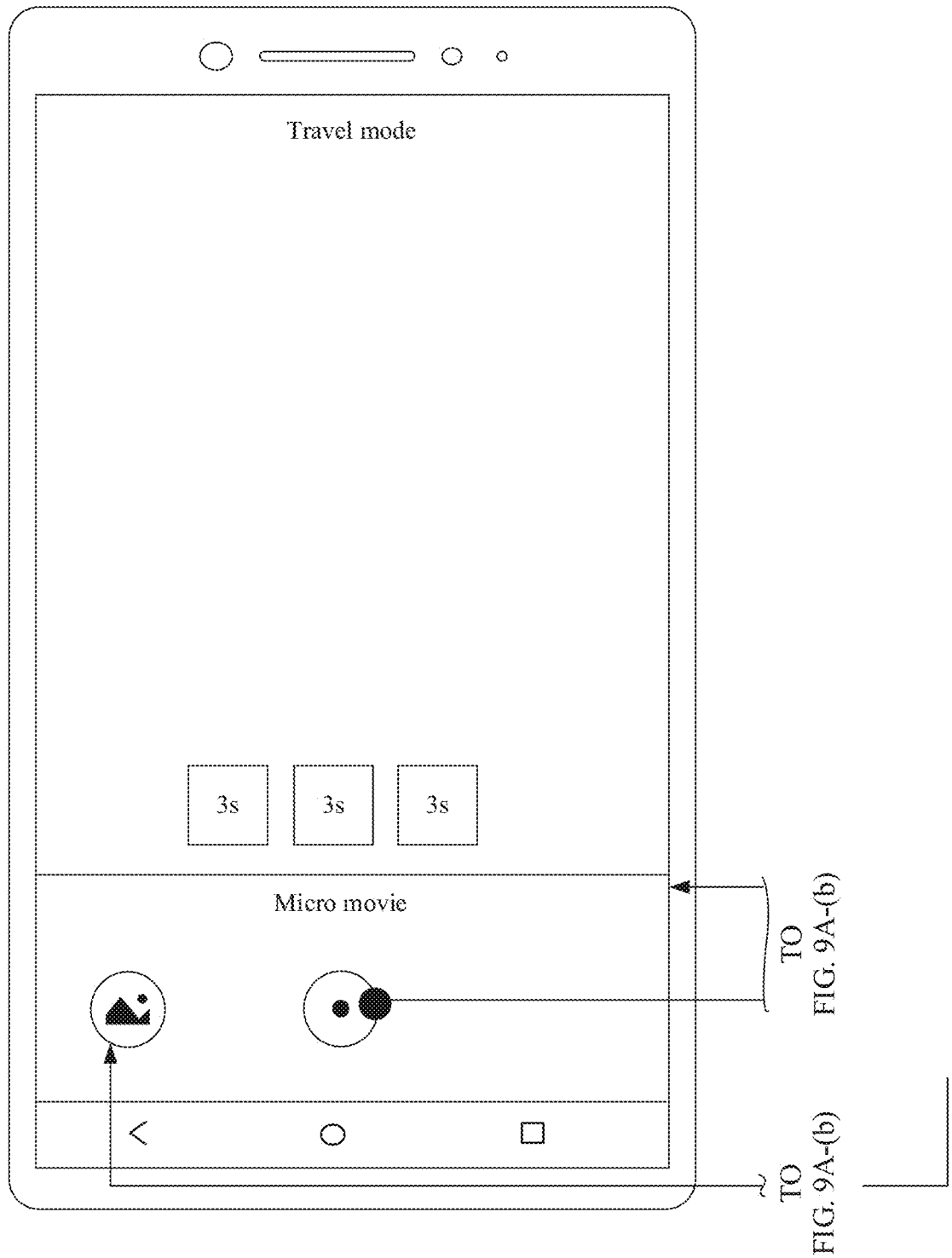
FIG. 9A-(a)

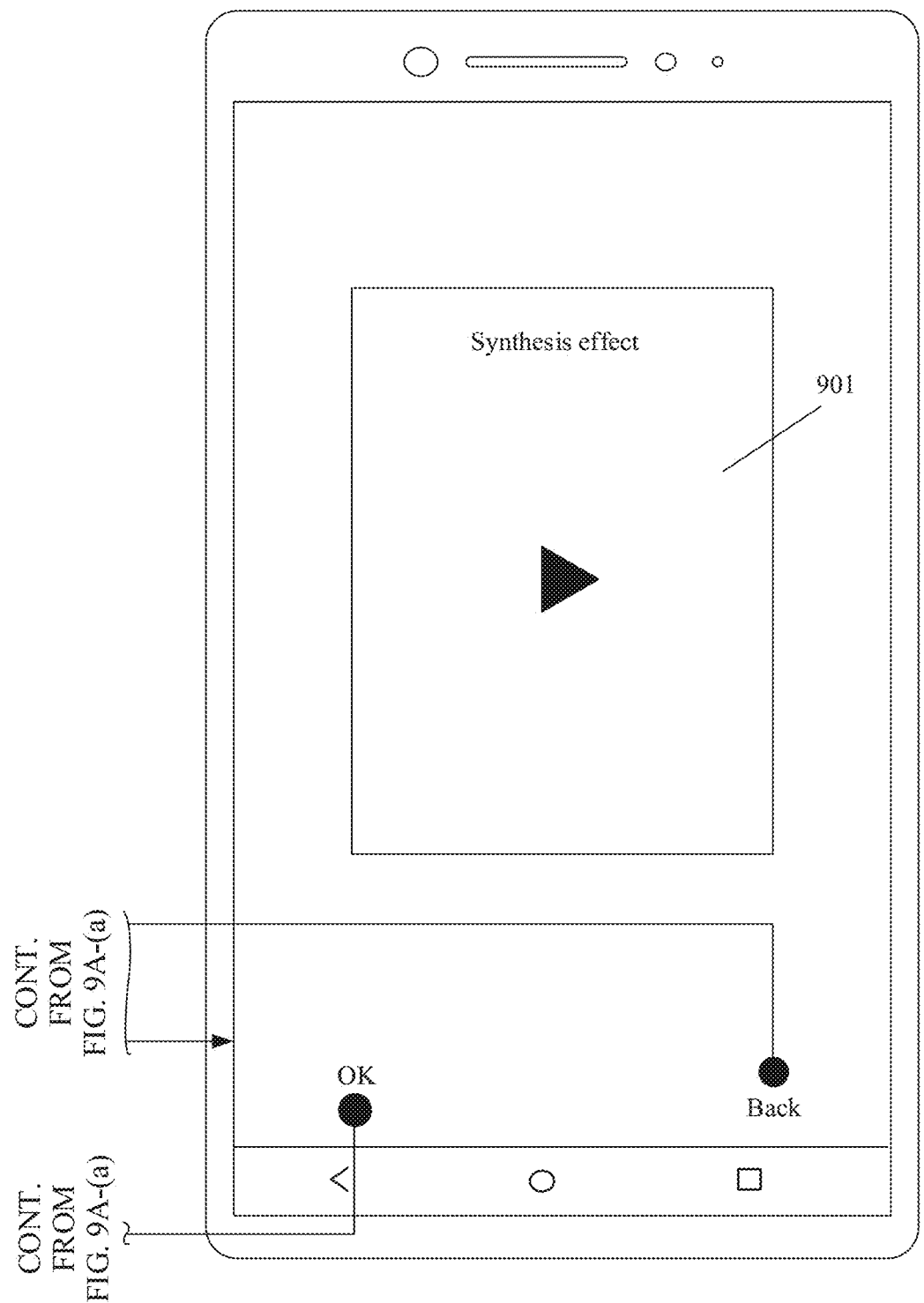
FIG. 9A-(b)

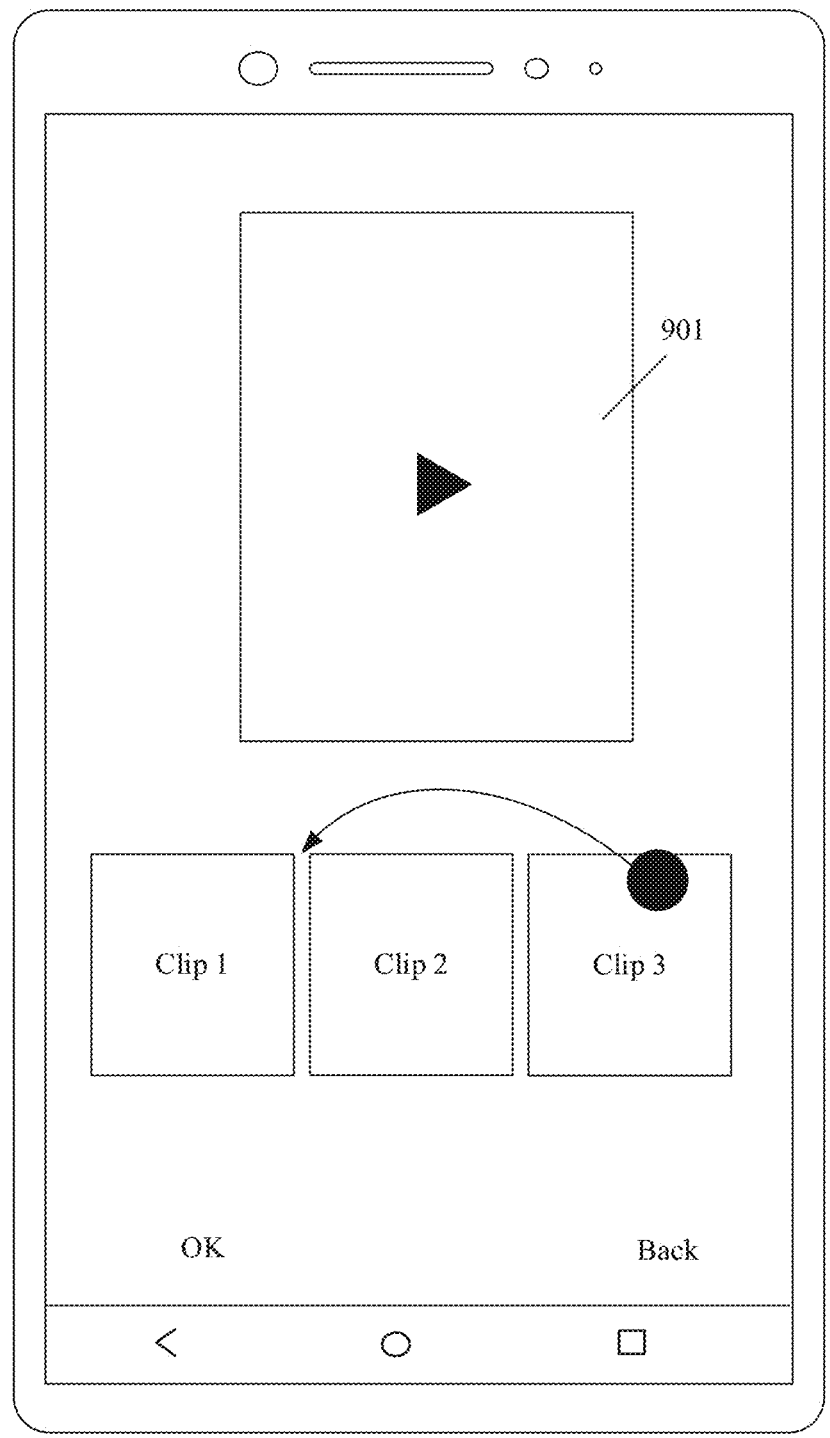
FIG. 9B-(a)

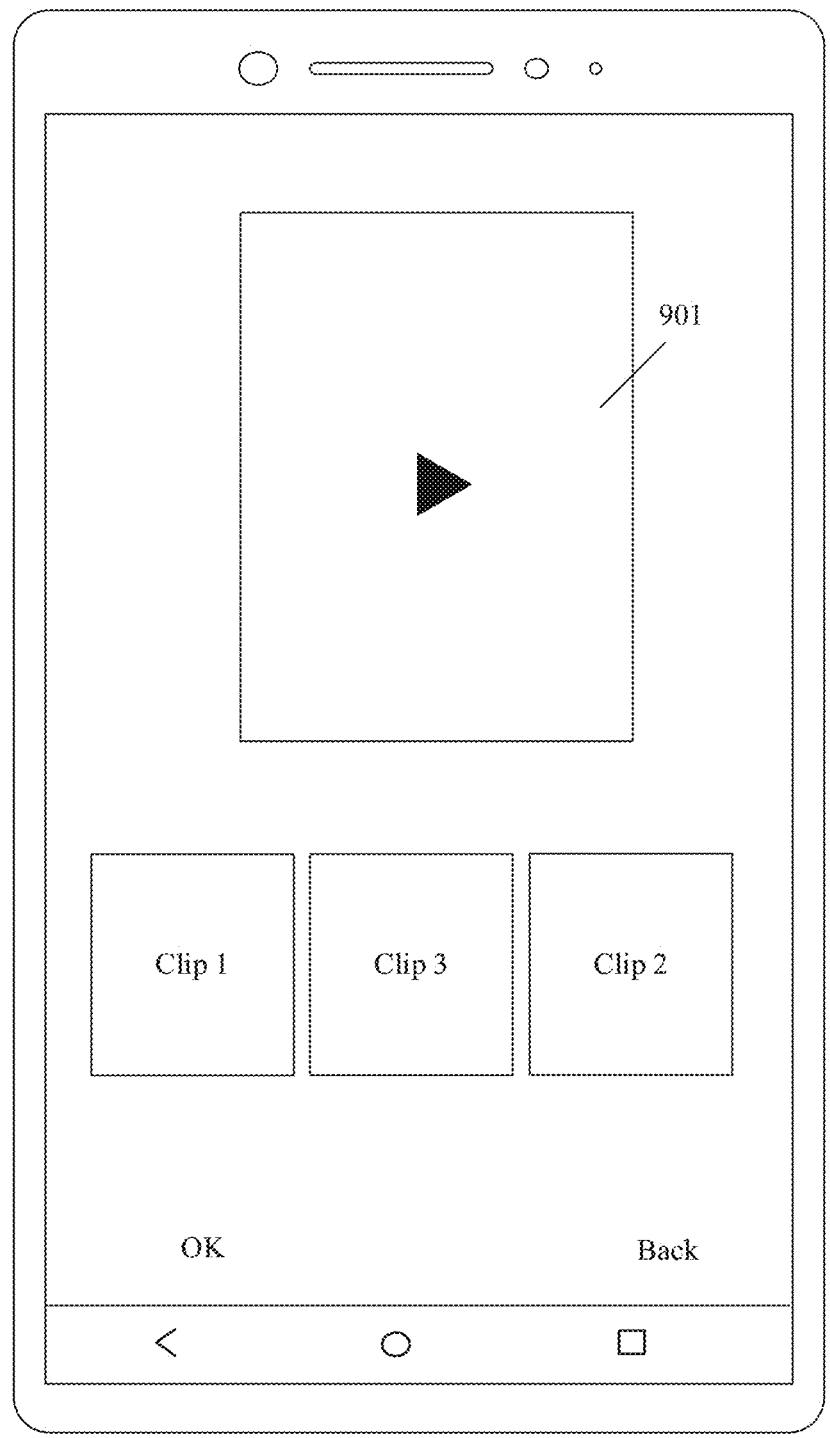
FIG. 9B-(b)

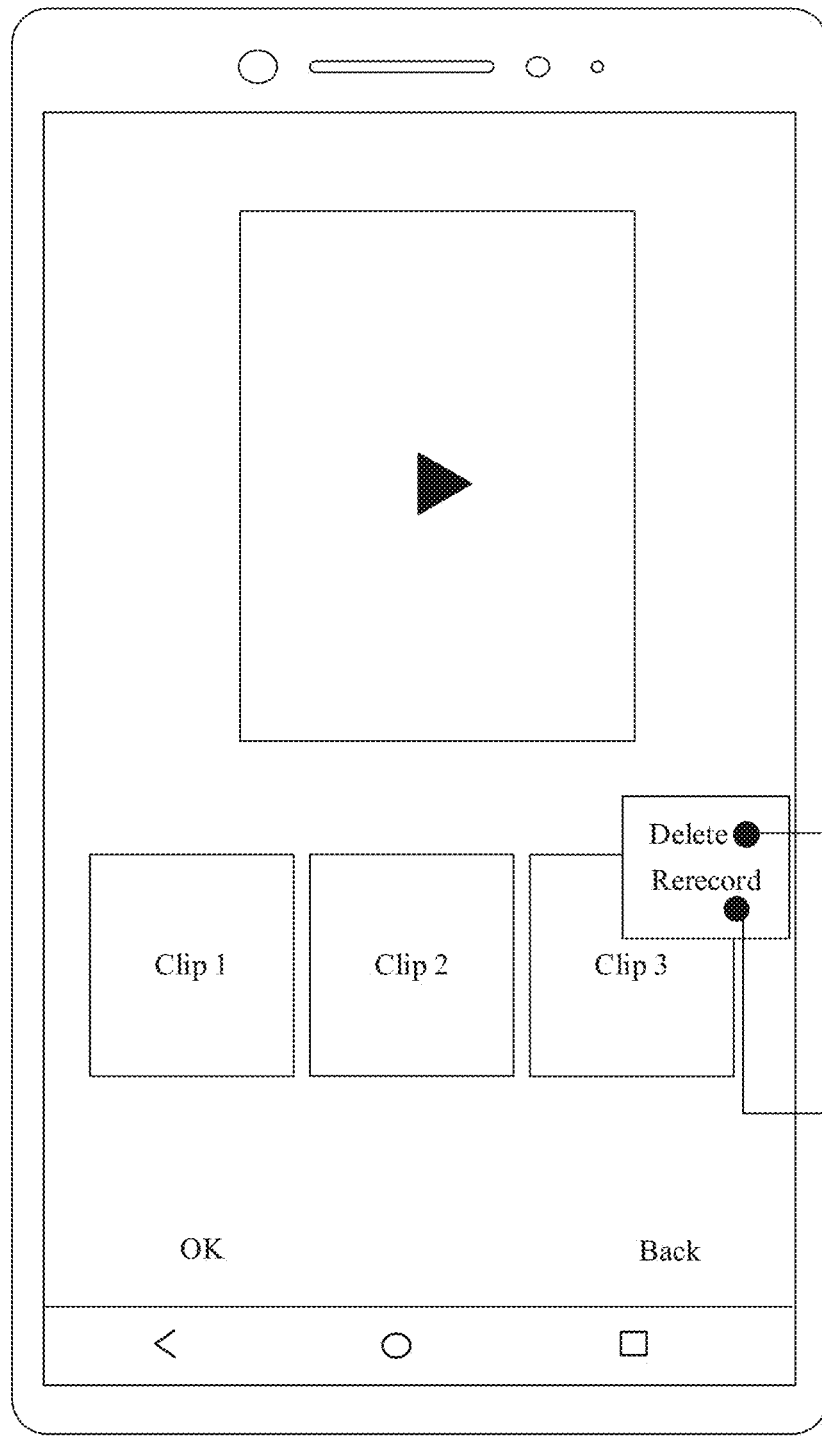
FIG. 9C-(a)

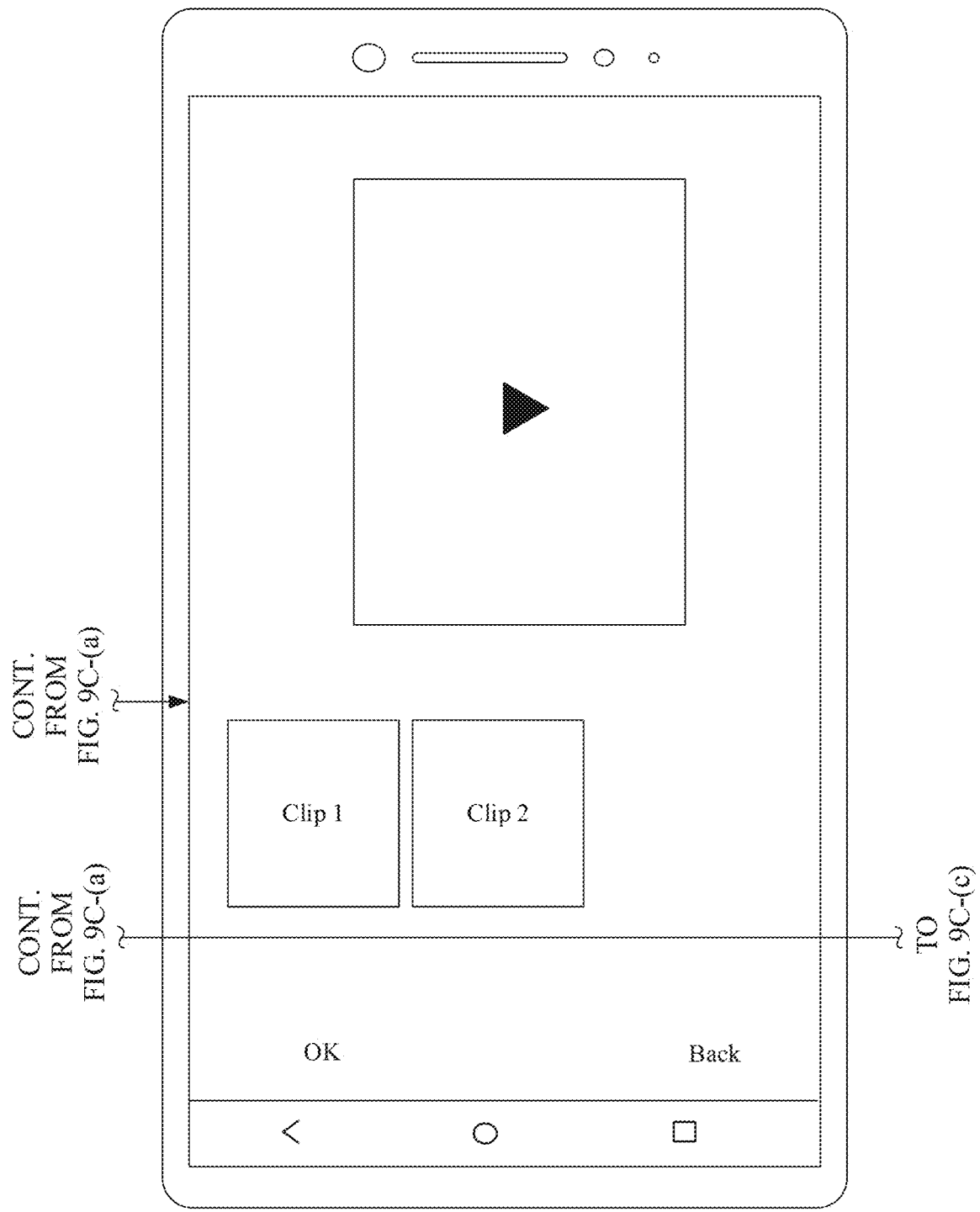
FIG. 9C-(b)

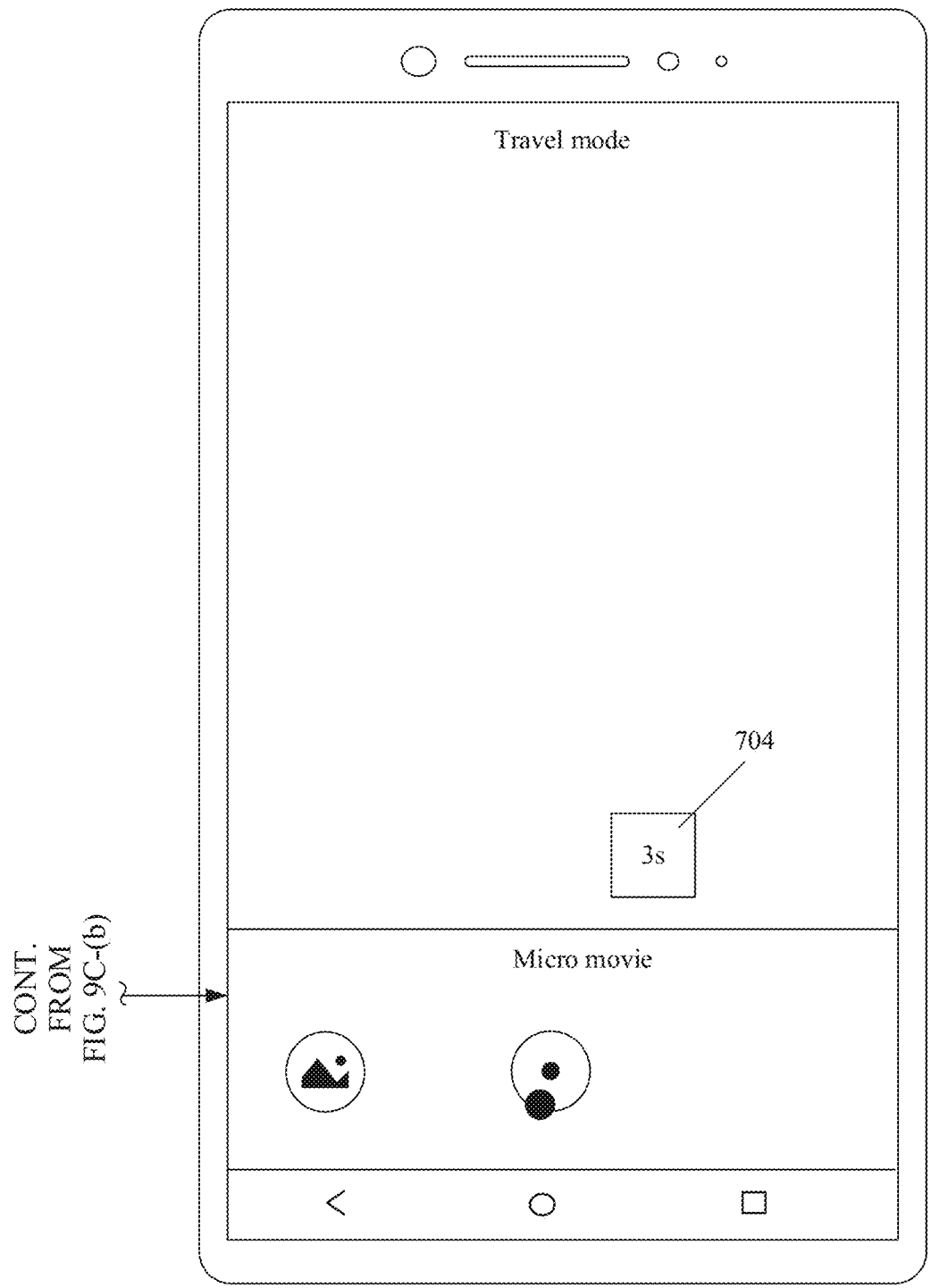
FIG. 9C-(c)

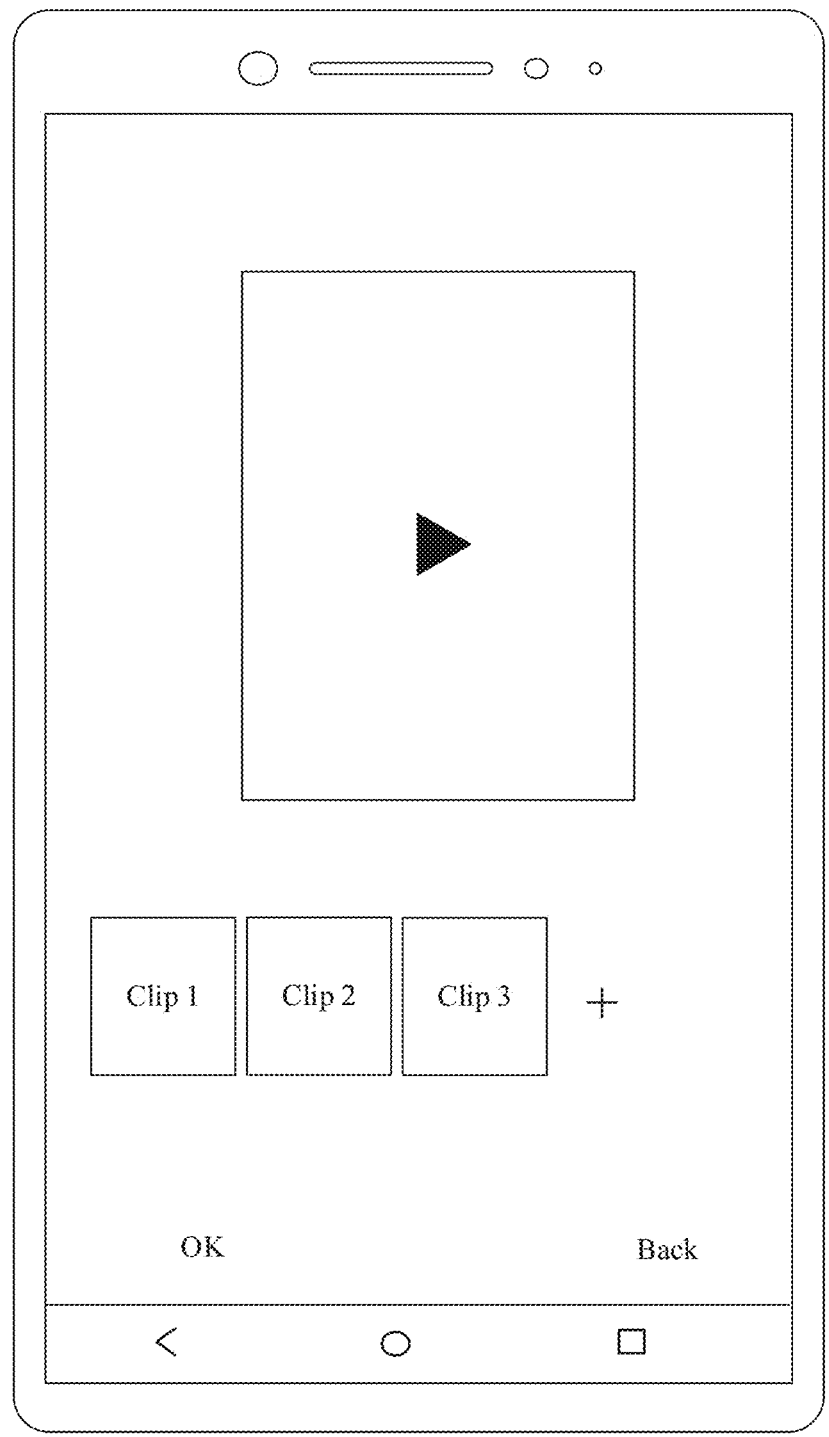
FIG. 9D-(a)

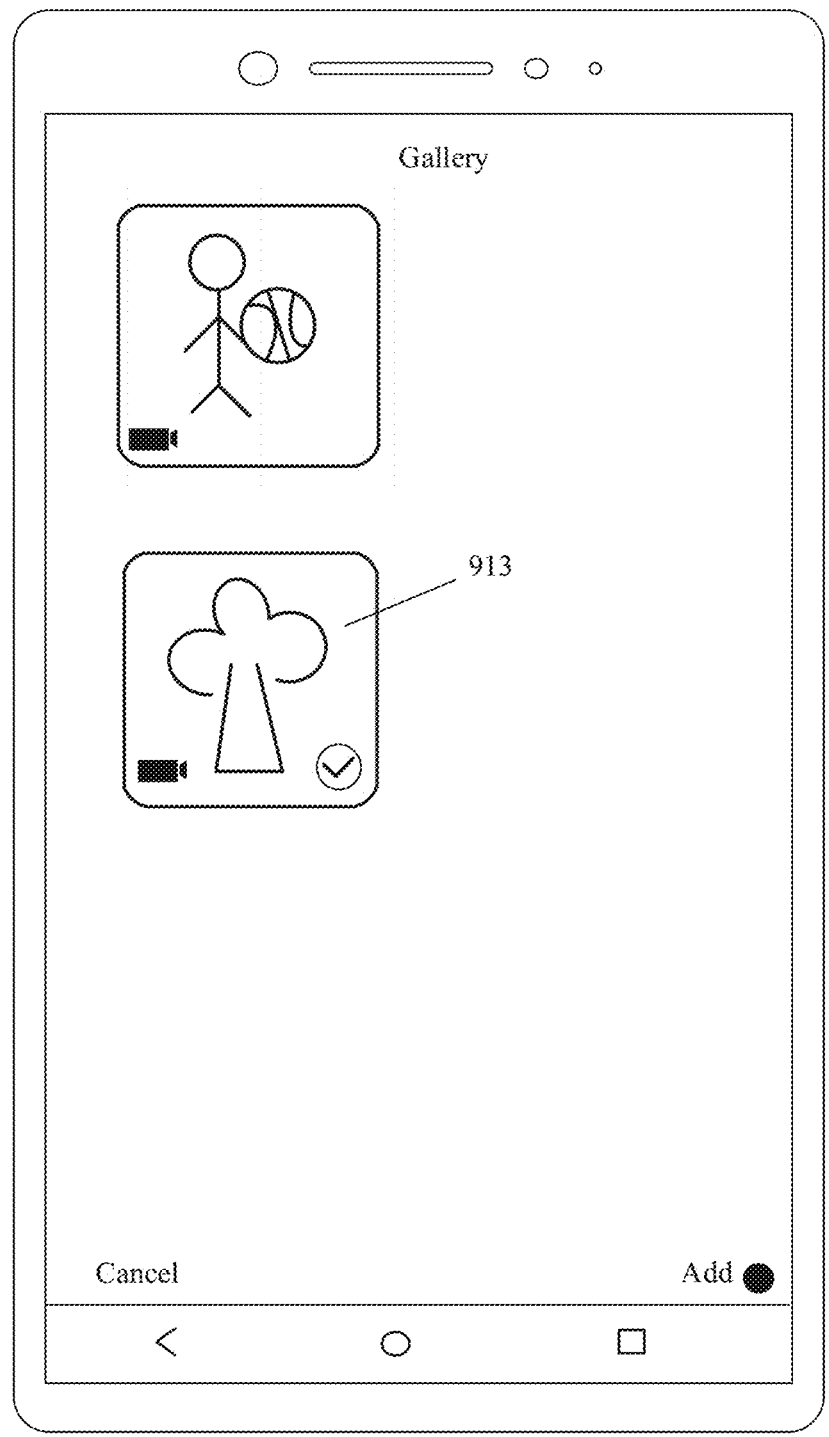
FIG. 9D-(b)

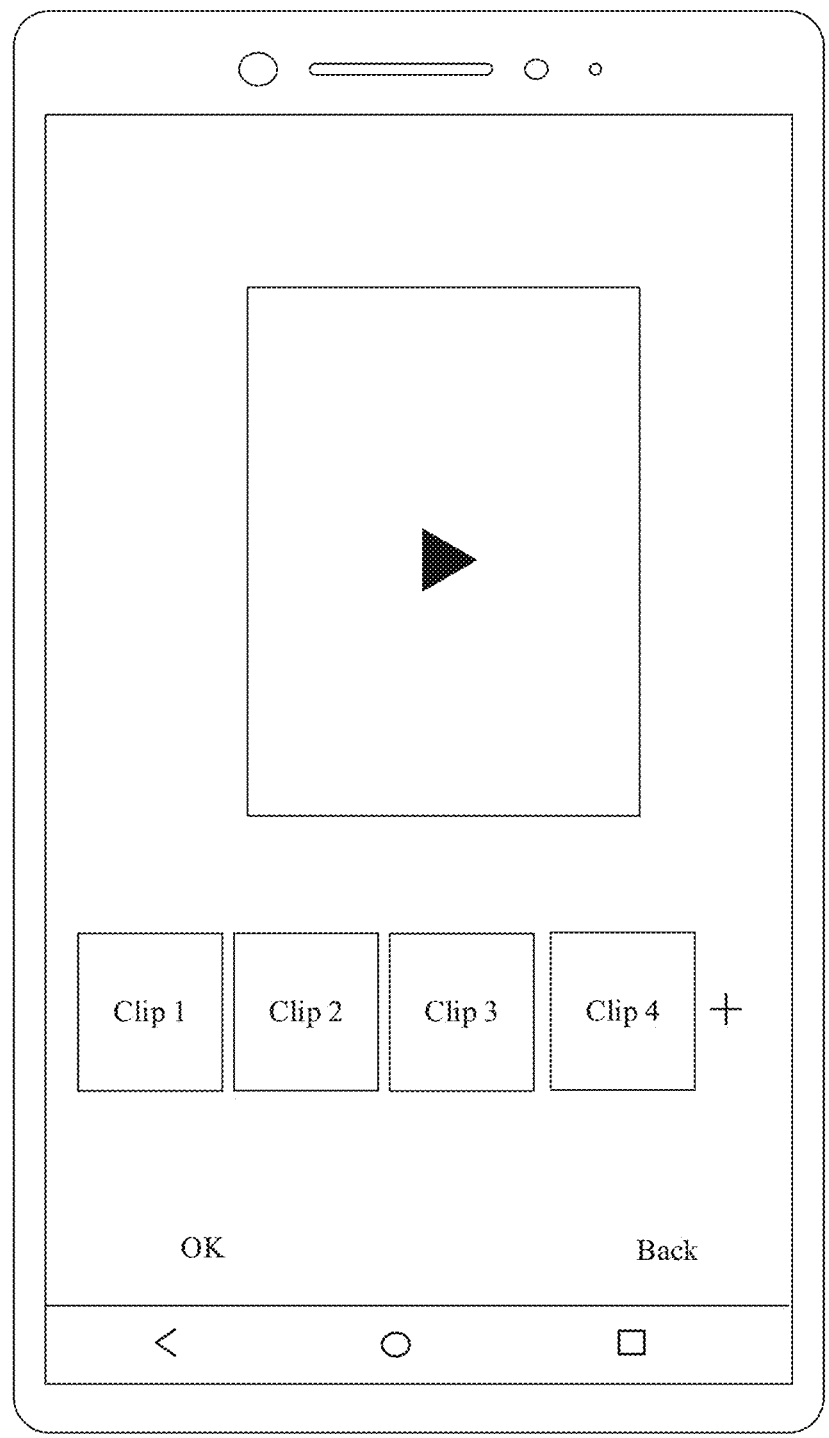
FIG. 9D-(c)

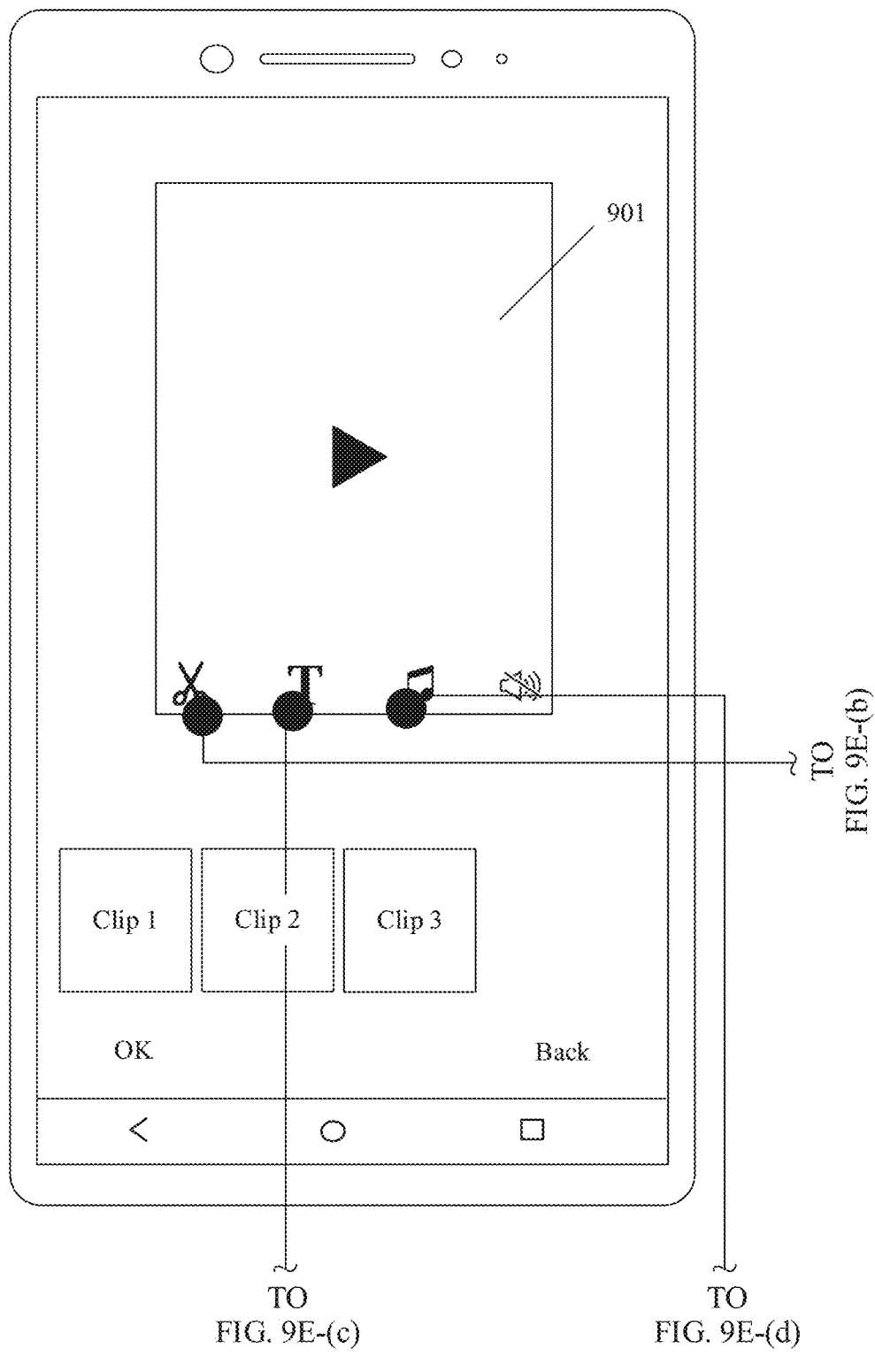
FIG. 9E-(a)

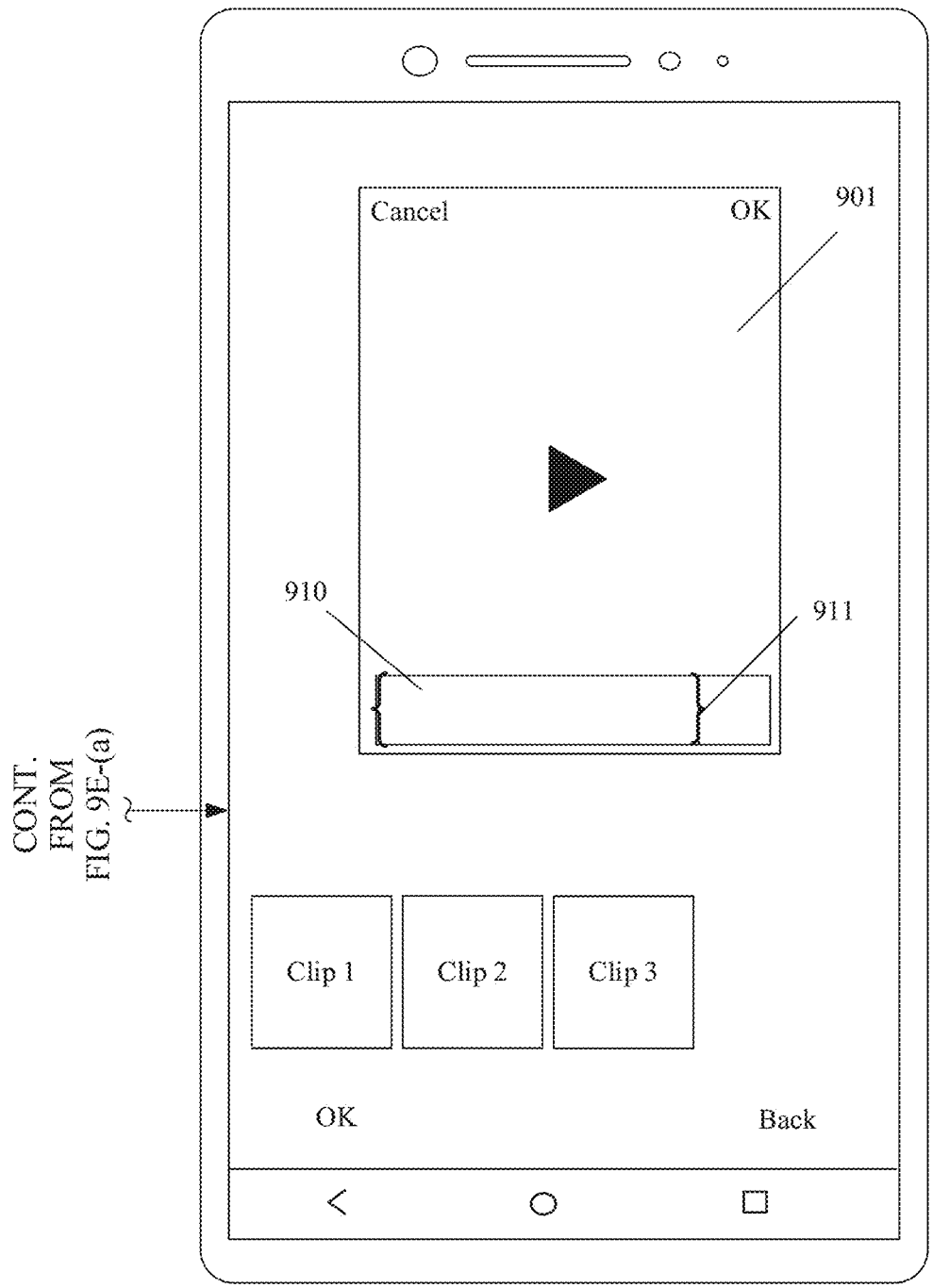
FIG. 9E-(b)

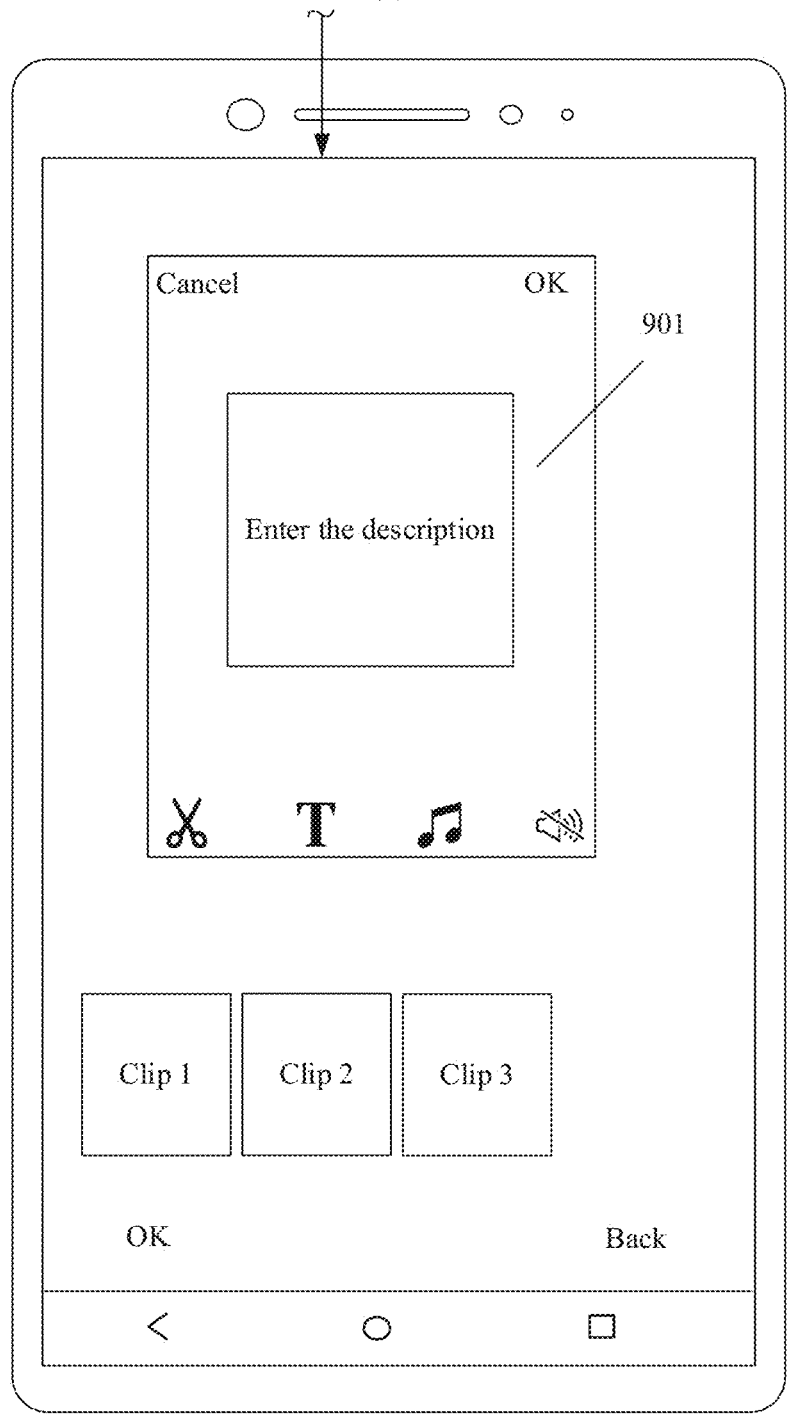
FIG. 9E-(c)

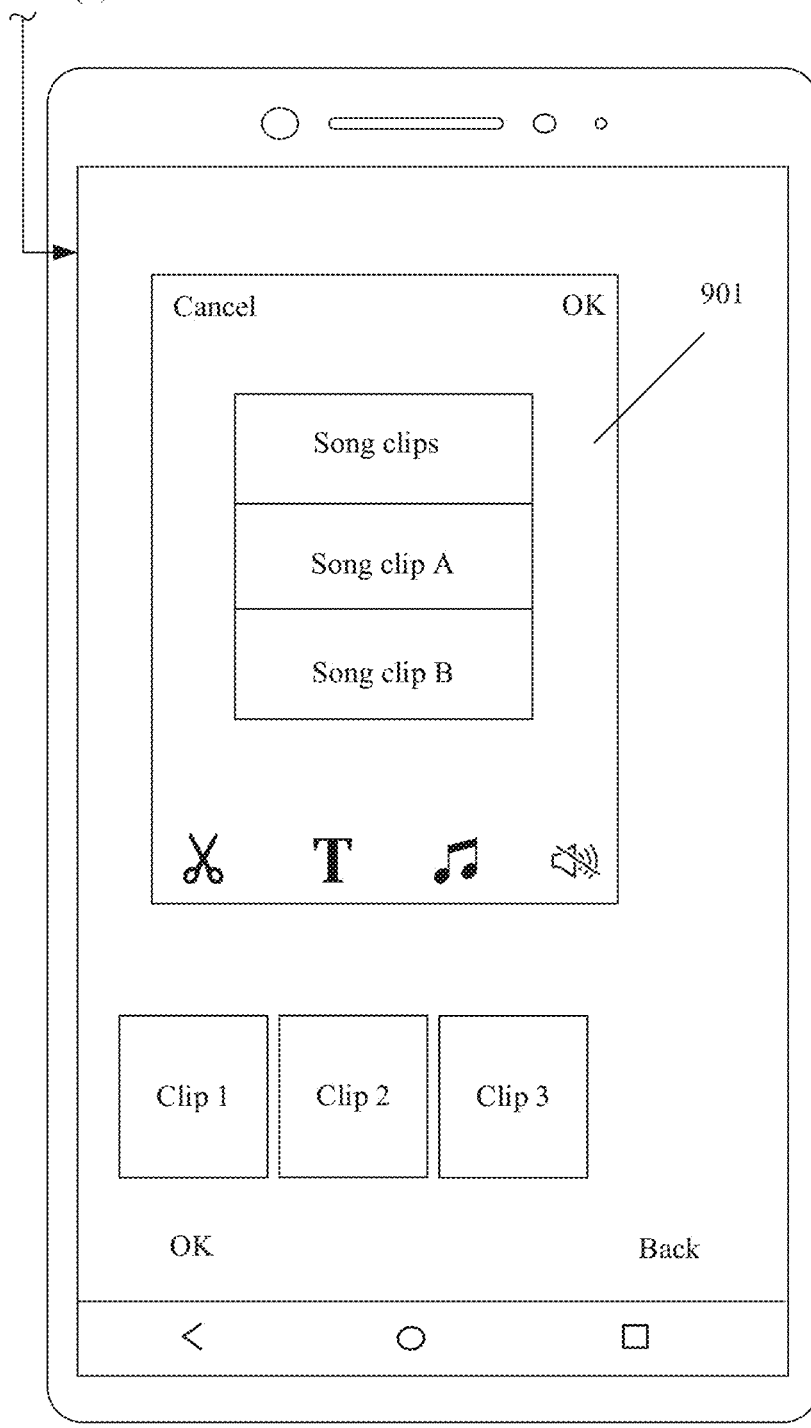
FIG. 9E-(d)

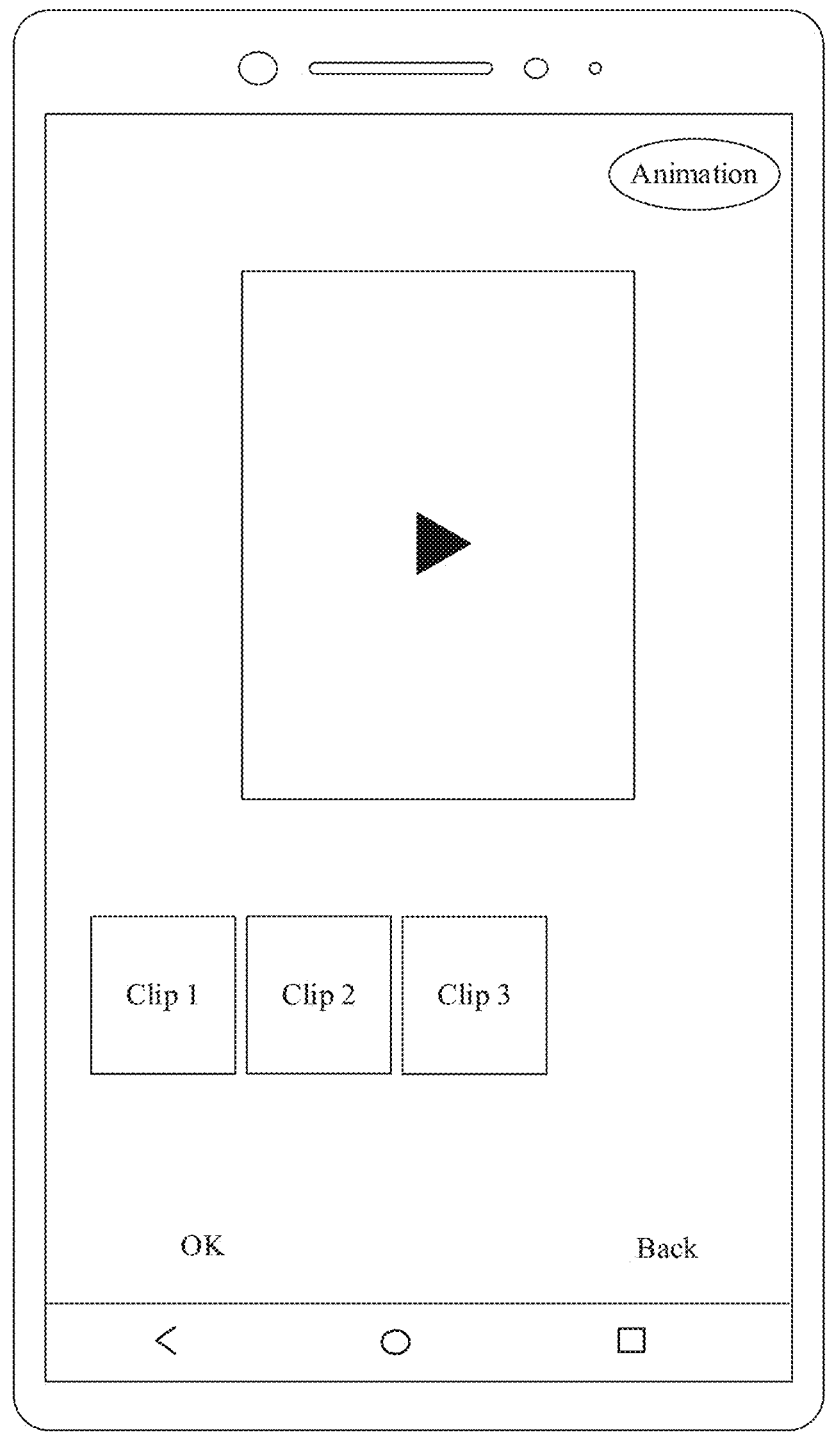
FIG. 9F-(a)

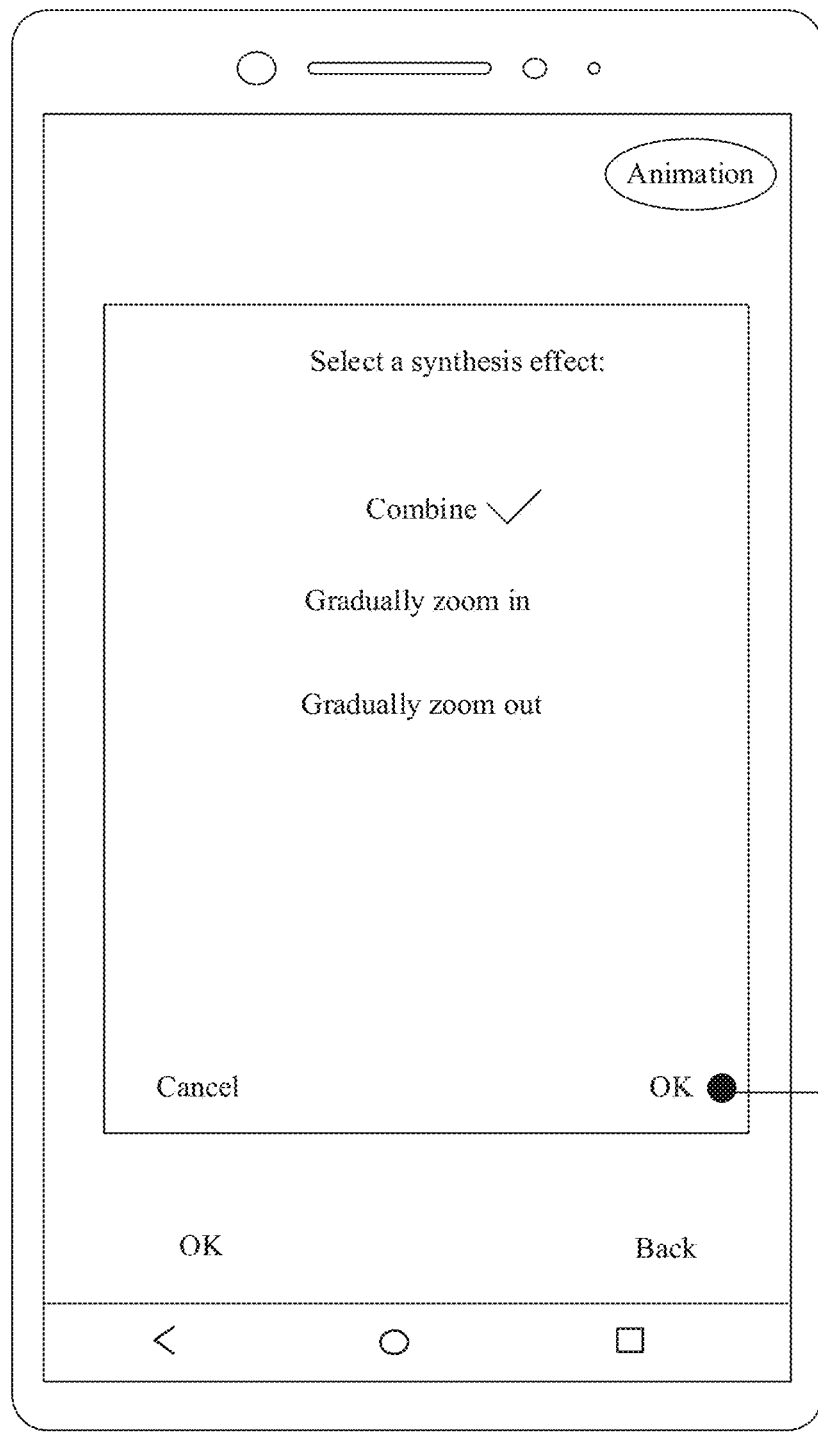
FIG. 9F-(b)

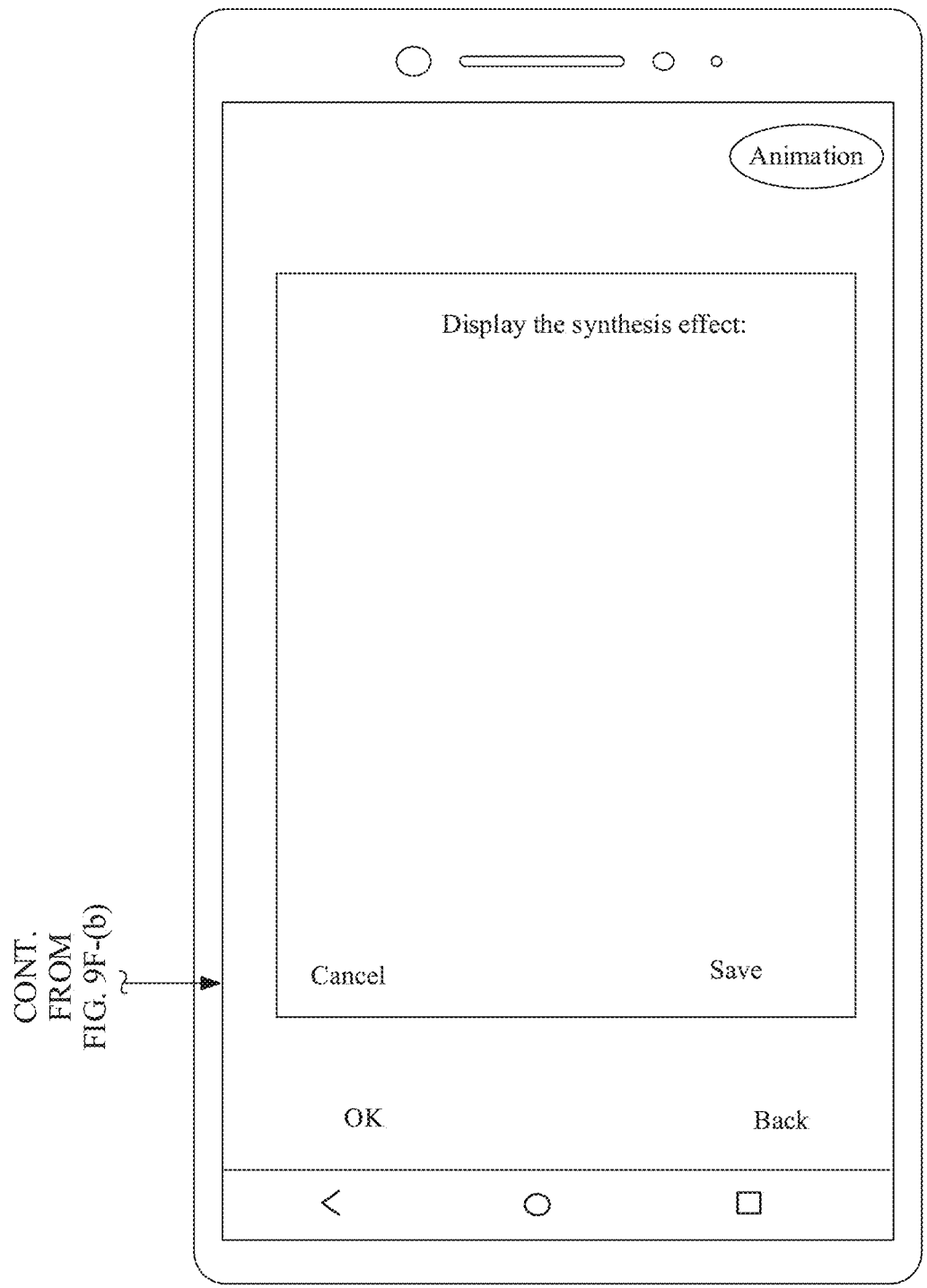
FIG. 9F-(c)

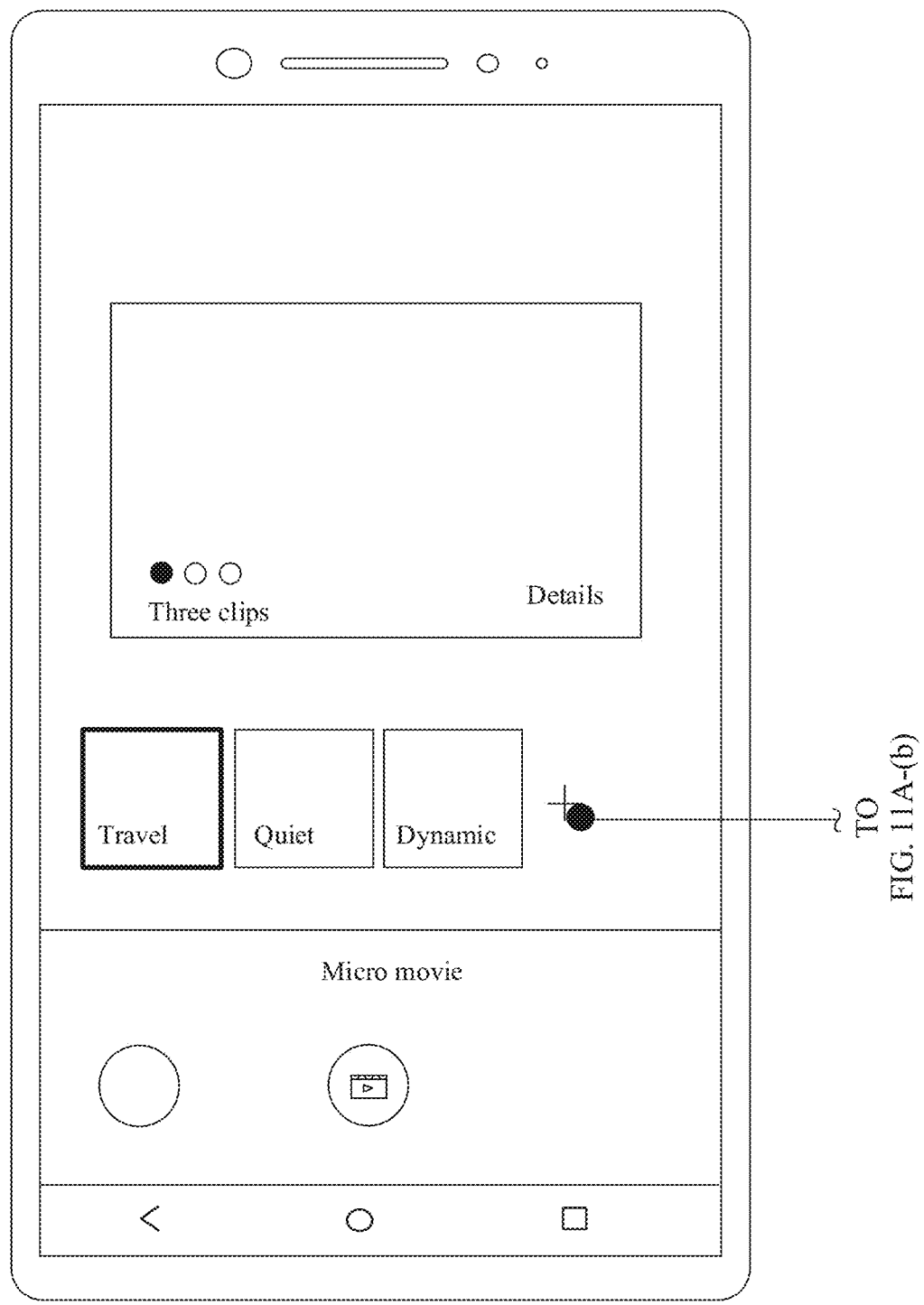
FIG. 11A-(a)

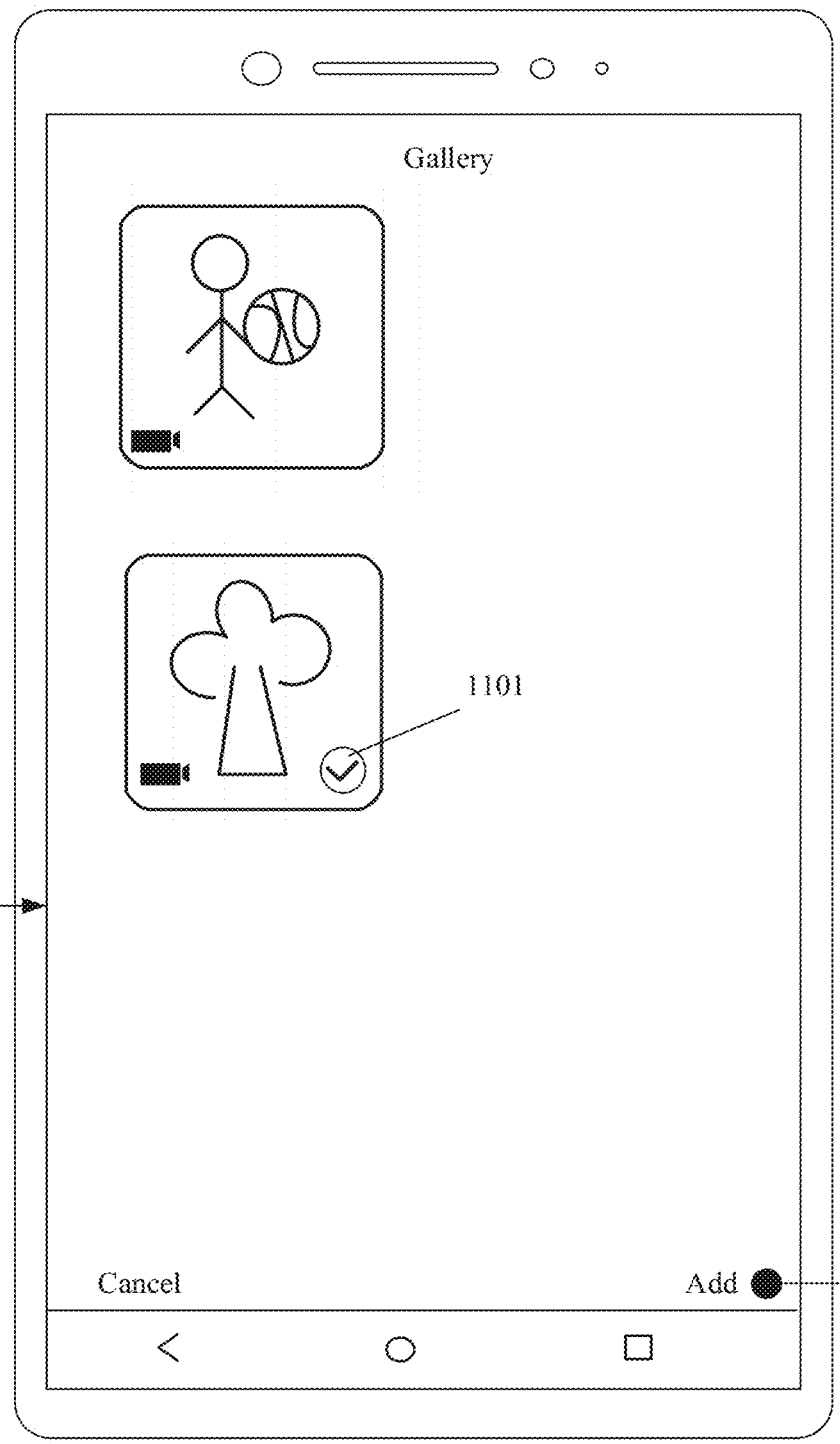
FIG. 11A-(b)

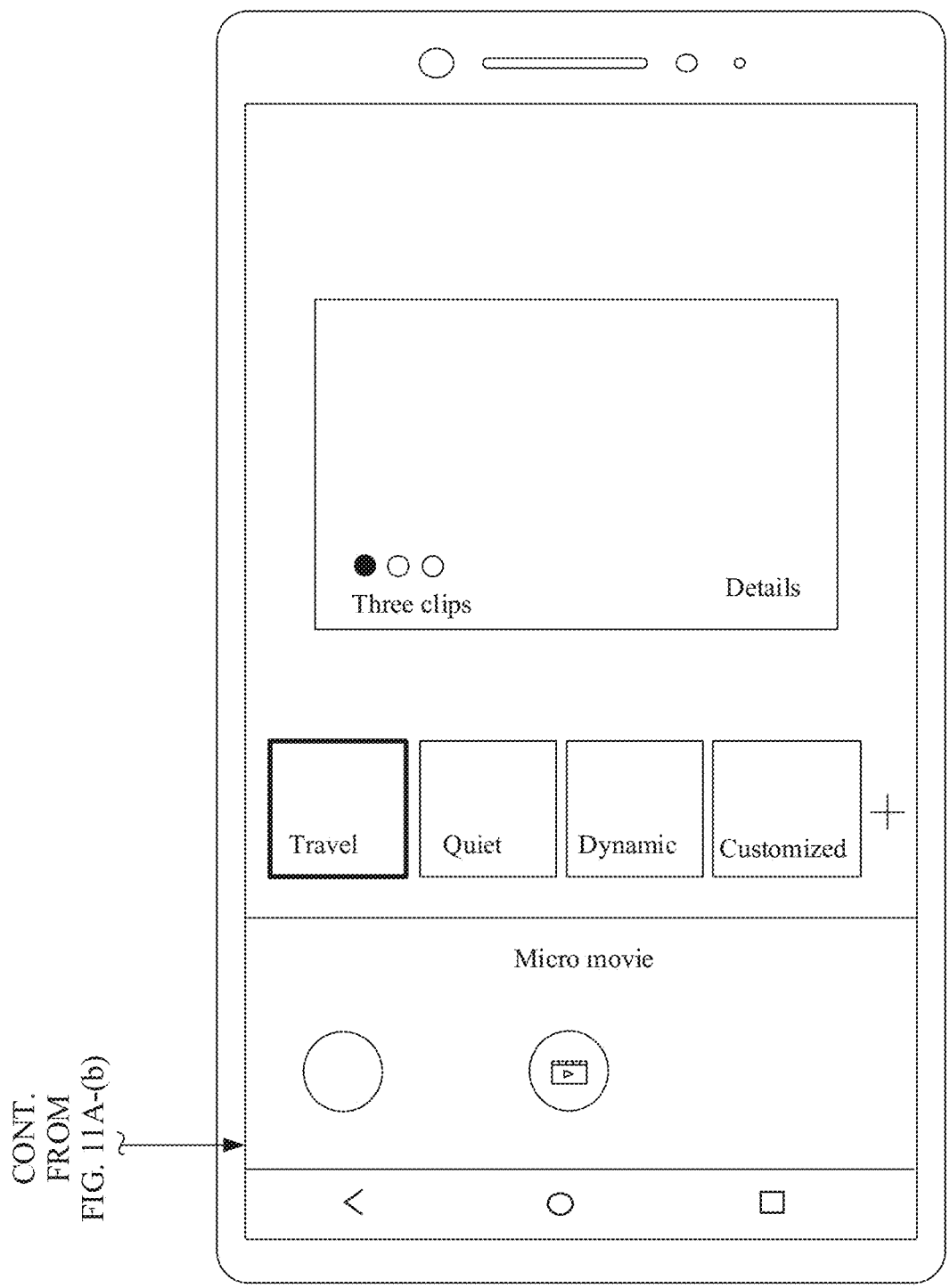
FIG. 11A-(c)

VIDEO SHOOTING METHOD AND ELECTRONIC DEVICE

CROSS-REFERENCE TO RELATED APPLICATIONS

This is a U.S. National Stage of International Patent Application No. PCT/CN2020/132547 filed on Nov. 28, 2020, which claims priority to Chinese Patent Application No. 201911207579.8 filed on Nov. 29, 2019, Chinese Patent Application No. 202011066518.7 filed on Sep. 30, 2020, and Chinese Patent Application No. 202010079012.3 filed on Feb. 3, 2020. All of the aforementioned applications are hereby incorporated by reference in their entireties.

TECHNICAL FIELD

This application relates to the field of image shooting technologies, and in particular, to a video shooting method and an electronic device.

BACKGROUND

To improve quality of shooting works, there are various camera movement shooting techniques in the industry, commonly known as "shaking a lens", "moving a lens", and the like. A mobile phone is used as an example. An implementation process of "moving a lens" may be shown, for example, in FIG. 1(a). In an object shooting process, the mobile phone moves in a horizontal direction. This is "moving a lens". It is assumed that the mobile phone moves from a point A to a point B. In a movement process, a preview image displayed on a display of the mobile phone changes because coverage of a camera changes. Certainly, "moving a lens" may also include "moving a lens" in a vertical direction. An upward movement may mean "ascending a lens", and a downward movement may mean "descending a lens". An implementation process of "shaking a lens" may be shown, for example, in FIG. 1(a). In an object shooting process, the mobile phone rotates around a central axis. The central axis is, for example, a perpendicular bisector of a short side of the mobile phone on a plane on which the display of the mobile phone is located. If the mobile phone rotates leftward around the central axis, "shaking a lens" leftward is implemented as shown in FIG. 1(b). If the mobile phone rotates rightward around the central axis, "shaking a lens" rightward is implemented as shown in FIG. 1(c).

In other words, if a user needs to implement the foregoing camera movement shooting technique such as "moving a lens" or "shaking a lens" by using a portable electronic device (for example, a mobile phone), the user needs to move or rotate the mobile phone. This is inconvenient.

SUMMARY

This application provides a video shooting method and an electronic device, to improve convenience of implementing a camera movement shooting manner such as "moving a lens" or "shaking a lens" by using a mobile phone.

According to a first aspect, a video shooting method is further provided. The method is applied to an electronic device, and includes: enabling a camera function; determining a first video recording template in response to a first operation of a user, where the first video recording template includes a first example sample, a second example sample, and preset audio, the first example sample corresponds to a first camera movement mode, the second example sample corresponds to a second camera movement mode, and the first camera movement mode is different from the second camera movement mode; displaying a video recording interface, where the video recording interface includes a first camera movement mode identifier and a second camera movement mode identifier; keeping a position of the electronic device unchanged and starting video recording in response to a second operation of the user, and automatically generating a synthetic video, where the synthetic video includes a first video clip, a second video clip, and the preset audio, the first video clip is a video clip generated by the electronic device in the first camera movement mode, and the second video clip is a video clip generated by the electronic device in the second camera movement mode.

Therefore, in this manner, various video clips obtained in various camera movement modes may be synthesized into a video and preset audio may be configured for the synthetic video, so that a video of relatively good quality can be obtained through a convenient operation. The synthetic video may be directly uploaded to a social network, sent to a contact, and the like, and an excessively complex video processing process is not required, so that an operation is simple, and user experience is relatively good.

In a possible design, the keeping a position of the electronic device unchanged and starting video recording in response to a second operation of the user includes: when the first camera movement mode identifier is selected, generating the first video clip in the first camera movement mode in response to a shooting indication by the user, where duration of the first video clip is first preset duration; and when the second camera movement mode identifier is selected, generating the second video clip in the second camera movement mode in response to a shooting indication by the user, where duration of the second video clip is second preset duration.

In other words, for each camera movement mode, the user may control start and/or stop of recording. For example, the first video recording template includes a plurality of camera movement modes. Video recording duration corresponding to each camera movement mode may be preset fixed duration, to be specific, shooting stops when the preset duration is reached. Alternatively, video recording duration corresponding to each camera movement mode may be non-preset duration. For example, the user controls, by using a shooting control on a viewfinder interface, a mobile phone to start and stop recording in the first camera movement mode.

In a possible design, when the first video clip is generated in the first camera movement mode, a countdown of generating the first video clip in the first camera movement mode is further displayed on the video recording interface; and when the second video clip is generated in the second camera movement mode, a countdown of generating the second video clip in the second camera movement mode is further displayed on the video recording interface.

In other words, the electronic device may display a recording time countdown, to help the user learn of a recording progress (for example, remaining recording duration), so that interaction experience is relatively good.

In a possible design, the method further includes: displaying the video recording interface, where the video recording interface includes the first camera movement mode identifier and the second camera movement mode identifier; deleting the first camera movement mode identifier or the second camera movement mode identifier m response to a third operation of the user; keeping the position of the electronic device unchanged and starting recording in response to a fourth operation of the user; and automatically generating a synthetic video, where the synthetic video includes a video clip generated by the electronic device in a camera movement mode that is not deleted, and the synthetic video further includes the preset audio.

In other words, the user may delete a camera movement mode identifier. For example, if the user deletes a camera movement mode identifier corresponding to a camera movement mode that the user does not like, the corresponding camera movement mode is deleted, and video clips generated in camera movement modes corresponding to remaining camera movement mode identifiers are synthesized into a video.

In a possible design, the method further includes: displaying the video recording interface, where the video recording interface includes the first camera movement mode identifier and the second camera movement mode identifier; adding a third camera movement mode identifier to the video recording interface in response to a third operation of the user, where the third camera movement mode identifier is used to indicate a third camera movement mode; keeping the position of the electronic device unchanged and starting recording in response to a fourth operation of the user; and automatically generating a synthetic video, where the synthetic video includes the first video clip, the second video clip, a third video clip, and the preset audio, and the third video clip is a video clip generated by the electronic device in the third camera movement mode.

In other words, assuming that the user likes a camera movement mode, the user may add a camera movement mode identifier corresponding to the camera movement mode, so that the corresponding camera movement mode is added, and a video clip generated in an original camera movement mode and a video clip generated in the added camera movement mode are synthesized into a video.

In a possible design, the method further includes: displaying the video recording interface, where the video recording interface includes the first camera movement mode identifier and the second camera movement mode identifier; adjusting an order of displaying the first camera movement mode identifier and the second camera movement mode identifier to a first order in response to a third operation of the user; keeping the position of the electronic device unchanged and starting recording in response to a fourth operation of the user; and automatically generating a synthetic video, where an order of playing the first video clip and the second video clip in the synthetic video is the first order.

In other words, the user may adjust an order of displaying camera movement mode identifiers, so that an order of synthesizing video clips is adjusted, and an order of playing two video clips in a synthetic video is also adjusted.

In a possible design, the first example sample and/or the second example sample are/is displayed on the video recording interface.

On the recording interface, the first example sample is used to help the user view a shooting effect of the first camera movement mode, and the second example sample is used to view a shooting effect of the second camera movement mode, so that interaction experience is relatively good.

In a possible design, before the automatically generating a synthetic video, the method further includes: displaying a presentation interface, where the presentation interface includes the first video clip and the second video clip; and the automatically generating a synthetic video includes: performing video synthesizing in response to a video synthesizing instruction entered by the user.

In other words, before performing video synthesizing, the user may further separately view the first video clip and the second video clip. Assuming that the user is satisfied with the two video clips, video synthesizing is performed under a trigger operation of the user.

In a possible design, the method further includes: deleting the first video clip or the second video clip in response to the fourth operation; or adding a local third video clip to the synthetic video; or adjusting the order of playing the first video clip or the second video clip in the synthetic video.

In other words, the user may delete a video clip, for example, delete a shot clip that the user is not satisfied with; or may locally add a video clip that the user likes; or may adjust an order of playing two video clips in a synthetic video. In conclusion, the user can flexibly set a synthetic video, so that interaction experience is relatively good.

In a possible design, the first video recording template is a default template or a user-defined template.

In other words, the user not only may use a default template of the electronic device, but also may customize a template, for example, set a template that the user likes, so that interaction experience is relatively good.

In a possible design, the method further includes: automatically storing the first video clip, the second video clip, and the synthetic video. In other words, the electronic device may automatically store all video clips and a video into which the video clips are synthesized. In this way, the user may locally view each individual video clip, or may view the synthetic video, so that user experience is relatively good. For example, the user may upload an individual video clip to the social network, or may upload the synthetic video to the social network.

In a possible design, the method further includes: in response to a specific operation, changing audio in the synthetic video, or adding a text and/or a picture to the synthetic video. In other words, the user may change audio in a synthetic video, or may add a text, a picture, or the like to a synthetic video, so that interaction experience is relatively good.

According to a second aspect, an electronic device is further provided. The electronic device includes:
one or more processors; and
one or more memories.
The one or more memories store one or more computer programs, the one or more computer programs include instructions, and when the instructions are executed by the one or more processors, the electronic device is enabled to perform the following steps:
enabling a camera function;
determining a first video recording template in response to a first operation of a user, where the first video recording template includes a first example sample, a second example sample, and preset audio, the first example sample corresponds to a first camera movement mode, the second example sample corresponds to a second camera movement mode, and the first camera movement mode is different from the second camera movement mode;
displaying a video recording interface, where the video recording interface includes a first camera movement mode identifier and a second camera movement mode identifier;
keeping a position of the electronic device unchanged and starting video recording in response to a second operation of the user; and
automatically generating a synthetic video, where the synthetic video includes a first video clip, a second video clip, and the preset audio, the first video clip is a video clip generated by the electronic device in the first camera movement mode, and the second video clip is a video clip generated by the electronic device in the second camera movement mode.

In a possible design, when the instructions are executed by the one or more processors, the electronic device is enabled to specifically perform the following steps:

when the first camera movement mode identifier is selected, generating the first video clip in the first camera movement mode in response to a shooting indication by the user, where duration of the first video clip is first preset duration; and when the second camera movement mode identifier is selected, generating the second video clip in the second camera movement mode in response to a shooting indication by the user, where duration of the second video clip is second preset duration.

In a possible design, when the instructions are executed by the one or more processors, the electronic device is enabled to specifically perform the following steps:

when the first video clip is generated in the first camera movement mode, further displaying, on the video recording interface, a countdown of generating the first video clip in the first camera movement mode, and when the second video clip is generated in the second camera movement mode, further displaying, on the video recording interface, a countdown of generating the second video clip in the second camera movement mode.

In a possible design, when the instructions are executed by the one or more processors, the electronic device is enabled to further perform the following steps:

displaying the video recording interface, where the video recording interface includes the first camera movement mode identifier and the second camera movement mode identifier;

deleting the first camera movement mode identifier or the second camera movement mode identifier in response to a third operation of the user;

keeping the position of the electronic device unchanged and starting recording in response to a fourth operation of the user; and automatically generating a synthetic video, where the synthetic video includes a video clip generated by the electronic device in a camera movement mode that is not deleted and the preset audio.

In a possible design, when the instructions are executed by the one or more processors, the electronic device is enabled to further perform the following steps:

displaying the video recording interface, where the video recording interface includes the first camera movement mode identifier and the second camera movement mode identifier;

adding a third camera movement mode identifier to the video recording interface in response to a third operation of the user, where the third camera movement mode identifier is used to indicate a third camera movement mode;

keeping the position of the electronic device unchanged and starting recording in response to a fourth operation of the user; and automatically generating a synthetic video, where the synthetic video includes the first video clip, the second video clip, a third video clip, and the preset audio, and the third video clip is a video clip generated by the electronic device in the third camera movement mode.

In a possible design, when the instructions are executed by the one or more processors, the electronic device is enabled to further perform the following steps:

displaying the video recording interface, where the video recording interface includes the first camera movement mode identifier and the second camera movement mode identifier;

adjusting an order of displaying the first camera movement mode identifier and the second camera movement mode identifier to a first order in response to a third operation of the user;

keeping the position of the electronic device unchanged and starting recording in response to a fourth operation of the user; and automatically generating a synthetic video, where an order of playing the first video clip and the second video clip in the synthetic video is the first order.

In a possible design, the first example sample and/or the second example sample are/is displayed on the video recording interface.

In a possible design, when the instructions are executed by the one or more processors, the electronic device is enabled to further perform the following step:

displaying a presentation interface, where the presentation interface includes the first video clip and the second video clip; and the automatically generating a synthetic video includes: performing video synthesizing in response to a video synthesizing instruction entered by the user.

In a possible design, when the instructions are executed by the one or more processors, the electronic device is enabled to further perform the following step:

deleting the first video clip or the second video clip in response to the fourth operation; or adding a local third video clip to the synthetic video; or adjusting the order of playing the first video clip or the second video clip in the synthetic video.

In a possible design, the first video recording template is a default template or a user-defined template.

In a possible design, when the instructions are executed by the one or more processors, the electronic device is enabled to further perform the following step:

automatically storing the first video clip, the second video clip, and the synthetic video.

In a possible design, when the instructions are executed by the one or more processors, the electronic device is enabled to further perform the following step:

in response to a specific operation, changing audio in the synthetic video, or adding a text and/or a picture to the synthetic video.

According to a third aspect, an embodiment of this application further provides an electronic device. The electronic device includes modules/units that perform the method according to any one of the first aspect and the possible designs of the first aspect. These modules/units may be implemented by hardware, or may be implemented by hardware by executing corresponding software.

According to a fourth aspect, an embodiment of this application further provides a chip. The chip is coupled to a memory in an electronic device, and is configured to invoke a computer program stored in the memory and execute the technical solution according to any one of the first aspect and the possible designs of the first aspect in embodiments of this application. In this embodiment of this application, "coupling" means that two components are directly or indirectly combined with each other.

According to a fifth aspect, a computer-readable storage medium is further provided. The computer-readable storage medium includes a computer program, and when the computer program is run on an electronic device, the electronic device is enabled to perform the method according to the first aspect.

According to a sixth aspect, a program product is further provided. The program product includes instructions, and when the instructions are run on a computer, the computer is enabled to perform the method according to the first aspect.

According to a seventh aspect, a graphical user interface on an electronic device is further provided. The electronic device includes a display, one or more memories, and one or more processors. The one or more processors are configured to execute one or more computer programs stored in the one or more memories. The graphical user interface includes a graphical user interface displayed when the electronic device performs the method according to the first aspect.

For beneficial effects of the second aspect to the seventh aspect, refer to the beneficial effects of the first aspect. Details are not described again.

According to an eighth aspect, a method for displaying a preview image in a video recording scenario is provided. The method is applied to an electronic device, for example, a mobile phone or a tablet computer. The electronic device detects a first operation used to open a camera application; starts the camera application in response to the first operation; detects a second operation used to indicate a first video recording mode; displays a viewfinder interface on a display of the electronic device in response to the second operation, where the viewfinder interface includes a first preview image, and the first preview image is a first image block in a first region on a first image captured by a first wide-angle camera on the electronic device; keeps a position of the electronic device unchanged, and detects a third operation that indicates an image movement direction; and displays a second preview image on the viewfinder interface in response to the third operation, where the second preview image is a second image block in a second region on a second image captured by the first wide-angle camera, or the second preview image is an image block obtained after angle of view conversion is performed on the second image block; and an orientation of the second region relative to the first region is related to the image movement direction.

For example, in a process in which a user performs video recording by using a mobile phone, a preview image includes a scene A facing the user, and does not include a scene B on the right front of the user. The user keeps a position of the mobile phone unchanged, and enters an image rightward movement instruction (for example, by using a touchscreen). In this case, the preview image is updated to a new preview image including the scene B on the right front of the user (for example, excluding the scene A). Therefore, when the position of the electronic device remains unchanged, a shooting manner such as "moving a lens" or "shaking a lens" may also be implemented, so that user experience is relatively good.

It should be understood that, that an orientation of the second region relative to the first region is related to the image movement direction includes: the orientation of the second region relative to the first region is the same as or opposite to the image movement direction. This is not limited in this embodiment of this application. For example, the user may voluntarily set the orientation of the second region relative to the first region to be the same as or opposite to the image movement direction.

In a possible design, that an orientation of the second region relative to the first region is related to the image movement direction includes: a distance between the second region and a first edge of the second image is a second distance, a distance between the first region and a first edge of the first image is a first distance, and a distance change amount of the second distance relative to the first distance is related to the image movement direction.

For example, it is assumed that a distance between the first region and a left edge of the first image is H, and a distance between the second region and a left edge of the second image is H+A. When A is a positive number, it indicates that the orientation of the second region relative to the first region is rightward; or when A is a negative number, it indicates that the orientation of the second region relative to the first region is leftward.

In an example, the electronic device determines a third region on a third image, where a second orientation change amount of the third region relative to the second region is equal to a first orientation change amount of the second region relative to the first region; and displays a third preview image on the viewfinder interface, where the third preview image is a third image block in the third region on the third image, or the third preview image is an image block obtained after angle of view conversion is performed on the third image block. The second orientation change amount is a distance change amount of a third distance relative to the second distance, and the first orientation change amount is the distance change amount of the second distance relative to the first distance. The third distance is a distance between the third region and a first edge of the third image, the second distance is the distance between the second region and the first edge of the second image, and the first distance is the distance between the first region and the first edge of the first image.

In other words, change amounts of positions of preview images on images captured by the first wide-angle camera are the same. Therefore, visually, a preview image on the viewfinder interface moves at a constant speed, so that user experience is relatively good.

In another example, a second orientation change amount of the third region relative to the second region may alternatively be greater than a first orientation change amount of the second region relative to the first region. Therefore, visually, a preview image on the viewfinder interface moves at an accelerated speed, so that a sense of rhythm and visual impact are implemented.

Certainly, a second orientation change amount of the third region relative to the second region may alternatively be less than a first orientation change amount of the second region relative to the first region. Therefore, visually, a preview image on the viewfinder interface moves at a decelerated speed, so that video recording flexibility and interestingness are higher.

In a possible design, before entering the first video recording mode, the electronic device displays a fourth preview image on the viewfinder interface, where the fourth preview image is an image captured by a second wide-angle camera, a field of view of the second wide-angle camera is less than a field of view of the first wide-angle camera, and the first preview image is some or all of image blocks within an overlapping range between the field of view of the first wide-angle camera and the field of view of the second wide-angle camera. In other words, when switching from another mode to the first video recording mode, the electronic device starts the first wide-angle camera with a larger field of view, and displays, on the viewfinder interface, the first image block in the first region on the first image captured by the first wide-angle camera. Larger coverage of an image captured by a camera with a larger field of view indicates that more details are included and a movable range of a position of a first region on an image is larger. Therefore, a shooting manner such as "moving a lens" or "shaking a lens" may be implemented within a larger movable range, so that user experience is relatively good.

It should be understood that a magnification of an image captured by the second wide-angle camera is less than or equal to a magnification of an image captured by the first wide-angle camera.

The third operation includes: a flick operation on the first preview image; or an operation on a control used to indicate an image rotation direction on the viewfinder interface; or an operation of pressing and dragging a specific control on the viewfinder interface.

It should be understood that the foregoing third operation is merely an example instead of a limitation. Another operation used to input an image movement direction is also feasible. This is not limited in this embodiment of this application.

It can be understood that, when an image movement stop instruction is detected, a fifth preview image is displayed on the viewfinder interface, where the fifth preview image is a fifth image block in a fifth region on a fifth image captured by the first wide-angle camera, or the fifth preview image is an image block obtained after angle of view conversion is performed on the fifth image block; and an orientation of the fifth region relative to the second region does not change. In other words, when an image movement stop instruction is detected, an orientation of a preview image on an image does not change, and a position of the preview image on the viewfinder interface visually does not change.

It can be understood that, when detecting an image movement stop instruction, the electronic device generates and stores a video, where the video includes the second preview image. In other words, when detecting an image movement stop instruction, the electronic device automatically generates a video, and stores the video. This facilitates an operation and improves user experience.

The detecting an image movement stop instruction includes:

when the third operation is a flick operation on the first preview image, generating the image movement stop instruction when detecting an uplift after the flick operation; or when the third operation is an operation of tapping a control used to indicate an image movement direction on the viewfinder interface, generating the image movement stop instruction when detecting that a tap operation is performed again at any position on the viewfinder interface; or when the third operation is an operation of touching and holding a control used to indicate an image movement direction on the viewfinder interface, generating the image movement stop instruction when detecting an uplift after the touch and hold operation; or when the third operation is an operation of pressing and dragging a specific control on the viewfinder interface, generating the image movement stop instruction when detecting an uplift after the drag operation.

It should be noted that the image movement stop instruction is merely an example instead of a limitation. Another image movement stop instruction is also feasible. This is not limited in this embodiment of this application.

For example, the second image is one of M frames of images obtained through frame extraction from N frames of images captured by the first wide-angle camera, where N is an integer greater than or equal to 1, and M is an integer less than N. Frame extraction play can achieve a fast play effect. Therefore, a preview image can be quickly played. Alternatively, the second image is one of M frames of images obtained through multi-frame image insertion into N frames of images captured by the first wide-angle camera, where N is an integer greater than or equal to 1, and M is an integer greater than N. Frame insertion play can achieve a slow play effect. Therefore, a preview image can be slowly played.

The image block obtained after angle of view conversion is performed on the second image block satisfies the following formulas:

$$x'=x*\cos(\theta)-\sin(\theta)*y; \text{ and}$$

$$y'=x*\sin(\theta)+\cos(\theta)*y.$$

Herein, (x', y') is a pixel on the image block obtained after the angle of view conversion; (x, y) is a pixel on the second image block; and θ is a rotation angle, and the rotation angle is preset. After the electronic device performs angle of view conversion on an image block by using the foregoing formulas, a preview image is more suitable for a preview image presented when the mobile phone is shaken actually. Therefore, when the position of the electronic device remains unchanged, the user may implement a shooting manner such as "moving a lens" or "shaking a lens" by using the electronic device, so that user experience is relatively good.

According to a ninth aspect, a method for displaying a preview image in a video recording scenario is further provided. The method is applied to an electronic device. The electronic device detects a first operation used to open a camera application; starts the camera application in response to the first operation; detects a second operation used to indicate a first video recording mode; displays a viewfinder interface on a display of the electronic device in response to the second operation, where the viewfinder interface includes a first preview image, and the first preview image is a first image captured by a camera on the electronic device; keeps a position of the electronic device unchanged, and detects a third operation that indicates an image rotation direction; and displays a second preview image on the viewfinder interface in response to the third operation, where the second preview image is an image obtained after a second image captured by the camera rotates in the image rotation direction. In other words, in a process in which a user performs video recording by using an electronic device, a preview image on a viewfinder interface may rotate, so that an image rotation shooting effect is achieved, and user experience is relatively good.

In a possible design, a third preview image is displayed on the viewfinder interface, where the third preview image is an image obtained after a third image captured by the camera rotates in the image rotation direction, and a rotation angle of the third image relative to the second image is the same as a rotation angle of the second image relative to the first image.

In other words, in a process in which a user performs video recording by using an electronic device, a preview image on a viewfinder interface rotates at a same angle each time, in other words, rotates at a constant speed, so that a rotation shooting effect is achieved.

For example, the camera is a first wide-angle camera, the first image is a first image block in a first region on a fourth image captured by the first wide-angle camera, the second image is a second image block in a second region on a fifth image captured by the first wide-angle camera, and a position of the first region on the fourth image is the same as or different from a position of the second region on the fifth image.

The third operation includes: a circle drawing operation on the first preview image; or an operation on a control used to indicate an image rotation direction on the viewfinder interface.

It should be understood that the foregoing third operation is merely an example instead of a limitation. Another operation used to input an image movement direction is also feasible. This is not limited in this embodiment of this application.

In a possible design, when detecting an image rotation stop instruction, the electronic device generates and stores a video, where the video includes the second preview image. In other words, when detecting an image rotation stop instruction, the electronic device automatically generates a video, and stores the video. This facilitates an operation and improves user experience.

The detecting an image rotation stop instruction includes:

when the third operation is a circle drawing operation on the first preview image, generating the image rotation stop instruction when detecting an uplift after the circle drawing operation; or when the third operation is an operation of tapping a control used to indicate an image rotation direction on the viewfinder interface, generating the image rotation stop instruction when detecting that a tap operation is performed again at any position on the viewfinder interface; or when the third operation is an operation of touching and holding a control used to indicate an image rotation direction on the viewfinder interface, generating the image rotation stop instruction when detecting an uplift after the touch and hold operation.

It should be noted that the image rotation stop instruction is merely an example instead of a limitation. Another image rotation stop instruction is also feasible. This is not limited in this embodiment of this application.

The second image is one of M frames of images obtained through frame extraction from N frames of images captured by the first camera, where N is an integer greater than or equal to 1, and M is an integer less than N. Frame extraction play can achieve a fast play effect. Therefore, a preview image can be quickly played. Alternatively, the second image is one of M frames of images obtained through multi-frame image insertion into N frames of images captured by the first camera, where N is an integer greater than or equal to 1, and M is an integer greater than N. Frame insertion play can achieve a slow play effect. Therefore, a preview image can be slowly played.

According to a tenth aspect, an electronic device is further provided. The electronic device includes one or more processors and one or more memories. The one or more memories store one or more computer programs, the one or more computer programs include instructions, and when the instructions are executed by the one or more processors, the electronic device is enabled to perform the following steps:

detecting a first operation used to open a camera application:

starting the camera application in response to the first operation;

detecting a second operation used to indicate a first video recording mode:

displaying a viewfinder interface on a display of the electronic device in response to the second operation, where the viewfinder interface includes a first preview image, and the first preview image is a first image block in a first region on a first image captured by a first wide-angle camera on the electronic device:

keeping a position of the electronic device unchanged, and detecting a third operation that indicates an image movement direction; and displaying a second preview image on the viewfinder interface in response to the third operation, where the second preview image is a second image block in a second region on a second image captured by the first wide-angle camera, or the second preview image is an image block obtained after angle of view conversion is performed on the second image block; and an orientation of the second region relative to the first region is related to the image movement direction.

In a possible design, that an orientation of the second region relative to the first region is related to the image movement direction includes: the orientation of the second region relative to the first region is the same as or opposite to the image movement direction.

In a possible design, that an orientation of the second region relative to the first region is related to the image movement direction includes: a distance between the second region and a first edge of the second image is a second distance, a distance between the first region and a first edge of the first image is a first distance, and a distance change amount of the second distance relative to the first distance is related to the image movement direction.

In a possible design, when the instructions are executed by the one or more processors, the electronic device is enabled to perform the following step:

displaying a third preview image on the viewfinder interface, where the third preview image is a third image block in a third region on a third image, or the third preview image is an image block obtained after angle of view conversion is performed on the third image block; and a second orientation change amount of the third region relative to the second region is equal to a first orientation change amount of the second region relative to the first region.

The second orientation change amount is a distance change amount of a third distance relative to the second distance, and the first orientation change amount is the distance change amount of the second distance relative to the first distance. The third distance is a distance between the third region and a first edge of the third image, the second distance is the distance between the second region and the first edge of the second image, and the first distance is the distance between the first region and the first edge of the first image.

In a possible design, when the instructions are executed by the one or more processors, the electronic device is enabled to further perform the following step: before the detecting a second operation used to indicate a first video recording mode, displaying a fourth preview image on the viewfinder interface, where the fourth preview image is an image captured by a second wide-angle camera, a field of view of the second wide-angle camera is less than a field of view of the first wide-angle camera, and the first preview image is some or all of image blocks within an overlapping range between the field of view of the first wide-angle camera and the field of view of the second wide-angle camera.

A magnification of an image captured by the second wide-angle camera is less than or equal to a magnification of an image captured by the first wide-angle camera.

The third operation includes:

a flick operation on the first preview image; or an operation on a control used to indicate an image rotation direction on the viewfinder interface; or an operation of pressing and dragging a specific control on the viewfinder interface.

In a possible design, when the instructions are executed by the one or more processors, the electronic device is enabled to further perform the following step: when detecting an image movement stop instruction, displaying a fifth preview image on the viewfinder interface, where the fifth preview image is a fifth image block in a fifth region on a fifth image captured by the first wide-angle camera, or the fifth preview image is an image block obtained after angle of view conversion is performed on the fifth image block; and an orientation of the fifth region relative to the second region does not change.

In a possible design, when the instructions are executed by the one or more processors, the electronic device is enabled to further perform the following steps: when detecting an image movement stop instruction, generating and storing a video, where the video includes the first preview image and the second preview image.

In a possible design, when the instructions are executed by the one or more processors, the electronic device is enabled to specifically perform the following step:

when the third operation is a flick operation on the first preview image, generating the image movement stop instruction when detecting an uplift after the flick operation; or when the third operation is an operation of tapping a control used to indicate an image movement direction on the viewfinder interface, generating the image movement stop instruction when detecting that a tap operation is performed again at any position on the viewfinder interface; or when the third operation is an operation of touching and holding a control used to indicate an image movement direction on the viewfinder interface, generating the image movement stop instruction when detecting an uplift after the touch and hold operation; or when the third operation is an operation of pressing and dragging a specific control on the viewfinder interface, generating the image movement stop instruction when detecting an uplift after the drag operation.

The second image is one of M frames of images obtained through frame extraction from N frames of images captured by the first wide-angle camera, where N is an integer greater than or equal to 1, and M is an integer less than N; or the second image is one of M frames of images obtained through multi-frame image insertion into N frames of images captured by the first wide-angle camera, where N is an integer greater than or equal to 1, and M is an integer greater than N.

In a possible design, the image block obtained after angle of view conversion is performed on the second image block satisfies the following formulas:

$$x'=x*\cos(\theta)-\sin(\theta)*y; \text{ and}$$

$$y'=x*\sin(\theta)+\cos(\theta)*y.$$

Herein, (x', y') is a pixel on the image block obtained after the angle of view conversion; (x, y) is a pixel on the second image block; and θ is a rotation angle, and the rotation angle is preset.

According to an eleventh aspect, an electronic device is further provided. The electronic device includes one or more processors and one or more memories. The one or more memories store one or more computer programs, the one or more computer programs include instructions, and when the instructions are executed by the one or more processors, the electronic device is enabled to perform the following steps:

detecting a first operation used to open a camera application, starting the camera application in response to the first operation; detecting a second operation used to indicate a first video recording mode; displaying a viewfinder interface on a display of the electronic device in response to the second operation, where the viewfinder interface includes a first preview image, and the first preview image is a first image captured by a camera on the electronic device; keeping a position of the electronic device unchanged, and detecting a third operation that indicates an image rotation direction; and displaying a second preview image on the viewfinder interface in response to the third operation, where the second preview image is an image obtained after a second image captured by the camera rotates in the image rotation direction.

In a possible design, when the instructions are executed by the one or more processors, the electronic device is enabled to further perform the following step:

displaying a third preview image on the viewfinder interface, where the third preview image is an image obtained after a third image captured by the camera rotates in the image rotation direction, and a rotation angle of the third image relative to the second image is the same as a rotation angle of the second image relative to the first image.

The camera is a first wide-angle camera, the first image is a first image block in a first region on a fourth image captured by the first wide-angle camera, the second image is a second image block in a second region on a fifth image captured by the first wide-angle camera, and a position of the first region on the fourth image is the same as or different from a position of the second region on the fifth image.

The third operation includes:

a circle drawing operation on the first preview image; or an operation on a control used to indicate an image rotation direction on the viewfinder interface.

In a possible design, when the instructions are executed by the one or more processors, the electronic device is enabled to further perform the following steps: when detecting an image rotation stop instruction, generating and storing a video, where the video includes the first preview image and the second preview image.

In a possible design, when the instructions are executed by the one or more processors, the electronic device is enabled to specifically perform the following step:

when the third operation is a circle drawing operation on the first preview image, generating the image rotation stop instruction when detecting an uplift after the circle drawing operation; or when the third operation is an operation of tapping a control used to indicate an image rotation direction on the viewfinder interface, generating the image rotation stop instruction when detecting that a tap operation is performed again at any position on the viewfinder interface; or when the third operation is an operation of touching and holding a control used to indicate an image rotation direction on the viewfinder interface, generating the image rotation stop instruction when detecting an uplift after the touch and hold operation.

The second image is one of M frames of images obtained through frame extraction from N frames of images captured by the first camera, where N is an integer greater than or equal to 1, and M is an integer less than N; or the second image is one of M frames of images obtained through multi-frame image insertion into N frames of images captured by the first camera, where N is an integer greater than or equal to 1, and M is an integer greater than N.

According to a twelfth aspect, an electronic device is further provided. The electronic device includes modules/units that perform the method according to any one of the eighth aspect and the possible designs of the eighth aspect. These modules/units may be implemented by hardware, or may be implemented by hardware by executing corresponding software.

According to a thirteenth aspect, an electronic device is further provided. The electronic device includes modules/units that perform the method according to any one of the ninth aspect and the possible designs of the ninth aspect. These modules/units may be implemented by hardware, or may be implemented by hardware by executing corresponding software.

According to a fourteenth aspect, a chip is further provided. The chip is coupled to a memory in an electronic device, and is configured to perform the technical solution according to any one of the eighth aspect and the possible designs of the eighth aspect in the embodiments of this application. In this embodiment of this application, "coupling" means that two components are directly or indirectly combined with each other.

According to a fifteenth aspect, a chip is further provided. The chip is coupled to a memory in an electronic device, and is configured to perform the technical solution according to any one of the ninth aspect and the possible designs of the ninth aspect in the embodiments of this application. In this embodiment of this application, "coupling" means that two components are directly or indirectly combined with each other.

According to a sixteenth aspect, a computer-readable storage medium is further provided. The computer-readable storage medium includes a computer program, and when the computer program is run on an electronic device, the electronic device is enabled to perform the technical solution according to any one of the eighth aspect and the possible designs of the eighth aspect.

According to a seventeenth aspect, a computer-readable storage medium is further provided. The computer-readable storage medium includes a computer program, and when the computer program is run on an electronic device, the electronic device is enabled to perform the technical solution according to any one of the ninth aspect and the possible designs of the ninth aspect.

According to an eighteenth aspect, a program product is further provided. The program product includes instructions, and when the instructions are run on a computer, the computer is enabled to perform the technical solution according to any one of the eighth aspect and the possible designs of the eighth aspect.

According to a nineteenth aspect, a program product is further provided. The program product includes instructions, and when the instructions are run on a computer, the computer is enabled to perform the technical solution according to any one of the ninth aspect and the possible designs of the ninth aspect.

According to a twentieth aspect, a graphical user interface on an electronic device is further provided. The electronic device includes one or more memories and one or more processors. The one or more processors are configured to execute one or more computer programs stored in the one or more memories. The graphical user interface includes a graphical user interface displayed when the electronic device performs the technical solution according to any one of the eighth aspect and the possible designs of the eighth aspect.

According to a twenty-first aspect, a graphical user interface on an electronic device is further provided. The electronic device includes one or more memories and one or more processors. The one or more processors are configured to execute one or more computer programs stored in the one or more memories. The graphical user interface includes a graphical user interface displayed when the electronic device performs the technical solution according to any one of the ninth aspect and the possible designs of the ninth aspect.

For beneficial effects of the ninth aspect to the twenty-first aspect, refer to the beneficial effects of the eighth aspect. Details are not described again.

BRIEF DESCRIPTION OF DRAWINGS

FIG. 1(a) to FIG. 1(c) are a schematic diagram of implementing "shaking a lens" and "moving a lens" by using a mobile phone in the conventional technology;

FIG. 3A-(a) to FIG. 3A-(c) are schematic diagrams of implementation principles of various camera movement modes according to an embodiment of this application;

FIG. 3B-(a) to FIG. 3B-(c) are a schematic diagram of an example of a move mode according to an embodiment of this application;

FIG. 5A-(a) to FIG. 5A-(c) and FIG. 5B are schematic diagrams of a micro movie icon on a mobile phone according to an embodiment of this application:

FIG. 7A, FIG. 7B-(a) to FIG. 7B-(c), FIG. 7C-(a) to FIG. 7C-(c), and FIG. 7D-(a) to FIG. 7D-(c) are schematic diagrams of an example of a recording interface of a travel template according to an embodiment of this application;

FIG. 8A-(a), FIG. 8A-(b), FIG. 8B-(a) to FIG. 8B-(c), FIG. 8C, FIG. 8D-(a), and FIG. 8D-(b) are schematic diagrams of another example of a recording interface of a travel template according to an embodiment of this application;

FIG. 9A-(a), FIG. 9A-(b), FIG. 9B-(a), FIG. 9B-(b), FIG. 9C-(a) to FIG. 9C-(c), FIG. 9D-(a) to FIG. 9D-(c), FIG. 9E-(a) to FIG. 9E-(d), and FIG. 9F-(a) to FIG. 9F-(c) are schematic diagrams of an effect presentation interface according to an embodiment of this application;

FIG. 11A-(a) to FIG. 11A-(c) and FIG. 11B are schematic diagrams of another example of a home page of a micro movie mode according to an embodiment of this application;

FIG. 11C is a schematic diagram of an interface for selecting camera movement modes and combining the camera movement modes into a shooting template according to an embodiment of this application:

DESCRIPTION OF EMBODIMENTS

Figure 2A:
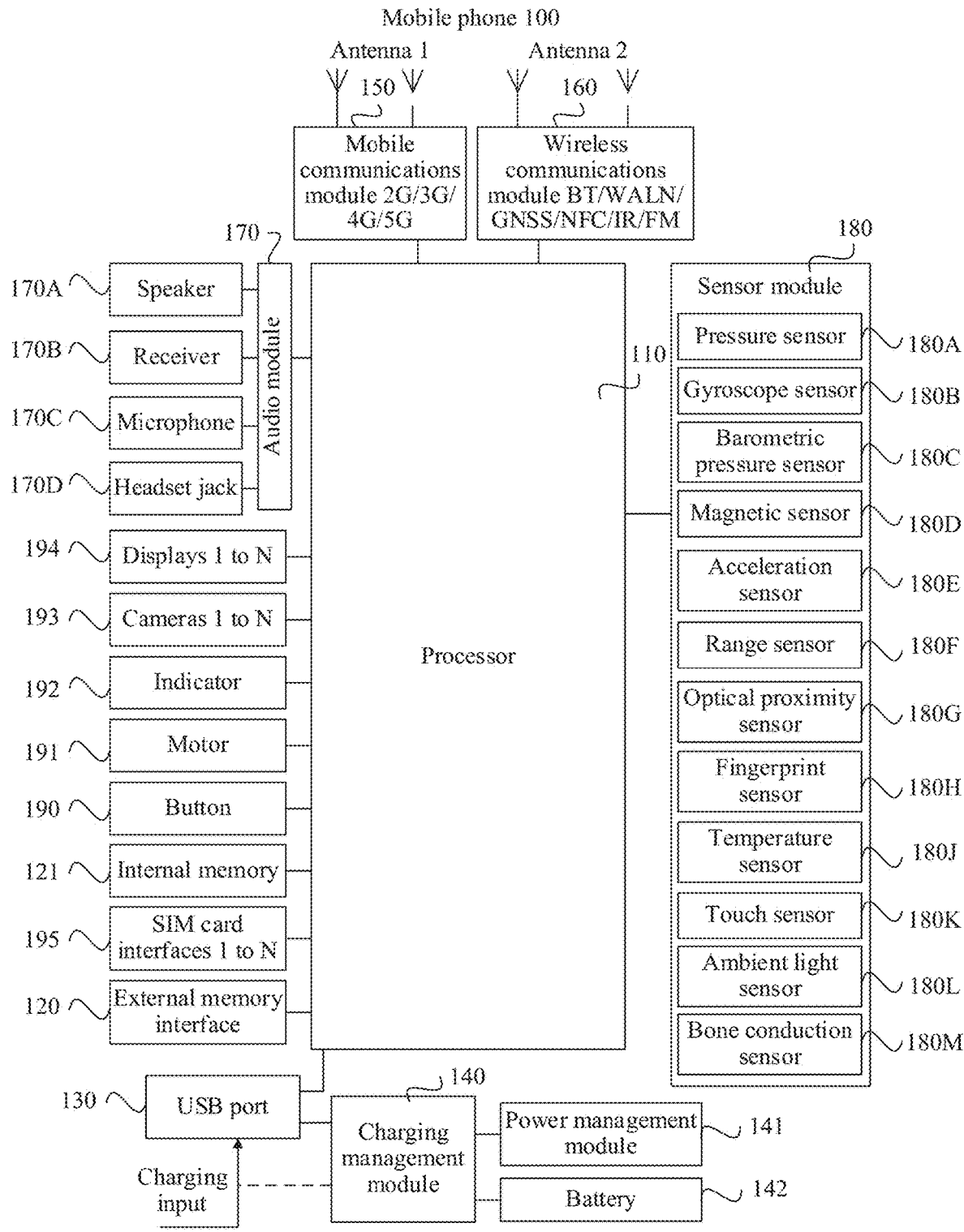
FIG. 2A is a schematic diagram of a hardware structure of an electronic device according to an embodiment of this application.

The following describes some terms in the embodiments of this application to help a person skilled in the art have a better understanding.

A preview image in the embodiments of this application is an image displayed on a viewfinder interface of an electronic device. For example, when the electronic device is a mobile phone, the mobile phone starts a camera application, opens a camera, and displays a viewfinder interface, where a preview image is displayed on the viewfinder interface. The mobile phone is still used as an example. When the mobile phone enables a video call function (for example, a video communication function in WeChat), the mobile phone opens a camera, and displays a viewfinder interface, where a preview image is displayed on the viewfinder interface.

A field of view in the embodiments of this application is an important performance parameter of a camera. In addition, "field of view" may also be referred to as terms such as "angle of view", "vision scope", and "vision field scope". This specification imposes no limitation on the name. The field of view is used to indicate a maximum shooting angle range of the camera. If an object is in the angle range, the object is captured by the camera and therefore is further presented in a preview image. If an object is outside the angle range, the object is not captured by the camera and therefore is not presented in a preview image.

Generally, a larger field of view of the camera indicates a larger shooting range and a shorter focal length; and a smaller field of view of the camera indicates a smaller shooting range and a longer focal length. Therefore, cameras may be classified into a common camera, a wide-angle camera, an ultra-wide-angle camera, and the like due to different fields of view. For example, a focal length of the common camera may range from 40 millimeters to 45 millimeters, and an angle of view may range from 40 degrees to 60 degrees; a focal length of the wide-angle camera may range from 24 millimeters to 38 millimeters, and an angle of view may range from 60 degrees to 84 degrees; and a focal length of the ultra-wide-angle camera may range from 13 millimeters to 20 millimeters, and an angle of view may range from 94 degrees to 118 degrees.

A video shooting method provided in the embodiments of this application may be applied to an electronic device. The electronic device includes a camera. Preferably, the camera is a wide-angle camera or an ultra-wide-angle camera. Certainly, the camera may alternatively be a common camera. A quantity of cameras is not limited in this application. There may be one or more cameras. If there are a plurality of cameras, the plurality of cameras may preferably include at least one wide-angle camera or at least one ultra-wide-angle camera.

The electronic device may be, for example, a mobile phone, a tablet computer, a wearable device (for example, a watch, a wristband, a helmet, a headset, or a necklace), a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

For example, FIG. 2A is a schematic structural diagram of an electronic device 100. As shown in FIG. 2A, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent devices, or may be integrated into one or more processors. The controller may be a nerve center and a command center of the electronic device 100. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

The USB port 130 is an interface that conforms to a USB standard specification, and may be specifically a mini USB port, a micro USB port, a USB Type C port, or the like. The USB port 130 may be configured to connect to a charger to charge the electronic device 100, and may also be configured to transmit data between the electronic device 100 and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device 100 may be configured to cover one or more communication bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some functional modules in the mobile communications module 150 may be disposed in a same device as at least some modules in the processor 110.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (bluetooth. BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrated into at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, for example, a viewfinder interface of a camera application. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing.

The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group. MPEG)1, MPEG2, MPEG3, and MPEG4.

The NPU is a neural network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, software code of at least one application (such as an iQIYI application or a WeChat application), and the like. The data storage area may store data (for example, a shot image or a recorded video) or the like generated when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The external memory interface 120 may be configured to connect to an external memory card, for example, a micro SD card, to extend a storage capability of the electronic device. The external memory card communicates with the processor 110 through the external memory interface 120, to implement a data storage function. For example, files such as music and a video are stored in the external memory card.

The electronic device 100 may implement audio functions such as music playing and recording functions through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the electronic device 100. In some embodiments, an angular velocity of the electronic device 100 around three axes (namely, axes x, y, and z) may be determined through the gyroscope sensor 180B.

The gyroscope sensor 180B may be configured to implement image stabilization during shooting. The barometric pressure sensor 180C is configured to measure barometric pressure. In some embodiments, the electronic device 100 calculates an altitude based on a barometric pressure value measured by the barometric pressure sensor 180C, to assist in positioning and navigation. The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the clamshell is set based on a detected opening or closing state of the flip cover or a detected opening or closing state of the clamshell. The acceleration sensor 180E may detect accelerations in various directions (usually on three axes) of the electronic device 100, and may detect a magnitude and a direction of gravity when the electronic device 100 is still. The acceleration sensor 180E may be further configured to identify a posture of the electronic device 100, and is applied to applications such as a pedometer and switching between a landscape mode and a portrait mode.

The range sensor 180F is configured to measure a distance. The electronic device 100 may measure a distance in an infrared manner or a laser manner. In some embodiments, in a shooting scenario, the electronic device 100 may measure a distance through the range sensor 180F, to implement quick focusing. The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch. The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer a detected touch operation to the application processor, to determine a type of a touch event. The display 194 may provide a visual output related to the touch operation. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100.

It can be understood that the components shown in FIG. 2A do not constitute a specific limitation on the electronic device 100. The mobile phone may further include more or fewer components than those shown in the figure, or combine some components, or split some components, or have different component arrangements. In addition, a combination/connection relationship between the components in FIG. 2A may also be adjusted and modified.

In this embodiment of this application, the electronic device 100 may include one or more cameras 193. It is assumed that the electronic device 100 includes a plurality of cameras such as a camera 1 and a camera 2, and a field of view of the camera 1 is less than a field of view of the camera 2. For example, the camera 1 is a long-focus camera, and the camera 2 is a wide-angle camera (which may be a common wide-angle camera or an ultra-wide-angle camera); or the camera 1 is a common wide-angle camera, and the camera 2 is an ultra-wide-angle camera; or there are other different combinations. In some embodiments, both the camera 1 and the camera 2 may be rear-facing cameras or front-facing cameras. It should be understood that the electronic device 100 may further include more cameras, for example, a long-focus camera.

The electronic device 100 may provide a plurality of recording modes, for example, a common recording mode, a move mode, and a shake mode. In the common video recording mode, the electronic device 100 starts the camera 1 with a relatively small field of view, and displays, on the viewfinder interface, an image captured by the camera 1. When switching from the common video recording mode to the move mode, the electronic device 100 starts the camera 2 with a relatively large field of view, and displays, on the viewfinder interface, an image block on one frame of image captured by the camera 2. When the electronic device 100 remains stationary, if the processor 110 (for example, a GPU or an NPU) responds to an image movement direction that is entered by the user (for example, an image movement direction that is entered by performing a flick operation on a screen), according to the image movement direction, another image block on a next frame of image captured by the camera 2 is determined, and then the another image block is displayed on the viewfinder interface. An orientation of the another image block relative to the previous image block is related to the image movement direction that is entered by the user. In other words, the user enters the image movement direction to implement a shooting manner of "moving a lens". Therefore, in this embodiment of this application, in a video recording process of the mobile phone, the shooting manner of "moving a lens" may also be implemented without a need of moving a position of the mobile phone by the user, thereby facilitating an operation. Therefore, user experience is relatively good.

Figure 2B:
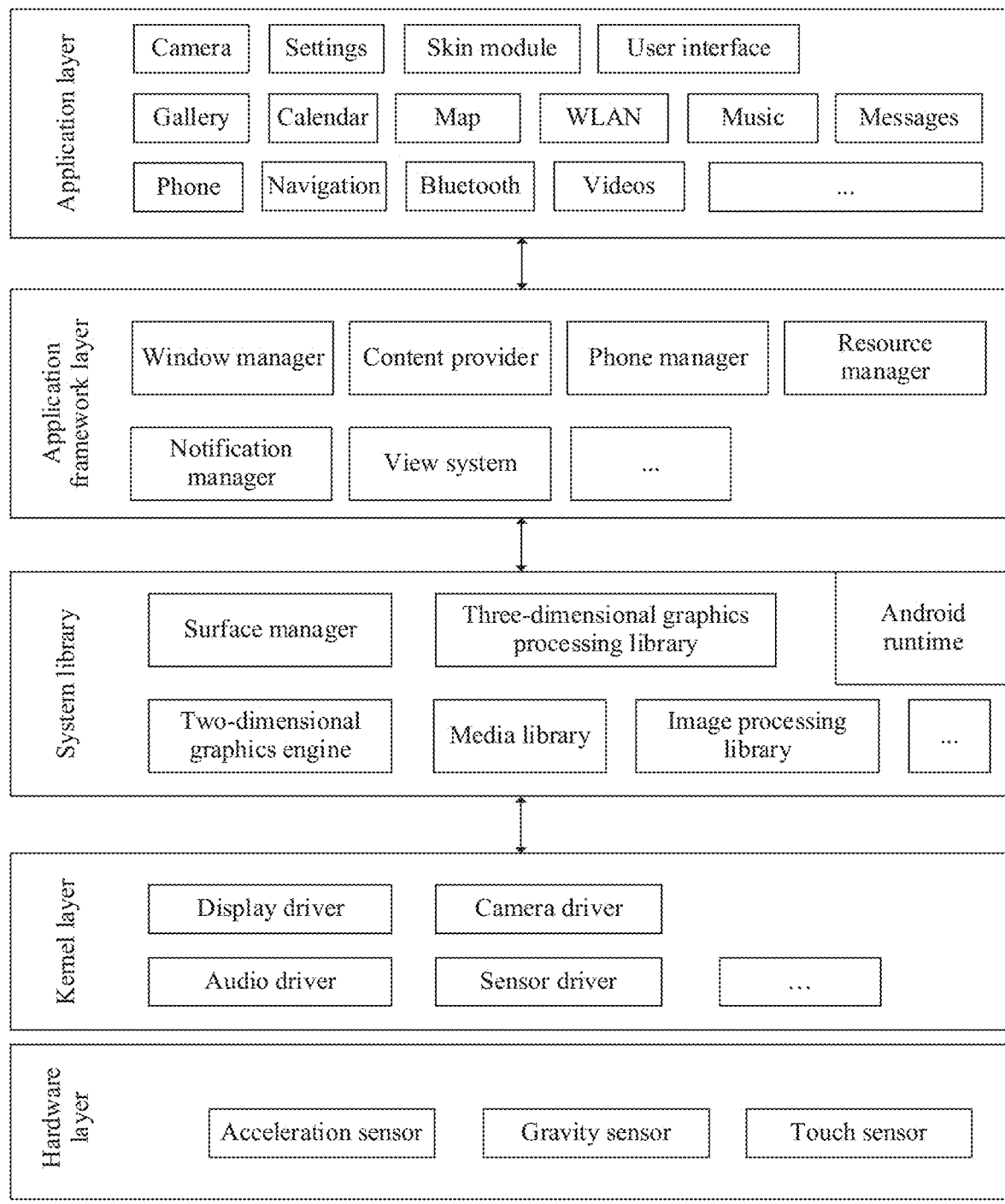
FIG. 2B is a schematic diagram of a software structure of an electronic device according to an embodiment of this application.

FIG. 2B is a block diagram of a software structure of an electronic device according to an embodiment of this application. As shown in FIG. 2B, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework layer (framework, FWK), an Android runtime (Android runtime) and system library, and a kernel layer from top to bottom.

The application layer may include a series of application packages. As shown in FIG. 2B, the application layer may include Camera, Settings, a skin module, a user interface (user interface, UI), a third-party application, and the like. The third-party application may include WeChat, QQ, Gallery, Calendar, Phone, Map, Navigation, WLAN, Bluetooth, Music, Videos, Messages, and the like.

The application framework layer provides an application programming interface (application programming interface, API) and a programming framework for an application at the application layer. The application framework layer may include some predefined functions. As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including a notification icon of Messages may include a text display view and a picture display view.

The phone manager is configured to provide a communication function of the electronic device, for example, management of a call status (including answering or declining).

The resource manager provides various resources for an application, for example, a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to: notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The core library includes two parts, a function that needs to be invoked in Java language and a core library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a graphics processing library for image processing, to achieve "shaking", "moving", "ascending", and "descending" shooting effects.

The kernel layer is a layer between hardware and software. The kernel layer includes at least a display driver, a camera driver, an audio driver, and a sensor driver.

The hardware layer may include various types of sensors, for example, the acceleration sensor, the gyroscope sensor, and the touch sensor in the embodiments of this application.

With reference to a method for displaying a preview image in a video recording scenario in the embodiments of this application, the following describes working procedures of software and hardware of the electronic device by using an example.

When the touch sensor 180K receives a touch operation, a corresponding hardware interruption is sent to the kernel layer. An example in which the touch operation is a touch tap operation is used. Assuming that a control corresponding to the tap operation is a control corresponding to an icon of the camera application, the camera application is started. Assuming that the camera application is currently in the move mode, the camera driver at the kernel layer is invoked to drive a camera with a relatively large field of view (for example, an ultra-w % ide-angle camera) to capture an image. The ultra-wide-angle camera sends the captured image to the graphics processing library in the system library.

The graphics processing library processes the image captured by the ultra-wide-angle camera, for example, determines an image block on the image. The display displays the image block, that is, a preview image, on the viewfinder interface of the camera application. When the electronic device remains stationary, assuming that the touch sensor 180K receives a flick operation, a corresponding hardware interruption is sent to the kernel layer. The kernel layer processes the flick operation into an original input event, and stores the original input event at the kernel layer. Assuming that the camera application obtains the original input event from the kernel layer and identifies that the input event corresponds to a flick direction, the graphics processing library determines another image block on the image captured by the ultra-wide-angle camera, where an orientation of the another image block relative to the one image block is related to the flick direction. Therefore, in a video recording process of the electronic device, an effect of "moving a lens" may also be achieved when the electronic device remains stationary.

For ease of understanding, in the following embodiments of this application, an example in which the electronic device is a mobile phone is used to describe in detail the video shooting method provided in the embodiments of this application with reference to the accompanying drawings.

In the video shooting method provided in this application, a camera movement shooting technique such as "moving a lens" or "shaking a lens" may be implemented when the mobile phone remains stationary.

For ease of description, in this specification, "moving a lens" is referred to as a "move mode"; "shaking a lens" is referred to as a "shake mode"; and the "move mode", the "shake mode", and the like are collectively referred to as a "camera movement mode". Herein, only the "move mode" and the "shake mode" are used as examples. It can be understood that the camera movement mode may be more specific. For example, the move mode may include an upward move mode, a downward move mode, a leftward move mode, and a rightward move mode according to a movement direction, and may include an accelerated move mode, a constant move mode, and a decelerated move mode according to a movement speed. For example, referring to Table 1, various camera movement modes are listed.

TABLE 1

Various camera movement modes

|  |  | Direction | Speed |
|---|---|---|---|
| Camera movement mode | Move mode | Rightward move mode | Accelerated, constant, and decelerated |
|  |  | Leftward move mode | Accelerated, constant, and decelerated |
|  |  | Upward move mode | Accelerated, constant, and decelerated |
|  |  | Downward move mode | Accelerated, constant, and decelerated |
|  | Shake mode | Rightward shake mode | Accelerated, constant, and decelerated |
|  |  | Leftward shake mode | Accelerated, constant, and decelerated |
|  |  | Upward shake mode | Accelerated, constant, and decelerated |
|  |  | Downward shake mode | Accelerated, constant, and decelerated |
|  | Push a lens |  | Accelerated, constant, and decelerated |
|  | Pull a lens |  | Accelerated, constant, and decelerated |
|  | Rotate mode | Clockwise rotate mode | Accelerated, constant, and decelerated |
|  |  | Counterclockwise rotate mode | Accelerated, constant, and decelerated |

The 36 camera movement modes in Table 1 are used as an example. It can be understood that more modes may be further included. For example, in addition to the upward movement, the downward movement, the leftward movement, and the rightward movement, the move mode may further include movements in other directions, which are not enumerated one by one herein.

The following describes implementation principles of the various "camera movement modes" when the mobile phone remains stationary.

(1) Move Mode

The mobile phone starts a camera such as a wide-angle camera or an ultra-wide-angle camera. The camera outputs an image stream. Referring to FIG. 3A-(a), a largest block represents an image that is output by the camera, and generally represents an image including a relatively large quantity of to-be-shot objects. For ease of description, only an $m^{th}$ frame of image to an $(m+3)^{th}$ frame of image in the image stream are captured as an example in FIG. 3A-(a). For example, for the $m^{th}$ frame of image, a small block in a corresponding large block is marked as an $m^{th}$ region, and an image block in the $m^{th}$ region may be obtained through clipping and displayed on a display as a preview image. In other words, a preview image displayed on the mobile phone is an image block obtained through clipping from an image captured by the camera. The descriptions herein are also applicable to the shake mode, the push mode, the pull mode, and the like below.

A rightward movement is used as an example. Assuming that the rightward movement starts from the $m^{th}$ frame, referring to FIG. 3A-(a), a preview image is the image block in the $m^{th}$ region on the $m^{th}$ frame of image; a next frame of preview image is an image block in an $(m+1)^{th}$ region on the $(m+1)^{th}$ frame of image, where a position of the $(m+1)^{th}$ region moves rightward by a distance A relative to that of the $m^{th}$ region; a next frame of preview image is an image block in an $(m+2)^{th}$ region on the $(m+2)^{th}$ frame of image, where a position of the $(m+2)^{th}$ region moves rightward by a distance B relative to that of the $(m+1)^{th}$ region, and the position of the $(m+2)^{th}$ region moves rightward by a distance A+B relative to that of the $m^{th}$ region; and so on. The $m^{th}$ region, the $(m+1)$ region, the $(m+2)^{th}$ region, and the like are collectively referred to as a target region. In other words, a position of the target region on the image captured by the camera gradually moves rightward. This achieves a lens rightward movement effect. However, the mobile phone does not move actually.

An example in which the $m^{th}$ region is a central region on the $m^{th}$ frame of image is used in FIG. 3A-(a). It can be understood that the $m^{th}$ region may alternatively be another region on the $m^{th}$ frame of image. For example, a left edge of the $m^{th}$ region overlaps a left edge of the $m^{th}$ frame of image. To be specific, the target region moves from the leftmost to the rightmost of the image.

FIG. 3A-(a) is described by using the rightward movement as an example. It can be understood that movements in various directions such as a leftward movement, an upward movement, a downward movement, and a diagonal movement may be further included, and have a same principle as the rightward movement. Details are not described again.

The following provides a specific example. For ease of simplification, an example of updating a preview image by one frame per second is used.

It is assumed that an image in the image stream that is output by the camera is 4148*2765, and a target region is 2094*1178. An example in which a target region moves from the leftmost to the rightmost of an image is used, and an example of a constant movement is used. Referring to FIG. 3B-4a), FIG. 3B-(b), and FIG. 3B-(c), the rightward movement means that a center point of a target region moves from −1027 to +1027 in an X direction. In this case, it takes 3 seconds to complete a leftmost-to-rightmost translation. Herein, the rightward movement is used as an example. It can be understood that the leftward movement has a same principle as the rightward movement. Details are not described again. In addition, the example of performing updating by one frame per second is used herein. It can be understood that updating may be performed by a plurality of frames per second during actual application.

Likewise, the upward translation means that a center point of a target region moves from −793 to +793 in a Y direction. In this case, it takes 3 seconds (or user-specified duration) to complete a bottommost-to-uppermost translation. Herein, the upward movement is used as an example. It can be understood that the downward movement has a same principle as the upward movement. Details are not described again.

(2) Shake Mode

Different from the move mode, in the shake mode, in addition to that a position of a target region on an image captured by the camera needs to be changed, angle of view conversion further needs to be performed on an image block in the target region, and a preview image is an image block obtained after the angle of view conversion. For example, the mobile phone may first perform angle of view conversion on an image (for example, an $m^{th}$ frame of image) captured by the camera, and then determine that an image block in a target region on an image obtained after the angle of view conversion is a preview image; or the mobile phone may first determine an image block in a target region on an image captured by the camera, then perform angle of view conversion on the image block, and determine that an image block obtained after the angle of view conversion is a preview image.

A right shake is used as an example. Assuming that the right shake starts from the $m^{th}$ frame, referring to FIG. 3A-(a), a preview image is an image block obtained after angle of view conversion is performed on an image block in an $m^{th}$ region, a next frame of preview image is an image block obtained after angle of view conversion is performed on an image block in an $(m+1)^{th}$ region, a next frame of preview image is an image block obtained after angle of view conversion is performed on an image block in an $(m+2)^{th}$ region, and so on. This achieves a lens rightward-shake effect. However, a position of the mobile phone does not change actually.

The angle of view conversion may be implemented through affine transformation. For example, the affine transformation includes: multiplying a pixel on an image by a linear transformation matrix, and adding a translation vector to obtain an image obtained after angle of view conversion. For example, the image obtained after the angle of view conversion satisfies the following formula:

$$\begin{bmatrix} x' \\ y' \\ 1 \end{bmatrix} = \begin{bmatrix} m11 & m12 & m13 \\ m21 & m22 & m23 \\ 0 & 0 & 1 \end{bmatrix} \begin{bmatrix} x \\ y \\ 1 \end{bmatrix}.$$

The following formulas may be obtained according to the foregoing formula:

$x'=m11*x+m12*y+m13$; and $y'=m21*x+m22*y+m23$.

Herein, (x', y') is a pixel on the image obtained after the angle of view conversion; (x, y) is a pixel on the image obtained before the angle of view conversion; and the matrix $$\begin{bmatrix} m11 & m12 & m13 \\ m21 & m22 & m23 \\ 0 & 0 & 1 \end{bmatrix}$$

in the formula is a matrix used to implement linear transformation and translation. In addition, m11, m12, m21, and m22 are linear transformation parameters; m13 and m23 are translation parameters; and m11, m12, m21, and m22 are related to a rotation angle. Assuming that a rotation angle of "shaking a lens" is θ, m11=cos(θ), m12=−sin(θ), m21=sin(θ), m22=cos(θ), m13=0, and m23=0. Therefore, the following formulas may be obtained by deforming the foregoing formulas:

$x'=x*\cos(θ)-\sin(θ)*y$; and $y'=x*\sin(θ)+\cos(θ)*y$.

For example, the rotation angle θ may be determined in a plurality of manners. For example, the rotation angle θ is a preset fixed value, or may be set by a user. Therefore, after determining the rotation angle, the mobile phone may perform angle of view conversion according to the foregoing formulas.

(3) Push Mode

The push mode corresponds to a shooting manner of "pushing a lens", which can be understood as that the camera gradually approaches an object, to be specific, a to-be-shot object on a viewfinder interface is magnified. This helps focus on object details.

Referring to FIG. 3A-(b), for example, for an $m^{th}$ frame of image, a corresponding large block includes a small block, that is, an $m^{th}$ region, and the mobile phone obtains an image block from the $m^{th}$ region through clipping and displays the image block on a screen.

Assuming that the push mode starts from the $m^{th}$ frame, still referring to FIG. 3A-(b), a preview image is the image block obtained from the $m^{th}$ region on the $m^{th}$ frame of image through clipping; a next frame of preview image is an image block obtained from an $(m+1)^{th}$ region through clipping, where an area of the $(m+1)^{th}$ region is less than an area of the $m^{th}$ region; a next frame of preview image is an image block obtained from an $(m+2)^{th}$ region through clipping, where an area of the $(m+2)^{th}$ region is less than the area of the $m^{th}$ region; and so on. In other words, an image block area is becoming smaller. In this case, when an image block is displayed on the display, to adapt to a size of the display, the image block needs to be magnified for display. A smaller image block indicates a larger magnification. Therefore, a to-be-shot object in a preview image on the mobile phone is gradually magnified. This achieves a shooting effect that the camera gradually approaches an object. However, a position of the mobile phone does not change.

(4) Pull Mode

The pull mode corresponds to a shooting manner of "pulling a lens", which can be understood as that the camera gradually moves away from an object, to be specific, a to-be-shot object on a viewfinder interface is de-magnified. This helps panoptic shooting.

Different from the pull mode, assuming that the push mode starts from an $m^{th}$ frame, a preview image is an image block in an $m^{th}$ region on the $m^{th}$ frame of image; a next frame of preview image is an image block in an $(m+1)^{th}$ region on an $(m+1)^{th}$ frame of image, where an area of the $(m+1)^{th}$ region is greater than an area of the $m^{th}$ region; a next frame of preview image is an image block in an $(m+2)^{th}$ region on an $(m+2)^{th}$ frame of image, where an area of the $(m+2)^{th}$ region is greater than the area of the $(m+1)^{th}$ region; and so on. In other words, an image block area is becoming larger. In this case, when an image block is displayed on the display, to adapt to a size of the display, the image block needs to be de-magnified for display. A larger image block indicates a larger de-magnification. Therefore, a to-be-shot object in a preview image on the mobile phone is de-magnified. This achieves an effect that the camera gradually moves away from a to-be-shot object. However, a position of the mobile phone does not change.

(5) Rotate Mode

In the rotate mode, in addition to determining an image block in a target region, the mobile phone further needs to rotate the image block. For example, the mobile phone may first rotate an image captured by the camera, and then determine that an image block in a target region on a rotated image is a preview image; or the mobile phone may first determine an image block in a target region on an image captured by the camera, then rotate the image block, and determine that a rotated image block is a preview image.

Clockwise rotation is used as an example. Assuming that the rotation starts from an $m^{th}$ frame, referring to FIG. 3A-(c), a preview image is an image block in an $m^{th}$ region, a next frame of preview image is an image block obtained after an image block in an $(m+1)^{th}$ region rotates clockwise by an angle G, a next frame of preview image is an image block obtained after an image block in an $(m+2)^{th}$ region rotates clockwise by an angle G+P, and so on. In other words, a target region gradually rotates clockwise. Therefore, a to-be-shot object on a preview image gradually rotates clockwise. This achieves a rotation shooting effect of the mobile phone. However, a position of the mobile phone does not change.

FIG. 3A-(c) is described by using the clockwise rotation as an example. It can be understood that counterclockwise rotation may be further included, and has a same principle as the clockwise rotation. Details are not described again.

(6) Constant Mode

The constant mode includes a constant move mode, a constant shake move, a constant push mode, a constant pull mode, a constant rotate mode, and the like. More specifically, the constant movement may further include the constant upward movement, the constant downward movement, the constant leftward movement, the constant rightward movement, and the like, and the constant rotation may further include the constant clockwise rotation, the constant counterclockwise rotation, and the like. This is shown in Table 1.

The constant movement is used as an example, to be specific, the constant rightward movement is used as an example. Referring to FIG. 3A-(a), for example, A=B=C, to be specific, the target region (for example, the $m^{th}$ region, the $(m+1)^{th}$ region, and the $(m+2)^{th}$ region) moves by a same distance each time. This achieves a constant rightward movement effect.

The constant push is used as an example. Referring to FIG. 3A-(b), the target region (for example, the $m^{th}$ region, the $(m+1)^{th}$ region, and the $(m+2)^{th}$ region) is decreased by a same area each time. This achieves a constant push shooting effect.

The constant rotation is used as an example, to be specific, the constant clockwise rotation is used as an example. Referring to FIG. 3A-(c), for example, G=P=W, to be specific, the target region (for example, the $m^{th}$ region, the $(m+1)^{th}$ region, and the $(m+2)^{th}$ region) rotates by a same angle each time. This achieves a constant rotation effect.

(7) Accelerated Mode

The accelerated mode includes an accelerated move mode, an accelerated shake move, an accelerated push mode, an accelerated pull mode, an accelerated rotate mode, and the like. More specifically, the accelerated movement may further include the accelerated upward movement, the accelerated downward movement, the accelerated leftward movement, the accelerated rightward movement, and the like; and the accelerated rotation may further include the accelerated clockwise rotation, the accelerated counterclockwise rotation, and the like. This is shown in Table 1.

The accelerated movement is used as an example, to be specific, the accelerated rightward movement is used as an example. Referring to FIG. 3A-(a), for example, A<B<C, to be specific, the target region (for example, the $m^{th}$ region, the $(m+1)^{th}$ region, and the $(m+2)^{th}$ region) moves by an increasing distance each time. This achieves an accelerated rightward movement effect.

The accelerated push is used as an example. Referring to FIG. 3A-(b), an area reduction amount of the target region (for example, the $m^{th}$ region, the $(m+1)^{th}$ region, and the $(m+2)^{th}$ region) gradually increases. For example, a first area difference between the $(m+1)^{th}$ region and the $m^{th}$ region is less than a second area difference between the $(m+2)^{th}$ region and the $(m+1)^{th}$ region. This achieves an accelerated push effect.

The accelerated rotation is used as an example, to be specific, the accelerated clockwise rotation is used as an example. Referring to FIG. 3A-(c), for example, G<P<W, to be specific, the target region (for example, the $m^{th}$ region, the $(m+1)^{th}$ region, and the $(m+2)^{th}$ region) rotates by an increasing angle each time. This achieves an accelerated rotation effect.

The accelerated rightward movement is still used as an example. The accelerated rightward movement may be implemented in another manner in addition to a manner of setting that A, B, and C satisfy A<B<C. For example, still referring to FIG. 3A-(a), it is set that A=B=C; and then the accelerated movement is implemented through frame extraction. For example, the $m^{th}$ frame, the $(m+1)^{th}$ frame, and the $(m+3)^{th}$ frame are extracted. In this case, preview images are successively an image block in the $m^{th}$ region, an image block in the $(m+1)^{th}$ region, and an image block in the $(m+3)^{th}$ region. However, the $(m+1)^{th}$ region moves rightward by a distance A relative to the $m^{th}$ region, and the $(m+3)^{th}$ region moves rightward by a distance B+C relative to the $(m+1)^{th}$ region. This implements the accelerated rightward movement.

(8) Decelerated Mode

The decelerated mode includes a decelerated move mode, a decelerated shake move, a decelerated push mode, a decelerated pull mode, a decelerated rotate mode, and the like. More specifically, the decelerated movement may further include the decelerated upward movement, the decelerated downward movement, the decelerated leftward movement, the decelerated rightward movement, and the like, and the decelerated rotation may further include the decelerated clockwise rotation, the decelerated counterclockwise rotation, and the like. This is shown in Table 1.

The decelerated movement is used as an example, to be specific, the decelerated rightward movement is used as an example. Referring to FIG. 3A-(a), for example, A>B>C, to be specific, the target region (for example, the $m^{th}$ region, the $(m+1)^{th}$ region, and the $(m+2)^{th}$ region) moves by a decreasing distance each time. This achieves a decelerated rightward movement effect.

The decelerated push is used as an example. Referring to FIG. 3A-(b), an area reduction amount of the target region (for example, the $m^{th}$ region, the $(m+1)^{th}$ region, and the $(m+2)^{th}$ region) gradually decreases. For example, a first area difference between the $(m+1)^{th}$ region and the $m^{th}$ region is greater than a second area difference between the $(m+2)^{th}$ region and the $(m+1)^{th}$ region. This achieves a decelerated push effect.

The decelerated rotation is used as an example, to be specific, the decelerated clockwise rotation is used as an example. Referring to FIG. 3A-(c), for example, G>P>W, to be specific, the target region (for example, the $m^{th}$ region, the (m+1)$^{th}$ region, and the (m+2)$^{th}$ region) rotates by a decreasing angle each time. This achieves a decelerated rotation effect.

The decelerated rightward movement is still used as an example. The decelerated rightward movement may be implemented in another manner in addition to a manner of setting that A, B, and C satisfy A>B>C. For example, still referring to FIG. 3A-(a), it is set that A=B=C; and then the decelerated movement is implemented through frame insertion. For example, a p$^{th}$ frame is inserted between the m$^{th}$ frame and the (m+1)$^{th}$ frame; and a target region on the p$^{th}$ frame is a p$^{th}$ region and moves rightward by X relative to the m$^{th}$ region, where X is less than A. In this case, preview images are successively an image block in the m$^{th}$ region, an image block in the p$^{th}$ region, an image block in the (m+1)$^{th}$ region, and the like. In addition, the p$^{th}$ region moves rightward by X relative to the m$^{th}$ region, and the (m+1)$^{th}$ region moves rightward by A relative to the m$^{th}$ region. This achieves a decelerated rightward movement effect. However, a position of the mobile phone does not change.

The following describes a process of performing video shooting by using the various "camera movement modes" when the mobile phone remains stationary.

Generally, to bring an ultimate viewing effect to the audience, a large quantity of camera movement shooting techniques such as "moving a lens", "shaking a lens", and "pushing/pulling a lens" are used in a movie shooting process. However, the movie shooting requires professional equipment and photographers. Therefore, in this application, it is considered that movie-similar shooting is implemented through a mobile phone by using various camera movement modes when the mobile phone remains stationary. For example, a micro movie mode (or may be referred to as a movie mode) may be provided in the mobile phone. In the micro movie mode, a user may use the mobile phone to perform movie-similar shooting. Specifically, the micro movie mode includes a plurality of story templates, and each story template includes a plurality of different camera movement modes. The mobile phone may perform video shooting by using different camera movement modes included in a story template, thereby improving video shooting quality and facilitating an operation, even non-professional photographers can use various camera movement modes to complete shooting, thereby improving video shooting interest to a specific extent.

The following specifically describes the technical solutions in the embodiments of this application with reference to the accompanying drawings.

Figure 4A:
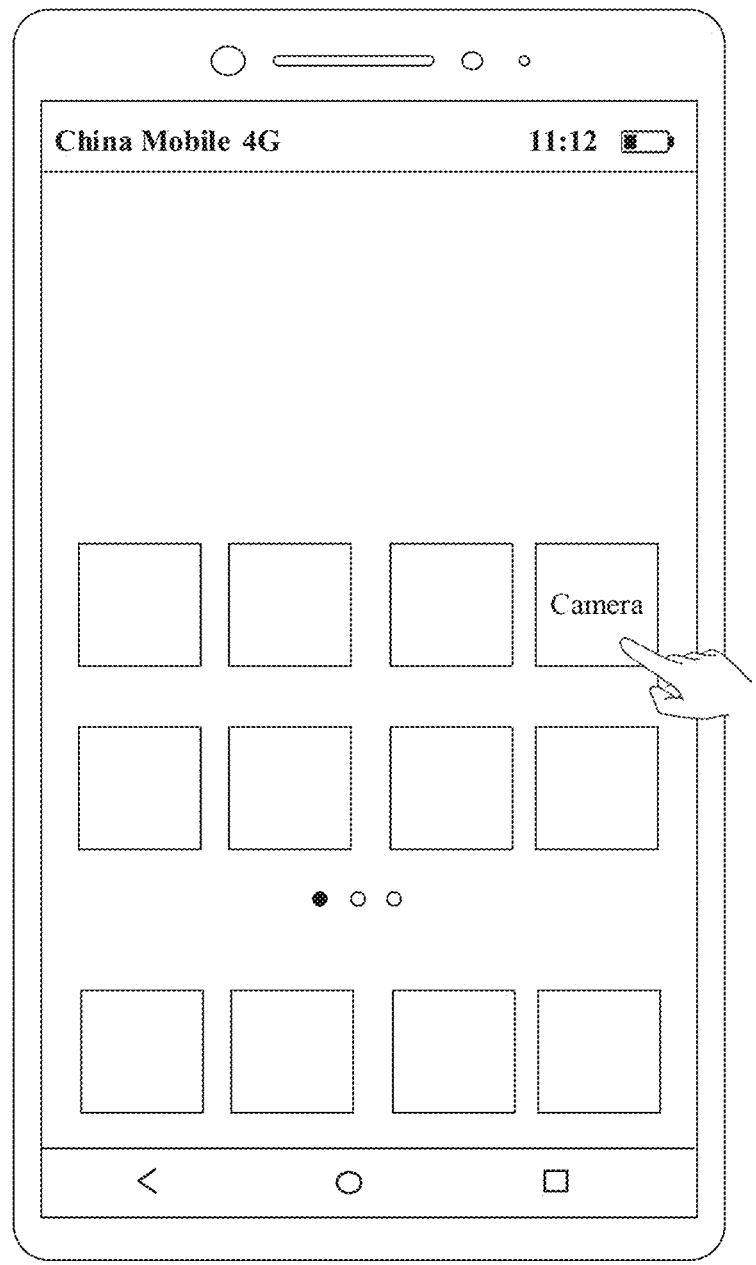
FIG. 4(a) and FIG. 4(b) are a schematic diagram of an example of a GUI of a mobile phone according to an embodiment of this application.

FIG. 4(a) shows a graphical user interface (graphical user interface, GUI) of a mobile phone. The GUI is a home screen (home screen) of the mobile phone. The home screen includes icons of a plurality of applications, for example, an icon of a camera application. When detecting an operation that a user taps the icon of the camera application, the mobile phone starts the camera application, and displays another GUI shown in FIG. 4(b), where the GUI may be referred to as a viewfinder interface (or a shooting interface). A preview image may be displayed on the viewfinder interface in real time.

After detecting an operation that the user indicates a micro movie mode, the mobile phone enters (or starts) the micro movie mode. In the micro movie mode, the mobile phone may perform video recording by using various story templates.

The user may indicate the micro movie mode in a plurality of manners.

For example, the viewfinder interface includes a button used to indicate the micro movie mode. When detecting an operation that the user taps the button, the mobile phone enters the micro movie mode.

Figure 5B:
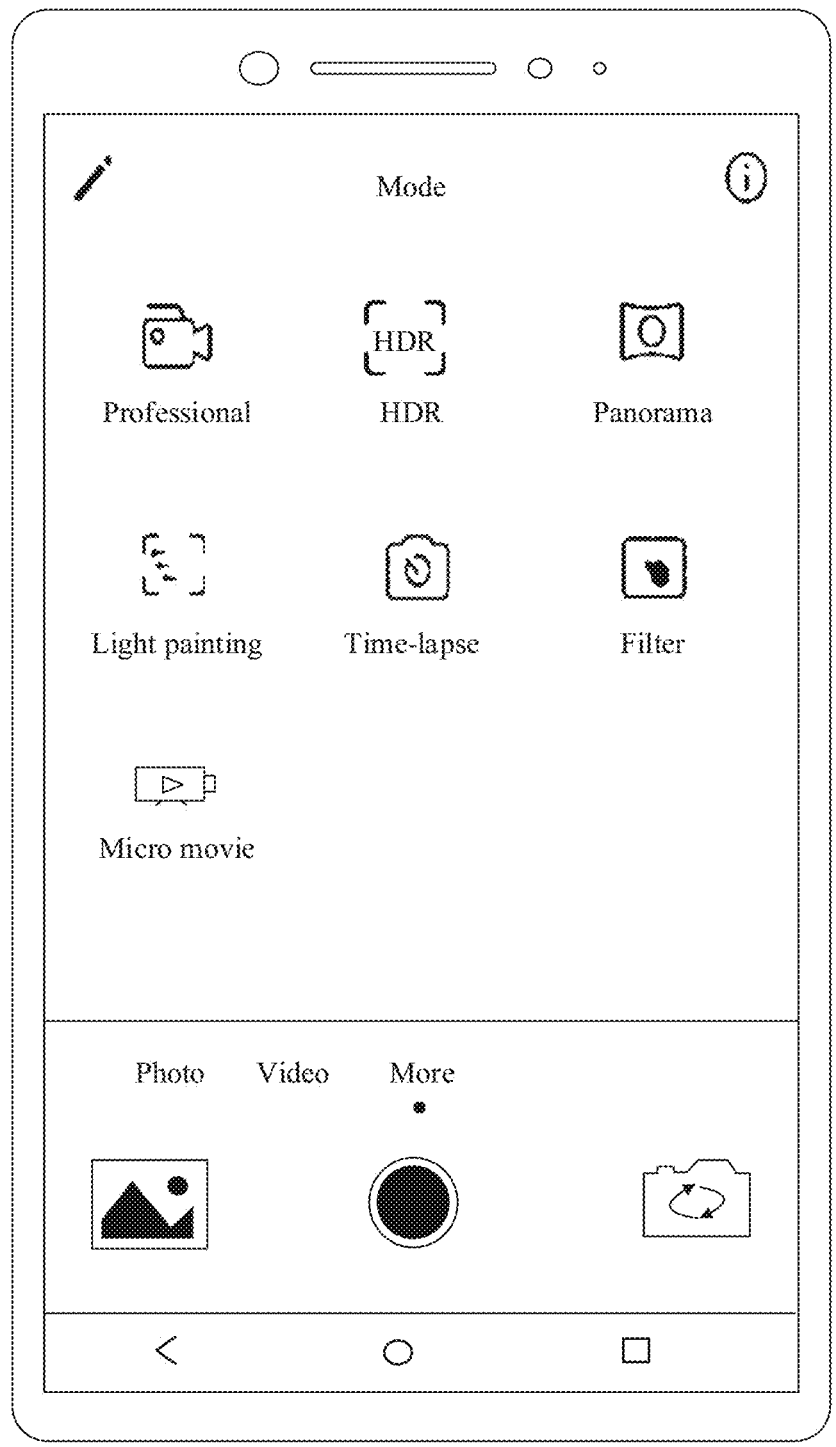

For example, the button may be a button 501 shown in FIG. 5A-(a). Alternatively, the button may be displayed at a position shown in FIG. 5A-(b). Optionally, when a video recording mode is entered, the button is displayed on the viewfinder interface, and the button may not be displayed in a photo mode. Alternatively, the button may be displayed at a position shown in FIG. 5A-(c). A display position of the button may be set by the mobile phone by default, or may be set by the user. This is not limited.

Figure 4B:
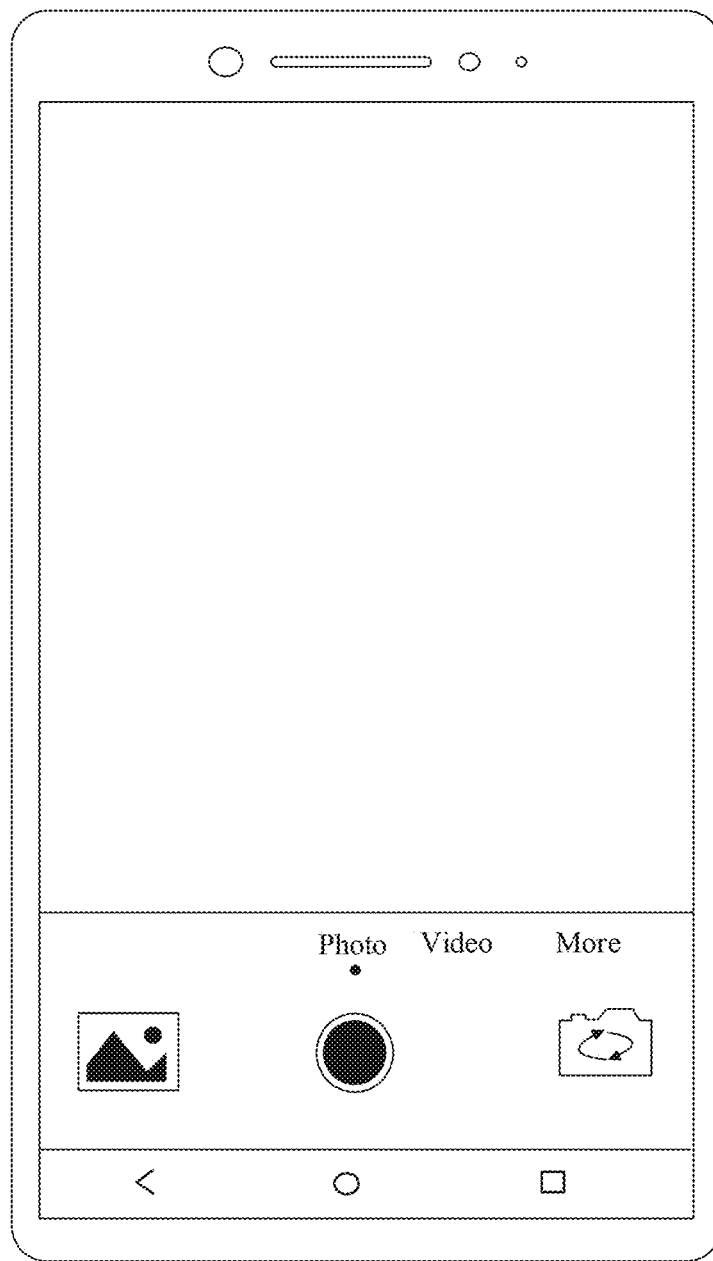

Alternatively, as shown in FIG. 4(b), when detecting an operation of tapping a button "More", the mobile phone displays a mode selection interface shown in FIG. 5B. The interface includes an icon of the micro movie mode. When detecting an operation that the user taps the icon, the mobile phone enters the micro movie mode.

Alternatively, when detecting a preset gesture operation of the user on the viewfinder interface, the mobile phone enters the micro movie mode. For example, the preset gesture operation may be a gesture operation of drawing a circle on the viewfinder interface, or an operation of touching and holding a preview image on the viewfinder interface. This is not limited in this embodiment.

Alternatively, after the mobile phone displays the viewfinder interface, if the mobile phone detects a user voice that indicates to enter the micro movie mode, the mobile phone enters the micro movie mode.

After entering the micro movie mode, the mobile phone may display a plurality of story templates. Each story template may include a plurality of camera movement modes.

Optionally, to help the user intuitively understand the story templates, the mobile phone may further provide a video sample corresponding to each story template. A video sample may be understood as a finished product that has been recorded by using a story template. For example, the story templates include a travel template. A video sample corresponding to the travel template includes three video clips, and each video clip is shot in one camera movement mode. In this way, the user can roughly know a shooting effect of the travel template by watching the video sample corresponding to the travel template.

Figure 6A:
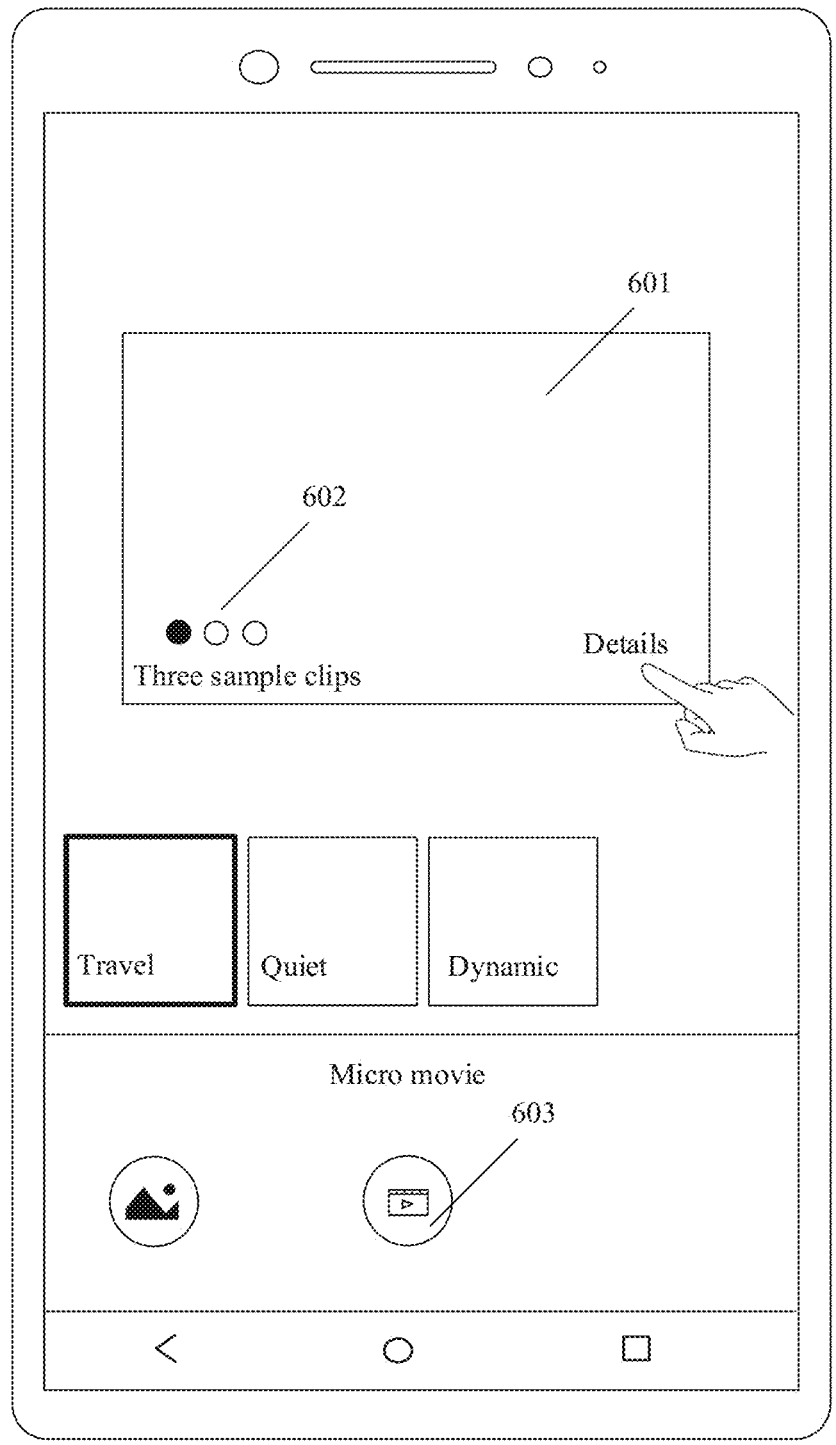
FIG. 6(a) and FIG. 6(b) are a schematic diagram of a home page of a micro movie mode according to an embodiment of this application.

For example, for an interface displayed after the mobile phone enters the micro movie mode, refer to FIG. 6(a). For ease of description, the interface is referred to as a home page of the micro movie mode below. The home page includes a plurality of story templates, for example, a travel template, a quiet template, and a dynamic template shown in FIG. 6(a).

The home page may further include a preview box 601 for displaying a video sample corresponding to a story template. For example, when detecting an operation that the user selects the travel template (for example, an operation of tapping the travel template), the mobile phone displays a video sample corresponding to the travel template in the preview box 601.

Figure 6B:
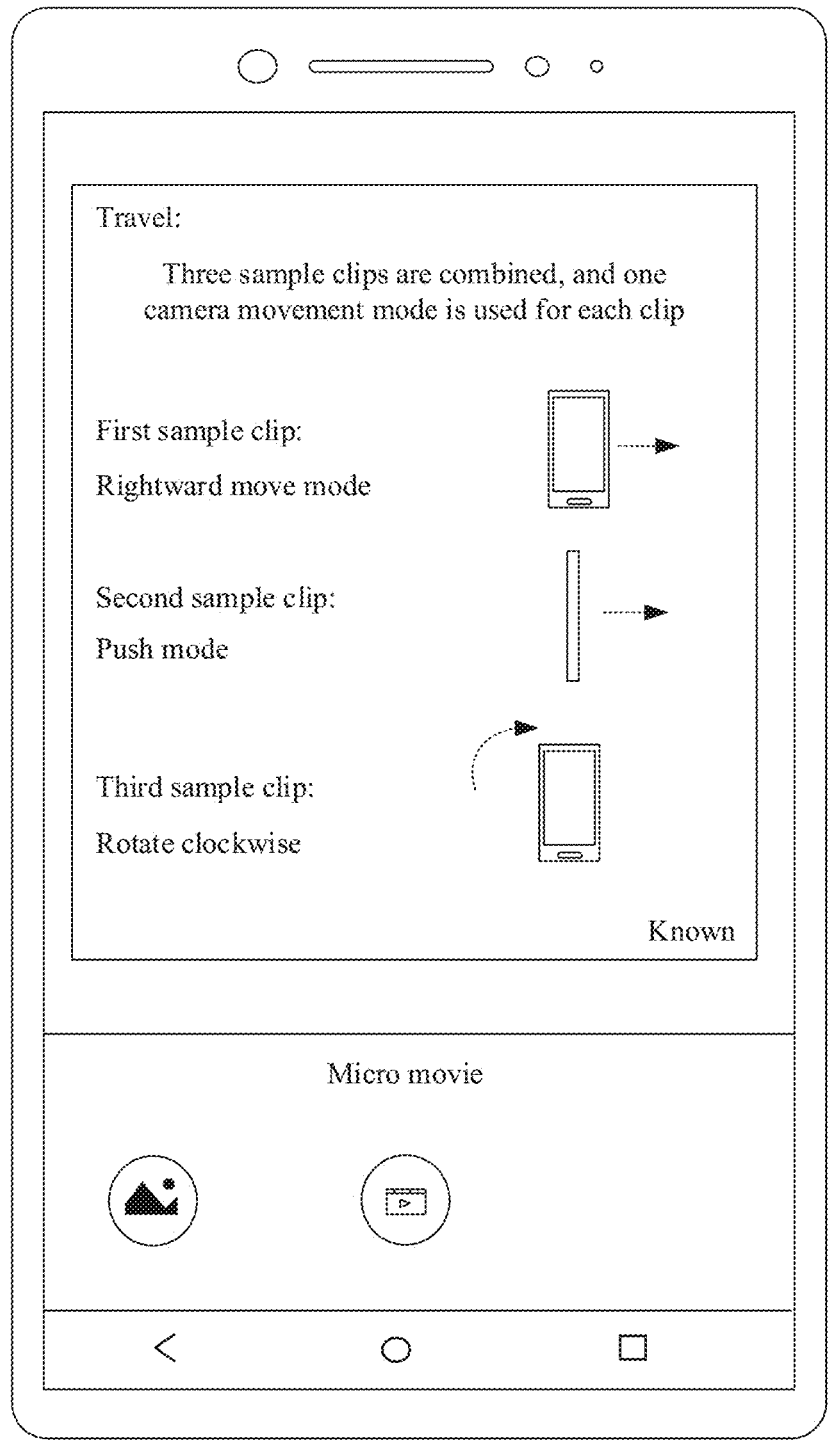

Because the video sample corresponding to the travel template is obtained by synthesizing the three sample clips, the video sample may be directly played or each sample clip may be played in the preview box 601. For example, after a first sample clip is played in the preview box 601, a next sample clip is automatically played, or a next sample clip is automatically played after a period of time. To help the user determine a specific sample clip that is being played in the preview box 601, the mobile phone may output a specific prompt. For example, as shown in FIG. 6(*a*), when the first sample clip is being played in the preview box 601, a first small circle in a mark 602 is in a first color (for example, black), and the other two small circles are in a second color (for example, white); or when the second sample clip is being played in the preview box 601, a second small circle in a mark 602 is in a first color (for example, black), and the other two small circles are in a second color (for example, white).

Alternatively, when detecting an operation that the user selects the first sample clip, the mobile phone plays the first sample clip in the preview box 601. When detecting an operation of selecting the second sample clip, the mobile phone plays the second sample clip in the preview box 601. For example, still referring to FIG. 6(*a*), the first sample clip is displayed in the preview box 601 by default. When the mobile phone detects a left-flick operation of the user in the preview box 601, the preview box 601 includes a next sample clip. When the mobile phone detects a left-flick operation of the user in the preview box 601 again, the preview box 601 includes a next sample clip. In addition, the mark 602 may also prompt the user with a sample clip that is being played in the preview box 601.

Optionally, the video sample may include music, and the music may be set by default, for example, may be set in the travel template as an auxiliary.

Optionally, a quantity of sample clips, total recording duration of the travel template, recording duration of each video clip, and the like may be further displayed in the preview box 601 in addition to the mark 602.

Because the user may want to know a camera movement mode used for each story template, the mobile phone may display a prompt to the user on a touchscreen or may prompt the user in a sound manner, to notify the user of a camera movement mode used for a story template. For example, referring to FIG. 6(*a*), when the travel template is selected, a button "Details" may be further displayed in the preview box 601 in addition to the video sample corresponding to the travel module. When detecting an operation that the user taps the button "Details", the mobile phone displays an interface shown in FIG. 6(*b*). The interface includes a camera movement mode used for each sample clip included in the travel template. For example, a rightward move mode is used for the first sample clip, a push mode is used for the second sample clip, and a clockwise rotate mode is used for the third sample clip. For ease of description, a constant speed is used as an example herein.

It should be noted that, when the video sample corresponding to the travel template is being displayed in the preview box 601, the button "Details" may be used to view a camera movement mode used for the travel template. Therefore, it can be understood that, when a video sample corresponding to the quiet template is being displayed in the preview box 601, the button "Details" may be used to view a camera movement mode used for the quiet module. Details are not described again.

Still referring to FIG. 6(*a*), the home page further includes a control 603, and the control 603 is used to enter a recording interface of a story template. For example, assuming that the mobile phone detects an operation that the user selects the travel template and then taps the control 603, the mobile phone enters a recording interface of the travel template.

Figure 7A:
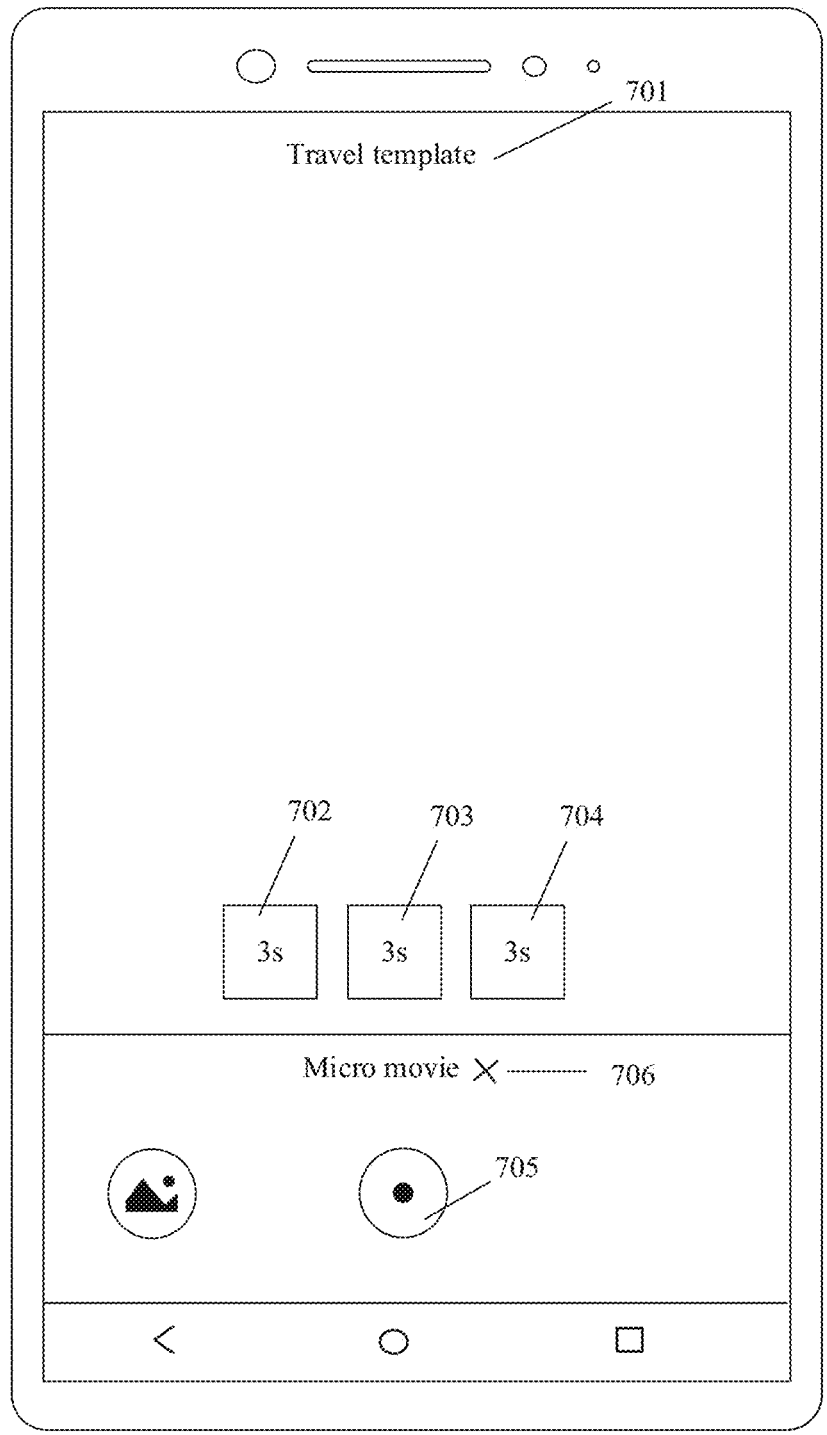

For example, the recording interface of the travel template is shown in FIG. 7A. The recording interface includes a prompt 701 for prompting the user that the mobile phone is being in the travel template. Certainly, the prompt 701 may alternatively not be displayed. The recording interface further includes three marks: a mark 702 to a mark 704. The mark 702 is used to indicate a first camera movement mode used for the travel mode, the mark 703 is used to indicate a second camera movement mode, and the mark 704 is used to indicate a third camera movement mode.

Optionally, a time 1 is displayed in the mark 702, and the time 1 is used to indicate recording duration of using the first camera movement mode. Likewise, a time 2 is displayed in the mark 703, and the time 2 is used to indicate recording duration of using the second camera movement mode. A time 3 is displayed in the mark 704, and the time 3 is used to indicate recording duration of using the third camera movement mode. The time 1, the time 2, and the time 3 may be set by default, and may be the same or may be different (an example in which the time 1, the time 2, and the time 3 each are 3 s is used in FIG. 7A). Alternatively, the time 1, the time 2, and the time 3 may be set by the user (which is described below).

A button 706 is further displayed on the recording interface for closing the recording interface of the travel template. Assuming that the mobile phone detects an operation of tapping the button 706, the home page shown in FIG. 6(*a*) is returned.

A button 705 is further displayed on the recording interface. Optionally, the button 705 may be a recording button for controlling start and/or stop of recording.

Manner 1: The travel template includes three camera movement modes, and for each camera movement mode, the button 705 may be used to control start and/or stop of recording.

Still referring to FIG. 7A, when detecting an operation of selecting the mark 702 (for example, tapping the mark 702), the mobile phone determines the first camera movement mode corresponding to the mark 702. When detecting an operation of tapping the button 705, the mobile phone starts video shooting in the first camera movement mode. An example in which the first camera movement module is the rightward move mode is used. For an implementation principle thereof, refer to the descriptions in FIG. 3A-(*a*). For a recording effect thereof, refer to FIG. 7B-(*a*) to FIG. 7B-(*c*). Specifically, as shown in FIG. 7B-(*a*), a to-be-shot object "tower" in a preview image is on a right side in the image; as shown in FIG. 7B-(*b*), "tower" in a preview image is in the middle of the image; and as shown in FIG. 7B-(*c*), "tower" in a preview image is on a left side in the image. This is equivalent to an effect that the mobile phone moves rightward. However, the mobile phone does not move actually.

In a process in which the mobile phone performs video shooting in the first camera movement mode, the time in the mark 702 automatically decreases. For example, the time in the mark 702 is 3 s in FIG. 7B-(*a*), the time in the mark 702 decreases to 2 s in FIG. 7B-(*b*), and the time in the mark 702 decreases to Is in FIG. 7B-(*c*). When the time decreases to 0, the recording stops. In this case, the process in which the mobile phone performs recording in the first camera movement mode ends.

For another example, referring to FIG. 7A, when detecting an operation of selecting the mark 703 (for example, tapping the mark 703), the mobile phone determines the second camera movement mode corresponding to the mark 703. When detecting an operation of tapping the button 705, the mobile phone starts video shooting in the second camera movement mode. An example in which the second camera movement module is the push mode is used. For an implementation principle thereof, refer to the descriptions in FIG. 3A-(b). For a recording effect thereof, refer to FIG. 7C-(a) to FIG. 7C-(c). Specifically, as shown in FIG. 7C-(a), a to-be-shot object "tower" in a preview image is relatively far visually, and therefore "tower" is relatively small; as shown in FIG. 7C-(b). "tower" in a preview image is magnified, so that the user feels close to "tower"; and as shown in FIG. 7C-(c), "tower" in a preview image is further magnified. This is equivalent to an effect that the mobile phone approaches an object. However, the mobile phone does not move actually.

Likewise, in a process in which the mobile phone performs recording in the second camera movement mode, the time in the mark 703 automatically decreases. When the time decreases to 0, the recording stops. In this case, the process in which the mobile phone performs recording in the second camera movement mode ends.

For another example, referring to FIG. 7A, when detecting an operation of selecting the mark 704 (for example, tapping the mark 704), the mobile phone determines the third camera movement mode corresponding to the mark 704. When detecting an operation of tapping the button 705, the mobile phone starts video shooting in the third camera movement mode. An example in which the third camera movement module is the clockwise rotate mode is used. For an implementation principle thereof, refer to the descriptions in FIG. 3A-(c). For a recording effect thereof, refer to FIG. 7D-(a) to FIG. 7D-(c). Specifically, as shown in FIG. 7D-(a), a to-be-shot object "tower" in a preview image is perpendicular; as shown in FIG. 7D-(b), "tower" in a preview image rotates clockwise; and as shown in FIG. 7D-(c), "tower" in a preview image further rotates. This is equivalent to a shooting effect that the mobile phone rotates clockwise. However, the mobile phone does not move actually.

Likewise, in a process in which the mobile phone performs recording in the camera movement mode 3, the time in the mark 704 automatically decreases. When the time decreases to 0, the recording stops. In this case, the process in which the mobile phone performs recording in the third camera movement mode ends.

Therefore, in Manner 1, the user selects a camera movement mode by using the mark 702 to the mark 704, and then controls, by using the button 705, the mobile phone to start shooting in the selected camera movement mode.

Certainly, the button 705 may also control stop of shooting. FIG. 7A is used as an example. The user selects the first camera movement mode. When detecting an operation of tapping the button 705, the mobile phone starts recording in the first camera movement mode; and when detecting an operation of tapping the button 705 again, the mobile phone stops the recording in the first camera movement mode. The second camera movement mode and the third camera movement mode have a same principle as the first camera movement mode. Details are not described again. In other words, for each camera movement mode, the button 705 not only can be used to control start of recording, but also can be used to control stop of the recording. In this case, recording duration corresponding to each camera movement mode may not be preset. For example, the recording duration may be determined by the user. When the user wants to stop recording, the user taps the button 705.

Manner 2: In Manner 1, for each camera movement mode, the user needs to tap the button 705 once to start recording. Different from Manner 1, in Manner 2, when detecting an operation on the button 705, the mobile phone automatically performs recording sequentially in the three camera movement modes. For example, referring to FIG. 7A, when detecting an operation of tapping the button 705, the mobile phone first starts recording in the first camera movement mode, stops the recording when recording duration reaches preset duration (for example, 3 s), then automatically starts recording in the second camera movement mode, and performs recording in the third camera movement mode. In this manner, the user only needs to tap the button 705 once, so that an operation is convenient. Certainly, in Manner 2, the button 705 may also be used to control stop or pause of recording. Details are not described again.

Likewise, in Manner 2, in a process in which the mobile phone performs recording in the first camera movement mode, the time in the mark 702 may gradually decrease. When the time decreases to 0, the recording in the first camera movement mode stops. A principle of recording in the second camera movement mode and the third camera movement mode is the same as a principle of recording in the first camera movement mode. Details are not described again.

Alternatively, the button 705 may be a video synthesis button for synthesizing recorded clips into a video.

For example, the mark 702 to the mark 704 are used as recording buttons. Still referring to FIG. 7A, when detecting an operation of tapping the mark 702, the mobile phone starts recording in the first camera movement mode, stops the recording when recording duration (for example, 3 s) is reached, and stores a recorded clip (which is referred to as a clip 1 for ease of distinguishing). When detecting an operation of tapping the mark 703, the mobile phone obtains a clip 2 through recording in the second camera movement mode. When detecting an operation of tapping the mark 704, the mobile phone obtains a clip 3 through recording in the third camera movement mode. When detecting an operation of tapping the button 705, the mobile phone synthesizes the clip 1 to the clip 3 into one video.

Likewise, in a process in which the mobile phone performs recording in the first camera movement mode, the time in the mark 702 may gradually decrease. When the time decreases to 0, the recording in the first camera movement mode stops. A principle of recording in the second camera movement mode and the third camera movement mode is the same as a principle of recording in the first camera movement mode. Details are not described again.

Optionally, recording duration (for example, 3 s) corresponding to each camera movement mode may not be preset. For example, when detecting an operation of tapping the mark 702, the mobile phone starts recording in the first camera movement mode; and when detecting an operation of tapping the mark 702 again, the mobile phone stops the recording in the first camera movement mode. The second camera movement mode and the third camera movement mode have a same principle as the first camera movement mode. In other words, the mark 702 is used to control start and stop of recording in the first camera movement mode. To be specific, for each camera movement mode, the recording duration may be determined by the user.

An example in which the recording duration corresponding to each camera movement mode is preset and is 3 s is used above. It can be understood that the recording duration corresponding to each camera movement mode may be adjusted. For example, referring to FIG. 8A-(a), when detecting an operation (for example, a touch and hold operation) on the mark 702, the mobile phone may display a selection box, where the selection box includes a button "Time setting". When an operation on the button "Time setting" is detected, an interface shown in FIG. 8A-(b) is displayed. A button "+" and a button "−" are displayed on the interface. The button "+" is used to increase a time, for example, increase the time to 4s. The button "−" is used to decrease a time, for example, decrease the time to 2 s.

It should be noted that an example in which the travel template includes three camera movement modes is used in FIG. 7A It can be understood that the travel template may further include more or fewer camera movement modes. For example, the user may add or delete a camera movement mode.

An example of deleting a camera movement mode is used. For example, referring to FIG. 8A-(a), when detecting an operation (for example, a touch and hold operation) on the mark 702, the mobile phone displays the selection box, where the selection box includes a button "Delete". When the mobile phone detects an operation on the button "Delete", the mark 702 is deleted, and correspondingly the first camera movement mode corresponding to the mark 702 is deleted.

Figure 8C:
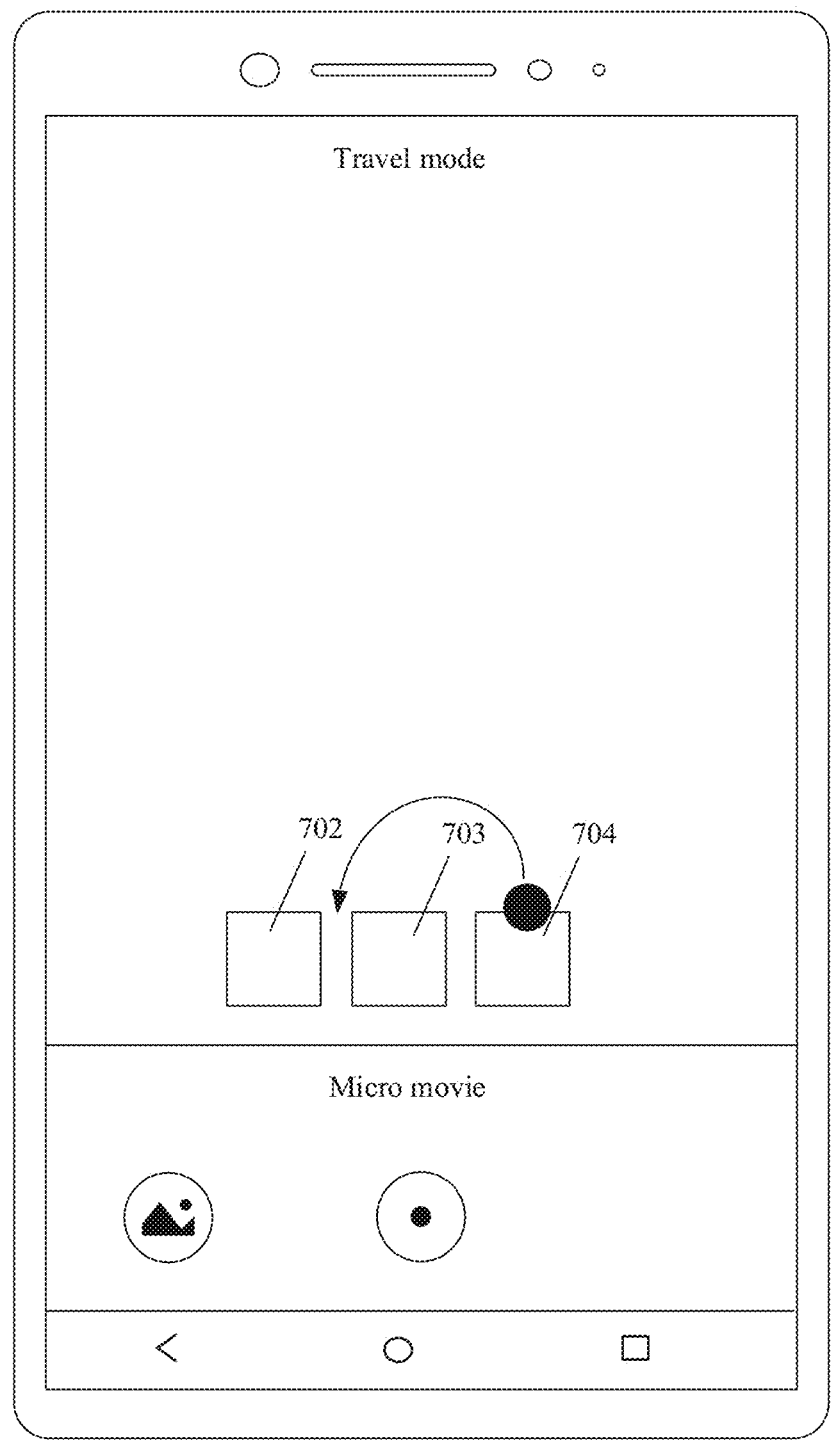

An example of adding a camera movement mode is used. For example, referring to FIG. 8B-(a), the recording interface of the travel mode further includes a button "+". When detecting an operation (for example, a tap operation) on the button "+", the mobile phone displays an interface shown in FIG. 8B-(b), where the interface includes a camera movement mode list. After the user selects a camera movement mode, if the mobile phone detects an operation of tapping a button "Add", an interface shown in FIG. 8B-(c) is displayed, and a mark 707 is added to the interface to indicate the user to select an added camera movement mode.

Optionally, an order of different camera movement modes may be adjusted. For example, referring to FIG. 8C, when the mobile phone detects an operation of touching and holding and dragging the mark 704, the mark 704 is in a movable state. When it is detected that the mark 704 is dragged to a position between the mark 702 and the mark 703, an order of the three camera movement modes is adjusted as follows, the first camera movement mode, the third camera movement mode, and the second camera movement mode. In this case, an order of the three clips in the synthetic video is as follows: the clip 1, the clip 3, and the clip 2. The clip 1 is obtained through shooting in the first camera movement mode, the clip 2 is obtained through shooting in the second camera movement mode, and the clip 3 is obtained through shooting in the third camera movement mode.

After the mobile phone enters the recording interface of the travel template (for example, the interface in FIG. 7A), the user may not remember a specific camera movement mode included in the travel template. Therefore, to help the user view a camera movement mode included in the travel template, the user may be prompted with the camera movement mode of the travel mode on the recording interface of the travel mode. For example, referring to FIG. 8D-(a), when detecting an operation of tapping the button 603, the mobile phone enters an interface shown in FIG. 8D-(b). The interface includes a widget. The video sample corresponding to the travel template may be played in the widget, or each sample clip may be played in the widget. For example, as shown in FIG. 8D-(b), when the mobile phone detects an operation on the mark 702, the first sample clip is played in the widget (for example, the sample clip 1 is cyclically played or is played only once). When the mobile phone detects an operation on the mark 703, the second sample clip is played in the widget (for example, the sample clip 1 is cyclically played or is played only once). In this way, in a recording process, the user can view a camera movement mode used by each sample clip.

Optionally, after completing video shooting by using the travel template, the mobile phone may enter an effect presentation interface. This helps the user view a shooting effect.

Manner 2 is used as an example. Referring to FIG. 9A-(a), after recording in the last camera movement mode reaches the recording duration (for example, 3 s), the mobile phone may automatically enter an effect presentation interface shown in FIG. 9A-(b). A preview box 901 is displayed on the interface for displaying a video obtained by synthesizing the three video clips. If the mobile phone detects an operation on a button "OK", the mobile phone stores the synthetic video. For example, an interface shown in FIG. 9A-(a) is returned, and an image in the synthetic video is displayed in a gallery mark in a bottom-left corner of the interface. If the user is not satisfied with the synthetic video, the user may perform rerecording. For example, when the mobile phone detects an operation on a button "Back", the mobile phone returns to the interface shown in FIG. 9A-(a) to perform rerecording. Optionally, the preview box 901 may occupy a part of the display or the entire display. If the entire display is occupied, the button "OK" and the button "Back" may be displayed above the preview box 901.

It should be noted that an example in which the synthetic video is displayed in the preview box 901 is used in FIG. 9A-(b). It can be understood that each video clip may alternatively be displayed. For example, FIG. 9B-(a) shows an example of another effect presentation interface. The interface includes a mark of each video clip. For example, when the mobile phone detects an operation (for example, a tap operation) on the mark of the clip 1, the clip 1 is played in the preview box 901. When the mobile phone detects an operation on the mark of the clip 2, the clip 2 is played in the preview box. Therefore, the user can view each recorded video clip. When the mobile phone detects an operation of tapping a button "OK", the mobile phone synthesizes the three clips into a video, stores the synthetic video, and returns to the interface shown in FIG. 9A-(a).

Optionally, an order of the three video clips may be adjusted. For example, still referring to FIG. 9B-(a), the mobile phone detects an operation (for example, an operation of touching and holding and dragging) on the mark of the clip 2, and changes a display position of the mark, for example, drags the mark of the clip 3 to a position between the mark of the clip 1 and the mark of the clip 2, as shown in FIG. 9B-(b). Therefore, an order of the clip 3 and the clip 2 is adjusted. In this case, if the mobile phone detects an operation on the button "OK", an order of displaying the video clips in a synthetic video is as follows: the clip 1, the clip 3, and the clip 2.

Optionally, some cases are considered. For example, the user is not satisfied with a video clip in the three video clips. In this case, the video clip may be deleted, and the remaining video clips are synthesized into a video. For example, referring to FIG. 9C-(a), when detecting an operation (for example, a touch and hold operation) on the mark of the clip 2, the mobile phone displays a button "Delete". Referring to FIG. 9C-(b), when the mobile phone detects an operation on the button "Delete", the clip 3 is deleted. In this case, if the mobile phone detects an operation on a button "OK", the mobile phone synthesizes the clip 1 and the clip 2 into a video.

Alternatively, if the user is not satisfied with a video clip, the user may rerecord the clip. For example, still referring to FIG. 9C-(a), when detecting an operation (for example, a touch and hold operation) on the mark of the clip 3, the mobile phone displays a button "Rerecord". When detecting an operation of tapping the button "Rerecord", the mobile phone displays an interface shown in FIG. 9C-(c). The interface is used to rerecord the clip 3. Therefore, only the mark 704 of the third camera movement mode may be displayed on the interface, and the mark of the first camera movement mode and the mark of the second camera movement mode are not displayed. For example, still referring to FIG. 9C-(c), when detecting an operation of tapping the button 705, the mobile phone starts recording in the third camera movement mode. When the recording duration (for example, 3 s) is reached, the mobile phone automatically returns to the interface shown in FIG. 8C. The clip 3 is a rerecorded clip.

Optionally, before synthesizing the clip 1 to the clip 3 into the video, the mobile phone may further add a locally recorded video clip. In this case, the clip 1 to the clip 3 and the added local video are synthesized during video synthesizing. For example, referring to FIG. 9D-(a), a button "+" is displayed on the effect presentation interface. When detecting an operation of tapping the button "+", the mobile phone displays an interface shown in FIG. 9D-(b). The interface is an interface of "Gallery" of the mobile phone. Assuming that the user selects a video 913, when the mobile phone detects an operation of tapping a button "Add", the mobile phone displays an interface shown in FIG. 9D-(c), where a clip 4, that is, the video 913, is added to the interface. In this case, if the mobile phone detects an operation of tapping the button "OK", the mobile phone synthesizes the four clips into a video.

Optionally, the mobile phone may further perform processing such as clipping and text or music adding on a recorded video clip.

For example, referring to FIG. 9E-(a), four icons are displayed in the preview box 901: a clipping icon, a text icon, a music icon, and a mute icon. It can be understood that the four icons act on the clip 1 when the clip 1 is played in the preview box, and the four icons act on the clip 2 when the clip 2 is played in the preview box.

For example, the clip 1 is displayed in the preview box. When detecting an operation on the clipping icon, the mobile phone may display an interface shown in FIG. 9E-(b). A clipping box 910 is displayed in the preview box 901, and all frames of images of the clip 1 may be displayed in the clipping box 910. For example, when the user wants to clip the last several frames, the user may move a clipping strip 911 to a position shown in FIG. 9E-(b). In this case, the last several frames are clipped. When it is detected that a button "OK" is tapped, an interface shown in FIG. 9E-(a) may be returned. In this case, a clipped clip 1 is displayed in the preview box 901.

When detecting an operation on the text icon, the mobile phone displays an interface shown in FIG. 9E-(c). A text input box is displayed in the preview box 901 on the interface, and the user may enter a text in the text input box. When it is detected that the button "OK" is tapped, the interface shown in FIG. 9E-(a) is returned. In this case, a clip 1 obtained after text adding is displayed in the preview box 901. It should be noted that text adding is used as an example for description herein. It can be understood that an emoticon, an animation, and the like may also be added.

When detecting an operation on the music icon, the mobile phone may display an interface shown in FIG. 9E-(d). A song clip list is displayed on the interface, and the list includes marks of a plurality of song clips such as a mark of a song clip A and a mark of a song clip B. When the mobile phone detects that the user selects the mark of the song clip A, the mobile phone may use the song clip A as background music of the clip 1. For example, when detecting that the button "OK" is tapped, the mobile phone returns to the interface shown in FIG. 9E-(a). In this case, a clip 1 obtained after the song clip A is added is displayed in the preview box 901. Optionally, in addition to a camera movement mode, a story template may further include default music. For example, for the travel template, default music of the travel template is music used in the sample video corresponding to the travel template. Therefore, assuming that the user does not select music, the mobile phone uses the default music of the travel template as the background music of the video. Because of a music rhythm, an image play rhythm in a video may be consistent with a music play rhythm. For example, if music includes a drum point, a frame of image is played when one drum point is played, and a next frame of image is played when a next drum point is played.

Optionally, the mobile phone may further eliminate an original sound in a video clip in the three recorded video clips. The original sound may be understood as a sound in a recorded video. For example, referring to FIG. 9E-(a), when detecting an operation on the mute icon, the mobile phone eliminates an original sound of the clip 1. Optionally, an original sound of a video clip may be entirely or partially eliminated. The clip 1 is used as an example. When the mobile phone detects an operation on the mute icon, the mobile phone may display an audio clipping box that is similar to, for example, the clipping box 910 in FIG. 9E-(b), and the user may select a to-be-muted part in the clip 1 by using the audio clipping box, so that an original sound of an unmuted part in the clip 1 is retained.

It should be noted that FIG. 9E-(a) to FIG. 9E-(d) only list four processing manners of performing clipping, text adding, music adding, and original sound elimination on a video clip. It can be understood that another processing manner may be further included. For example, various picture styles may be further provided to process an image in a clip, for example, a black-and-white style, an animation style, an ink and wash style, a strong exposure style, and a weak exposure style, which are not enumerated one by one in this application.

Optionally, the mobile phone may further select a synthesis special effect, and the synthesis special effect is used to synthesize three video clips in a specific synthesizing manner. For example, referring to FIG. 9F-(a), when detecting an operation on a button "Animation", the mobile phone displays an interface shown in FIG. 9F-(b). The interface includes a plurality of synthesis special effects. For example, assuming that the user selects "Combine", when the mobile phone detects an operation that the user taps a button "OK", a manner of synthesizing the clip 1 and the clip 2 is: fusing the last frame of the clip 1 and the first frame of the clip 2; and a corresponding synthesis effect is as follows: After playing the last second frame of the clip 1, the mobile phone plays the last frame of the clip 1, where the last frame is an image obtained by fusing the last frame of the clip 1 and the first frame of the clip 2; and then continues to play the second frame of the clip 2. To help the user view a synthesis effect, the mobile phone displays an interface shown in FIG. 9F-(c), to display the synthesis effect. When detecting that a button "Save" is tapped, the mobile phone saves the synthesis effect "Combine", and then returns to an interface shown in FIG. 9F-(a). When detecting an operation of tapping a button "OK" on the interface, the mobile phone synthesizes the clip 1 and the clip 3 by using the saved synthesis special effect.

FIG. 9F-(b) is used as another example. Assuming that the user selects "Gradually zoom in", a corresponding synthesis effect is as follows: After playing the clip 1, the mobile phone plays the first frame of image in the clip 2 in a gradually zoom-in manner, and then plays the second frame of image in the clip 2. It should be noted that "Combine", "Gradually zoom in", and the like are used as examples for description herein. There may be other synthesis special effects, which are not enumerated one by one in this application.

Figure 10:
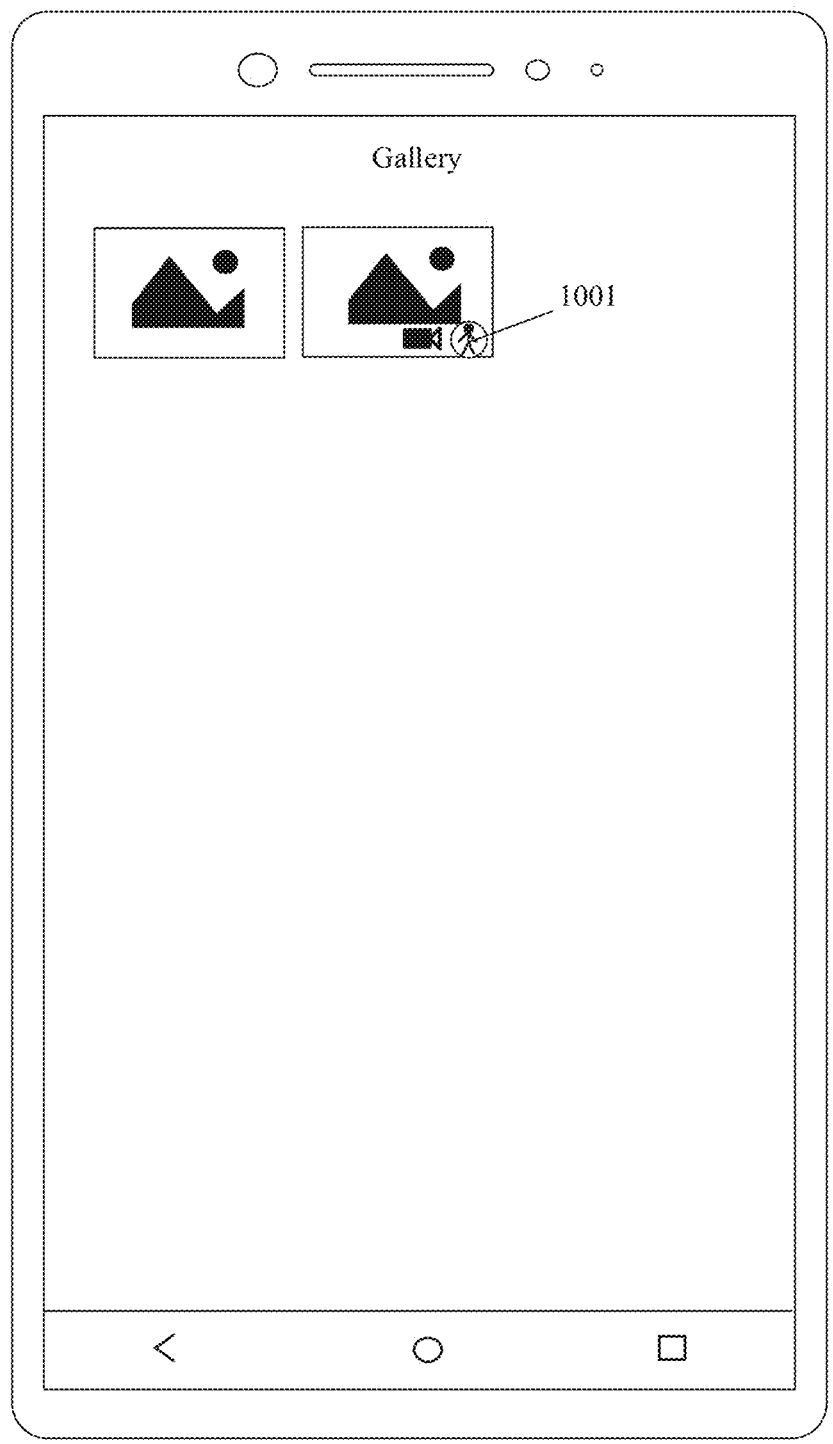
FIG. 10 is a schematic diagram of an interface of "Gallery" according to an embodiment of this application.

Optionally, when storing a video, the mobile phone may store both an original video and a synthetic video. FIG. 9B-(a) is used as an example. When detecting the button "OK", the mobile phone may store the video obtained by synthesizing the clip 1 to the clip 3, or may store an original video, where the original video may be understood as a video recorded without a camera movement mode. For ease of understanding, the rightward movement shown in FIG. 3A-(a) is used as an example. An original video is a video constituted by the $m^{th}$ frame of image to the $(m+3)^{th}$ frame of image instead of a video constituted by image blocks in the $m^{th}$ region to the $(m+1)^{th}$ region. For example, FIG. 10 shows an interface of a gallery application in the mobile phone. The interface stores two videos: a video shot in a camera movement mode and a video shot without a camera movement mode. For ease of distinguishing by the user, a mark 1001 may be displayed on the video shot in a camera movement mode. Optionally, when detecting the button "OK", the mobile phone may alternatively store each of the clip 1 to the clip 3.

In the foregoing embodiment. FIG. 6(*a*) is used as an example. A plurality of story templates are provided on the home page of the micro movie mode. The plurality of story templates are set by default (for example, are set when the mobile phone is delivered from a factory). It can be understood that the user may alternatively customize a story template. For ease of distinguishing, templates that are set by default are collectively referred to as a "default template", and templates that are customized by the user are collectively referred to as a "user-defined template".

Figure 11B:
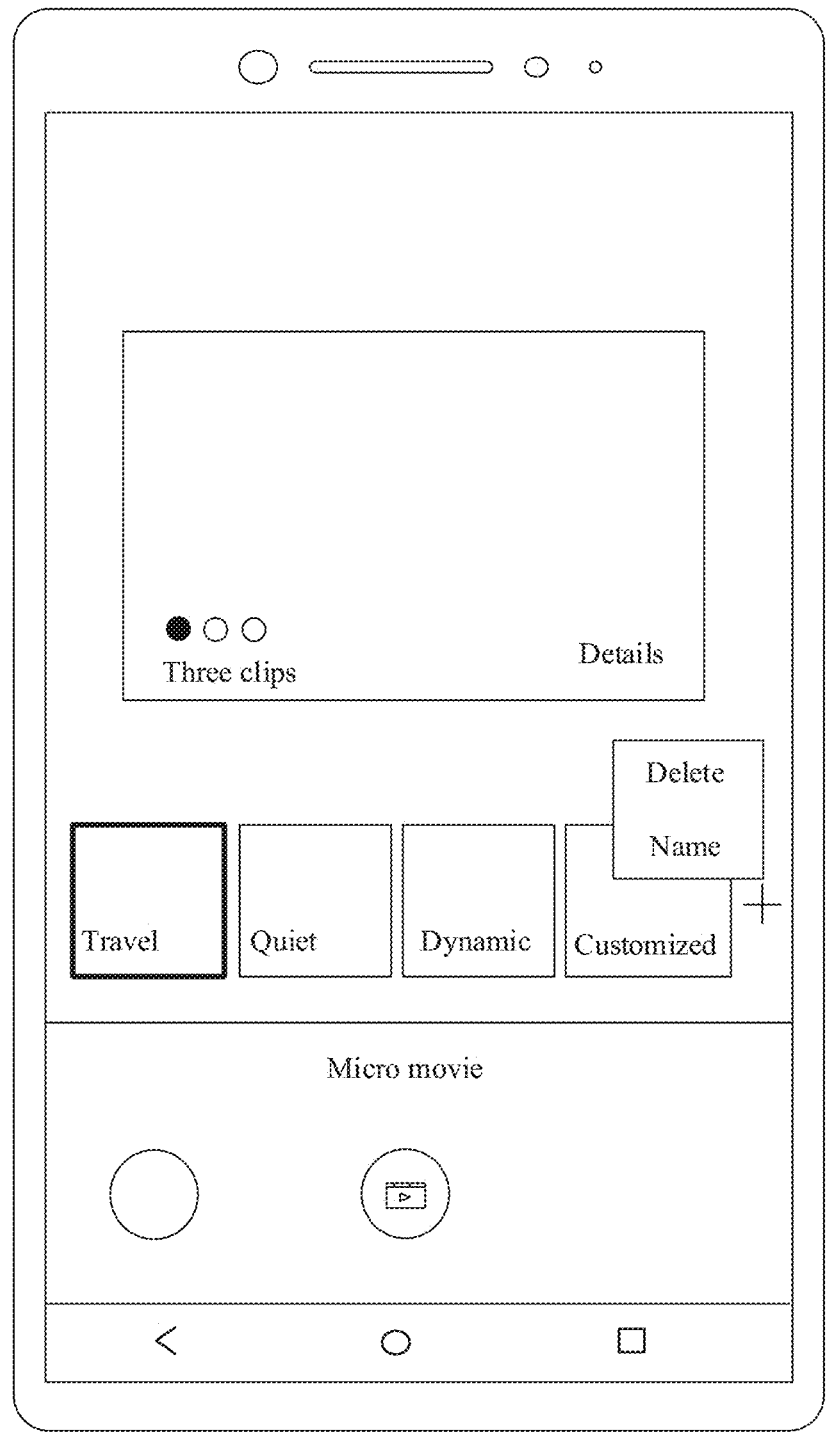
Figure 11C:
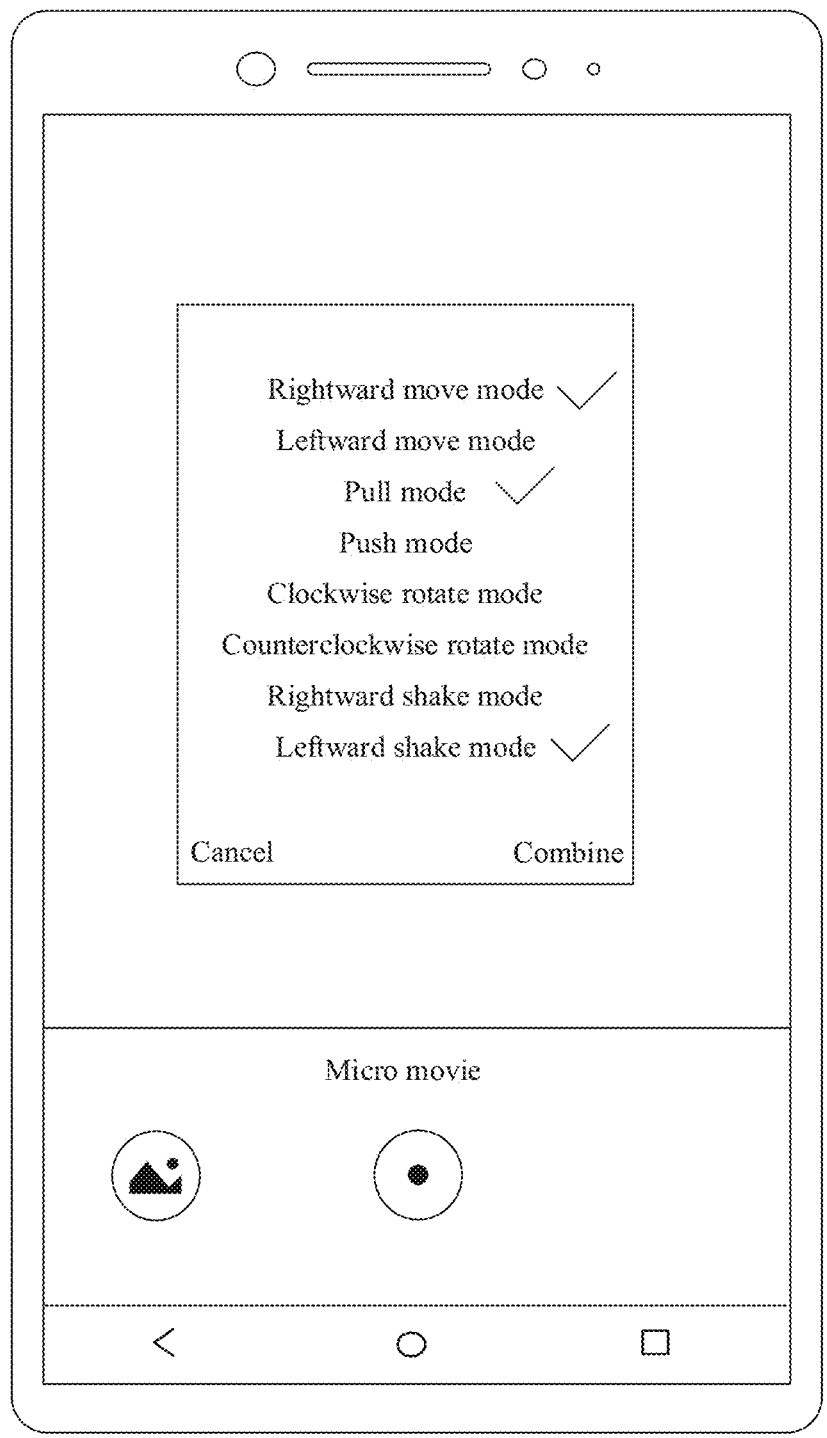

For example, referring to FIG. 11A-(a), a button "+" may be further displayed on the home page. When detecting an operation on the button, the mobile phone may display an interface shown in FIG. 11A-(b). The interface is the interface of "Gallery" in the mobile phone. The user may select a video clip stored in "Gallery". Assuming that the user selects a clip 1101, when the mobile phone detects that the user taps a button "Add", the mobile phone displays an interface shown in FIG. 11A-(c). A new template is added to the interface. The user may set a name of the new template. For example, referring to FIG. 11B, when detecting an operation (for example, a touch and hold operation) on the new template, the mobile phone displays a button "Name"; and when detecting an operation of tapping the button "Name", the mobile phone names the new template.

After adding a user-defined template, the mobile phone may parse a camera movement mode corresponding to the template. When the user selects a customized module, the user shoots a video in a camera movement mode corresponding to the customized module, to be specific, the user may use the template to shoot a video with an effect similar to that of the template. For example, if the user captures a clip from a movie as a user-defined template, an effect of a video shot by the user by using the template may be similar to that of the movie. Therefore, for non-professional photographers, shooting works with relatively high quality may also be obtained, and user experience is relatively good.

It can be understood that a template that the user does not like or that is not frequently used may be deleted. Both a default template and a user-defined template can be deleted; or only a user-defined template can be deleted, and a default template cannot be deleted. For example, referring to FIG. 11B, when detecting an operation (for example, a touch and hold operation) on the new template, the mobile phone displays a button "Delete"; and when detecting an operation of tapping the button "Delete", the mobile phone deletes the new template.

In FIG. 11A-(b), an example in which a user-defined template is a local video of the mobile phone is used. It can be understood that a user-defined module may alternatively be set in another manner. FIG. 11A-(a) is used as an example. When detecting an operation on the button "+", the mobile phone displays an interface shown in FIG. 11C. The interface includes a camera movement mode list. The user may select a plurality of camera movement modes from the camera movement mode list and combine the camera movement modes into a user-defined story template. Assuming that the user selects "Rightward move mode", "Pull mode", and "Leftward shake mode", when the mobile phone detects an operation of tapping a button "Combine", the mobile phone may display the interface shown in FIG. 11A-(c). A newly added template on the interface includes a plurality of camera movement modes selected by the user.

Figure 12:
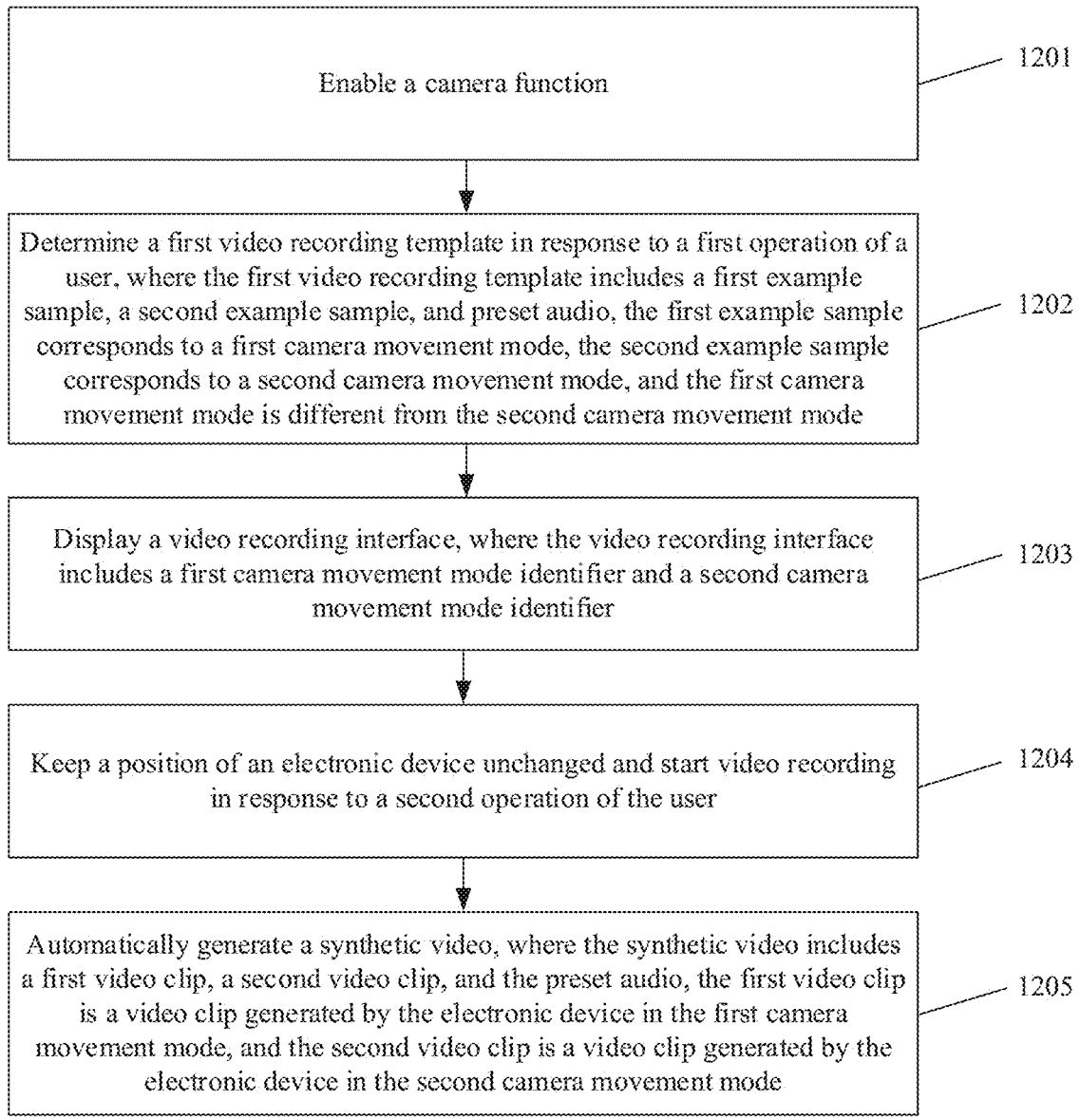
FIG. 12 is a schematic flowchart of a video shooting method according to an embodiment of this application.

With reference to the foregoing embodiment and the related accompanying drawings, an embodiment of this application provides a video shooting method. As shown in FIG. 12, the method may include the following steps.

S1201; Enable a camera function. For example, a mobile phone detects an operation used to open a camera application, and starts the camera application. The operation may be an operation of tapping the icon of "Camera" in FIG. 4(*a*). Certainly, the operation may alternatively be another operation, provided that the camera application can be opened. An operation type is not limited in this embodiment of this application.

S1202: Determine a first video recording template in response to a first operation of a user, where the first video recording template includes a first example sample, a second example sample, and preset audio, the first example sample corresponds to a first camera movement mode, the second example sample corresponds to a second camera movement mode, and the first camera movement mode is different from the second camera movement mode.

The first video recording template may be, for example, the travel template or the quiet template in FIG. 7A. Certainly, the first video recording template may alternatively be a default template, or may be a user-defined template, as shown in FIG. 11A.

The first operation may be one or more operations. It is assumed that the first operation is one operation. For example, after starting the camera application, the mobile phone displays the viewfinder interface shown in FIG. 4(*b*). The first operation may be an operation of tapping a button of the first video recording template, an operation of indicating the first video recording template through a voice, or the like. This is not limited in this embodiment of this application. It is assumed that the first operation includes a plurality of operations. For example, the first operation includes an operation of tapping the icon of "Micro movie"

in FIG. 5A-(a) to FIG. 5A-(c), an operation of tapping the travel template in FIG. 6(*a*), and an operation of tapping the control 603.

For the first example sample (or referred to as a first video sample), the second example sample (or referred to as a second video sample), and the preset audio, refer to the foregoing descriptions.

S1203: Display a video recording interface, where the video recording interface includes a first camera movement mode identifier and a second camera movement mode identifier.

For example, if the first video recording template is the travel template, the video recording interface may be the interface shown in FIG. 7A.

S1204: Keep a position of the electronic device unchanged and start video recording in response to a second operation of the user.

Manner 1 is as follows: Video recording starts in response to an operation (that is, the second operation) of tapping a recording button (for example, the button 705 in FIG. 7A). Specifically, a first video clip is first recorded in the first camera movement mode, and a second video clip is automatically recorded in the second camera movement mode after the recording is completed. Manner 2 is as follows: When the first camera movement mode identifier is selected, the first video clip is generated in the first camera movement mode in response to a shooting indication by the user, where duration of the first video clip is first preset duration; and when the second camera movement mode identifier is selected, the second video clip is generated in the second camera movement mode in response to a shooting indication by the user, where duration of the second video clip is second preset duration. In other words, for each camera movement mode, the user may control start and/or stop of recording.

S1205: Automatically generate a synthetic video, where the synthetic video includes the first video clip, the second video clip, and the preset audio, the first video clip is a video clip generated by the electronic device in the first camera movement mode, and the second video clip is a video clip generated by the electronic device in the second camera movement mode.

One manner is as follows: Video recording starts in response to an operation (that is, the second operation) of tapping a recording button (for example, the button 705 in FIG. 7A), where the recording manner may be Manner 1 or Manner 2; and video synthesizing may be automatically performed after the second video clip is recorded. Alternatively, another manner is as follows: Before the synthetic video is automatically generated, a presentation interface is displayed, where the presentation interface includes the first video clip and the second video clip; and video synthesizing is performed in response to a video synthesizing instruction entered by the user.

Optionally, when the first video clip is generated in the first camera movement mode, a countdown of generating the first video clip in the first camera movement mode is further displayed on the video recording interface; and when the second video clip is generated in the second camera movement mode, a countdown of generating the second video clip in the second camera movement mode is further displayed on the video recording interface. For example, refer to FIG. 7B-(a) to FIG. 7B-(c), FIG. 7C-(a) to FIG. 7C-(c), and FIG. 7D-(a) to FIG. 7D-(c).

Optionally, the user may further delete a camera movement mode identifier. For example, the mobile phone displays the video recording interface, where the video recording interface includes the first camera movement mode identifier and the second camera movement mode identifier; deletes the first camera movement mode identifier or the second camera movement mode identifier in response to a third operation of the user; keeps the position of the electronic device unchanged and starts recording in response to a fourth operation of the user; and automatically generates a synthetic video, where the synthetic video includes a video clip generated by the electronic device in a camera movement mode that is not deleted and the preset audio. For example, if the first camera movement mode identifier is deleted, the first camera movement mode is deleted. In this case, the electronic device starts recording, only needs to generate the second video clip in the second camera movement mode, and does not need to perform video synthesizing by using another video clip.

Optionally, the user may further add a camera movement mode identifier. For example, the electronic device displays the video recording interface, where the video recording interface includes the first camera movement mode identifier and the second camera movement mode identifier; adds a third camera movement mode identifier to the video recording interface in response to a third operation of the user, where the third camera movement mode identifier is used to indicate a third camera movement mode; keeps the position of the electronic device unchanged and starts recording in response to a fourth operation of the user; and automatically generates a synthetic video, where the synthetic video includes the first video clip, the second video clip, a third video clip, and the preset audio, and the third video clip is a video clip generated by the electronic device in the third camera movement mode.

Optionally, the user may further adjust an order of camera movement mode identifiers. For example, the electronic device displays the video recording interface, where the video recording interface includes the first camera movement mode identifier and the second camera movement mode identifier; adjusts an order of displaying the first camera movement mode identifier and the second camera movement mode identifier to a first order in response to a third operation of the user; keeps the position of the electronic device unchanged and starts recording in response to a fourth operation of the user; and automatically generates a synthetic video, where an order of playing the first video clip and the second video clip in the synthetic video is the first order.

Optionally, the first example sample and/or the second example sample are/is displayed on the video recording interface. For example, the recording interface may be the interface in FIG. 8D-(b), and an example clip may be displayed on the viewfinder interface in a picture-in-picture manner. For details, refer to the foregoing descriptions in FIG. 8D-(b).

Optionally, the electronic device may further delete the first video clip or the second video clip in response to the fourth operation: or add a local third video clip to the synthetic video; or adjust the order of playing the first video clip or the second video clip in the synthetic video. For example, refer to the foregoing descriptions in FIG. 9C-(a) to FIG. 9C-(c).

Optionally, the first video recording template is a default template or a user-defined template. For example, refer to FIG. 11A-(a) to FIG. 11A-(c).

Optionally, the electronic device may further automatically store the first video clip, the second video clip, and the synthetic video. For example, refer to the foregoing descriptions in FIG. 10.

Optionally, in response to a specific operation, the electronic device may further change audio in the synthetic video, or add a text and/or a picture to the synthetic video. For details, refer to the foregoing descriptions in FIG. 9E-(a) to FIG. 9E-(d).

Embodiment 2

In Embodiment 1 above, a combination of a plurality of camera movement modes is implemented in a micro movie mode. Different from Embodiment 1, Embodiment 2 provides another video shooting manner, that is, a manner in which a mobile phone performs shooting in a specific camera movement mode.

Figure 13A:
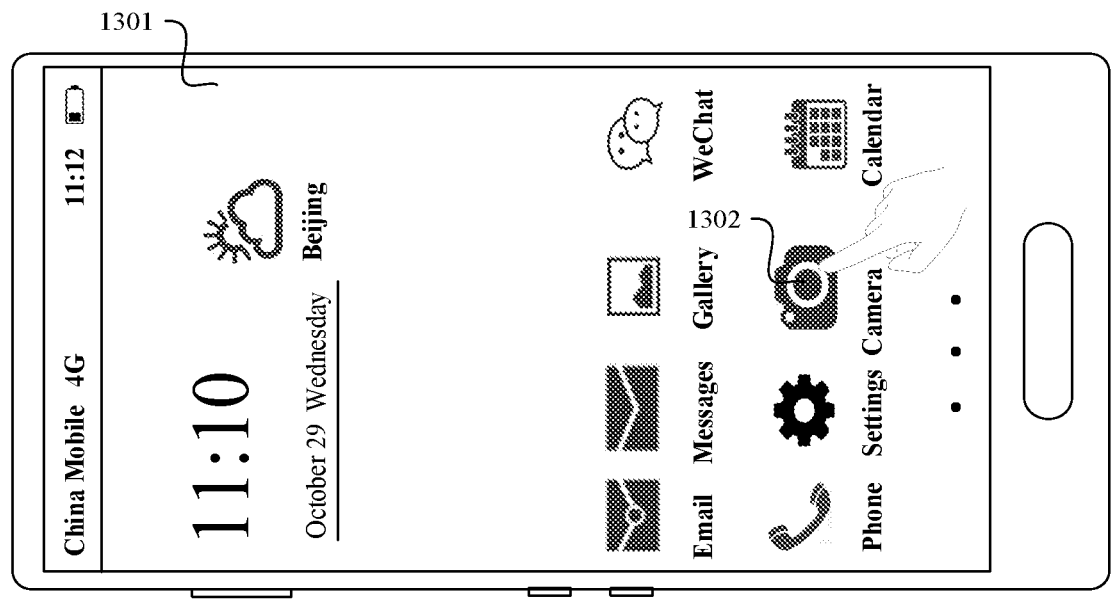
FIG. 13(*a*), FIG. 13(*b*), FIG. 14(*a*), FIG. 14(*b*), FIG. 15(*a*), FIG. 15(*b*)

FIG. 13(a) shows a graphical user interface (graphical user interface, GUI) of the mobile phone. The GUI is a home screen 401 of the mobile phone. After detecting an operation that a user taps an icon 402 of a camera application on the home screen 401, the mobile phone may start the camera application, start a common wide-angle camera (for example, a rear-facing camera), and display another GUI shown in FIG. 13(b), where the GUI may be referred to as a viewfinder interface 1303. The viewfinder interface 1303 is a viewfinder interface in a video recording mode (a common video recording mode). It should be understood that, if the mobile phone detects an operation that the user taps the icon 1302, the mobile phone displays a viewfinder interface of a photo mode by default, the user may select a video recording mode by performing an input operation such as a flick operation in a region 1304 (a region in a dashed box) in FIG. 13(b), and then the phone displays a viewfinder interface in the video recording mode.

Figure 13B:
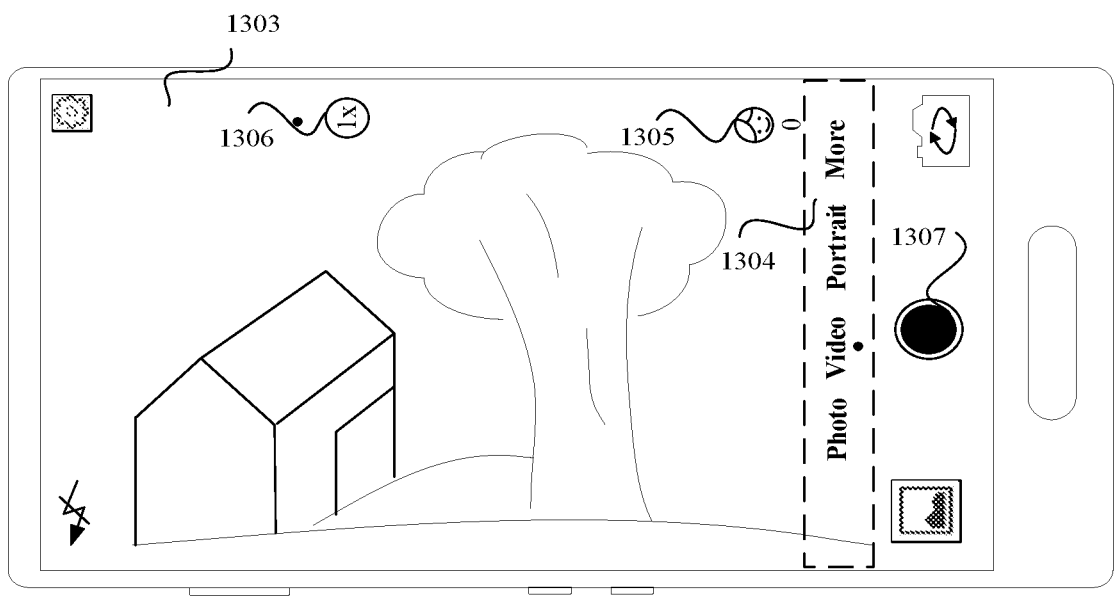

For example, referring to FIG. 13(b), after the mobile phone enters the video recording mode, the viewfinder interface 1303 includes a preview image. The viewfinder interface 1303 may further include a control 1305 used to indicate a beauty mode, a control 1306 used to indicate a beauty level, and a video recording control 1307. In the video recording mode, after the mobile phone detects an operation that the user taps the video recording control 1307, the mobile phone starts video recording.

It can be understood that the mobile phone performs different video stream processing procedures for a "shake" shooting manner and a "move" shooting manner. Therefore, this embodiment of this application provides a plurality of recording modes, for example, a common video recording mode and two camera movement modes (for example, including a move mode and a shake mode). The user may indicate the mobile phone to use a specific camera movement mode. The mobile phone performs different processing processes in different camera movement modes. For example, when the user expects to use the "shake" shooting manner, the user may enter an instruction to indicate the mobile phone to enter the shake mode. If the user expects to use the "move" shooting manner, the user may enter another instruction to indicate the mobile phone to enter the move mode. That the mobile phone enters the shake mode may be understood as that the mobile phone performs processing based on a processing procedure corresponding to the move mode. That the mobile phone enters the move mode may be understood as that the mobile phone performs processing based on a processing procedure corresponding to the shake mode.

In some embodiments, the mobile phone starts the camera application, enters the common video recording mode by default, and enters a corresponding camera movement mode after the user indicates the camera movement mode. Alternatively, after starting the camera application, the mobile phone enters a camera movement mode by default, for example, a camera movement mode used when the camera application is used last time. Assuming that the mobile phone enters the move mode by default after starting the camera application, the mobile phone may start an ultra-wide-angle camera. An image block on an image captured by the ultra-wide-angle camera is displayed on the viewfinder interface, for example, may be displayed at a central position.

The user may indicate the shake mode and the move mode in a plurality of manners, including but not limited to Manner 1 and Manner 2 below.

Figure 14A:
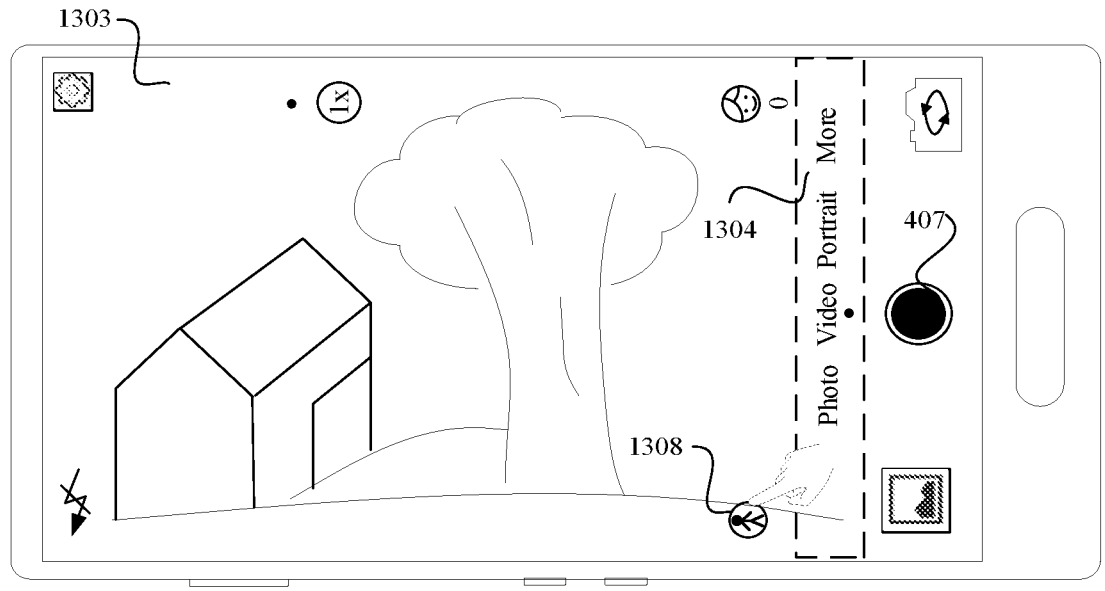

Manner 1: Referring to FIG. 14(a), the mobile phone is currently in a common video recording mode. A control 1308 used to indicate a camera movement mode is displayed on the viewfinder interface 1303. When detecting an operation on the control 1308 used to indicate a camera movement mode, the mobile phone displays a GUI shown in FIG. 14(b). A selection box 1309 is displayed on the GUI. The selection box 1309 includes options "Shake mode" and "Move mode". When detecting an operation on "Move mode" in the selection box 1309, the mobile phone enters the move mode. When detecting "Shake mode", the mobile phone enters the shake mode.

For example, after the mobile phone enters the common video recording mode, the control 1308 used to indicate a camera movement mode is displayed on the viewfinder interface by default; or after the user sets a camera movement mode shortcut, the control 1308 used to indicate a camera movement mode is displayed on the viewfinder interface. The user may set the camera movement mode shortcut by using a setting menu or the like in the camera application.

It should be noted that a display position of the control 1308 used to indicate a camera movement mode on the viewfinder interface 1303 is not limited in this embodiment of this application, or the user may customize a display position of the control 1308, or a display position of the control 1308 may be adaptively adjusted according to a landscape mode or a portrait mode of the mobile phone. In addition, the control 1308 used to indicate a camera movement mode may be in a form in which a preview image is not blocked as much as possible, for example, a transparent or translucent form.

It should be understood that, in Manner 1, the control 1308 used to indicate a camera movement mode is intuitively presented on the viewfinder interface, so that a user operation is convenient, and user experience is relatively good.

Figure 15A:
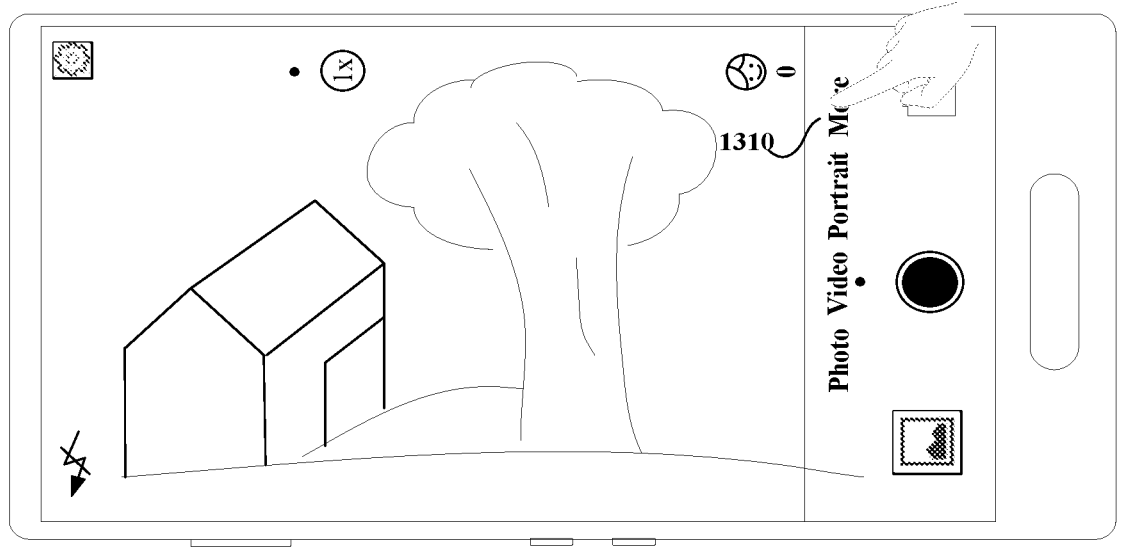
Figure 15B:
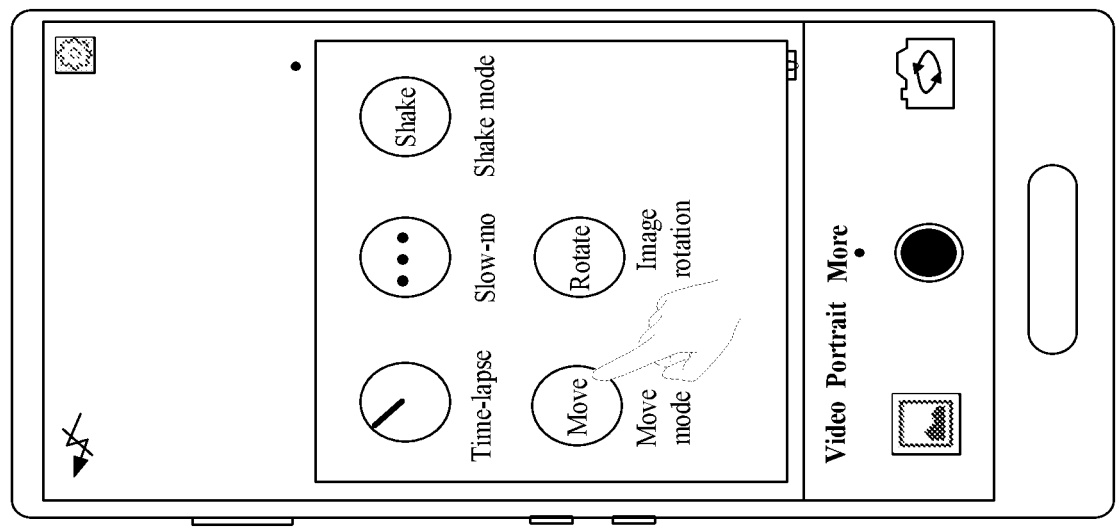

Manner 2: Referring to FIG. 15(a), the mobile phone is currently in a common video recording mode. The viewfinder interface 1303 further includes a control "More" 1310. When detecting an operation used to select the control "More" 1310, the mobile phone displays another GUI shown in FIG. 15(b). Icons corresponding to a plurality of photo modes are displayed on the GUI, including an icon of "Shake mode" and an icon of "Move mode". When detecting an operation on the icon of "Move mode", the mobile phone enters the move mode. When detecting an operation on the icon of "Shake mode", the mobile phone enters the shake mode. It should be understood that, in Manner 2, the control 1308 used to indicate a camera movement mode may not be displayed on the viewfinder interface, so that a preview image on the viewfinder interface can be prevented from being blocked.

It can be understood that Manner 1 and Manner 2 above are merely examples, and another manner of indicating the mobile phone to enter a camera movement mode (the shake mode or the move mode) is also feasible. For example, a voice instruction is used to indicate the mobile phone to enter the shake mode or the move mode. This is not limited in this embodiment of this application. The following uses Manner 1 as an example for description.

Embodiment 1

Figure 16:
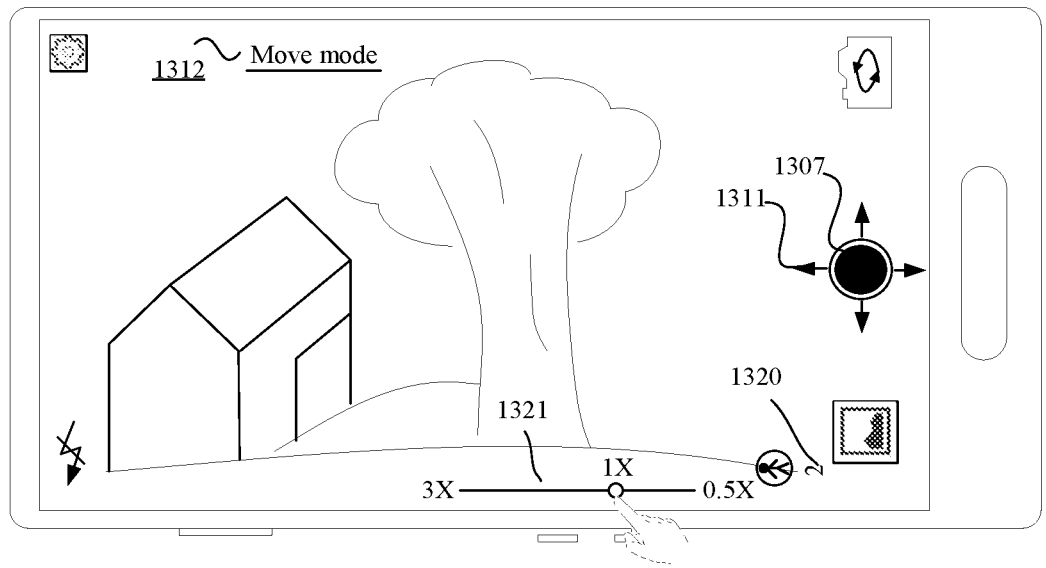
FIG. 16, and FIG. 17 are schematic diagrams of a graphical user interface of an electronic device according to an embodiment of this application.

For example, FIG. 16 is a schematic diagram of a GUI displayed when the mobile phone enters the move mode. To help the user determine a current mode, when the mobile phone enters the move mode, the mobile phone may display prompt information 1312 on the viewfinder interface. The prompt information 1312 is used to indicate that the mobile phone is currently in the move mode. Certainly, when the mobile phone switches from the common video recording mode to the move mode, the mobile phone may also output another prompt, for example, a vibration feedback. The prompt information 1312 may be displayed in a manner in which a preview image is not blocked as much as possible, for example, a translucent manner or a transparent manner. A direction control 1311 is also displayed on the viewfinder interface. The user may enter, by using the direction control 1311, information used to indicate an image movement direction. It should be understood that a display position of the direction control 1311 on the viewfinder interface is not limited in this embodiment of this application. For example, the direction control 1311 is displayed at a position shown in FIG. 16 by default, or the user may adjust the display position of the direction control 1311.

In some embodiments, the mobile phone uses a first wide-angle camera (for example, a common wide-angle camera) in the common video recording mode. When switching from the common video recording mode to the move mode, the mobile phone starts a second wide-angle camera (for example, an ultra-wide-angle camera). An angle of view of the first wide-angle camera is less than an angle of view of the second wide-angle camera. A first preview image is displayed on the viewfinder interface in the move mode. The first preview image is a first image block in a first region on an image captured by the ultra-wide-angle camera. It can be understood that the mobile phone starts the ultra-wide-angle camera after entering the move mode. In this case, the first preview image may be a first image block in a first region on a first frame of image captured by the ultra-wide-angle camera.

Figure 17:
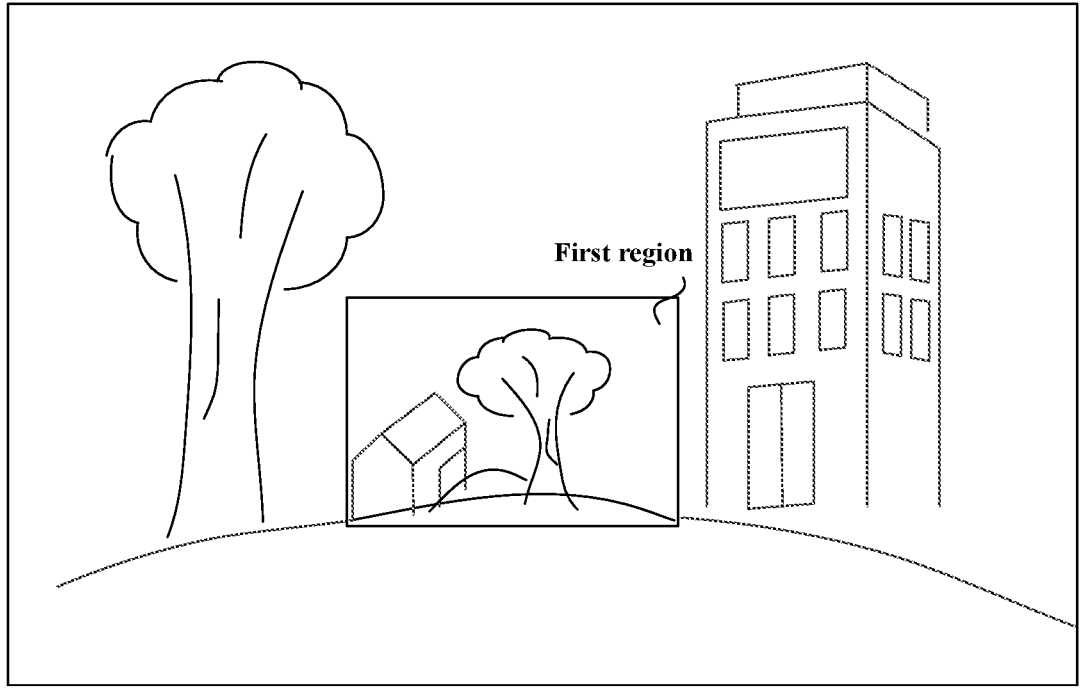

The first image block may be an image block that corresponds to the first preview image and that is on the image captured by the ultra-wide-angle camera. For example, the first image block is all or a part of an image in an overlapping angle of view range between the image captured by the ultra-wide-angle camera and an image captured by a common wide-angle camera. FIG. 17 is a schematic diagram of the first region on the image captured by the ultra-wide-angle camera. The first region may be all or a part of an overlapping angle of view range between the ultra-wide-angle camera and the common wide-angle camera. It can be learned from FIG. 17 and FIG. 18 through comparison that the preview image is the first image block in the first region in FIG. 18 after the mobile phone enters the move mode in FIG. 17. The mobile phone may close or open the common wide-angle camera after switching from the common video recording mode to the move mode.

In some embodiments, the preview image does not change when the mobile phone switches from the common video recording mode to the move mode. That the preview image does not change may be understood as that the preview image is not de-magnified or magnified after the mobile phone switches to the move mode. For example, a magnification of a preview image in the move mode and a magnification of a preview image in the common video recording mode are the same, for example, both are 1×. Therefore, after the mobile phone switches from the common video recording mode to the move mode, the user does not perceive that the preview image is suddenly magnified or de-magnified.

In some other embodiments, the preview image may change m the common video recording mode and the move mode. That the preview image changes may be understood as that the preview image is de-magnified or magnified after the mobile phone switches to the move mode. For example, a magnification of a preview image in the common video recording mode is IX, and a magnification of a preview image in the move mode is 5×. To be specific, the preview image is magnified when the mobile phone switches from the common video recording mode to the move mode. It can be understood that a position movement range in the first region on the image captured by the ultra-wide-angle camera is widened in a case in which an image magnification is increased after the mobile phone switches to the move mode. This can achieve a shooting effect of moving a lens within a relatively wide range.

The following embodiment describes a process in which the mobile phone implements image translation in the move mode.

Figure 18:
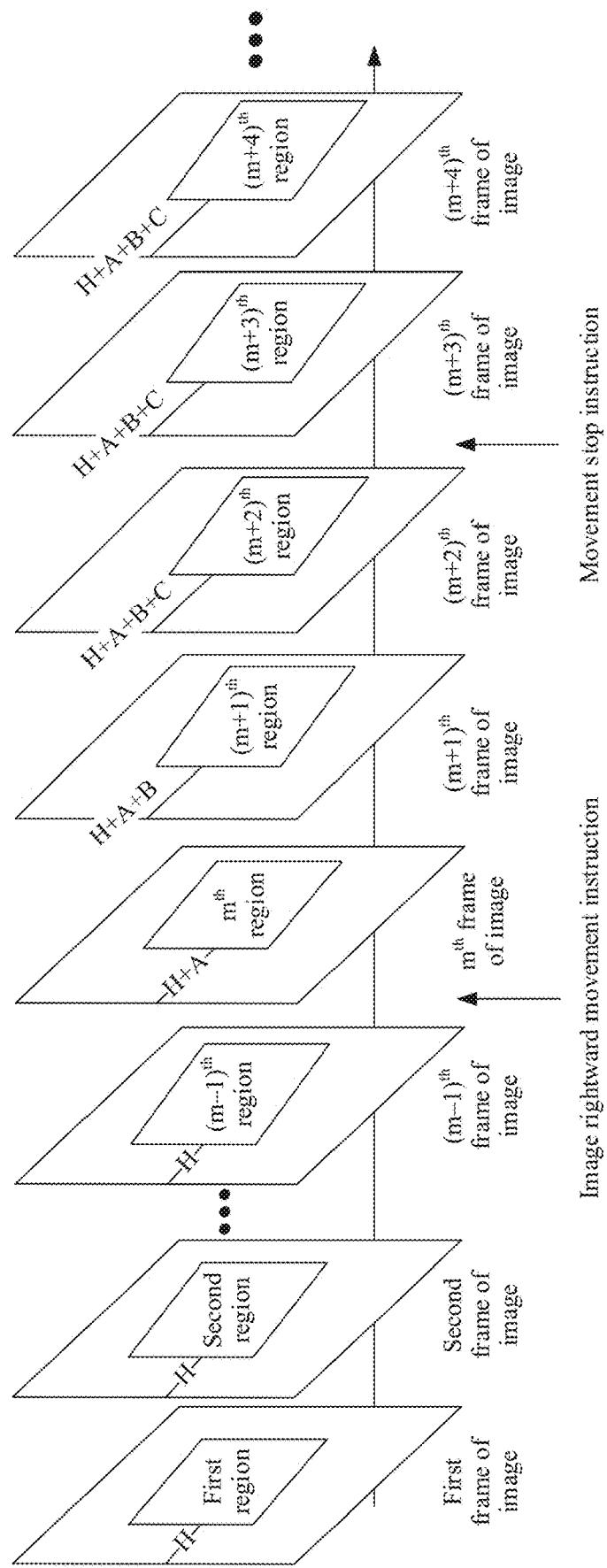
FIG. 18 is a schematic diagram of moving a target region on an image captured by an ultra-wide-angle camera according to an embodiment of this application.

Referring to FIG. 18, the ultra-wide-angle camera captures N frames of images, for example, a first frame of image, a second frame of image, and an $(m-1)^{th}$ frame of image. It can be understood that the mobile phone starts the ultra-wide-angle camera after entering the move mode. In this case, the first preview image displayed after the mobile phone enters the move mode may be a first image block in a first region on a first frame of image captured by the ultra-wide-angle camera. Assuming that the mobile phone has not detected an image movement instruction, the mobile phone determines a second region on the second frame of image. A position of the second region does not move relative to that of the first region, and the preview image is updated from the image block in the first region to an image block in the second region. By analogy, a position of an $(m-1)^{th}$ region on the $(m-1)^{th}$ frame of image does not move relative to that of the first region, where m may be an integer greater than or equal to 3. The preview image is updated to an image block in the $(m-1)^{th}$ region. In other words, the mobile phone does not detect the image movement instruction in a period from the first frame of image to the $(m-1)^{th}$ frame of image. Therefore, a position of the preview image on the image does not change.

Assuming that the mobile phone detects an image rightward movement instruction before the preview image is updated to an image block in an $m^{th}$ region on an $m^{th}$ frame of image (for example, in a process in which the preview image is displayed as the image block in the $(m-1)^{th}$ region), the mobile phone determines the $m^{th}$ region on the $m^{th}$ frame of image, where a position of the $m^{th}$ region moves rightward by a distance A relative to that of the $(m-1)^{th}$ region. As shown in FIG. 18, a distance between the $(m-1)^{th}$ region and a left image edge is H, and a distance between the $m^{th}$ region and a left image edge is H+A. In this case, after the mobile phone detects the image rightward movement instruction, the preview image on the viewfinder interface is updated from the image block in the $(m-1)^{th}$ region to the image block in the $m^{th}$ region, to be specific, the preview image moves rightward by a distance A on the image.

Then, the mobile phone determines an $(m+1)^{th}$ region on an $(m+1)^{th}$ frame of image, where a position of the $(m+1)^{th}$ region moves rightward by a distance B relative to that of the $m^{th}$ region. As shown in FIG. 18, the distance between the $m^{th}$ region and the left image edge is H+A, and a distance between the $(m+1)^{th}$ region and a left image edge is H+A+B. In this case, the preview image on the viewfinder interface is updated from the image block in the $m^{th}$ region to an image block in the $(m+1)^{th}$ region, to be specific, the preview image moves rightward by a distance B on the image.

The mobile phone determines an $(m+2)^{th}$ region on an $(m+2)^{th}$ frame of image, where a position of the $(m+2)^{th}$ region moves rightward by a distance C relative to that of the $(m+1)^{th}$ region. As shown in FIG. 18, the distance between the $(m+1)^{th}$ region and the left image edge is H+A+B, and a distance between the $(m+2)^{th}$ region and a left image edge is H+A+B+C. In this case, the preview image on the viewfinder interface is updated from the image block in the $(m+1)^{th}$ region to an image block in the $(m+2)^{th}$ region, to be specific, the position of the preview image on the image moves rightward by a distance C. Therefore, the preview image gradually moves rightward on the image.

Assuming that the mobile phone detects a movement stop instruction, the mobile phone determines an $(m+3)^{th}$ region on an $(m+3)^{th}$ frame of image, where a position of the $(m+3)^{th}$ region does not change relative to that of the $(m+2)^{th}$ region. The preview image is updated from the image block in the $(m+2)^{th}$ region to an image block in the $(m+3)^{th}$ region, to be specific, the position of the preview image on the image does not change. In this case, the rightward movement stops. Then, the preview image is updated from the image block in the $(m+3)^{th}$ region to an image block in an $(m+4)^{th}$ region, to be specific, the position of the preview image on the image remains unchanged until the image movement instruction is detected again and the movement continues.

There are a plurality of value relationships among A, B, and C. The following provides several examples.

Example 1: A=B=C. It is assumed that A=B=C=L. To be specific, after the mobile phone detects the image rightward movement instruction, a position of a target region (for example, the $m^{th}$ region, the $(m+1)^{th}$ region, and the $(m+2)^{th}$ region in FIG. 18) on each frame of image moves rightward by a same distance L, to be specific, moves rightward at a constant speed relative to that of a target region on a previous frame of image. In this case, the constant rightward movement is performed. In other words, after the mobile phone detects the image rightward movement instruction, the position of each updated preview image on the image relative to the previous frame of preview image moves rightward by the same distance L, until the movement stop instruction is detected. This achieves a shooting effect of the constant rightward movement.

Example 2: A<B<C<D. It is assumed that A=L, B=2L, and C=3L. To be specific, after the mobile phone detects the image rightward movement instruction, a target region on a next frame of image moves rightward at an accelerated speed relative to a target region on a previous frame of image. For example, the $m^{th}$ region moves rightward by a distance L relative to the $(m-1)^{th}$ region; the $(m+1)^{th}$ region moves rightward by a distance 2L relative to the $m^{th}$ region, to be specific, the $(m+1)^{th}$ region moves rightward at an accelerated speed; and the $(m+2)^{th}$ region moves rightward by a distance 3L relative to the $(m+1)^{th}$ region, to be specific, the $(m+2)^{th}$ region moves rightward at an accelerated speed relative to the $(m+1)^{th}$ region. Therefore, after the mobile phone detects the image rightward movement instruction, each updated preview image moves rightward at an accelerated speed relative to a previous frame of preview image. This achieves a shooting effect of an accelerated image rightward movement.

Example 3: A>B>C>D. It is assumed that A=2L, B=L, and C=0. To be specific, after the mobile phone detects the image rightward movement instruction, a target region on a next frame of image moves rightward at a decelerated speed relative to a target region on a previous frame of image. For example, the $m^{th}$ region moves rightward by a distance 2L relative to the $(m-1)^{th}$ region: the $(m+1)^{th}$ region moves rightward by a distance L relative to the $m^{th}$ region, to be specific, the $(m+1)^{th}$ region moves rightward at a decelerated speed relative to the $m^{th}$ region; and the $(m+2)^{th}$ region moves rightward by a distance 0 relative to the $(m+1)^{th}$ region, to be specific, the $(m+2)^{th}$ region moves rightward at a decelerated speed relative to the $(m+1)^{th}$ region. In this case, the movement stops. Therefore, after the mobile phone detects the image rightward movement instruction, each updated preview image moves rightward at a decelerated speed relative to a previous frame of preview image, even the speed decreases to 0. This achieves a shooting effect of a decelerated image rightward movement.

The foregoing provides three examples of the value relationship among A, B, and C. The values of A, B, and C are not limited in this embodiment of this application, and may be flexibly set by a person skilled in the art to achieve different technical effects.

In some embodiments, after the mobile phone detects an instruction used to indicate an image movement direction, a manner in Example 1, Example 2, or Example 3 is used by default. Alternatively, after the mobile phone detects an instruction used to indicate an image movement direction, a manner in Example 1 is used by default; when the mobile phone detects an accelerated movement instruction, a manner in Example 2 is used; and when the mobile phone detects a decelerated movement instruction, a manner in Example 3 is used.

First Manner:

The ultra-wide-angle camera captures images frame by frame. It is assumed that N frames of images are captured, and preview images are sequentially updated to image blocks in target regions on the N frames of images. It can also be understood that the mobile phone does not perform frame extraction or frame insertion processing on the N frames of images captured by the ultra-wide-angle camera, but sequentially updates the preview images to the image blocks in the target regions on the N frames of images. This helps improve continuity and smoothness of preview images. Assuming that the mobile phone determines the target region in the manner in which A=B=C=L in FIG. 18 after detecting the instruction used to indicate the image movement direction, the position of the preview image on the image moves rightward at a constant speed. Assuming that the mobile phone determines the target region in the manner in which A<B<C<D in FIG. 18, the position of the preview image on the image moves rightward at an accelerated speed. Assuming that the mobile phone determines the target region in the manner in which A>B>C>D, the position of the preview image on the image moves rightward at a decelerated speed.

Second Manner:

The ultra-wide-angle camera captures N frames of images. The mobile phone extracts M frames of images from the N frames of images captured by the ultra-wide-angle camera, where M is an integer less than N; and updates a preview image by using an image block in a target region on each of the M frames of images. This can achieve a fast update (or play) effect. For example, it is assumed that an image capture frame rate of the ultra-wide-angle camera is 240 fps, to be specific, 240 frames of images are captured per second. It is further assumed that an image play (or referred to as update) frame rate of the mobile phone is 30 fps, to be specific, updating is performed by 30 frames per second. In this case, the 240 frames of images need to be updated in 8 seconds. Assuming that the mobile phone extracts 120 frames of images from the 240 frames of images, the extracted 120 frames are updated in only 4 seconds. This achieves a fast update effect.

Figure 19A:
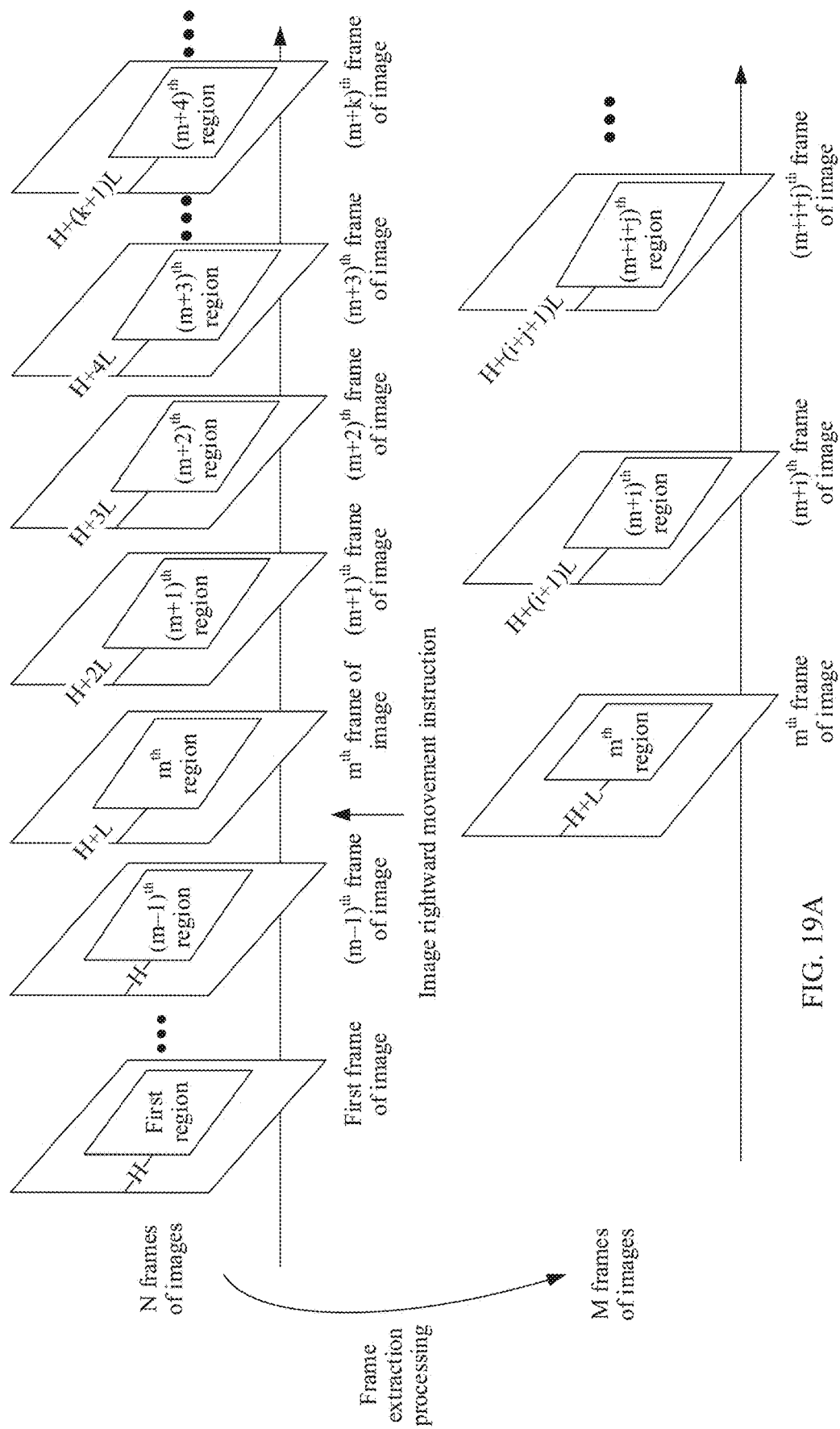
FIG. 19A to FIG. 19D are schematic diagrams of moving a target region on an image captured by an ultra-wide-angle camera according to an embodiment of this application.

Example 1: Referring to FIG. 19A, the ultra-wide-angle camera captures N frames of images, for example, sequentially captures a first frame of image, a second frame of image, and an $(m-1)^{th}$ frame of image. Assuming that the mobile phone detects an image rightward movement instruction before a preview image is updated to an $m^{th}$ region on an m frame of image, the mobile phone determines a target region on the $m^{th}$ frame of image in the N frames of images and a target region on each subsequent frame of image. It is assumed that a position of a target region on a next frame of image moves rightward by a same distance L (in other words, in the foregoing manner in which A=B=C=L) relative to that of a target region on a previous frame of image.

Then, the mobile phone starts frame extraction. It is assumed that the frame extraction starts from the $m^{th}$ frame, and the $m^{th}$ frame, an $(m+i)^{th}$ frame, and an $(m+i+j)^{th}$ frame are extracted. The $m^{th}$ region on the $m^{th}$ frame moves rightward by a distance L relative to the $(m-1)^{th}$ frame, an $(m+i)^{th}$ region on the $(m+i)^{th}$ frame of image moves rightward by a distance i L relative to the $m^{th}$ frame, and an $(m+i+j)^{th}$ region on the $(m+i+j)^{th}$ frame of image moves rightward by a distance j L relative to the $(m+i)^{th}$ frame.

Still referring to FIG. 19A, assuming that the mobile phone detects an image movement stop instruction in a process in which the preview image is displayed as an image block in the $(m+i+j)^{th}$ region, the mobile phone continues to update the preview image by using an image block in the target region on the $(m+i+j+1)^{th}$ frame of image, an image block in the target region on the $(m+i+j+2)^{th}$ frame of image, and the like. To be specific, after the mobile phone detects the image movement stop instruction, updating is performed without performing frame extraction, and a position of the target region on the image such as the $(m+i+j+1)^{th}$ frame of image or the $(m+i+j+2)^{th}$ frame of image relative to the $(m+i+j)^{th}$ region on the image remains unchanged, in other words, does not move. In other words, after the mobile phone detects an instruction used to indicate an image movement direction, the preview image is updated through frame extraction, and the position of the preview image on the image gradually moves in the image movement direction. After the mobile phone detects the image movement stop instruction, processing through frame extraction is not performed, and the position of the preview image on the image does not move.

FIG. 19A is still used as an example. Values of i and j may be understood as frame extraction intervals, and different values of i and j achieve different shooting effects.

It is assumed that i=j, which may be understood as that frame extraction intervals are the same. For example, i=j=2, to be specific, one frame is extracted every other frame or one frame is extracted every two frames. To be specific, after the mobile phone detects the image rightward movement instruction, preview images are sequentially updated to an image block in the $m^{th}$ region, an image block in an $(m+2)^{th}$ region, an image block in an $(m+4)^{th}$ region, and the like. The $m^{th}$ region moves rightward by 2L relative to the $(m+2)^{th}$ region, and the $(m+4)^{th}$ region moves rightward by 2L relative to the $(m+2)^{th}$ region. To be specific, a position of each updated preview image moves rightward by 2L relative to that of a previous frame of preview image on an image. It can be learned through comparison with the case in which A=B=C=L in FIG. 18 that, in the embodiment shown in FIG. 19A, the position of the preview image on the image may move rightward relatively fast at a constant speed (may move rightward by 2L each time) through frame extraction. In addition, the frame extraction updating can achieve a fast update effect. In other words, a position of a preview image on an image moves rightward relatively fast at a constant speed while the preview image is updated relatively fast.

Certainly, frame extraction intervals may alternatively be different, in other words, i is not equal to j. It is assumed that i<j, for example, i=2, and j=3. To be specific, after the mobile phone detects the image rightward movement instruction, the preview image is sequentially updated to image blocks in the $m^{th}$ region, the $(m+2)^{th}$ region, an $(m+5)^{th}$ region, and the like. The $(m+2)^{th}$ region moves rightward by 2L relative to the $m^{th}$ region, and the $(m+5)^{th}$ region moves rightward by 3L relative to the $(m+2)^{th}$ region. Therefore, after the mobile phone detects the image rightward movement instruction, a position of each updated preview image moves rightward at an accelerated speed relative to that of a previous frame of preview image on an image. In addition, the frame extraction updating can achieve a fast update effect. In other words, a position of a preview image on an image moves rightward at an accelerated speed while the preview image is updated relatively fast.

It is assumed that i>j, for example, i=3, and j=2. To be specific, after the mobile phone detects the image rightward movement instruction, the preview image is sequentially updated to image blocks in the $m^{th}$ region, an $(m+3)^{th}$ region, the $(m+5)^{th}$ region, and the like. The $(m+3)^{th}$ region moves rightward by 3L relative to the $m^{th}$ region, and the $(m+5)^{th}$ region moves rightward by 2L relative to the $(m+3)^{th}$ region. Therefore, after the mobile phone detects the image rightward movement instruction, a position of each updated preview image moves rightward at a decelerated speed relative to that of a previous frame of preview image on an image. In addition, the frame extraction updating can achieve a fast update effect. In other words, a position of a preview image on an image moves rightward at a decelerated speed while the preview image is updated relatively fast.

The foregoing provides three examples of the value relationship between i and j. The values i and j are not limited in this embodiment of this application, and may be flexibly set by a person skilled in the art to achieve different technical effects.

Figure 19B:
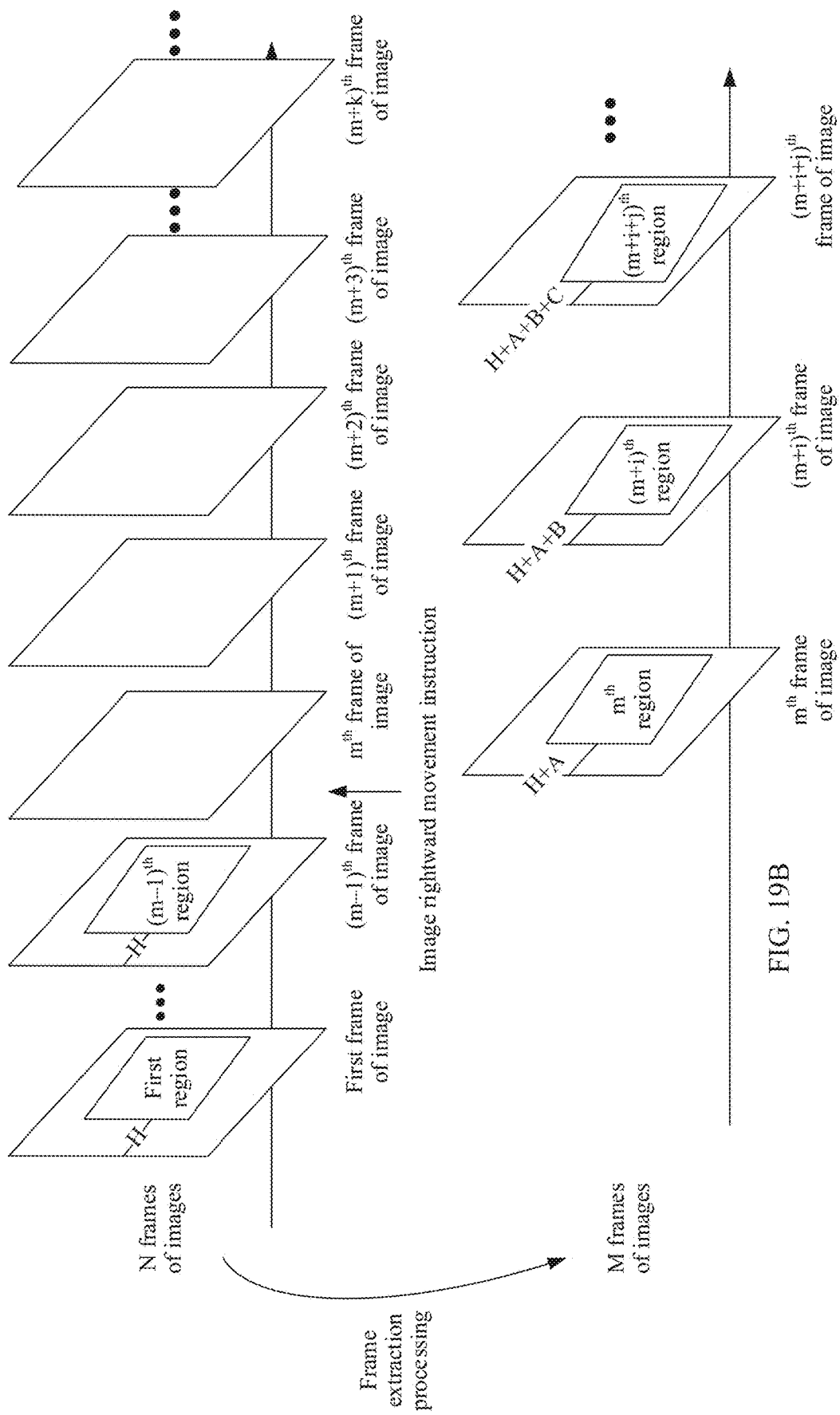

Example 2: In Example 1 above, the mobile phone first determines a target region on each frame of image, and then performs frame extraction. In Example 2, the mobile phone may first perform frame extraction, and then determine a target region on an extracted frame of image. Referring to FIG. 19B, assuming that the mobile phone detects an image rightward movement instruction before a preview image is updated to an $m^{th}$ frame of image, the mobile phone starts frame extraction from the $m^{th}$ frame of image, to obtain M frames of images. An image frame extraction interval is not limited herein. The mobile phone determines a target region on each of the M frames of images. For a manner of determining the target region on each of the M frames of images, refer to the descriptions in FIG. 18. Details are not described herein again. Assuming that the mobile phone determines the target region on each of the M frames of images in the manner in which A=B=C=L, because the frame extraction updating can achieve a fast update effect, a position of a preview image on an image moves rightward at a constant speed while the preview image is updated relatively fast. Assuming that the mobile phone determines the target region in the manner in which A<B<C<D in FIG. 18, a position of a preview image on an image moves rightward at an accelerated speed while the preview image is updated relatively fast. Assuming that the mobile phone determines the target region in the manner in which A>B>C>D, a position of a preview image on an image moves rightward at a decelerated speed while the preview image is updated relatively fast.

It should be noted that FIG. 19A is used as an example. Assuming that the mobile phone detects an accelerated image rightward movement instruction before the preview image is updated to the $m^{th}$ frame of image, the preview image is updated in the foregoing first manner, to be specific, is sequentially updated to image blocks in the $m^{th}$ region, the $(m+1)^{th}$ region, the $(m+2)^{th}$ region, and the like without performing frame extraction. Assuming that the mobile phone detects a movement stop instruction before the preview image is updated to the $(m+i+j+1)^{th}$ frame of image, a video is generated, and the video is obtained by synthesizing image blocks in target regions on images extracted from the $m^{th}$ frame to the $(m+i+j+1)^{th}$ frame. For example, if the $m^{th}$ region, the $(m+i)^{th}$ frame, and the $(m+i+j)^{th}$ frame are extracted, the video may be a video obtained by synthesizing image blocks in the $m^{th}$ region, the $(m+i)^{th}$ region, and the $(m+i+j)^{th}$ region. In other words, after the mobile phone detects the accelerated image rightward movement instruction, the preview image is updated without performing frame extraction. After the mobile phone detects the rightward movement stop instruction, a generated video may be a video obtained by synthesizing image blocks in target regions on extracted images. The manner of updating a preview image without performing frame extraction can reduce a calculation amount and improve efficiency.

Third Manner:

The ultra-wide-angle camera captures N frames of images. The mobile phone inserts a plurality of frames of images into the N frames of images to obtain M frames of images, where M is an integer greater than N, and sequentially updates a preview image by using the M frames of images. Because an image quantity increases, a slow update (or play) effect can be achieved. For example, it is assumed that an image capture frame rate of the ultra-wide-angle camera is 240 fps, to be specific, 240 frames of images are captured per second. It is further assumed that an image update (or referred to as play) frame rate of the mobile phone is 30 fps, to be specific, updating is performed by 30 frames per second. In this case, the 240 frames of images need to be updated in 8 seconds. Assuming that the mobile phone inserts 120 frames of images into the 240 frames of images, the obtained 360 frames of images are updated in only 12 seconds. This achieves a slow update effect.

Figure 19C:
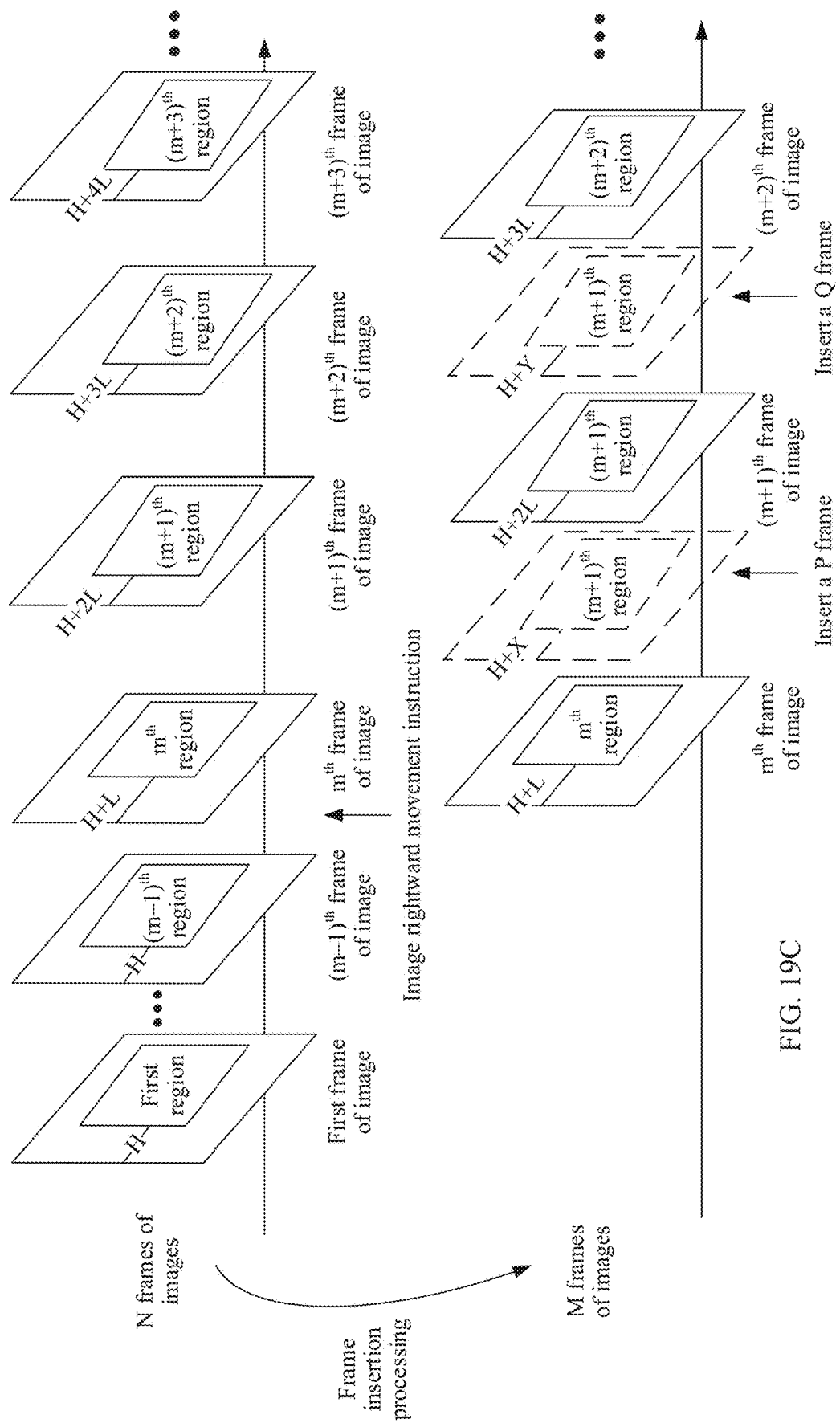

Example 1: Referring to FIG. 19C, the ultra-wide-angle camera captures N frames of images, for example, sequentially captures a first frame of image, a second frame of image, and an $(m-1)^{th}$ frame of image. Assuming that the mobile phone detects an image rightward movement instruction before a preview image is updated to an $m^{th}$ frame of image, the mobile phone determines a target region on the $m^{th}$ frame of image and a target region on each subsequent frame of image, and a position of a target region on a next frame of image moves rightward by a same distance L relative to that of a target region on a previous frame of image.

Then, the mobile phone starts frame insertion. It is assumed that the mobile phone inserts a P-frame of image (the inserted image is represented by a dashed line) between the $m^{th}$ frame and the $(m+1)^{th}$ frame, and inserts a Q-frame of image between the $(m+1)^{th}$ frame and the $(m+2)^{th}$ frame, where P and Q may be the same or different.

Assuming that P=Q=1, one frame is inserted every other frame. The mobile phone may determine a $P^{th}$ region on a $P^{th}$ frame of image (that is, one frame of image inserted between the $m^{th}$ frame and the $(m+1)^{th}$ frame). The $P^{th}$ region moves rightward by a distance X relative to the $m^{th}$ region. A value of X is not limited in this embodiment of this application. For example, X may range from L to 2L, for example, 1.5L. The mobile phone determines a $Q^{th}$ region on a $Q^{th}$ frame of image (that is, one frame of image inserted between the $(m+1)^{th}$ frame and the $(m+2)^{th}$ frame). The $Q^{th}$ region moves rightward by Y relative to the $(m+1)^{th}$ region. A value of Y is not limited in this embodiment of this application. For example, Y may range from 2L to 3L, for example, 2.5L.

For example, X=1.5L, and Y=2.5L. After the mobile phone detects the image rightward movement instruction, the preview image is sequentially updated to the $m^{th}$ region, the $P^{th}$ region, the $(m+1)^{th}$ region, the $Q^{th}$ region, and the like. Therefore, each updated preview image moves rightward by 0.5L. To be specific, a position of a preview image on an image moves rightward relatively slowly at a constant speed. In addition, the frame insertion updating can achieve an effect that a preview image is updated slowly. To be specific, a position of a preview image on an image may move rightward relatively slowly at a constant speed while the preview image is updated relatively slowly.

It can be understood that the values of X and Y are related to an image rightward movement speed. This is not limited in this embodiment of this application. A value relationship between P and Q may be flexibly set in the technology in this field, to achieve different effects.

It can be understood that, assuming that the mobile phone detects an image movement stop instruction in a process in which an image block in an $(m+2)^{th}$ region is displayed as a preview image, the mobile phone determines an image block in an $(m+3)^{th}$ region on an $(m+3)^{th}$ frame of image, an image block in an $(m+4)^{th}$ region on an $(m+4)^{th}$ frame of image, and the like. To be specific, after the mobile phone detects the image movement stop instruction, the mobile phone does not perform frame insertion, and the position of the preview image on the image does not move.

Figure 19D:
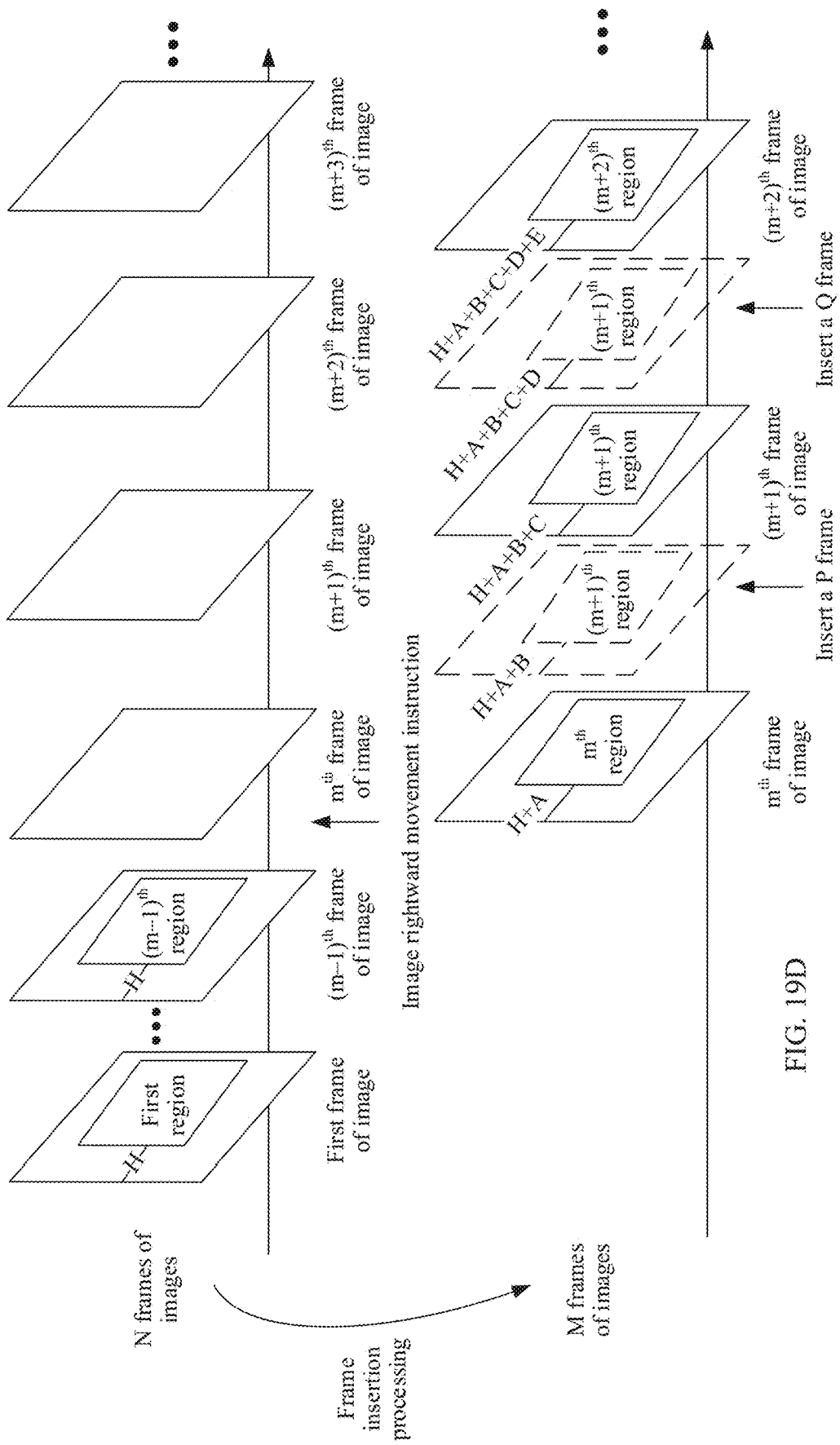

Example 2: In Example 1 above, the mobile phone first determines a target region on each frame of image, and then performs frame insertion. In Example 2, the mobile phone may first perform frame insertion, and then determine a target region. Referring to FIG. 19D, assuming that the mobile phone detects an image rightward movement instruction before a preview image is updated to an $m^{th}$ frame of image, the mobile phone starts frame insertion from the $m^{th}$ frame of image, to obtain M frames of images. A quantity of image frames inserted between two adjacent frames of images is not limited herein. An example of inserting one frame between two adjacent frames is used. As shown in FIG. 19D, a dashed-line image is an inserted image. For a manner in which the mobile phone determines the target region on each of the M frames of images, refer to the descriptions in FIG. 18. Details are not described herein again. Assuming that the mobile phone determines the target region on each of the M frames of images in the manner in which A=B=C=L, because the frame insertion updating can achieve a slow update effect, a position of a preview image on an image moves rightward at a constant speed while the preview image is updated relatively slowly. Assuming that the mobile phone determines the target region in the manner in which A<B<C<D, a position of a preview image on an image moves rightward at an accelerated speed while the preview image is updated relatively slowly. Assuming that the mobile phone determines the target region in the manner in which A>B>C>D, a position of a preview image on an image moves rightward at a decelerated speed while the preview image is updated relatively slowly.

In some embodiments, after the mobile phone detects an instruction used to indicate an image movement direction, the mobile phone performs processing in the foregoing first manner by default, and determines the target region in the manner in which A=B=C=L in the foregoing first manner by default, to be specific, a position of a preview image on an image moves rightward at a constant speed. When the mobile phone detects an accelerated movement instruction, the mobile phone may determine the target region in the manner in which A<B<C<D in the foregoing first manner, or may implement an accelerated movement in the frame insertion manner in Example 1 in the foregoing second manner. When the mobile phone detects a decelerated movement instruction, the mobile phone may determine the target region in the manner in which A>B>C>D in the foregoing first manner, or may implement a decelerated movement in the frame insertion manner in Example 1 in the foregoing third manner.

It should be noted that sides may be aligned in a process in which positions of target regions on different frames of images move. FIG. 18 is still used as an example. Sides of the first region and the second region are aligned. For example, a distance between a bottom side of the first region and a bottom side of the first frame of image is the same as a distance between a bottom side of the second region and a bottom side of the second frame of image, to ensure stable display of a preview image as much as possible. In some embodiments, jitter occurs in a process in which the user holds the mobile phone. To alleviate instability of the preview image caused by jitter of the user, an implementation is as follows: The mobile phone performs image stabilization on an image captured by the ultra-wide-angle camera, and determines a target region such as a first region, a second region, or a third region on an image obtained after the image stabilization. The image stabilization may be image stabilization clipping. Generally, when the user jitters, an image in an edge region on a preview image changes relatively quickly and consequently is unstable, and an image in a middle region on the preview image changes relatively slightly and therefore is relatively stable. Therefore, the mobile phone may clip an edge of each frame of image captured by the ultra-wide-angle camera. A specific clipping area is not limited in this embodiment of this application. For example, the mobile phone determines a first region on a remaining image obtained after a first frame of image is clipped, determines a second region on a remaining image obtained after a second frame of image is clipped, determines a third region on a remaining image obtained after a third frame of image is clipped, and so on. Therefore, the preview image is visually displayed relatively stably.

Another possible implementation is as follows: The mobile phone may determine a first region on a first frame of image, and perform image stabilization clipping on a first image block in the first region. For example, an edge of the first image block is clipped, and a remaining image obtained after the edge of the first image block is clipped is displayed as a preview image. Likewise, the mobile phone may determine a second region on a second frame of image, and perform image stabilization clipping on a second image block in the second region; and so on. In other words, the mobile phone first determines an image block in a target region on each frame of image, and then performs image stabilization clipping.

The foregoing mentions a plurality of manners in which the user enters the instruction used to indicate the image movement direction. This includes but is not limited to the following several examples.

Example 1: Referring to FIG. 16, the viewfinder interface further includes the direction control 1311. The direction control 1311 may include four arrows distributed around the video recording control 1307. When the mobile phone detects an operation that the user taps (for example, taps once) an arrow, the mobile phone starts to move the first region in a direction indicated by the arrow. For example, if the user taps a right arrow, a position of a preview image on an image starts to move rightward. The movement stops when the mobile phone detects a tap operation of the user at any position on the viewfinder interface, or the movement stops when the mobile phone detects the right arrow again, or the movement automatically stops after a specific period of time.

Example 2: Referring to FIG. 16, when the mobile phone detects that duration in which the user presses an arrow reaches preset duration, the mobile phone starts to move the first region in a direction indicated by the arrow. The movement stops when the user detects an uplift after the touch and hold operation.

Example 3: Referring to FIG. 16, when the mobile phone detects an operation that the user presses and drags (or flicks) the video recording control 1307 in a direction, the mobile phone starts to move the first region in the drag direction indicated by the drag operation. For example, if the user presses and drags the video recording control 1307 rightward, the mobile phone moves the first region rightward. The movement stops when the mobile phone detects an uplift after the drag operation. When the mobile phone detects that a finger presses the video recording control 1307 and lifts up at the pressed position, the mobile phone determines that recording starts. When the mobile phone detects that the finger presses and drags the video recording control 1307 to a position that is not pressed, the mobile phone determines a direction of the drag operation as the image movement direction, and moves the first region in the direction.

Example 4: Referring to FIG. 16, when the mobile phone detects a flick operation of the user on the screen (for example, on the preview image), the mobile phone starts to move the first region in a flick direction of the flick operation. When the mobile phone detects that the flick operation stops, the mobile phone stops moving the first region. That the flick operation stops may be understood as that the finger of the user flicks from a point A to a point B and stays at the point B, or the finger of the user flicks from a point A to a point B and then lifts up. It should be understood that the direction control 1311 may not be displayed on the viewfinder interface in this case.

Example 5: The user enters the image movement direction by using a voice instruction. The user may tap any position on the viewfinder interface or may use a voice instruction to indicate to stop a movement. It should be understood that the direction control 1311 may not be displayed on the viewfinder interface in this case.

When the method provided in this embodiment of this application is applied to a device such as a notebook computer, the image movement direction may be further entered by using a keyboard, a touchpad, or the like.

The accelerated movement instruction or the decelerated movement instruction mentioned above may be obtained in the following manner.

For example, referring to FIG. 16, an identifier 1320 used to indicate a movement speed is displayed on the viewfinder interface. The movement speed herein may be understood as a position change amount of a preview image on an image. A default value of the identifier 1320 is 1×. Herein, 1× may be understood as one time of L. In other words, when the identifier 1320 is 1×, the mobile phone may perform processing in the foregoing manner in which A=B=C=L. When the user taps the identifier 1320, a speed adjustment bar 1321 is displayed. For example, a largest speed provided by the speed adjustment bar 1321 in FIG. 16 is 3×, and a smallest speed is 0.5×. This is not limited in this embodiment of this application. It can be understood that 1×, 2×, 3×, and the like may be understood as a multiple of L, to be specific, 3× is three times L, and 2× is two times L. The user selects a speed by performing a flick operation on the speed adjustment bar 1321. Assuming that the user selects the speed 2×, the identifier 1320 displays "2×", and the mobile phone may perform processing in the manner in which i=j=2 in the manner (the frame extraction manner) shown in FIG. 19A, to achieve an effect that a position of a preview image on an image moves by 2L each time. Assuming that the user selects the speed 0.5L, the mobile phone may perform processing in the manner in which P=Q=1 in the manner (the frame insertion manner) shown in FIG. 19C, to achieve an effect that a position of a preview image on an image moves by 0.5L each time.

It can be understood that the mobile phone may alternatively set a speed in another manner, for example, by using a volume button. For example, if the mobile phone detects that a volume-up button is triggered, the speed increases: or if the mobile phone detects that a volume-down button is triggered, the speed decreases. It should be noted that a form of setting a movement speed by the mobile phone is not limited in this embodiment of this application. For example, it is also feasible to provide three speed level options, namely, a low speed, a medium speed, and a high speed, on the viewfinder interface for the user to select.

Figure 20A:
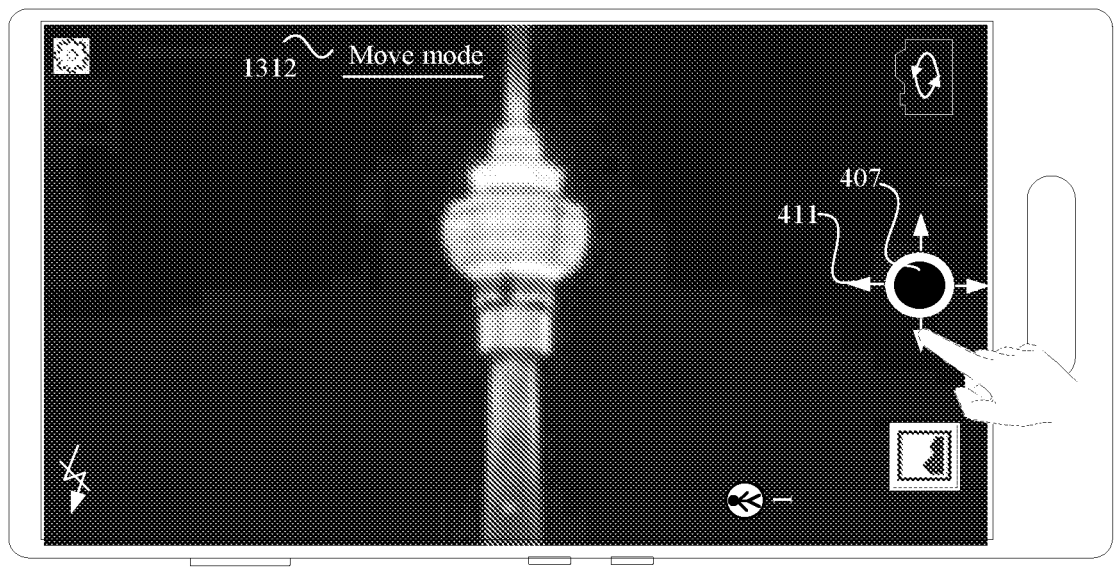
FIG. 20(*a*) to FIG. 20(*c*) and FIG. 21 to FIG. 24 are schematic diagrams of a graphical user interface of an electronic device according to an embodiment of this application.
Figure 20B:
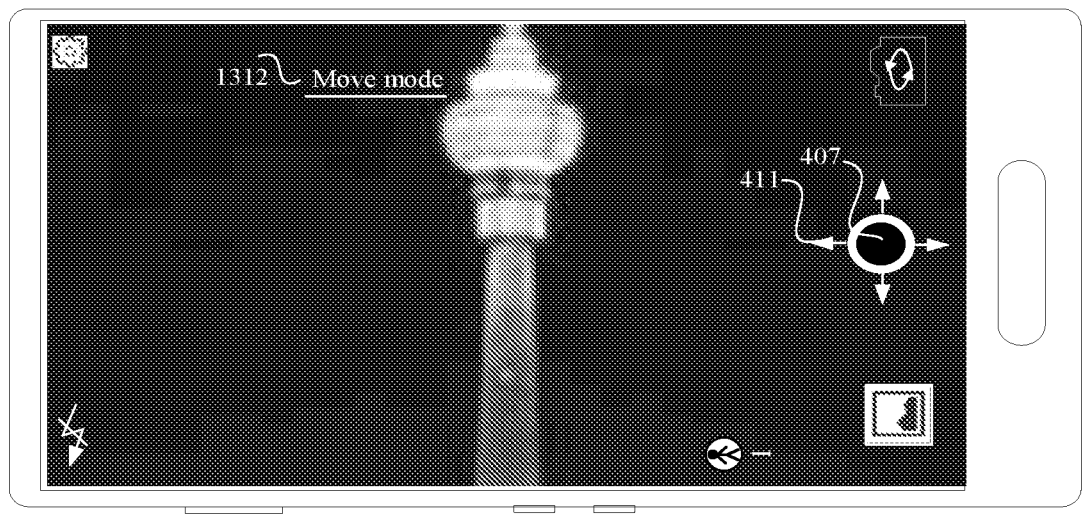
Figure 20C:
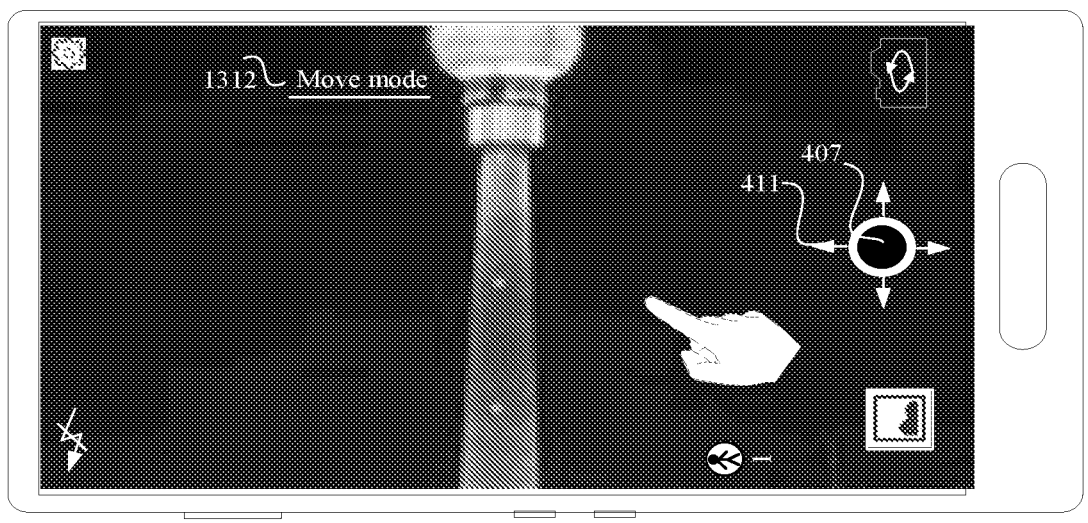

For example. FIG. 20(a) to FIG. 20(c) are a schematic diagram of an effect of a viewfinder interface displayed when a mobile phone is in a move mode according to an embodiment of this application. As shown in FIG. 20(a), a preview image 1 is displayed on the viewfinder interface. The mobile phone remains stationary. When the mobile phone detects an operation of tapping a down arrow, the mobile phone updates the preview image 1 to a preview image 2. Referring to FIG. 20(b), a scene included in the preview image 2 is located below a scene in the preview image 1. This is equivalent to downward movement shooting by the mobile phone. The mobile phone continues to update the preview image 2 to a preview image 3. Referring to FIG. 20(c), a scene included in the preview image 3 is located below the scene in the preview image 2. This is equivalent to downward movement shooting by the mobile phone. Assuming that the mobile phone detects that the user taps any position on the screen, the movement ends. It can be learned from FIG. 20(a) to FIG. 20(c) that a scene in a preview image gradually moves downward in a process in which the mobile phone remains stationary. This achieves a shooting effect of moving a lens downward.

Embodiment 2

Figure 21:
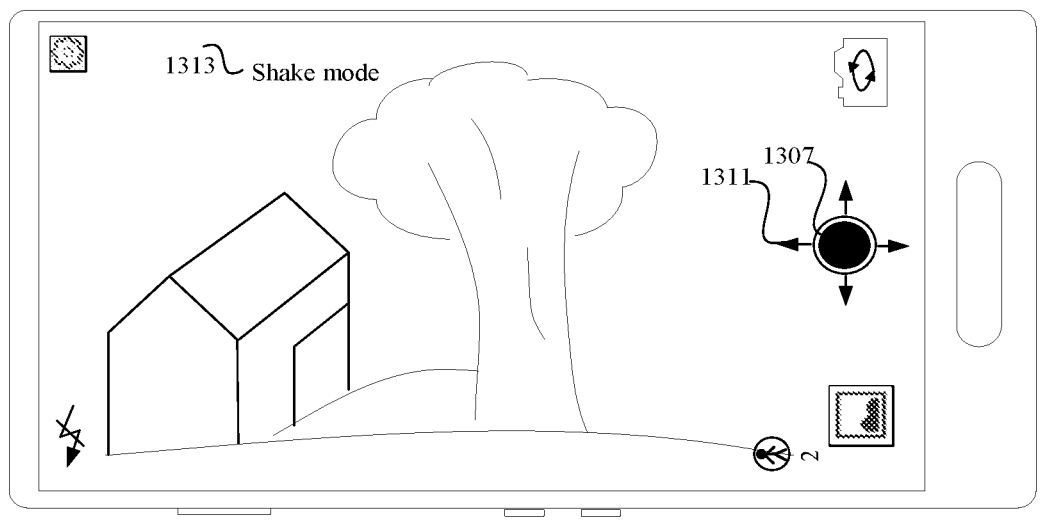

For example, FIG. 21 is a schematic diagram of a GUI displayed when the mobile phone enters the shake mode. To help the user determine a current mode, when the mobile phone enters the shake mode, the mobile phone may display prompt information 1313 on the viewfinder interface. The prompt information 1313 is used to indicate that the mobile phone is currently in the shake mode. Certainly, when the mobile phone switches from the common video recording mode to the shake mode, the mobile phone may also output another prompt, for example, a vibration feedback. The prompt information 1313 may be displayed in a manner in which a preview image is not blocked as much as possible, for example, a translucent manner or a transparent manner. The GUI may further include the direction control 1311. The user may enter an image movement direction by using the direction control 1311.

FIG. 21 is used as an example to describe how to record a video in the shake mode.

For a process in which the mobile phone switches from the common video recording mode to the shake mode, refer to the switching from the common video recording mode to the move mode. Details are not described herein again. In the shake mode, the mobile phone may achieve a shooting effect of "shaking a lens" by using the image movement direction entered by the user. For a manner in which the user enters the image movement direction and a manner in which the user enters a movement stop instruction, refer to the foregoing descriptions. Details are not described again.

Different from the move mode, in the shake mode, after determining a target region on an image, the mobile phone performs angle of view conversion on an image block in the target region, and then updates a preview image by using an image block obtained after the angle of view conversion. FIG. 16 is used as an example. When the mobile phone detects an image rightward shake instruction, the mobile phone determines an $m^{th}$ region on an $m^{th}$ frame of image and performs angle of view conversion on an image block in the $m^{th}$ region: the mobile phone determines an $(m+1)^{th}$ region on an $(m+1)^{th}$ frame of image and performs time conversion on an image block in the $(m+1)^{th}$ region; and so on. Therefore, after the mobile phone detects the image rightward shake instruction, the mobile phone sequentially updates preview images to an image block in the $m^{th}$ region that is obtained after the angle of view conversion, an image block in the $(m+1)^{th}$ region that is obtained after the angle of view conversion, and the like.

It should be noted that the foregoing plurality of implementations in the move mode such as the frame extraction manner and frame insertion manner are also applicable to the shake mode. Details are not described herein again.

For a process of performing angle of view conversion on an image block, refer to the foregoing descriptions. If the foregoing angle of view conversion process is used, a rotation angle θ may be determined in a plurality of manners. For example, the rotation angle θ is preset, for example, is a preset fixed value. Alternatively, if the user enters the image movement direction by performing a flick operation on the screen, the rotation angle is related to the flick operation. For example, the mobile phone stores a correspondence between a flick distance W of the flick operation and the rotation angle θ. When the mobile phone detects a flick operation of the user on the screen, the mobile phone determines a flick distance W of the flick operation, and determines a corresponding rotation angle θ based on the distance W and the correspondence. For example, a farther flick distance W of the flick operation indicates a larger rotation angle. Alternatively, the rotation angle θ may be related to a display value of the identifier 1320. Assuming that the identifier 1320 displays "2", the rotation angle θ is two times a preset angle. A value of the preset angle is not limited in this application.

Embodiment 3

Figure 22:
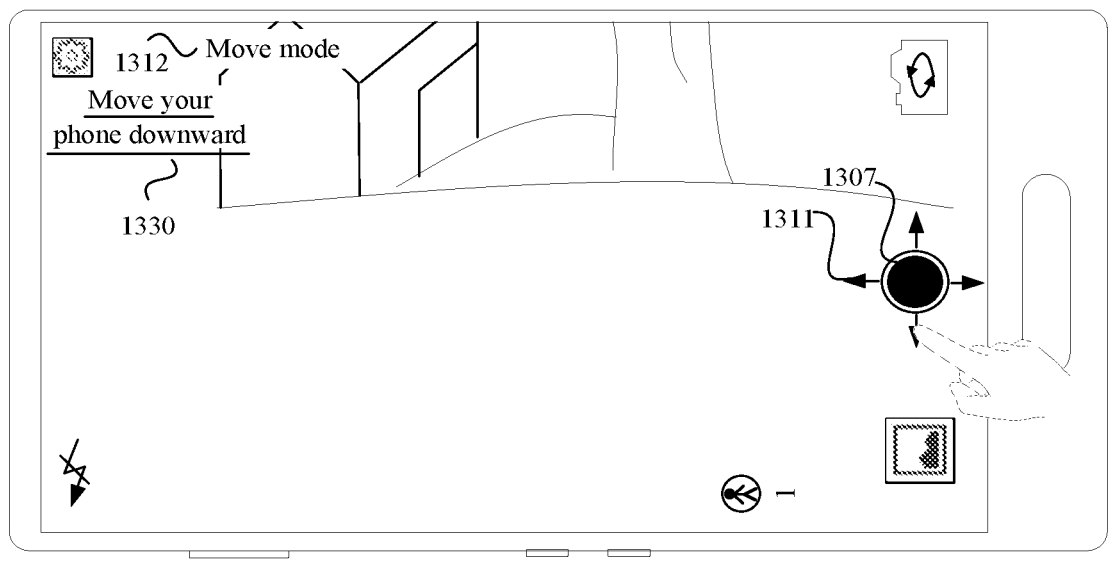

In some embodiments, a size of an image captured by the ultra-wide-angle camera is limited. When a first region is translated to an edge of the image captured by the ultra-wide-angle camera, the mobile phone outputs prompt information, to prompt the user to move the position of the mobile phone. The move mode is used as an example. Referring to FIG. 22, when the mobile phone detects that the user continuously presses the down arrow, a position of a preview image on an image gradually moves downward. When the position of the preview image on the image moves to the edge of the image captured by the ultra-wide-angle camera, the mobile phone may output prompt information 1330, to prompt the user to manually move the mobile phone downward, or the mobile phone may output prompt information used to prompt the user that the mobile phone cannot continue to move.

It should be understood that video recording starts when the mobile phone detects an operation on the recording control 1307. After starting the recording, the user may also indicate to enter the move mode or the shake mode, and then enter an image movement direction. The mobile phone translates, in the direction, a position of a target region on the image captured by the ultra-wide-angle camera, and continuously updates a preview image based on an image block in the target region. The mobile phone stores preview images; and when the mobile phone detects an operation on the recording control for stopping, the mobile phone synthesizes the stored preview images into a video and stores the video.

Figure 23:
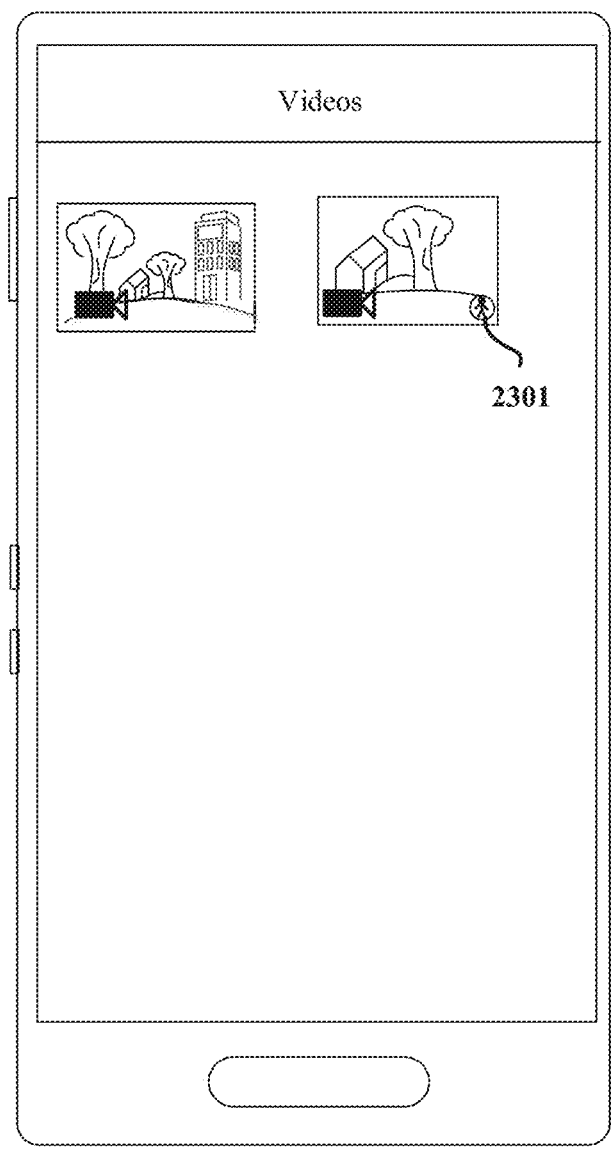

In some embodiments, after performing video recording in the shake mode or the move mode, the mobile phone may correspondingly store two videos. One video is a complete video, to be specific, each frame of image in the video is a complete image captured by the ultra-wide-angle camera. The other video is a video recorded in the move mode or the shake mode, to be specific, each frame of image in the video is an image block on an image captured by the ultra-wide-angle camera. For example, referring to FIG. 23, two videos are stored in a video folder in an album of the mobile phone, where one video is a complete video, and the other video is a video recorded in the move mode or the shake mode. An identifier 2301 may be displayed on the video recorded in the move mode or the shake mode, to facilitate distinguishing by the user.

Embodiment 4

In some other embodiments, the mobile phone may further provide an image rotate mode. In this mode, an image rotation shooting effect may also be achieved when the user does not need to manually rotate the mobile phone (for example, the mobile phone remains stationary).

Figure 24:
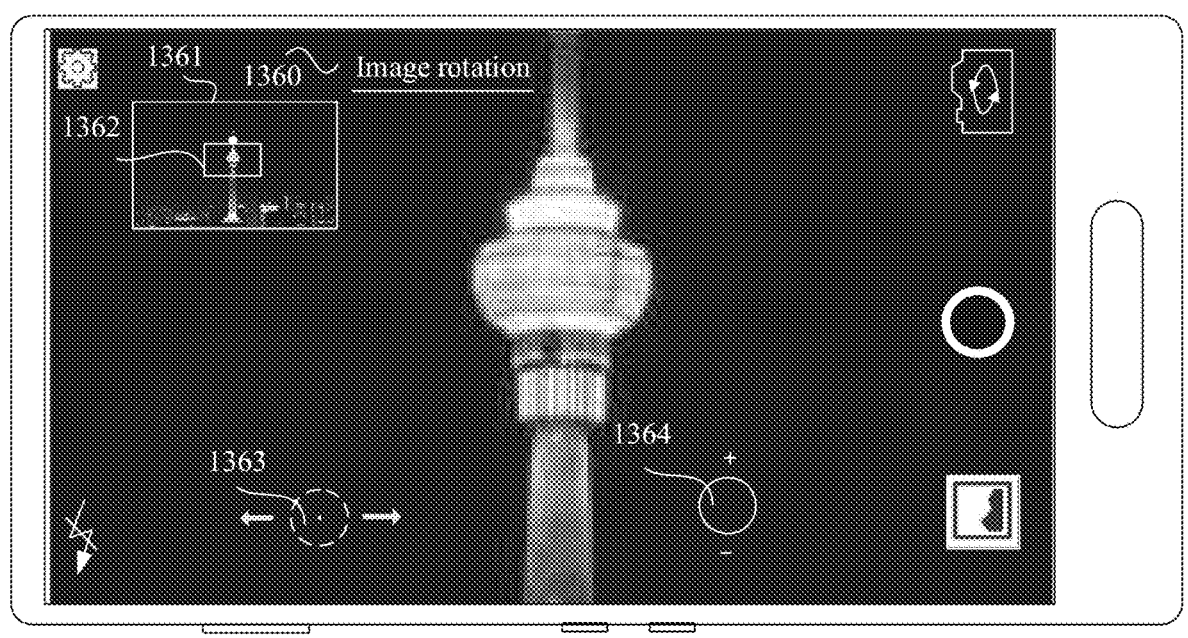

For example, when the mobile phone is in the move mode or the shake mode, if the mobile phone detects a preset operation on a preview image (for example, a double-tap operation or a touch and hold operation on the preview image), the mobile phone enters the image rotate mode. FIG. 24 is a schematic diagram of a viewfinder interface in the image rotate mode. The viewfinder interface includes indication information 1360 used to indicate that the mobile phone is currently in the image rotate mode. Optionally, the prompt information 1360 may not be displayed. The viewfinder interface further includes a preview box 1361, and an image captured by the ultra-wide-angle camera (for example, a complete image captured by the ultra-wide-angle camera) is displayed on the preview box 1361. A target box 1362 is displayed in the preview box 1361, and an image block in the target box 1362 is a current preview image. The viewfinder interface further includes an icon 1363 used to indicate a rotation progress and an icon 1364 used to set a rotation speed.

Figure 25:
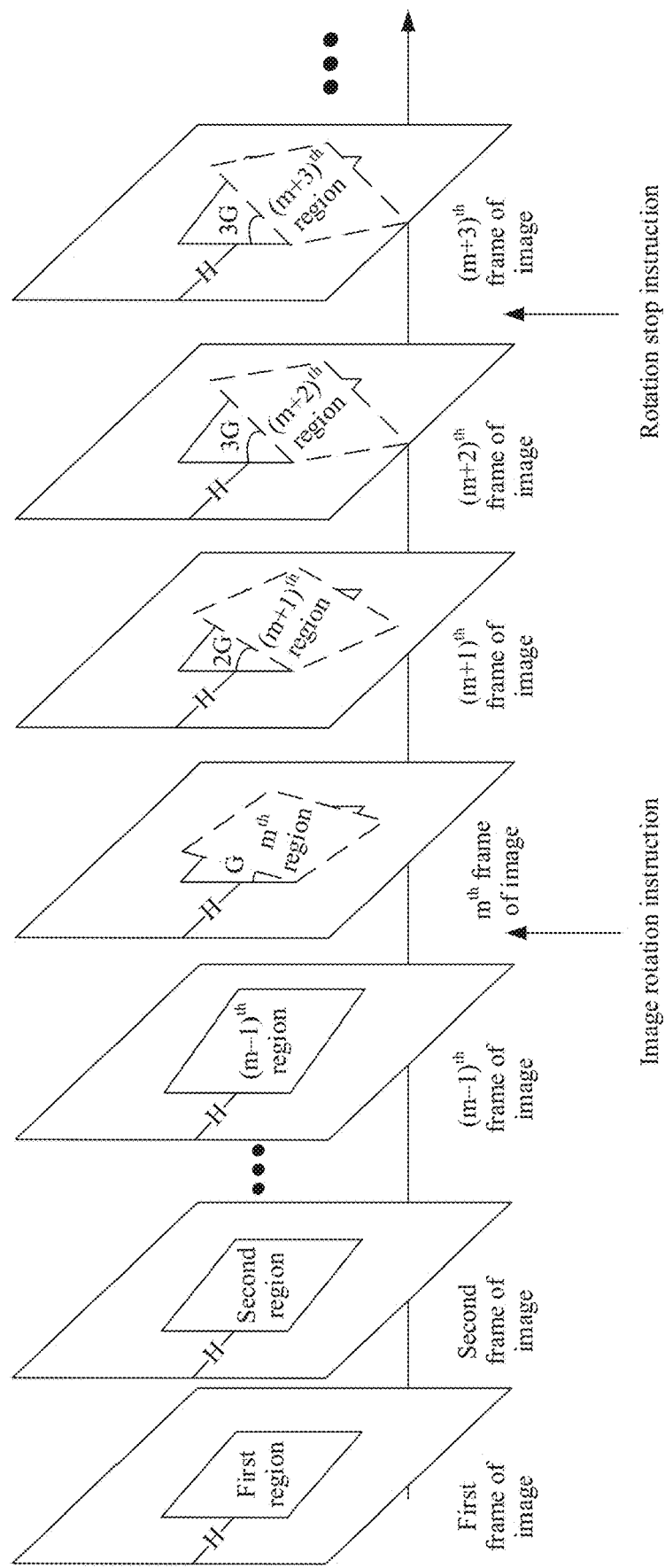
FIG. 25 is a schematic diagram of rotating a target region on an image captured by an ultra-wide-angle camera according to an embodiment of this application.

For example, referring to FIG. 25, assuming that the mobile phone detects an image clockwise rotation instruction before a preview image is updated to an $m^{th}$ frame of image, the mobile phone determines a target region on the $m^{th}$ frame of image, that is, an $m^{th}$ region, and rotates an image block in the $m^{th}$ region clockwise by an angle G; the mobile phone determines an $(m+1)^{th}$ region on an $(m+1)^{th}$ frame of image, where a position of the $(m+1)^{th}$ region remains unchanged relative to that of the $m^{th}$ region; and rotates an image block in the $(m+1)^{th}$ region clockwise by an angle 2G; and so on. Therefore, after the mobile phone detects the image clockwise rotation instruction, preview images are sequentially updated to an image block in the $m^{th}$ region that is obtained after the clockwise rotation by an angle G, an image block in the $(m+1)^{th}$ region that is obtained after the clockwise rotation by an angle 2G, an image block in an $(m+2)^{th}$ region that is obtained after clockwise rotation by an angle 3G, and the like. Therefore, a preview image gradually rotates clockwise, and all updated preview images rotate by a same angle, to be specific, rotate at a constant speed.

Assuming that a rotation stop instruction is detected before a preview image is updated to an $(m+3)^{th}$ frame of image, the mobile phone determines an $(m+3)^{th}$ region on the $(m+3)^{th}$ frame of image, where a position of the $(m+3)^{th}$ region remains unchanged relative to that of the $(m+2)^{th}$ region; and rotates an image block in the $(m+3)^{th}$ region clockwise by an angle 3G, where the rotation angle of the image block in the $(m+3)^{th}$ region remains unchanged relative to that of the image block in the $(m+2)^{th}$ region. In this case, the rotations stops.

It can be understood that, in the embodiment shown in FIG. 25, rotation angles of two adjacent frames of images are the same and each are an angle G. However, rotation angles of two adjacent frames may alternatively be different. For example, the rotation angle of the image block in the $m^{th}$ region is G, and the rotation angle of the image block in the $(m+1)^{th}$ region is 3G. In this case, a preview image rotates at an accelerated speed. Alternatively, the rotation angle of the image block in the $m^{th}$ region is G, and the rotation angle of the image block in the $(m+1)^{th}$ region is 0.5G. In this case, a preview image rotates at a decelerated speed.

It should be noted that the foregoing frame extraction updating manner or frame insertion updating manner is also applicable to this embodiment. For example, the accelerated rotation may be implemented through frame extraction, and the decelerated rotation may be implemented through frame insertion. For example, referring to FIG. 24, it is assumed that the user expects to increase a rotation angle when the mobile phone detects an operation above "+" on the icon 1364. In this case, the mobile phone may implement the accelerated rotation through frame extraction. This is similar to the manner of extracting one frame every other frame in the embodiment shown in FIG. 19A This achieves an effect that each updated preview image rotates by an angle 2G. It is assumed that the user expects to decrease a rotation angle when the mobile phone detects an operation on "−" below the icon 1364. In this case, the mobile phone may implement the decelerated rotation through frame insertion. This is similar to the manner of inserting one frame every other frame in the embodiment shown in FIG. 10B. This achieves an effect that each updated preview image rotates by an angle 0.5G.

The foregoing mentions that there may be a plurality of manners in which the mobile phone detects an instruction used to indicate an image rotation direction. For example, referring to FIG. 24, when the mobile phone detects an operation on the icon 1363, clockwise or counterclockwise rotation starts by default, which may be voluntarily set by the user. For another example, a left arrow and a right arrow are displayed at the icon 1363. When the mobile phone detects that the user taps the left arrow, the counterclockwise rotation starts. When the mobile phone detects that the user taps the right arrow, the clockwise rotation starts.

For example, rotation starts after the mobile phone detects an operation of tapping the icon 1363, and the rotation automatically stops when preset rotation duration (for example, 5 s) is reached. The mobile phone may store a video obtained by synthesizing preview images displayed in a period from the beginning to the end of the rotation.

Alternatively, rotation starts after the mobile phone detects an operation of tapping the icon 1363, and the rotation continues until 360-degree rotation is completed.

Alternatively, rotation starts after the mobile phone detects an operation of tapping the icon 1363, and the rotation continues until the user enters a rotation stop instruction. For example, the rotation stops when the mobile phone detects a tap operation of the user at any position on the preview interface, or the rotation stops when the mobile phone detects an operation of tapping the icon 1363 again.

Alternatively, rotation starts when the mobile phone detects an operation of touching and holding the icon 1363 (when duration of pressing the icon 1363 is greater than preset duration), and the rotation stops when the mobile phone detects an uplift after the touch and hold operation.

It can be understood that image rotation may be performed before video recording starts (for example, before a video recording control used to indicate to start video recording is tapped), or may be performed after video recording starts (for example, after a video recording control used to indicate to start video recording is tapped).

Figure 26:
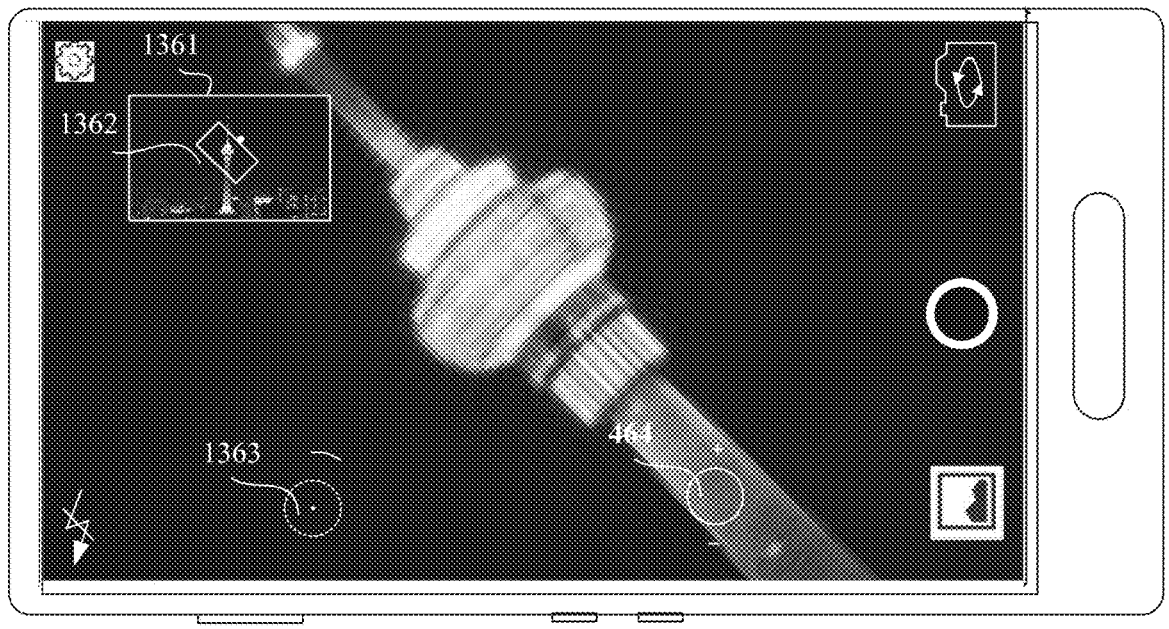
FIG. 26 and FIG. 27 are schematic diagrams of a graphical user interface of an electronic device according to an embodiment of this application.

For example, FIG. 26 is a schematic diagram of an image counterclockwise rotation. In a process in which a preview image rotates counterclockwise, the target box 1362 on the viewfinder interface may also synchronously rotate, to notify the user of an approximate rotation angle of a current preview image. A current rotation progress may also be displayed on the icon 1363. A rotation direction of the target box 1362 may be the same as or different from a rotation direction of a preview image. This is not limited in this embodiment of this application.

Embodiment 5

In some other embodiments, the mobile phone may further provide the push-pull mode. In the push-pull mode, the mobile phone can achieve a shooting effect of "pushing a lens" or "pulling a lens". Herein, "pushing a lens" may be understood as that a camera approaches an object, to be specific, an object on a viewfinder interface is magnified. This helps focus on object details. In addition, "pulling a lens" may be understood as that a camera moves away from an object, to be specific, an object on a viewfinder interface is de-magnified. This helps panoptic shooting.

For example, when the mobile phone is in the image rotate mode, the move mode, or the shake mode, if the mobile phone detects a preset operation on a preview image (for example, a double-tap operation or a touch and hold operation on the preview image), the mobile phone enters the push-pull mode. The embodiments of this application provide a plurality of modes including the common video recording mode, the shake mode, the move mode, the image rotate mode, and the push-pull mode. In some embodiments, when the mobile phone detects a double-tap operation of the user on a preview image, cyclic switching between different modes is implemented.

Figure 27:
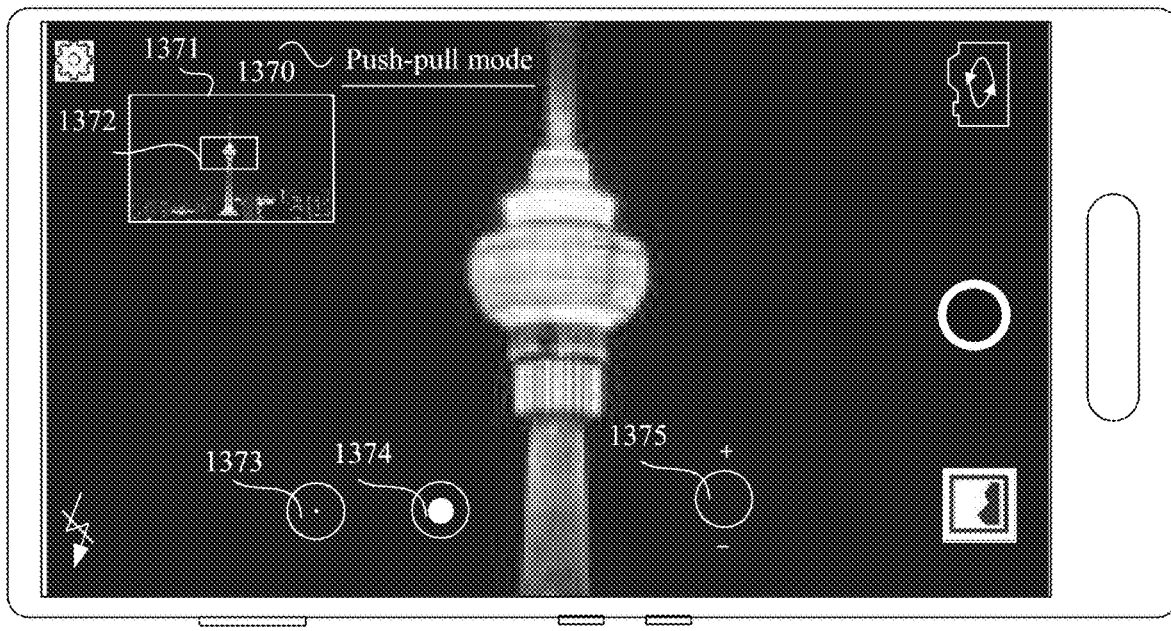

FIG. 27 is a schematic diagram of a viewfinder interface in the push-pull mode. The viewfinder interface includes indication information 1370 used to indicate that the mobile phone is currently in the push-pull mode. Optionally, the prompt information 1370 may not be displayed. The viewfinder interface further includes a preview box 1371, and an image captured by the ultra-wide-angle camera is displayed in the preview box 1371. A target box 1372 is displayed in the preview box 1371, and an image block in the target box 1372 is a current preview image. The viewfinder interface further includes an icon 1373 used to indicate to pull a lens, an icon 1374 used to indicate to push a lens, and an icon 1375 used to set a push-pull speed.

An example of pulling a lens is used in the following embodiment to describe a shooting process of pulling a lens when the mobile phone remains stationary.

Figure 28:
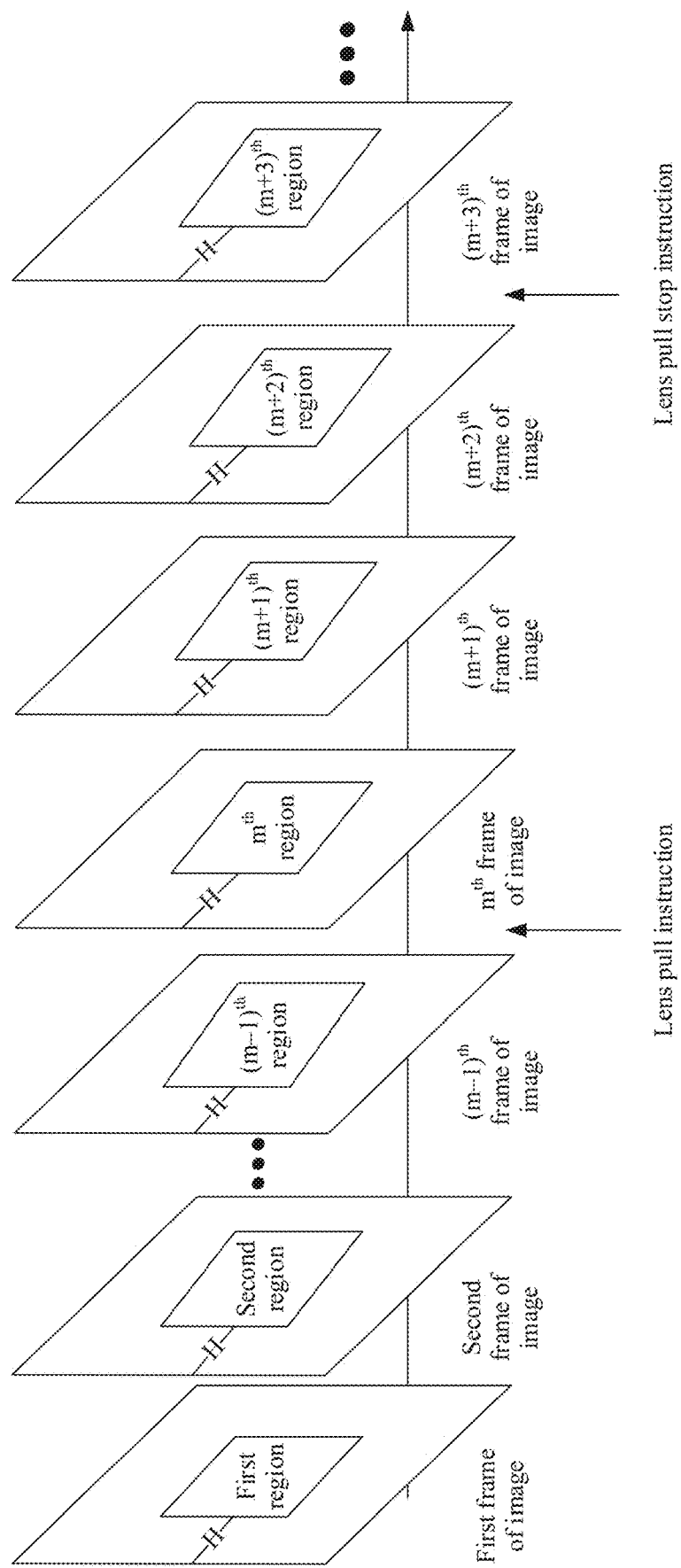
FIG. 28 is a schematic diagram of magnifying a target region on an image captured by an ultra-wide-angle camera according to an embodiment of this application.

For example, referring to FIG. 28, assuming that the mobile phone detects a lens pull instruction before a preview image is updated to an $m^{th}$ frame of image, the mobile phone determines a target region on the $m^{th}$ frame of image, that is, an $m^{th}$ region, where an area of the $m^{th}$ region is greater than an area of the $(m-1)^{th}$ region; the mobile phone determines an $(m+1)^{th}$ region on an $(m+1)^{th}$ frame of image, where an area of the $(m+1)^{th}$ region is greater than the area of the $(m+1)^{th}$ region; and so on. Therefore, after the mobile phone detects the lens pull instruction, preview images are sequentially updated to an image block in the $m^{th}$ region, an image block in the $(m+1)^{th}$ region, an image block in an $(m+2)^{th}$ region, and the like. In this way, an area occupied by a preview image on an image gradually increases, and an angle of view range of the preview image becomes larger. This achieves a shooting effect that a camera gradually moves away from an object.

Assuming that a lens pull stop instruction is detected before a preview image is updated to an $(m+3)^{th}$ frame of image, the mobile phone determines an $(m+3)^{th}$ region on the $(m+3)^{th}$ frame of image, where an area of the $(m+3)^{th}$ region remains unchanged relative to that of the $(m+2)^{th}$ region. In this case, the lens pull stops. Therefore, after the mobile phone detects a lens pull stop instruction, an area occupied by a preview image does not increase, and the camera does not move away from an object visually.

It can be understood that, in the embodiment shown in FIG. 28, area change amounts of target regions on two adjacent frames of images may be the same or different. Assuming that area increase amounts of target regions on two adjacent frames of images are the same, in other words, an area of a target region increases at a constant speed, a shooting effect that a camera moves away from an object at a constant speed is achieved. Assuming that the area of the $(m+1)^{th}$ region is S greater than the area of the $m^{th}$ region and the area of the $(m+2)^{th}$ region is 2 S greater than the area of the $(m+1)^{th}$ region, in other words, an area of a target region increases at an accelerated speed, a shooting effect that a preview image moves away from an object at an accelerated speed is achieved. Assuming that the area of the $(m+1)^{th}$ region is S greater than the area of the m region and the area of the $(m+2)^{th}$ region is 0.5 S greater than the area of the $(m+1)^{th}$ region, in other words, an area of a target region increases at a decelerated speed, a shooting effect that a preview image moves away from an object at a decelerated speed (slowly) is achieved.

It should be noted that the foregoing frame extraction updating manner or frame insertion updating manner is also applicable to this embodiment to achieve different effects. Details are not described herein again.

The mobile phone obtains the lens pull instruction in a plurality of manners, including but not limited to the following manners.

For example, the area of the target region starts to increase after the mobile phone detects an operation of tapping the icon 1373, and the increase automatically stops when preset duration (for example, 5 s) is reached. The mobile phone may store a video obtained by synthesizing preview images displayed in a period from the beginning to the end of the increase.

Alternatively, the area of the target region starts to increase after the mobile phone detects an operation of tapping the icon 1373, and the increase continues until the area of the target region is equal to an area of a complete image captured by the ultra-wide-angle camera.

Alternatively, the area of the target region starts to increase after the mobile phone detects an operation of tapping the icon 1373, and the increase continues until it is detected that the user enters an increase stop instruction. For example, the increase stops when the mobile phone detects a tap operation of the user at any position on the preview interface, or the increase stops when the mobile phone detects an operation of tapping the icon 473 again.

Alternatively, the area of the target region starts to increase when the mobile phone detects an operation of touching and holding the icon 1373 (when duration of pressing the icon 1373 is greater than preset duration), and the increase stops when the mobile phone detects an uplift after the touch and hold operation.

Figure 29:
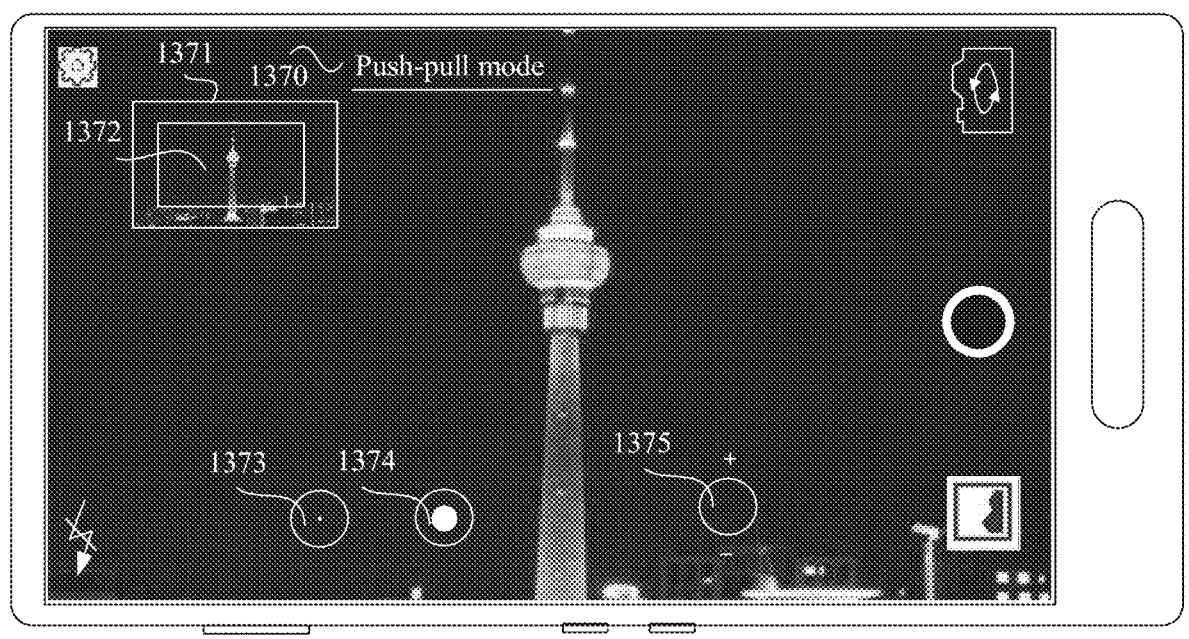
FIG. 29 is a schematic diagram of a graphical user interface of an electronic device according to an embodiment of this application.

FIG. 29 is used as an example. When the mobile phone detects that the user taps the icon 1373 used to indicate to pull a lens, an area of a target region on an image starts to increase. Correspondingly, a preview image is gradually updated to an image block in a larger target region. This achieves a shooting effect that an object gradually moves away from a camera. Still referring to FIG. 29, an area of the target box 1372 on the viewfinder interface may be synchronously increased, to notify the user of an approximate proportion of a current preview image to a complete image.

It should be noted that an example of pulling a lens is used above, and a similar manner may be used for pushing a lens. For example, when the mobile phone detects a lens push instruction, the mobile phone may determine a target region in a manner similar to that shown in FIG. 28. A difference lies in that an area of a target region on a next frame of image is smaller than an area of a target region on a previous frame of image, so that preview image magnification is implemented. When the mobile phone detects a lens push stop instruction, the area of the target region stops decreasing, so that the preview image magnification stops.

In some embodiments, after obtaining a video through recording in the move mode, the shake mode, or the image rotate mode, the mobile phone may automatically make music for the video. For example, the mobile phone makes music for the video by using a selected sound. The sound may be a sound selected in advance by the user from a plurality of sounds provided by the camera application. The sound herein may include a song clip, a ringtone, another sound, or the like. This is not limited in this embodiment of this application.

It should be noted that the implementations of this application may be randomly combined to achieve different technical effects. For example, in a process in which a preview image rotates clockwise, the preview image is gradually de-magnified or magnified; or when a position of a preview image on an image gradually moves leftward, the preview image is gradually magnified. This is not limited in this embodiment of this application.

Figure 30:
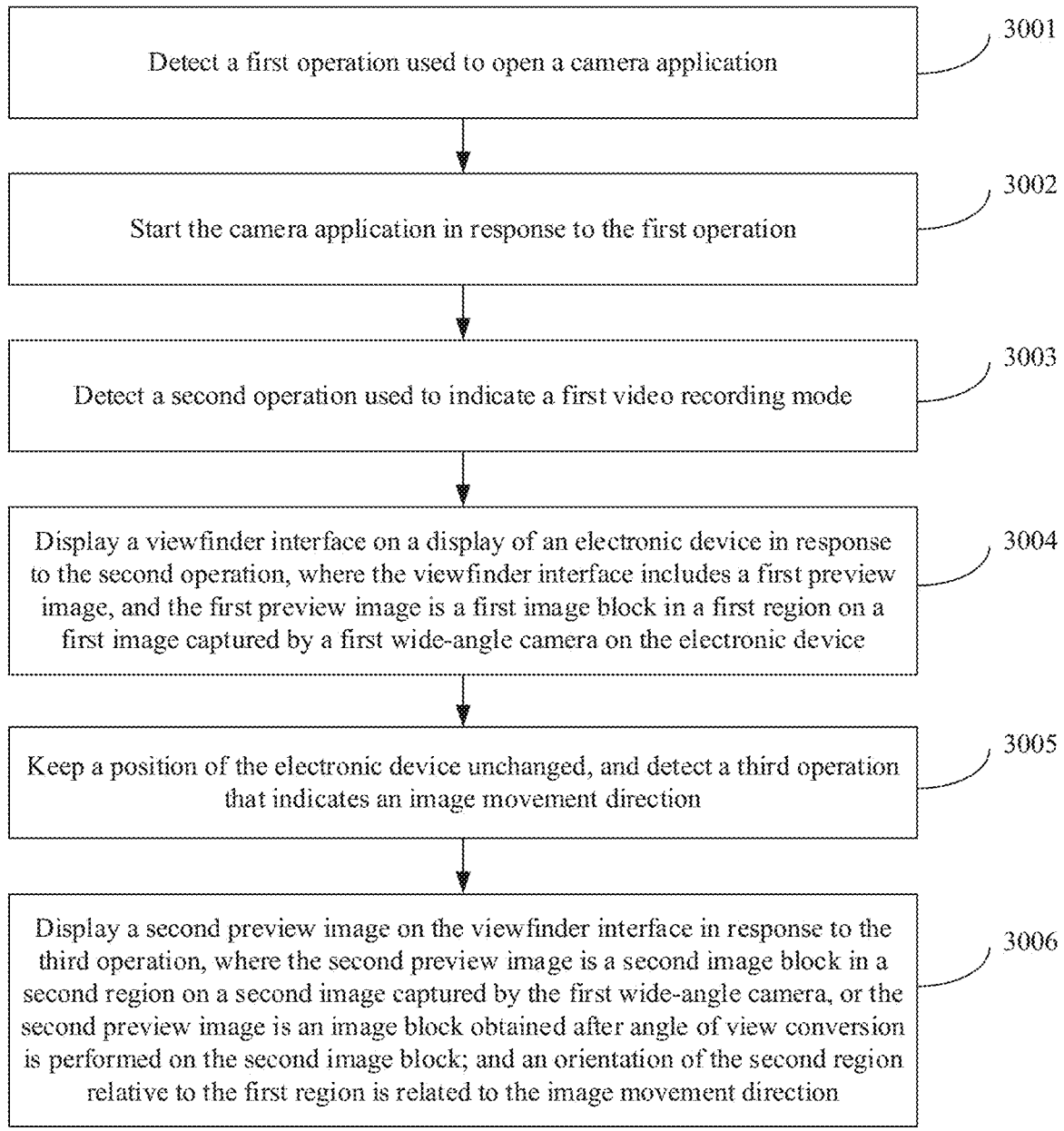
FIG. 30 and FIG. 31 are schematic flowcharts of a method for displaying a preview image in a video recording scenario according to embodiments of this application.

With reference to the foregoing embodiments and the related accompanying drawings, an embodiment of this application provides a method for displaying a preview image in a video recording scenario. The method may be implemented by the electronic device (for example, a mobile phone or a tablet computer) shown in FIG. 2. As shown in FIG. 30, the method may include the following steps.

3001: Detect a first operation used to open a camera application.

FIG. 13(*a*) is used as an example. The first operation is, for example, an operation that the user taps the icon 402.

3002: Start the camera application in response to the first operation.

3003: Detect a second operation used to indicate a first video recording mode.

In this embodiment of this application, the electronic device may provide a plurality of recording modes, for example, a common video recording mode and the first video recording mode (for example, including a move mode and a shake mode). The electronic device may enter a mode under a user instruction. FIG. 14(*a*) is used as an example. The electronic device displays the viewfinder interface in the common video recording mode, and the electronic device displays the selection box 1309 after detecting an operation of tapping the control 408 used to indicate a camera movement mode. The second operation may be an operation of tapping the option "Shake mode" or "Move mode" in the selection box 1309. Assuming that the second operation is an operation of tapping the option "Move mode" in the selection box 1309, the electronic device enters the move mode.

3004: Display a viewfinder interface on a display of the electronic device in response to the second operation, where the viewfinder interface includes a first preview image, and the first preview image is a first image block in a first region on a first image captured by a first wide-angle camera on the electronic device.

FIG. 14(*b*) is still used as an example. When the electronic device detects the second operation (an operation of tapping the option "Move mode" in the selection box 1309), the electronic device enters the move mode, and displays the first preview image on the viewfinder interface, where the first preview image is the first image block in the first region on the first image captured by the first wide-angle camera (for example, an ultra-wide-angle camera). For example, the first image is the image shown in FIG. 17, and the first preview image is an image block in the first region on the first image.

It can be understood that the electronic device uses a second wide-angle camera in the common video recording mode. When detecting the second operation used to indicate the first video recording mode (for example, the move mode), the electronic device starts the first wide-angle camera. An angle of view of the second wide-angle camera is less than an angle of view of the first wide-angle camera. The first wide-angle camera is, for example, an ultra-wide-angle camera, and the second wide-angle camera is, for example, a common wide-angle camera. In other words, after the electronic device switches from the common video recording mode to the move mode, the electronic device switches from the common wide-angle camera to the ultra-wide-angle camera, and the first preview image is the first image block in the first region on the first image captured by the ultra-wide-angle camera. It can be understood that the first image may be a first frame of image captured by the ultra-wide-angle camera after the electronic device switches from the common video recording mode to the first video recording mode and starts the ultra-wide-angle camera.

3005: Keep a position of the electronic device unchanged, and detect a third operation that indicates an image movement direction.

The third operation may be implemented in a plurality of manners. FIG. 16 is used as an example. The third operation may be an operation that the user taps an arrow (for example, the right arrow) on the direction control 1311, and a direction indicated by the arrow is the image movement direction. Alternatively, the third operation may be an operation that the user presses an arrow in press duration that reaches preset duration, and a direction indicated by the arrow is the image movement direction. Alternatively, the third operation is an operation that the user presses and drags (or flicks) the video recording control 1307 in a direction, and the drag direction is the image movement direction. Alternatively, the third operation is a flick operation of the user on a screen (for example, a preview image), and a flick direction of the flick operation is the image movement direction. Alternatively, when the method provided in this embodiment of this application is applied to a device such as a notebook computer, the third operation may be an operation of entering the image movement direction by using a keyboard, a touchpad, or the like.

3006: Display a second preview image on the viewfinder interface in response to the third operation, where the second preview image is a second image block in a second region on a second image captured by the first wide-angle camera, or the second preview image is an image block obtained after angle of view conversion is performed on the second image block; and an orientation of the second region relative to the first region is related to the image movement direction.

It should be noted that the first image may be a first frame of image captured by the ultra-wide-angle camera after the electronic device switches from the common video recording mode to the first video recording mode and starts the ultra-wide-angle camera. FIG. 18 is used as an example. The first preview image is the first image block in the first region on the first frame of image. It is assumed that the third operation used to indicate the image rightward movement is detected in a period from the $(m-1)^{th}$ frame of image to the $m^{th}$ frame of image. The second preview image is the $m^{th}$ image block in the $m^{th}$ region (that is, the second region) on the $m^{th}$ frame of image (that is, the second image), or the second preview image is the image block obtained after angle of view conversion is performed on the $m^{th}$ image block in the $m^{th}$ region on the $m^{th}$ frame of image. An orientation of the $m^{th}$ region (that is, the second region) relative to the first region changes.

Optionally, the orientation of the second region relative to the first region is the same as or opposite to the image movement direction. For example, if the image movement direction entered by the user is rightward and the second region is on the right of the first region, a position of a preview image on an image captured by the ultra-wide-angle camera moves rightward; or if the user enters an image rightward movement instruction and the second region is on the left of the first region, a position of a preview image on an image moves leftward. The user may voluntarily set the image movement direction entered by the user to be the same as or opposite to the movement direction in which the position of the preview image on the image captured by the ultra-wide-angle camera moves.

In the foregoing descriptions, that an orientation of the second region relative to the first region is related to the image movement direction may be understood as follows: a distance between the second region and a first edge of the second image is a second distance, a distance between the first region and a first edge of the first image is a first distance, and a distance change amount of the second distance relative to the first distance is related to the image movement direction. The first edge may be an upper edge, a lower edge, a left edge, a right edge, or the like of the image captured by the ultra-wide-angle camera. For example, if the image movement direction is leftward or rightward, the first edge may be the left edge or the right edge. If the image movement direction is upward or downward, the first edge may be the upper edge or the lower edge. FIG. 18 is used as an example. It is assumed that the first edge is the left image edge, the second distance between the second region (that is, the $m^{th}$ region) and the left edge of the second image (that is, the $m^{th}$ frame of image) is H+A, and the first distance between the first region and the left edge of the first image is H. In this case, the distance change amount of the second distance relative to the first distance is A. The distance change amount A has a plurality of cases, and is related to the image movement direction. For example, when the image movement direction is rightward and A is greater than 0, the second region moves rightward relative to the first region. When the image movement direction is leftward and A is less than 0, the second region moves leftward relative to the first region.

A third preview image after the second preview image may be a third image block in a third region on a third image captured by the ultra-wide-angle camera. FIG. 18 is still used as an example. If the second image is the $m^{th}$ frame of image, the third image may be the $(m+1)^{th}$ frame of image, and the third region is the $(m+1)^{th}$ region on the $(m+1)^{th}$ frame of image. In this case, the third preview image is the $(m+1)^{th}$ image block in the $(m+1)^{th}$ region on the $(m+1)^{th}$ frame of image. By analogy, a fourth preview image after the third preview image may be the $(m+2)^{th}$ image block in the $(m+2)^{th}$ region on the $(m+2)^{th}$ frame of image, and the like.

FIG. 18 is still used as an example. A second orientation change amount of the third region (that is, the $(m+1)^{th}$ region on the $(m+1)^{th}$ frame of image) relative to the second region (that is, the $m^{th}$ region on the $m^{th}$ frame of image) is a distance change amount of the third distance relative to the second distance. The third distance is a distance between the third region and a first edge (for example, a left image edge) of the third image, to be specific, is H+A+B; and the second distance is a distance between the second region and the first edge (for example, the left image edge) of the second image, to be specific, is H+A In this case, the second orientation change amount is B.

A first orientation change amount of the second region (that is, the $m^{th}$ region on the $m^{th}$ frame of image) relative to the first region (that is, the first region on the first frame of image) is the distance change amount of the second distance relative to the first distance. The second distance is the distance between the second region and the first edge (for example, the left image edge) of the second image, to be specific, is H+A; and the first distance is the distance between the first region and the first edge of the first image, to be specific, is H. In this case, the first orientation change amount is A.

In some embodiments, the second orientation change amount B is equal to the first orientation change amount A. In other words, orientation change amounts of preview images on images are the same. To be specific, a position of a preview image on an image moves at a constant speed. Certainly, the second orientation change amount B may be less than or greater than the first orientation change amount A, to achieve different effects. For details, refer to the foregoing descriptions. Details are not described again.

In a possible implementation, the third operation is used to indicate an image movement direction. In this possible implementation, after detecting the third operation, the electronic device is in a preview mode. In the preview mode, a position of a preview image on an image captured by the ultra-wide-angle camera changes according to the image movement direction. When detecting an operation on the video recording control 1307, the electronic device starts video recording. After the video recording starts, a position of a preview image on an image changes continuously. When a video recording stop instruction is detected, the video recording stops.

In another possible implementation, the third operation not only may be used to indicate an image movement direction, but also may be used to indicate to start video recording. FIG. 16 is used as an example. When detecting a third operation that the user taps an arrow (for example, the right arrow) on the direction control 411, the electronic device displays the second preview image, and starts video recording. When detecting an image movement stop instruction, the electronic device stops the movement and the video recording, and stores a video. The video includes the second preview image.

FIG. 18 is used as an example. When the electronic device detects the image rightward movement instruction, the electronic device displays the $m^{th}$ image block in the $m^{th}$ region on the $m^{th}$ frame of image on the viewfinder interface, and starts video recording. Then, preview images are sequentially updated to the image block in the $(m+1)^{th}$ region and the image block in the $(m+2)^{th}$ region. Until the electronic device detects the movement stop instruction, the electronic device stops the video recording and stores a video, where the video includes the $m^{th}$ image block, the $(m+1)^{th}$ image block, and the $(m+2)^{th}$ image block.

Optionally, the second image is one of M frames of images obtained through frame extraction from N frames of images captured by the first wide-angle camera, where N is an integer greater than or equal to 1, and M is an integer less than N. For a specific frame extraction process, refer to the descriptions in FIG. 10A or FIG. 19B. Details are not described herein again. Alternatively, the second image is one of M frames of images obtained through multi-frame image insertion into N frames of images captured by the first wide-angle camera, where N is an integer greater than or equal to 1, and M is an integer greater than N. For a specific frame insertion process, refer to the descriptions in FIG. 19C or FIG. 19D. Details are not described herein again.

Figure 31:
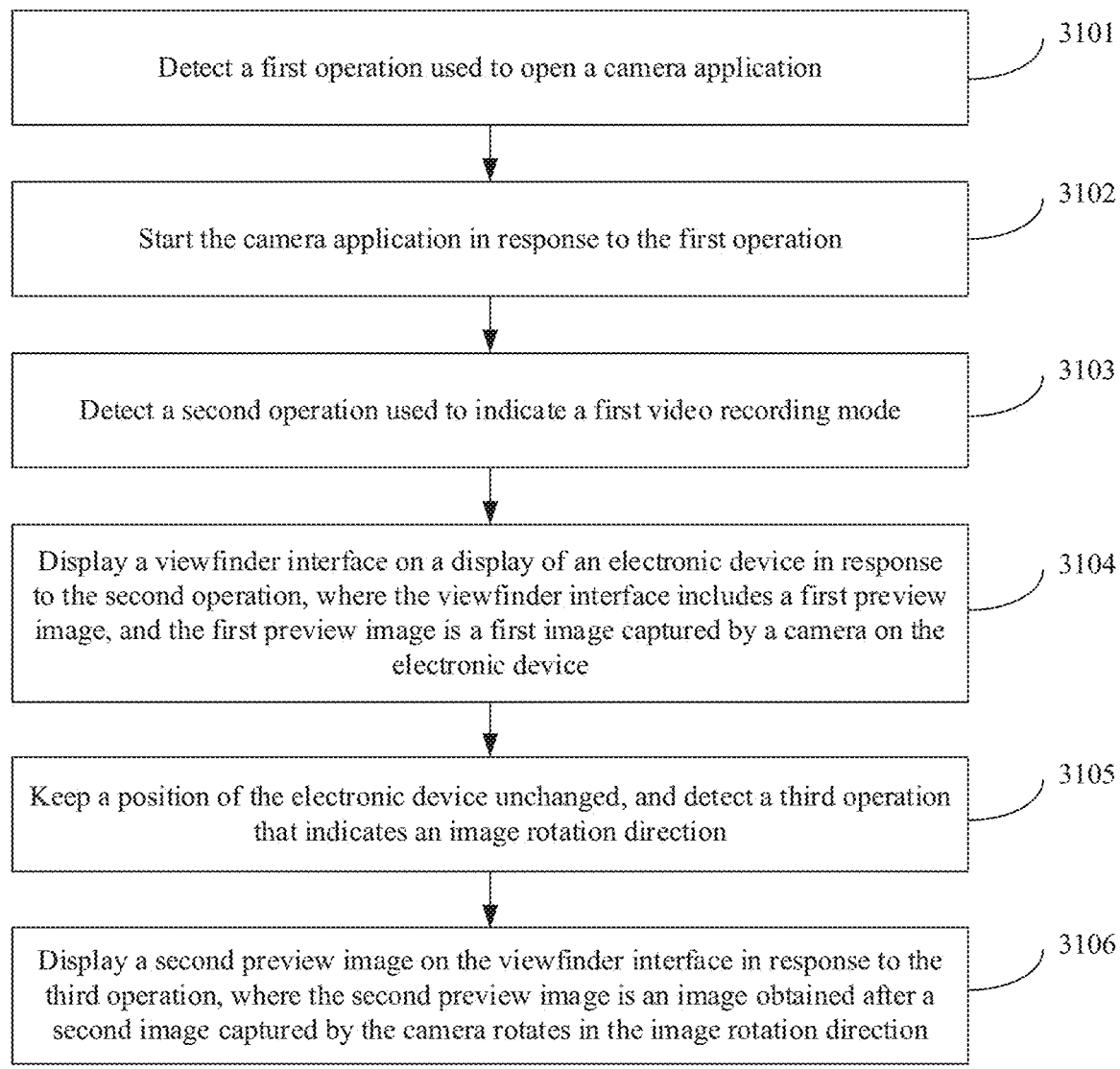

With reference to the foregoing embodiments and the related accompanying drawings, an embodiment of this application provides a method for displaying a preview image in a video recording scenario. The method may be implemented by the electronic device (for example, a mobile phone or a tablet computer) shown in FIG. 2A. As shown in FIG. 31, the method may include the following steps.

3101: Detect a first operation used to open a camera application.

3102: Start the camera application in response to the first operation.

For descriptions of step 3101 and step 3102, refer to the descriptions of step 3001 and step 3002 in FIG. 30. Details are not described herein again.

3103: Detect a second operation used to indicate a first video recording mode.

Figure 14B:
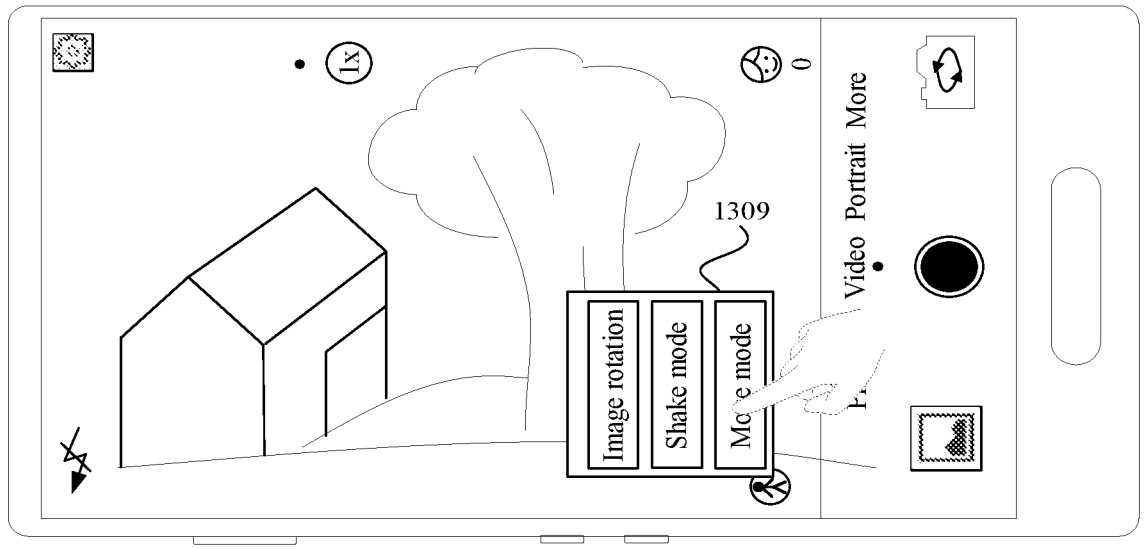

For example, the electronic device may provide a plurality of video recording modes such as a common video recording mode and an image rotation video recording mode. FIG. 16 is used as an example. The electronic device displays the viewfinder interface in the move mode, and the second operation may be an operation of double tapping the viewfinder interface, or another operation that may be used to switch to the image rotation video recording mode. FIG. 14(b) is used as an example. The second operation may be an operation of tapping an option "Image rotation" in the selection box 409.

3104: Display a viewfinder interface on a display of the electronic device in response to the second operation, where the viewfinder interface includes a first preview image, and the first preview image is a first image captured by a camera on the electronic device.

In some embodiments, the camera is a common camera or a first wide-angle camera. The first wide-angle camera is used as an example. The first image is a first image block in a first region on a first frame of image captured by the first wide-angle camera.

FIG. 14(b) is still used as an example. When detecting the second operation (an operation of tapping the option "Image rotation" in the selection box 1309), the electronic device enters the image rotation video recording mode. For a viewfinder interface in the image rotation video recording mode, refer to FIG. 24. A first preview image is displayed on the viewfinder interface, and the first preview image is a first image block in a first region on a first frame of image captured by the first wide-angle camera (for example, a wide-angle camera).

It can be understood that the electronic device uses a second wide-angle camera in the common video recording mode. When detecting the second operation used to indicate the first video recording mode (for example, the image rotation video recording mode), the electronic device starts the first wide-angle camera. An angle of view of the second wide-angle camera is less than an angle of view of the first wide-angle camera. The first wide-angle camera is, for example, an ultra-wide-angle camera, and the second wide-angle camera is, for example, a common wide-angle camera. In other words, after the electronic device switches from the common video recording mode to the image rotation video recording mode, the electronic device switches from the common wide-angle camera to the ultra-wide-angle camera, and the first preview image is the first image block in the first region on the first frame of image captured by the ultra-wide-angle camera.

3105: Keep a position of the electronic device unchanged, and detect a third operation that indicates an image rotation direction.

The third operation may be implemented in a plurality of manners. FIG. 24 is used as an example. The third operation may be an operation of tapping the icon 1363. For example, after the icon 1363 is tapped, clockwise or counterclockwise rotation starts by default. Alternatively, the third operation may be an operation of drawing a circle on the viewfinder interface, and a circle drawing direction of the circle drawing operation is the image rotation direction. Alternatively, the third operation may be an operation of tapping the left arrow on the left of the icon 1363, and the image rotation direction is counterclockwise rotation. Alternatively, the third operation may be an operation of tapping the right arrow on the right of the icon 1363, and the image rotation direction is clockwise rotation.

3106: Display a second preview image on the viewfinder interface in response to the third operation, where the second preview image is an image obtained after a second image captured by the camera rotates in the image rotation direction.

For example, if the camera is the first wide-angle camera (for example, the ultra-wide-angle camera), the first image may be a first frame of image captured by the ultra-wide-angle camera after the electronic device switches from the common video recording mode to the first video recording mode (that is, the image rotation video recording mode) and starts the ultra-wide-angle camera. FIG. 25 is used as an example. The first preview image is the first image block in the first region on the first frame of image. It is assumed that a third operation used to indicate image clockwise rotation is detected in a period from the $(m-1)^{th}$ frame of image to the $m^{th}$ frame of image. The electronic device determines the $m^{th}$ image block in the $m^{th}$ region (that is, the second region) on the $m^{th}$ frame of image (that is, the second image), where the second preview image is an image block obtained after the $m^{th}$ image block rotates by an angle G.

Optionally, a rotation direction of the second image relative to the first image is the same as or opposite to the image rotation direction indicated by the third operation. This is not limited in this embodiment of this application.

In some embodiments, a third preview image is displayed on the viewfinder interface after the second preview image, where the third preview image is an image obtained after a third image captured by the camera rotates in the image rotation direction, and a rotation angle of the third image relative to the second image is the same as a rotation angle of the second image relative to the first image. For example, if the camera is the first wide-angle camera (the ultra-wide-angle camera), the third preview image after the second preview image may be an image block obtained after a third image block in a third region on the third image captured by the ultra-wide-angle camera rotates by a specific angle. FIG. 25 is still used as an example. The second image is the $m^{th}$ frame of image, the second region is the $m^{th}$ region, and the second preview image is an image block obtained after the image block in the $m^{th}$ region rotates by an angle G. The third image is the $(m+1)^{th}$ frame of image, the third region is the $(m+1)^{th}$ region, and the third preview image is an image block obtained after the image block in the $(m+1)^{th}$ region rotates by an angle 2G. Therefore, a rotation angle of the third region relative to the second region is equal to a rotation angle of the second region relative to the first region. To be specific, a preview image rotates at a constant speed. Certainly, the rotation angle of the third region relative to the second region may be different from the rotation angle of the second region relative to the first region. For example, if the rotation angle of the third region relative to the second region is greater than the rotation angle of the second region relative to the first region, the rotation is accelerated. If the rotation angle of the third region relative to the second region is less than the rotation angle of the second region relative to the first region, the rotation is decelerated.

In a possible implementation, the third operation is used to indicate an image rotation direction. In this possible implementation, after detecting the third operation, the electronic device is in a preview mode. In the preview mode, a previewed picture rotates. When detecting an operation on the video recording control 1307, the electronic device starts video recording. After the video recording starts, the preview image continues to rotate. When a video recording stop instruction is detected, the video recording stops.

In another possible implementation, the third operation not only may be used to indicate an image rotation direction, but also may be used to indicate to start video recording. FIG. 24 is used as an example. When detecting a third operation that the user taps the left arrow on the left of the icon 1363, the electronic device displays the second preview image, and starts video recording. When detecting a rotation stop instruction, the electronic device stops the rotation and the video recording, and stores a video. The video includes the second preview image.

FIG. 25 is used as an example. When the electronic device detects the image clockwise rotation instruction, the electronic device displays, on the viewfinder interface, an image block obtained after the $m^{th}$ image block in the $m^{th}$ region rotates by an angle G, and starts video recording. Then, preview images are sequentially updated to image blocks obtained after the image block in the $(m+1)^{th}$ region and the image block in the $(m+2)^{th}$ region rotate at a specific angle. Until the electronic device detects the rotation stop instruction, the electronic device stops the video recording and stores a video, where the video includes an image block obtained after the $m^{th}$ image block rotates by an angle G, an image block obtained after the $(m+1)^{th}$ image block rotates by an angle 2G, and an image block obtained after the $(m+2)^{th}$ image block rotates by an angle 3G.

Optionally, the second image may be one of M frames of images obtained through frame extraction from N frames of images captured by the first wide-angle camera, where N is an integer greater than or equal to 1, and M is an integer less than N. For a specific frame extraction process, refer to the descriptions in FIG. 19A or FIG. 19B. Details are not described herein again. Alternatively, the second image is one of M frames of images obtained through multi-frame image insertion into N frames of images captured by the first wide-angle camera, where N is an integer greater than or equal to 1, and M is an integer greater than N. For a specific frame insertion process, refer to the descriptions in FIG. 19C or FIG. 19D. Details are not described herein again.

The terms used in the following embodiments are merely intended to describe specific embodiments, but are not intended to limit this application. The terms "one", "a", "the", "the foregoing", "this", and "the one" of singular forms used in this specification and the appended claims of this application are also intended to include plural forms such as "one or more", unless otherwise specified in the context clearly. It should be further understood that, in the embodiments of this application, "one or more" means one, two, or more. In addition, "and/or" describes an association relationship between associated objects, and indicates that three relationships may exist. For example, A and/or B may indicate a case in which only A exists, both A and B exist, and only B exists, where A and B may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements such as "in an embodiment", "in some embodiments", "in some other embodiments", and "in other embodiments" that appear at different places do not necessarily mean referring to a same embodiment. Instead, the statements mean referring to "one or more but not all of the embodiments", unless otherwise specified in other manners. The terms "include", "comprise", "have", and variants of the terms all mean "include but are not limited to", unless otherwise specified in other manners.

In the embodiments provided in this application, the method provided in the embodiments of this application is described from the perspective in which the mobile device (for example, the mobile phone) is used as an execution body. To implement functions in the method provided in the embodiments of this application, the terminal device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint condition of the technical solutions.

According to the context, the term "when" or "after" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "when it is determined that", "in response to determining", "when (a stated condition or event) is detected", or "in response to detecting (a stated condition or event)". In addition, in the foregoing embodiments, relational terms such as first and second are used to distinguish one entity from another, and any actual relationship and order between these entities are not limited.

All or some of the foregoing embodiments may be implemented by using software, hardware, firmware, or any combination thereof. When the software is used to implement the embodiments, the embodiments may be implemented all or partially in a form of a computer program product. The computer program product includes one or more computer instructions. When the computer program instructions are loaded and executed on a computer, all or some of the procedures or the functions according to the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be noted that a part of this patent application document includes content protected by a copyright. The copyright owner reserves the copyright except for making a copy of the patent documents of the Patent Office or the content of the recorded patent documents.

What is claimed is:

1. An electronic device comprising:
    a processor; and
    a memory coupled to the processor and configured to store instructions wherein when executed by the processor, the instructions cause the electronic device to:
        enable a camera function;
        obtain, for the camera function, a first operation of a user;
        determine, in response to the first operation, a first video recording template comprising a first example sample corresponding to a first camera movement mode, a second example sample corresponding to a second camera movement mode, and a preset audio, wherein the first camera movement mode is different from the second camera movement mode;
        display a video recording interface comprising a first camera movement mode identifier identifying the first camera movement mode and a second camera movement mode identifier identifying the second camera movement mode;
        obtain a second operation of the user;
        start a video recording in response to the second operation;
        generate, during the video recording and while maintaining a first position of the electronic device, a first video clip in the first camera movement mode, wherein the first video clip has a moving effect corresponding to the first camera movement mode;
        generate, during the video recording and while maintaining a second position of the electronic device, a second video clip in the second camera movement mode, wherein the second video clip has a moving effect corresponding to the second camera movement mode; and
        generate a first synthetic video comprising the first video clip, the second video clip, and the preset audio.

2. The electronic device of claim 1, wherein when executed by the processor, the instructions further cause the electronic device:
    obtain a shooting indication by the user;
    further generate, when the first camera movement mode identifier is selected and in response to the shooting indication, the first video clip, wherein the first video clip is of a first preset duration; and
    further generate, when the second camera movement mode identifier is selected and in response to the shooting indication, the second video clip, wherein the second video clip is of a second preset duration.

3. The electronic device of claim 2, wherein when executed by the processor, the instructions further cause the electronic device:
display, on the video recording interface, a first countdown of generating the first video clip when generating the first video clip; and
display, on the video recording interface, a second countdown of generating the second video clip when generating the second video clip.

4. The electronic device of claim 1, wherein when executed by the processor, the instructions further cause the electronic device:
obtain a third operation of the user;
delete, in response to the third operation and from the video recording interface, the first camera movement mode identifier or the second camera movement mode identifier;
obtain a fourth operation of the user;
maintain the position and start recording in response to the fourth operation; and
generate a second synthetic video comprising the preset audio and a third video clip generated in a remaining camera movement mode that is not deleted from the first camera movement mode and the second camera movement mode.

5. The electronic device of claim 1, wherein when executed by the processor, the instructions further cause the electronic device to:
obtain a third operation of the user;
add, in response to the third operation and to the video recording interface, a third camera movement mode identifier indicating a third camera movement mode;
obtain a fourth operation of the user;
maintain the position and start recording in response to the fourth operation; and
generate a second synthetic video comprising the first video clip, the second video clip, a third video clip generated in the third camera movement mode, and the preset audio.

6. The electronic device of claim 1, wherein when executed by the processor, the instructions further cause the electronic device to:
obtain a third operation of the user;
adjust, in response to the third operation, a first order of displaying the first camera movement mode identifier and the second camera movement mode identifier to a second order;
obtain a fourth operation of the user;
maintain the position and start recording in response to the fourth operation; and
generate a second synthetic video, wherein, in the second synthetic video, the first video clip and the second video clip are in the second order.

7. The electronic device of claim 1, wherein when executed by the processor, the instructions further cause the electronic device to display, on the video recording interface, the first example sample, the second example sample, or both the first example sample and the second example sample.

8. The electronic device of claim 1, wherein when executed by the processor, the instructions further cause the electronic device:
display a presentation interface comprising the first video clip and the second video clip;
obtain, from the user, a video synthesizing instruction; and
perform, in response to the video synthesizing instruction, video synthesizing to obtain the first synthetic video.

9. The electronic device of claim 1, wherein when executed by the processor, the instructions further cause the electronic device:
obtain a third operation of the user and delete the first video clip or the second video clip in response to the third operation;
add a local third video clip to the first synthetic video; or
adjust an order of playing the first video clip or the second video clip in the first synthetic video.

10. The electronic device of claim 1, wherein the first video recording template is a default template or a user-defined template.

11. An electronic device comprising:
a first wide-angle camera configured to capture a first image and a second image;
a display; and
a processor coupled to the display and the first wide-angle camera and configured to cause the electronic device to:
detect a first operation for opening a camera application;
start, in response to the first operation, the camera application;
detect a second operation indicating a first video recording mode;
display, in response to the second operation and on the display, a viewfinder interface comprising a first preview image, wherein the first preview image is a first image block in a first region in the first image;
maintain a position of the electronic device;
detect a third operation indicating a first image movement direction; and
display, on the viewfinder interface in response to the third operation, a second preview image that is either a second image block in a second region in the second image or a third image block that is based on an angle of view conversion on the second image block,
wherein an orientation of the second region relative to the first region is related to the first image movement direction, wherein a second distance is between the second region and a second edge of the second image, wherein a first distance is between the first region and a first edge of the first image, and wherein a distance change amount of the second distance relative to the first distance is related to the first image movement direction.

12. The electronic device of claim 11, wherein the orientation is the same as or opposite to the first image movement direction.

13. The electronic device of claim 11, wherein the processor is further configured to cause the electronic device to display, on the viewfinder interface, a third preview image that is either a fourth image block in a third region on a third image or a fifth image block obtained after the angle of view conversion is performed on the fourth image block, wherein a second orientation change amount of the third region relative to the second region is equal to a first orientation change amount of the second region relative to the first region, wherein the second orientation change amount is a first distance change amount of a third distance relative to a second distance between the second region and a second edge of the second image, wherein the first orientation change amount is a second distance change amount of the second distance relative to a first distance between the first region and a first edge of the first image, and wherein the third distance is between the third region and a third edge of the third image.

14. The electronic device of claim 11, further comprising a second wide-angle camera coupled to the processor and configured to capture a third image, wherein a second field of view of the second wide-angle camera is less than a first field of view of the first wide-angle camera, wherein before detecting the second operation, the processor is further configured to cause the electronic device to display, on the viewfinder interface, the third image as a third preview image, and wherein the first preview image is some or all of image blocks within an overlapping range between the first field of view and the second field of view.

15. The electronic device of claim 11, wherein the third operation comprises:
   a flick operation on the first preview image;
   a fourth operation on a first control for indicating an image rotation direction on the viewfinder interface; or
   a fifth operation of pressing and dragging a second control on the viewfinder interface.

16. The electronic device of claim 11, wherein the processor is further configured to cause the electronic device to:
   detect an image movement stop instruction; and
   generate and store, in response to the image movement stop instruction, a video comprising the second preview image.

17. The electronic device of claim 16, wherein the processor is further configured to cause the electronic device to generate the image movement stop instruction when:
   detecting an uplift after a flick operation on the first preview image when the third operation is the flick operation;
   detecting that a tap operation is performed again at any position on the viewfinder interface when the third operation is a sixth operation of tapping a third control indicating a second image movement direction on the viewfinder interface;
   detecting the uplift after a touch and hold operation when the third operation is a seventh operation of touching and holding a fourth control indicating the second image movement direction; and
   detecting the uplift after a drag operation when the third operation is an eighth operation of pressing and dragging a fifth control on the viewfinder interface.

18. The electronic device of claim 11, wherein the first wide-angle camera is further configured to capture N frames of images, and wherein the processor is further configured to cause the electronic device to:
   obtain M1 frames of images through frame extraction from the N frames of images and obtain the second image from one of the M1 frames of images, wherein N is an integer greater than or equal to 1, and wherein M1 is an integer less than N; or
   obtain M2 frames of images through multi-frame image insertion into the N frames of images and obtain the second image from one of the M2 frames of images, wherein M2 is an integer greater than N.

19. The electronic device of claim 11, wherein the third image block satisfies the following formulas:

$$x'=x*\cos(\theta)-\sin(\theta)*y; \text{ and}$$

$$y'=x*\sin(\theta)+\cos(\theta)*y,$$

wherein (x', y') is a first pixel on the third image block, wherein (x, y) is a second pixel on the second image block, and wherein θ is a preset rotation angle.

* * * * *